(12) United States Patent
Bartfai-Walcott et al.

(10) Patent No.: US 11,972,269 B2
(45) Date of Patent: Apr. 30, 2024

(54) DEVICE ENHANCEMENTS FOR SOFTWARE DEFINED SILICON IMPLEMENTATIONS

(71) Applicant: Intel Corporation, Santa Clara, CA (US)

(72) Inventors: Katalin Klara Bartfai-Walcott, El Dorado Hills, CA (US); Arkadiusz Berent, Tuchom (PL); Vasuki Chilukuri, Hillsboro, OR (US); Mark Baldwin, Hillsboro, OR (US); Vasudevan Srinivasan, Portland, OR (US); Bartosz Gotowalski, Gdansk (PL)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 18/092,163

(22) Filed: Dec. 30, 2022

(65) Prior Publication Data

US 2023/0132432 A1 May 4, 2023

Related U.S. Application Data

(63) Continuation of application No. 17/033,267, filed on Sep. 25, 2020, now Pat. No. 11,599,368.
(Continued)

(51) Int. Cl.
*G06F 9/445* (2018.01)
*G06F 11/30* (2006.01)
(Continued)

(52) U.S. Cl.
CPC ...... *G06F 9/44505* (2013.01); *G06F 11/3058* (2013.01); *G06F 21/105* (2013.01);
(Continued)

(58) Field of Classification Search
CPC ............. G06F 11/3051; G06F 11/3058; G06F 21/105; G06F 21/1075; G06F 21/445;
(Continued)

(56) References Cited

U.S. PATENT DOCUMENTS 7,315,826 B1 1/2008 Guheen et al.
7,493,477 B2 2/2009 Velhal et al.
(Continued)

FOREIGN PATENT DOCUMENTS

CN 114341917 A 4/2022
DE 112020004561 T5 10/2022
(Continued)

OTHER PUBLICATIONS

Kepa et al. "IP protection in partially reconfigurable FPGAs", IEEE 2009, 2009, pp. 403-409, 7 pages.
(Continued)

*Primary Examiner* — Terrell S Johnson
(74) *Attorney, Agent, or Firm* — Hanley, Flight & Zimmerman, LLC

(57) ABSTRACT

Methods, apparatus, systems and articles of manufacture (e.g., physical storage media) to provide device enhancements for software defined silicon implementations are disclosed. Example non-transitory computer readable medium includes instructions to cause one or more processors to at least generate a first stock keeping unit, associate the first stock keeping unit with a semiconductor device, the first stock keeping unit associated with a first set of features to be provided by the semiconductor device, command the semiconductor device to activate a feature not included in the first set of features to cause the semiconductor device to provide a second set of features, generate a second stock keeping unit for the semiconductor device, and associate the second stock keeping unit with the semiconductor device
(Continued)

and the second set of features to be provided by the semiconductor device.

25 Claims, 37 Drawing Sheets

Related U.S. Application Data

(60) Provisional application No. 63/049,017, filed on Jul. 7, 2020, provisional application No. 62/937,032, filed on Nov. 18, 2019, provisional application No. 62/907,353, filed on Sep. 27, 2019.

(51) Int. Cl.
  *G06F 21/10*  (2013.01)
  *G06Q 10/087*  (2023.01)
  *G06Q 30/04*  (2012.01)
  *H04L 9/32*  (2006.01)

(52) U.S. Cl.
  CPC .......... *H04L 9/3247* (2013.01); *H04L 9/3268* (2013.01); *H04L 9/3278* (2013.01); *G06F 21/1075* (2023.08); *G06Q 10/087* (2013.01); *G06Q 30/04* (2013.01)

(58) Field of Classification Search
  CPC ............... G06F 21/602; G06F 2201/81; G06F 2201/835; G06F 9/44505; G06Q 10/087; G06Q 30/018; G06Q 30/04; G06Q 30/0601; G06Q 30/0621; H04L 9/0866; H04L 9/3247; H04L 9/3268; H04L 9/3278
  See application file for complete search history.

(56) References Cited

U.S. PATENT DOCUMENTS

| | | | |
|---|---|---|---|
| 7,681,245 B2 * | 3/2010 | Walker | G06F 21/10 726/30 |
| 7,814,366 B2 * | 10/2010 | Apparao | G06F 11/008 714/13 |
| 7,895,124 B2 | 2/2011 | Baratti et al. | |
| 8,055,822 B2 | 11/2011 | Bernstein et al. | |
| 8,082,547 B1 | 12/2011 | Herington et al. | |
| 8,194,569 B2 | 6/2012 | Shorty et al. | |
| 8,224,750 B1 | 7/2012 | Bennett et al. | |
| 9,032,482 B2 | 5/2015 | Kondou et al. | |
| 9,104,894 B2 | 8/2015 | Brown et al. | |
| 9,280,338 B1 | 3/2016 | Stickle et al. | |
| 9,411,395 B2 | 8/2016 | Rosenzweig et al. | |
| 9,513,968 B1 | 12/2016 | Fiske et al. | |
| 9,652,612 B2 | 5/2017 | Brech et al. | |
| 10,031,993 B1 * | 7/2018 | Poornachandran | H03K 19/17704 |
| 10,361,864 B2 | 7/2019 | Glendinning | |
| 11,218,322 B2 | 1/2022 | Ghetie et al. | |
| 11,573,830 B2 | 2/2023 | Bartfai-Walcott et al. | |
| 11,579,897 B2 | 2/2023 | Bartfai-Walcott et al. | |
| 11,599,368 B2 | 3/2023 | Bartfai-Walcott et al. | |
| 2003/0112123 A1 | 6/2003 | Hom et al. | |
| 2004/0044631 A1 | 3/2004 | Walker et al. | |
| 2004/0221193 A1 | 11/2004 | Armstrong et al. | |
| 2005/0289072 A1 | 12/2005 | Sabharwal | |
| 2006/0168372 A1 | 7/2006 | Smith et al. | |
| 2006/0212677 A1 | 9/2006 | Fossum | |
| 2007/0188351 A1 | 8/2007 | Brown et al. | |
| 2009/0204544 A1 | 8/2009 | Eizenhoefer et al. | |
| 2009/0323107 A1 | 12/2009 | Maeda | |
| 2010/0100565 A1 | 4/2010 | Adachi | |
| 2011/0154348 A1 | 6/2011 | Elnozahy et al. | |
| 2011/0191832 A1 | 8/2011 | Davis et al. | |
| 2011/0197077 A1 | 8/2011 | Chan et al. | |
| 2013/0089004 A1 | 4/2013 | David et al. | |
| 2013/0111033 A1 | 5/2013 | Mao et al. | |
| 2013/0145431 A1 | 6/2013 | Kruglick | |
| 2014/0013153 A1 | 1/2014 | Chittigala et al. | |
| 2014/0044265 A1 | 2/2014 | Kocher et al. | |
| 2014/0068792 A1 | 3/2014 | Kondou et al. | |
| 2014/0317422 A1 | 10/2014 | Rosenzweig et al. | |
| 2014/0359350 A1 | 12/2014 | Plank et al. | |
| 2016/0142890 A1 | 5/2016 | Drozdovskyy et al. | |
| 2016/0259923 A1 | 9/2016 | Papa et al. | |
| 2017/0041793 A1 | 2/2017 | Lee et al. | |
| 2017/0206352 A1 | 7/2017 | Brech et al. | |
| 2017/0357784 A1 | 12/2017 | Duda et al. | |
| 2018/0109537 A1 | 4/2018 | Schmidt et al. | |
| 2018/0145836 A1 | 5/2018 | Saur et al. | |
| 2018/0219841 A1 | 8/2018 | Nadler et al. | |
| 2018/0260538 A1 | 9/2018 | Ramirez et al. | |
| 2018/0336342 A1 | 11/2018 | Narendra et al. | |
| 2019/0245707 A1 | 8/2019 | Coombes et al. | |
| 2020/0034171 A1 | 1/2020 | Kommula et al. | |
| 2020/0153645 A1 | 5/2020 | Sutton et al. | |
| 2020/0160340 A1 | 5/2020 | Walters et al. | |
| 2020/0310872 A1 | 10/2020 | Jambur et al. | |
| 2021/0011741 A1 | 1/2021 | Bartfai-Walcott et al. | |
| 2021/0012357 A1 | 1/2021 | Bartfai-Walcott et al. | |
| 2021/0012445 A1 | 1/2021 | Bartfai-Walcott et al. | |
| 2021/0117515 A1 | 4/2021 | Bartfai-Walcott et al. | |
| 2021/0334101 A1 | 10/2021 | Palermo et al. | |
| 2022/0092154 A1 | 3/2022 | Bartfai-Walcott et al. | |
| 2022/0100823 A1 | 3/2022 | Bartfai-Walcott et al. | |

FOREIGN PATENT DOCUMENTS

| | | |
|---|---|---|
| WO | 2021062242 A1 | 4/2021 |
| WO | 2021062243 A2 | 4/2021 |
| WO | 2022240905 A1 | 11/2022 |

OTHER PUBLICATIONS

United States Patent and Trademark Office, "Requirement for Restriction / Election," issued in connection with U.S. Appl. No. 17/133,876, mailed on Aug. 31, 2023, 6 pages.

Maes et al; "A Pay-per-User Licensing Scheme for Hardware IP Cores in Recent SRAM-Based FPGAs"; IEEE 2011; (Maes_2012.pdf; pp. 98-108) (Year: 2012).

United States Patent and Trademark Office, "Final Office Action", issued in connection with U.S. Appl. No. 17/033,252, on Jun. 14, 2023, 15 pages.

Chen et al., "Cloud Licensing model for -NET software protection," Computer Science & Education (ICCSE), IEEE, dated Jul. 14, 2012, pp. 1069-1074.

United States Patent and Trademark Office, "Non-Final Office Action," issued in connection with U.S. Appl. No. 17/033,200, dated May 12, 2023, 13 pages.

Amelino et al. "An IP Core Remote Anonymous Activation Protocol", IEEE Transactions on Emerging Topics in Computing 2016, updated Jun. 6, 2018, pp. 258-268, 11 pages.

Amelino et al., "A proposal for the secure activation and licensing of FPGA IP cores", ITASEC, 2017, 9 pages.

United States Patent and Trademark Office, "Notice of Allowance," issued in U.S. Appl. No. 17/033,267, dated Feb. 2, 2023, 2 pages.

United States Patent and Trademark Office, "Notice of Allowance," issued in connection with U.S. Appl. No. 17/442,541, on Jan. 5, 2023, 3 pages.

International Searching Authority, "International Search Report," issued in connection with PCT No. PCT/US2020/052847, Mar. 3, 2021, 3 pages.

International Searching Authority, "Written Opinion of the International Searching Authority," issued in connection with International Patent Application No. PCT/US2020/052847, dated Mar. 3, 2021, 6 pages.

International Searching Authority, "Written Opinion of the International Searching Authority," issued in connection with International Patent Application No. PCT/US2020/052848, dated Mar. 22, 2021, 5 pages.

(56) References Cited

OTHER PUBLICATIONS

International Searching Authority, "International Search Report," issued in connection with International Patent Application No. PCT/US2020/052848, dated Mar. 22, 2021, 4 pages.
Anonymous: "Trusted execution environment", Wikipedia, Apr. 29, 2021, pp. 1-7.
United States Patent and Trademark Office, Restriction Requirement, mailed in connection with U.S. Appl. No. 17/033,267, on Feb. 15, 2022, 6 pages.
International Searching Authority, "International Preliminary Report on Patentability," issued in connection with International Patent Application No. PCT/US2020/052847, dated Mar. 15, 2022, 8 pages.
International Searching Authority, "International Preliminary Report on Patentability," issued in connection with International Patent Application No. PCT/US2020/052848, dated Mar. 15, 2022, 7 pages.
United States Patent and Trademark Office, "Notice of Allowance," issued in connection with U.S. Appl. No. 17/442,541, dated May 6, 2022, 10 pages.
Netherland Patent Office, "Decision formal defects," issued in connection with Netherland Patent Application No. 2031835, dated May 20, 2022, 4 pages. (Machine translation included).
United States Patent and Trademark Office, "Notice of Allowance," issued in connection with U.S. Appl. No. 17/442,041, dated Jun. 23, 2022, 11 pages.
United States Patent and Trademark Office, "Notice of Allowance," issued in connection with U.S. Appl. No. 17/033,267, dated Jul. 6, 2022, 10 pages.
United States Patent and Trademark Office, "Notice of Allowance," issued in connection with U.S. Appl. No. 17/442,041, dated Jul. 13, 2022, 3 pages.
International Searching Authority, "Partial International Search," issued in connection with PCT Application No. PCT/US2022/028632, dated Aug. 19, 2022, 14 pages.
Netherland Patent Office, "Decision restoration request," issued in connection with Netherland Patent Application No. 2031835, dated Feb. 28, 2023, 4 pages. [Machine translation included].
Netherland Patent Office, "Reminder formal defects," issued in connection with Netherland Patent Application No. 2031835, dated Sep. 7, 2022, 4 pages. (Machine Translation included).
United States Patent and Trademark Office, "Restriction Requirement," in connection with U.S. Appl. No. 17/033,252, on Sep. 21, 2022, 5 pages.
United States Patent and Trademark Office, "Notice of Allowance," in connection with U.S. Appl. No. 17/442,541, on Sep. 21, 2022, 10 pages.
United States Patent and Trademark Office, "Notice of Allowance," issued in U.S. Appl. No. 17/442,541, dated Sep. 21, 2022, 10 pages.
United States Patent and Trademark Office, "Notice of Allowance," issued in connection with U.S. Appl. No. 17/033,267, dated Oct. 11, 2022, 5 pages.
United States Patent and Trademark Office, "Notice of Allowance," issued in connection with U.S. Appl. No. 17/442,041, dated Oct. 12, 2022, 11 pages.
United States Patent and Trademark Office, "Notice of Allowance," issued in U.S. Appl. No. 17/442,041, dated Jan. 5, 2023, 2 pages.
International Searching Authority, "International Search Report," issued in connection with International Patent Application No. PCT/US2022/028632, dated Oct. 21, 2022, 7 pages.
International Searching Authority, "Written Opinion of the International Searching Authority," issued in connection with International Patent Application No. PCT/US2022/028632, dated Oct. 21, 2022, 12 pages.
United States Patent and Trademark Office, "Notice of Allowance," issued in connection with U.S. Appl. No. 17/442,041, dated Nov. 2, 2022, 3 pages.
United States Patent and Trademark Office, "Notice of Allowance," issued in connection with U.S. Appl. No. 17/442,041, dated Nov. 23, 2022, 3 pages.
United States Patent and Trademark Office, "Notice of Allowance," issued in connection with U.S. Appl. No. 17/442,541, dated Dec. 7, 2022, 2 pages.
United States Patent and Trademark Office, "Non-Final Office Action", issued in connection with U.S. Appl. No. 17/033,252, on Dec. 16, 2022, 10 pages.
United States Patent and Trademark Office, "Requirement for Restriction/Election", issued in connection with U.S. Appl. No. 17/033,200, on Dec. 28, 2022, 6 pages.
Netherlands Patent Office, "Search Report," issued in connection with Dutch Patent Application No. 2031835, dated Jul. 24, 2023, 18 pages.
European Patent Office, "Extended European Search Report," issued in connection with European Patent Application No. 20868873.9, dated Sep. 6, 2023, 7 pages.
International Searching Authority, "International Preliminary Report on Patentability," issued in connection with International Application No. PCT/US2022/028632, mailed on Nov. 23, 2023, 13 pages.
United States Patent and Trademark Office, "Final Office Action," issued in connection with U.S. Appl. No. 17/033,200, dated Nov. 29, 2023, 14 pages.
United States Patent and Trademark Office, "Notice of Allowance and Fee(s) Due," issued in connection with U.S. Appl. No. 17/133,876, dated Jan. 8, 2024, 8 pages.

\* cited by examiner

DEVICE ENHANCEMENTS FOR SOFTWARE DEFINED SILICON IMPLEMENTATIONS

RELATED APPLICATION(S)

This patent arises from a continuation of U.S. patent application Ser. No. 17/033,267, which is titled "DEVICE ENHANCEMENTS FOR SOFTWARE DEFINED SILICON IMPLEMENTATIONS," and which was filed on Sep. 25, 2020, which claims the benefit of U.S. Provisional Application Ser. No. 62/907,353, which is titled "SOFTWARE DEFINED SILICON IMPLEMENTATION AND MANAGEMENT," and which was filed on Sep. 27, 2019. U.S. patent application Ser. No. 17/033,267 also claims the benefit of U.S. Provisional Application Ser. No. 62/937,032, which is titled "SOFTWARE DEFINED SILICON IMPLEMENTATION AND MANAGEMENT," and which was filed on Nov. 18, 2019. U.S. patent application Ser. No. 17/033,267 further claims the benefit of U.S. Provisional Application Ser. No. 63/049,017, which is titled "SYSTEMS, METHODS, AND APPARATUS FOR SOFTWARE DEFINED SILICON SECURITY," and which was filed on Jul. 7, 2020. Priority to U.S. patent application Ser. No. 17/033,267, U.S. Provisional Application Ser. No. 62/907,353, U.S. Provisional Application Ser. No. 62/937,032, and U.S. Provisional Application Ser. No. 63/049,017 is claimed. U.S. patent application Ser. No. 17/033,267, U.S. Provisional Application Ser. No. 62/907,353, U.S. Provisional Application Ser. No. 62/937,032, and U.S. Provisional Application Ser. No. 63/049,017 are hereby incorporated by reference herein in their respective entireties.

FIELD OF THE DISCLOSURE

This disclosure relates generally to semiconductor devices and, more particularly, to systems, methods, and apparatus for software defined silicon security.

BACKGROUND

In today's marketplace, semiconductor device manufacturers ship semiconductor devices, such as microprocessors, with hardware and firmware features fixed, or locked, at the factory. Even if additional, dormant hardware and/or firmware features are included in the shipped semiconductor devices, such dormant features are unable to be activated after the semiconductor devices leave the factory. To gain access to one or more of those dormant features, a customer would need to order, and a manufacturer would need to ship, new versions of the semiconductor devices that have the desired dormant feature(s) activated at the factory. To further complicate matters, the manufacturer may need to predefine and manage numerous different stock keeping units (SKUs) to track the various combinations of different features that are able to be activated on its semiconductor devices, even if some of those combinations are never realized.

Figure 1:
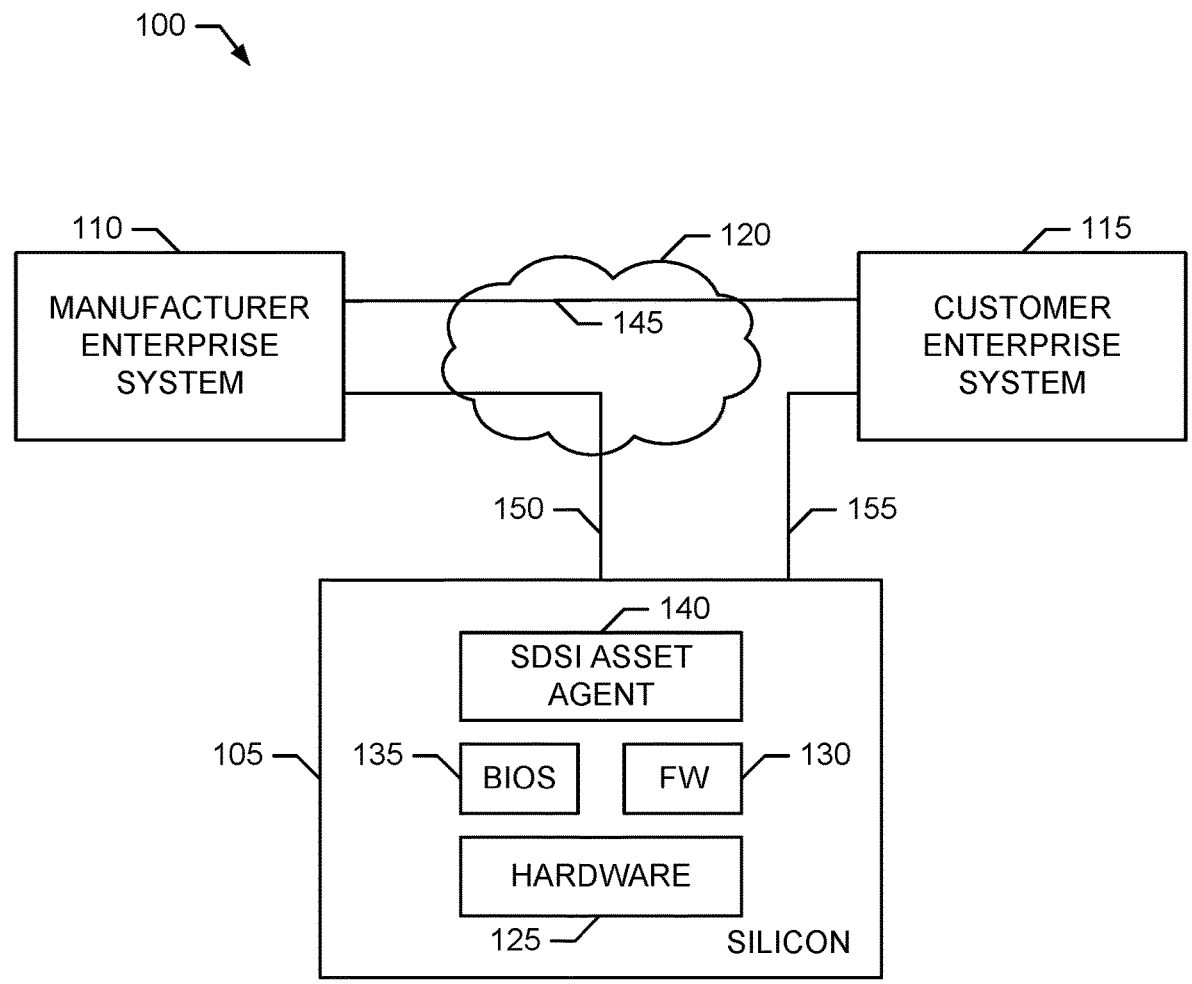
FIG. 1 is a block diagram of an example system to implement and manage software defined silicon products in accordance with teachings of this disclosure.

The figures are not to scale. In general, the same reference numbers will be used throughout the drawing(s) and accompanying written description to refer to the same or like parts, elements, etc. Connection references (e.g., attached, coupled, connected, and joined) are to be construed broadly and may include intermediate members between a collection of elements and relative movement between elements unless otherwise indicated. As such, connection references do not necessarily infer that two elements are directly connected and in fixed relation to each other.

Unless specifically stated otherwise, descriptors such as "first," "second," "third," etc. are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name. As used herein, "approximately" and "about" refer to dimensions that may not be exact due to manufacturing tolerances and/or other real world imperfections. As used herein "substantially real time" refers to occurrence in a near instantaneous manner recognizing there may be real world delays for computing time, transmission, etc. Thus, unless otherwise specified, "substantially real time" refers to real time+/−1 second.

DETAILED DESCRIPTION

Software Defined Silicon Architecture

Methods, apparatus, systems and articles of manufacture (e.g., physical storage media) to implement and manage software defined silicon products, also referred to as silicon assets, are disclosed herein. Examples of silicon products include any type of semiconductor device, such as, computer processors, central processing unit(s) (CPUs), semiconductor chips, silicon hardware devices, etc., as well as circuit boards and/or systems employing such silicon products, etc. Software Defined Silicon (SDSi) as disclosed herein, which is also referred to as Software Defined Intelligent Silicon (SDISi), enables a hardware agnostic activation and entitlement management solution, which can realize additional market and monetization opportunities for silicon products. For example, silicon products can be released to the market with additional, dormant processing capacity and/or features (e.g., to support unexpected market shifts, future competitive pressures, etc.) SDSi provides a solution for customers to access those features and for the platform manufacturer to recover trapped revenue in shipped products post-sale.

As mentioned above, semiconductor device manufacturers currently ship semiconductor devices, such as microprocessors, with hardware and firmware features fixed, or locked, at the factory. For example, a semiconductor device manufacturer may implement a semiconductor device with one-time fuses that are activated, or blown, to disable some features at the factory, leaving those feature dormant and unusable in the shipped semiconductor device. Thus, even if additional, dormant hardware and/or firmware features are included in the shipped semiconductor devices, such dormant features are unable to be activated after the semiconductor devices leave the factory when such one-time fuse implementations are employed. To gain access to one or more of those dormant features, a customer would need to order, and a manufacturer would need to ship, new versions of the semiconductor devices that have the desired dormant feature(s) activated at the factory. To further complicate matters, the manufacturer may need to predefine and manage a numerous different stock keeping units (SKUs) to track the various combinations of different features that are able to be activated on its semiconductor devices, even if some of those combinations are never realized.

In contrast, SDSi provides a solution that enables activation, deactivation and management of silicon product features after the product has left the manufacturer's facility and control. Thus, for silicon product manufacturers, SDSi provides a monetization opportunity and an access to new routes to market. For example, SDSi enables manufacturers to capture additional revenue via one-time activation, on-demand activation and/or recurring subscription models that extend feature activation and entitlement management onto the customer premises, with the potential for income and profits beyond the initial product sale. Additionally or alternatively, SDSi enables manufacturers to take advantage of economies of scale by reducing the number of different silicon product versions that need to be manufactured. For example, through the use of SDSi, manufacturers can implement one version of a silicon product with a baseline set of features activated, and can then activate other dormant features as requested and purchased by customers for their particular applications. For customers, SDSi enables effective management of capital expenditures and operating expenditures through silicon-enabled intra-scalability and elasticity. For example, SDSi can streamline a customer's inventory by reducing the number of different silicon product versions that need to be stocked to support different applications.

SDSi systems, as disclosed herein, also enable efficient SKU management by providing the ability to activate SKUs permanently, semi-permanently and/or via capacity-on-demand, and to provide SKU assignments on a per-customer basis. SDSi systems, as disclosed herein, enable permanent or dynamic activation of dormant features (also referred to as "dark assets") at a customer's premises without the need for a return merchandise authorization (RMA). In some examples, SDSI systems, as disclosed herein, also provide failure recovery solutions by activating dormant features to replace failed features on the silicon product.

These and other example methods, apparatus, systems and articles of manufacture (e.g., physical storage media) to implement and manage SDSi products are disclosed in greater detail below.

Software Defined Silicon Security

Methods, apparatus, systems, and articles of manufacture (e.g., physical storage media) for SDSi security are also disclosed herein. In some disclosed examples, SDSi solutions effectuate security features through at least one of peer-to-peer attestation or trusted execution environment (TEE) deployment. Maintaining trust within an SDSi solution is advantageous for silicon product manufacturers to ensure security of data (e.g., silicon product manufacturer owned cryptographical data). For example, the data can allow the unlocking or activation of SDSi features and security thereof is advantageous to protect revenue streams and prevent SDSi systems from being compromised by malicious actors.

In some disclosed examples, SDSi solutions effectuates system security by deploying a peer-to-peer attestation schema in a mesh network. For example, SDSi systems can communicate with each other to determine reputation information. In such disclosed examples, SDSi systems query other SDSIs systems for runtime measurements and identify compromised SDSi systems based on a comparison of the runtime measurements to known validated runtime measurements. In some such disclosed examples, SDSi systems identify an SDSi system to execute system functions, such as to facilitate entitlement/license processing and telemetry reporting, based on the reputation score. In some disclosed examples, SDSi systems improve system security by implementing re-certification processes to identify rogue and/or malicious SDSi systems.

In some disclosed examples, SDSi solutions effectuate system security by deploying TEEs within the SDSi systems or associated with the SDSi systems. For example, SDSi systems can explore an environment of a semiconductor device to determine security capabilities of the semiconductor device. In such disclosed examples, the security capabilities can include whether the semiconductor device supports deployment of one or more known TEEs, whether the semiconductor device has a capability to deploy a TEE component (e.g., trusted execution, trusted memory, trusted storage, etc.), etc. In some disclosed examples, SDSi systems deploy one of the known TEEs while, in some disclosed examples, SDSi systems compose a TEE based on one or more TEE components of which the semiconductor supports deployment thereof. In some disclosed examples, SDSi systems facilitate deployment of a TEE by translating an intent to deploy the TEE to one or more features of an associated semiconductor device. In such disclosed examples, SDSi systems translate the intent using one or more artificial intelligence (AI)/machine learning (ML) models.

These and other example methods, apparatus, systems and articles of manufacture (e.g., physical storage media) to implement and manage SDSi products are disclosed in greater detail below.

Device Enhancements

Device enhancements for software defined silicon implementations are also disclosed herein. As used herein, "the absolute time" refers to a particular clock and date reading (e.g., 11:11 PM EST, Jan. 1, 2020, etc.). As used herein, "the relative time" refers to an elapsed time between a fixed event (e.g., a time of manufacture of a device, etc.) and the current time. As used, herein a "time reference" refers to a singular absolute time reading and/or a singular relative time reading and may be used to generate a timestamp and/or an odometer reading.

As used herein, a "feature configuration" of a silicon product refers to the hardware, firmware, and/or physical features enabled on the silicon products. Feature configurations can, for example, include the number of cores of a processor that have been activated and/or the speed at which each core runs. As disclosed in further detail below, a license can be used to change the feature configuration of a silicon product.

As least some prior silicon products, such as central processing units (CPUs) and other semiconductor devices, are not able to provide/determine relative or absolute time references. For example, some existing CPUs lack internal clocks. Also, in at least some silicon products that include clocks, the clocks can be set and/or adjusted by a user of the machine, and, thusly, may not be reliable for determining absolute and/or relative time references. Further, some internal clocks (e.g., monotonic clocks, etc.) require power and, accordingly, cannot measure time if the silicon product and/or machine including the silicon product is powered off. Example SDSi systems disclosed herein utilize absolute and/or relative time references to enable or prohibit certain actions to ensure business and financial viability of feature activation decisions associated with the silicon product. In some examples, some silicon product features can be available only before or after a particular date and/or time from the time of manufacture of the processor.

Examples disclosed herein overcome the above-noted problems by adding one or more features to the silicon product, such that the feature has electrical properties that are time-dependent. In some examples disclosed herein, the electrical properties of the feature change in a known or predetermined manner as a function of time. In some examples disclosed herein, the electrical properties of the feature change when the silicon product is not powered on. In some examples disclosed herein, by determining the electrical properties of the feature at two separate points of time, the relative time between those points can be determined. In some examples disclosed herein, the electrical properties of the time-dependent features are measured at the time of manufacture and are stored with the date and time of manufacture. In such examples, the absolute time can be determined by adding the determined relative time between the current time and the time of manufacture to the date and time of manufacture. In some examples disclosed herein, the feature is implemented by a radioisotope. In some examples disclosed herein, the feature is implemented by a physical unclonable function (PUF) with time-varying electrical properties. As such, the examples disclosed herein provide a reliable and unfalsifiable measures of absolute and relative time references that do not require constant power to the silicon product and/or machine in which the silicon product is used.

Examples disclosed herein enable users, customers, and/or machine-manufacturers flexibility of changing the configuration of a processor after the silicon product has been manufactured. In some examples, the changing of the configuration of a silicon product can affect the operating conditions (e.g., thermal design power (TDP), etc.) of the silicon product, and, thusly, affect the lifespan and/or condition of the processor. As such, in some examples, changing the configuration of the silicon product can cause the silicon product to have a combination of features that damage the silicon product and/or reduce the lifespan of a silicon product to an unacceptable level. In some examples, the features activated in a given configuration can affect the operating conditions of a silicon product in an interdependent manner. For example, the number of active cores in a semiconductor device such as a CPU impacts the maximum frequency those cores can operate at, as well as the thermal design power of the semiconductor device. As such, to prevent unacceptable device degradation and damage, examples disclosed herein account for the effect of each feature on the operating conditions of the device.

Existing silicon products, such as CPUs, have limited internal storage. In existing techniques, the allowed configurations of a CPU are hard-coded into the CPU when the CPU is manufactured as multi-dimensional matrices. In some examples, given the number of features that may be enabled after manufacture, millions of potential combinations could be potentially enabled in a CPU. As such, in some examples, storing each allowable configuration in CPU memory can consume a significant amount of storage space of the CPU and severely limit the amount of memory available on the CPU for other functions and/or data. Adding additional memory to the CPU would increase manufacturing cost and/or the size of the CPU.

Examples disclosed herein overcome the above-noted problems by creating groups of features based on assigning weight(s) and/or value metric(s) to each feature in order to calculate a group score associated with a requested configuration. In such examples, the calculated group score can be compared to one or more thresholds to determine if the requested configuration allows for nominal operation of the silicon product. In some examples disclosed herein, the group score is compared to an enablement threshold. In such examples, if the group score does not satisfy the enablement threshold, the requested configuration results in operating conditions that may result in unacceptable degradation and/or damage to the silicon product and is, thusly, prohibited from being implemented. In some examples disclosed herein, the group score is compared to a warranty threshold. In such examples, if the group score does not satisfy the warranty threshold, the requested configuration results in operating conditions that void the warranty of the silicon product. In some examples disclosed herein, environmental factors (e.g., ambient temperature, available machine cooling, humidity, radiation, etc.) are incorporated into the determination of the group score. In some examples disclosed herein, multiple group scores are calculated for different unrelated feature-groups. In such examples, each group score is compared to different threshold values. In some examples disclosed herein, a machine learning model to refine and update the group score algorithm and/or weights for each feature using historic silicon product operating data.

Software Defined Silicon Architecture

Turning to the figures, a block diagram of an example system 100 to implement and manage SDSi products in accordance with teachings of this disclosure is illustrated in FIG. 1. The example SDSi system 100 of FIG. 1 includes an example silicon product 105, such as an example semiconductor device 105 or any other silicon asset 105, that implement SDSi features as disclosed herein. Thus, the silicon product 105 of the illustrated example is referred to herein as an SDSi product 105, such as an SDSi semiconductor device 105 or SDSi silicon asset 105. The system 100 also includes an example manufacturer enterprise system 110 and an example customer enterprise system 115 to manage the SDSi product 105. In the illustrated example of FIG. 1, at least some aspects of the manufacturer enterprise system 110 are implemented as cloud services in an example cloud platform 120.

The example manufacturer enterprise system 110 can be implemented by any number(s) and/or type(s) of computing devices, servers, data centers, etc. In some examples, the manufacturer enterprise system 110 is implemented by a processor platform, such as the example processor platform 2800 of FIG. 28. Likewise, the example customer enterprise system 115 can be implemented by any number(s) and/or type(s) of computing devices, servers, data centers, etc. In some examples, the customer enterprise system 115 is implemented by a processor platform, such as the example processor platform 2900 of FIG. 29. The example cloud platform 120 can be implemented by any number(s) and/or type(s), such as Amazon Web Services (AWS®), Microsoft's Azure® Cloud, etc. In some examples, the cloud platform 120 is implemented by one or more edge clouds as described below in connection with FIGS. 35-37. Aspects of the manufacturer enterprise system 110, the customer enterprise system 115 and the cloud platform 120 are described in further detail below.

In the illustrated example of FIG. 1, the SDSi product 105 is an SDSi semiconductor device 105 that includes example hardware circuitry 125 that is configurable under the disclosed SDSi framework to provide one or more features. For example, such features can include a configurable number of processor cores, a configurable clock rate from a set of possible clock rates, a configurable cache topology from a set of possible cache topologies, configurable coprocessors, configurable memory tiering, etc. As such, the hardware circuitry 125 can include one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)), field programmable gate arrays (FPGAs), field programmable logic device(s) (FPLD(s)), etc., or any combination thereof. The SDSi semiconductor device 105 of FIG. 1 also includes example firmware 130 and an example basic input/output system (BIOS) 135 to, among other things, provide access to the hardware circuitry 125. In some examples, the firmware 130 and/or the BIOS 135 additionally or alternatively implement features that are configurable under the disclosed SDSi framework. The SDSi semiconductor device 105 of FIG. 1 further includes an example SDSi asset agent 140 to configure (e.g., activate, deactivate, etc.) the SDSi features provided by the hardware circuitry 125 (and/or the firmware 130 and/or the BIOS 135), confirm such configuration and operation of the SDSi features, report telemetry data associated with operation of the SDSi semiconductor device 105, etc. Aspects of the SDSi asset agent 140 are described in further detail below.

The system 100 allows a customer, such as an original equipment manufacturer (OEM) of computers, tablets, mobile phones, other electronic devices, etc., to purchase the SDSi semiconductor device 105 from a silicon manufacturer and later configure (e.g., activate, deactivate, etc.) one or more SDSi features of the SDSi semiconductor device 105 after it has left the silicon manufacturer's factory. In some examples, the system 100 allows the customer (OEM) to configure (e.g., activate, deactivate, etc.) the SDSi feature(s) of the SDSi semiconductor device 105 at the customer's facility (e.g., during manufacture of a product including the SDSi semiconductor device 105) or even downstream after customer's product containing the SDSi semiconductor device 105 has been purchased by a third party (e.g., a reseller, a consumer, etc.)

By way of example, consider an example implementation in which the semiconductor device 105 includes up to eight (8) processor cores. Previously, the number of cores activated on the semiconductor device 105 would be fixed, or locked, at the manufacturer's factory. Thus, if a customer wanted the semiconductor device 105 to have two (2) active cores, the customer would contract with the manufacturer to purchase the semiconductor device 105 with 2 active cores, and the manufacturer would ship the semiconductor device 105 with 2 cores activated, and identify the shipped device with a SKU indicating that 2 cores were active. However, the number of active cores (e.g., 2 in this example) could not be changed after the semiconductor device 105 left the manufacturer's factory. Thus, if the customer later determined that 4 (or 8) active cores were needed for its products, the customer would have to contract with the manufacturer to purchase new versions of the semiconductor device 105 with 4 (or 8) active cores, and the manufacturer would ship the new versions of the semiconductor device 105 with 4 (or 8) cores activated, and identify the shipped device with a different SKU indicating that 4 (or 8) cores were active. In such examples, the customer and/or the manufacturer may be left with excess inventory of the semiconductor device 105 with the 2-core configuration, which can incur economic losses, resource losses, etc.

In contrast, assume the number of processor cores activated on the semiconductor device 105 is an SDSi feature that can be configured in the example system 100 in accordance with teachings of this disclosure. In such an example, the customer could contract with the manufacturer to purchase the SDSi semiconductor device 105 with 2 active cores, and the manufacturer would ship the SDSi semiconductor device 105 with 2 cores activated, and identify the shipped device with a SKU indicating that 2 cores were active. After the device is shipped, if the customer determines that it would prefer that 4 cores were active, the customer management system 105 can contact the manufacturer enterprise system 110 via a cloud service implemented by the cloud platform 120 (represented by the line labeled 145 in FIG. 1) to request activation of 2 additional cores. Assuming the request is valid, the manufacturer enterprise system 110 generates a license (also referred to as a license key) to activate the 2 additional cores, and sends the license to the customer management system 115 via the cloud service implemented by the cloud platform 120 (represented by the line labeled 145 in FIG. 1) to confirm the grant of an entitlement to activate the 2 additional cores. The customer enterprise system 115 then sends the license (or license key) to the SDSi asset agent 140 of the SDSi semiconductor device 105 (via a network as represented by represented by the line labeled 155 in FIG. 1) to cause activation of 2 additional cores provided by the hardware circuitry 125 of the SDSi semiconductor device 105. In the illustrated example, the SDSi asset agent 140 reports a certificate back to the manufacturer enterprise system 110 (e.g., via an appropriate cloud service implemented by the cloud platform 120, as represented by the line labeled 150 in FIG. 1) to confirm activation of the 2 cores. In some examples, the SDSi asset agent 140 also reports the certificate back to the customer enterprise system 115 (e.g., via the network as represented by the line labeled 155 in FIG. 1) to confirm activation of the 2 cores. In some examples, the SDSi asset agent 140 also reports telemetry data associated with operation of the SDSi semiconductor device 105 to the manufacturer enterprise system 110 (e.g., via the appropriate cloud service implemented by the cloud platform 120, as represented by the line labeled 150 in FIG. 1) and/or the customer enterprise system 115 (e.g., via the network as represented by the line labeled 155 in FIG. 1). After successful activation is confirmed, the manufacturer then invoices the customer (e.g., via the manufacturer enterprise system 110 and the customer management system 115) for the newly activate features (e.g., 2 additional cores). In some examples, the manufacturer enterprise system 110 and/or the customer management system 115 determine a new SKU (e.g., a soft SKU) to identify the same SDSi semiconductor device 105 but with the new feature configuration (e.g., 4 cores instead of 2 cores).

If the customer later determines that it would prefer that 8 cores were active, the customer management system 115 can contact the manufacturer enterprise system 110 via the cloud service implemented by the cloud platform 120 (represented by the line labeled 145 in FIG. 1) to request activation of the remaining 4 additional cores. Assuming the request is valid, the manufacturer enterprise system 110 generates another license (or license key) to activate the 4 additional cores, and sends the license to the customer management system 115 via the cloud service implemented by the cloud platform 120 (represented by the line labeled 145 in FIG. 1) to confirm the grant of an entitlement to activate the 4 remaining cores. The customer enterprise system 115 then sends license (or license key) to the SDSi asset agent 140 of the SDSi semiconductor device 105 (e.g., via the network as represented by the line labeled 155 in FIG. 1) to cause activation of the 4 remaining cores provided by the hardware circuitry 125 of the SDSi semiconductor device 105. In the illustrated example, the SDSi asset agent 140 reports a certificate back to the manufacturer enterprise system 110 (e.g., via the appropriate cloud service implemented by the cloud platform 120, as represented by the line labeled 150 in FIG. 1) to confirm activation of the 4 remaining cores. In some examples, the SDSi asset agent 140 also reports the certificate back to the customer enterprise system 115 (e.g., via the network as represented by the line labeled 155 in FIG. 1) to confirm activation of the 4 remaining cores. In some examples, the SDSi asset agent 140 reports telemetry data associated with operation of the SDSi semiconductor device 105 to the manufacturer enterprise system 110 (e.g., via the appropriate cloud service implemented by the cloud platform 120, as represented by the line labeled 150 in FIG. 1) and/or the customer enterprise system 115 (e.g., via the network as represented by the line labeled 155 in FIG. 1). After successful activation is confirmed, the manufacturer then invoices the customer (e.g., via the manufacturer enterprise system 110 and the customer management system 115) for the newly activate features (e.g., the 4 additional cores). In some examples, the manufacturer enterprise system 110 and/or the customer management system 115 determine yet another new SKU (e.g., a soft SKU) to identify the same SDSi semiconductor device 105 but with the new feature configuration (e.g., 8 cores instead of 4 cores).

In the illustrated examples of FIG. 1, the communications between the manufacturer enterprise system 110 and the customer enterprise system 115, between the manufacturer enterprise system 110 and the SDSi asset agent 140 of the SDSi semiconductor device 105, and between the SDSi asset agent 140 of the SDSi semiconductor device 105 and the customer enterprise system 115 can be implemented by one or more networks. For example, such networks can include the Internet, one or more wireless (cellular, satellite, etc.) service provider networks, one or more wired (e.g., cable, digital subscriber line, optical fiber, etc.) networks, one or more communication links, busses, etc.

In some examples, the SDSi semiconductor device 105 is included in or otherwise implements an example edge node, edge server, etc., included in or otherwise implementing one or more edge clouds. In some examples, the SDSi semiconductor device 105 is included in or otherwise implements an appliance computing device. In some examples, the manufacturer enterprise system 110 is implemented by one or more edge node, edge server, etc., included in or otherwise implementing one or more edge clouds. In some examples, the manufacturer enterprise system 110 is implemented by one or more appliance computing devices. In some examples, the customer enterprise system 115 is implemented by one or more edge node, edge server, etc., included in or otherwise implementing one or more edge clouds. In some examples, the customer enterprise system 115 is implemented by one or more appliance computing devices. Examples of such edge nodes, edge servers, edge clouds and appliance computing devices are described in further detail below in connection with FIGS. 35-37. Furthermore, in some examples, such edge nodes, edge servers, edge clouds and appliance computing devices may themselves be implemented by SDSi semiconductor devices capable of being configured/managed in accordance with the teachings of this disclosure.

In some examples, the manufacturer enterprise system 110 communicates with multiple customer enterprise systems 115 and/or multiple SDSi semiconductor devices 105 via the cloud platform 120. In some examples, the manufacturer enterprise system 110 communicates with multiple customer enterprise systems 115 and/or multiple SDSi semiconductor device(s) 105 via the cloud platform 120 through one or more edge servers/nodes. In either such example, the customer enterprise system(s) 115 and/or SDSi semiconductor device(s) 105 can themselves correspond to one or more edge nodes, edge servers, edge clouds and appliance computing devices, etc.

In some examples, the manufacturer enterprise system 110 may delegate SDSi license generation and management capabilities to one or more remote edge nodes, edge servers, edge clouds, appliance computing devices, etc., located within a customer's network domain. For example, such remote edge nodes, edge servers, edge clouds, appliance computing devices, etc., may be included in the customer enterprise system 115. In some such examples, the manufacturer enterprise system 110 can delegate to such remote edge nodes, edge servers, edge clouds, appliance computing devices, etc., a full ability to perform SDSi license generation and management associated with the customer's SDSi semiconductor devices 105 provided the remote edge nodes, edge servers, edge clouds, appliance computing devices, etc., are able to communicate with manufacturer enterprise system 110. However, in some examples, if communication with the manufacturer enterprise system 110 is disrupted, the remote edge nodes, edge servers, edge clouds, appliance computing devices may have just a limited ability to perform SDSi license generation and management associated with the customer's SDSi semiconductor devices 105. For example, such limited ability may restrict the delegated SDSi license generation and management to supporting failure recovery associated with the SDSi semiconductor devices 105. Such failure recovery may be limited to generating and providing licenses to configure SDSi features of a client's SDSi semiconductor device 105 to compensate for failure of one or more components of the SDSi semiconductor device 105 (e.g., to maintain a previously contracted quality of service).

Figure 2:
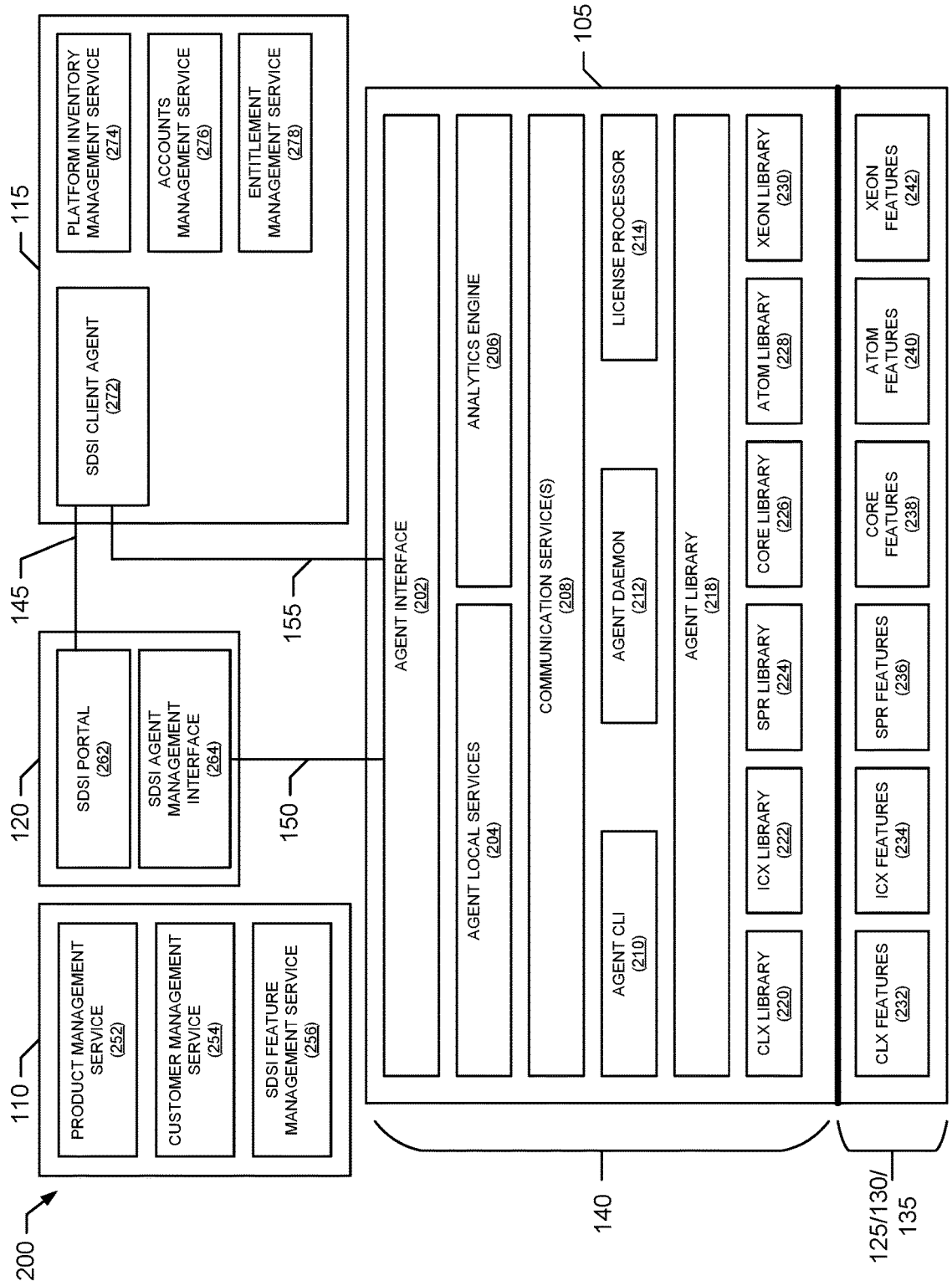
FIG. 2 is a block diagram illustrating example implementations of an example software defined silicon agent, an example manufacturer enterprise system and an example customer enterprise system included in the example system of FIG. 1.

A block diagram of an example system 200 that illustrates example implementations of the SDSi asset agent 140 of the SDSi silicon product 105, the manufacturer enterprise system 110 and the customer enterprise system 115 included in the example system 100 of FIG. 1 is illustrated in FIG. 2. The example SDSi asset agent 140 of FIG. 2 includes an example agent interface 202, example agent local services 204, an example analytics engine 206, example communication services 208, an example agent command line interface (CLI) 210, an example agent daemon 212, an example license processor 214, and an example agent library 218. The example SDSi asset agent 140 of FIG. 2 also includes example feature libraries 220-230 corresponding to respective example feature sets 232-242 implemented by the hardware circuitry 125, firmware 130 and/or BIOS 135 of the SDSi semiconductor device 105. The example manufacturer enterprise system 110 of FIG. 2 includes an example product management service 252, an example customer management service 254, and an example SDSi feature management service 256. The example manufacturer enterprise system 110 of FIG. 2 also implements an example SDSi portal 262 and an example SDSi agent management interface 264 as cloud services in the cloud platform 120. The example customer enterprise system 115 of FIG. 2 includes an example SDSi client agent 272, an example platform inventory management service 274, an example accounts management service 276 and an example entitlement management service 278.

In the illustrated example of FIG. 2, the agent interface 202 implements an interface to process messages sent between the SDSi asset agent 140 and the manufacturer enterprise system 110, and between the SDSi asset agent 140 and the customer enterprise system 115. The SDSi asset agent 140 of the illustrated example includes the agent local services 204 to implement any local services used to execute the SDSi asset agent 140 on the semiconductor device 105. The SDSi asset agent 140 of the illustrated example includes the analytics engine 206 to generate telemetry data associated with operation of the semiconductor device 105. Accordingly, the analytics engine 206 is an example of means for reporting telemetry data associated with operation of the semiconductor device 105. The communication services 208 provided in the SDSi asset agent 140 of the illustrated example include a local communication service to enable the SDSi asset agent 140 to communicate locally with the other elements of the semiconductor device 105 and/or a product platform including the semiconductor device 105. The communication services 208 also include a remote communication service to enable the SDSi asset agent 140 to communicate remotely with the SDSi agent management interface 264 of the manufacturer enterprise system 110 and the SDSi client agent 272 of the customer enterprise system 115. The SDSi asset agent 140 of the illustrated example includes the agent CLI 210 to process commands entered locally to the semiconductor device 105 via a command line interface. The SDSi asset agent 140 of the illustrated example includes the license processor 214 to process license(s) received from the customer enterprise system 115 to configure (e.g., activate, deactivate, etc.) one or more SDSi features included in the feature sets 232-242 implemented by the hardware circuitry 125, firmware 130 and/or BIOS 135 of the SDSi semiconductor device 105. Accordingly, the license processor 214 is an example of means for activating or deactivating at least one feature of the semiconductor device 105 based on a license received via a network from a remote enterprise system. The SDSi asset agent 140 of the illustrated example includes the agent daemon 212 to securely execute the elements of the SDSi asset agent 140. For example, the agent daemon 212 can execute one or more of the agent interface 202, the agent local services 204, the analytics engine 206, the communication services 208, the agent CLI 210 and/or the license processor 214 in a protected environment, such as a trusted execution environment (TEE), implemented by the semiconductor device 105. The SDSi asset agent 140 of the illustrated example includes the agent library 218 to provide, among other things, hardware-agnostic application programming interfaces (APIs) to be used by the license processor 214 to invoke the respective, hardware-specific feature libraries 220-230 to configure (e.g., activate, deactivate, etc.), based on the received license data, one or more features in the corresponding example features sets 232-242 implemented by the hardware circuitry 125, firmware 130 and/or BIOS 135 of the SDSi semiconductor device 105. Accordingly, the hardware circuitry 125, firmware 130 and/or BIOS 135 are examples of means for providing SDSi features in the SDSi semiconductor device 105. In some examples, the agent library 218 and/or the hardware-specific feature libraries 220-230 also operate in a protected environment, such as a TEE, implemented by the semiconductor device 105. Further details concerning the elements of the SDSi asset agent 140 of FIG. 2 are described below.

In the illustrated example of FIG. 2, the manufacturer enterprise system 110 includes the example product management service 252 to manage the inventory, pricing, etc., of the products manufactured by the manufacturer of the SDSi semiconductor device 105. The manufacturer enterprise system 110 of the illustrated example includes the customer management service 254 to manage customer accounts, billing, reconciliation, etc., for the manufacturer of the SDSi semiconductor device 105. The manufacturer enterprise system 110 of the illustrated example includes the SDSi feature management service 256 to manage the configuration of SDSi feature(s) implemented by the silicon products manufactured by the manufacturer of the SDSi semiconductor device 105. The manufacturer enterprise system 110 of the illustrated example implements the SDSi portal 262 to communicate (e.g., via a network) with the customer enterprise system 115. The manufacturer enterprise system 110 of the illustrated example implements the SDSi agent management interface 264 to communicate (e.g., via a network) with the SDSi asset agent 140 of the SDSi semiconductor device 105. Further details concerning the elements of the manufacturer enterprise system 110 of FIG. 2 are described below.

In the illustrated example of FIG. 2, the customer enterprise system 115 includes the SDSi client agent 272 to communicate (e.g., via a network) with the manufacturer enterprise system 110 and the SDSi asset agent 140 of the SDSi semiconductor device 105. The customer enterprise system 115 of the illustrated example includes the platform inventory management service 274 to manage the platforms offered by the customer (OEM), such as platforms that include the SDSi semiconductor device 105. The customer enterprise system 115 of the illustrated example includes the accounts management service 276 to manage accounts, billings, reconciliations, etc., the customer has with manufacturers, downstream customers, etc., such as the manufacturer of the SDSi semiconductor device 105. The customer enterprise system 115 of the illustrated example includes the entitlement management service 278 to manage licenses granted by manufacturers of SDSi products, such as the manufacturer of the SDSi semiconductor device 105, to configure (e.g., activate, deactivate, etc.) SDSi features implemented by those products. Further details concerning the elements of the customer enterprise system 115 of FIG. 2 are described below.

Figure 3:
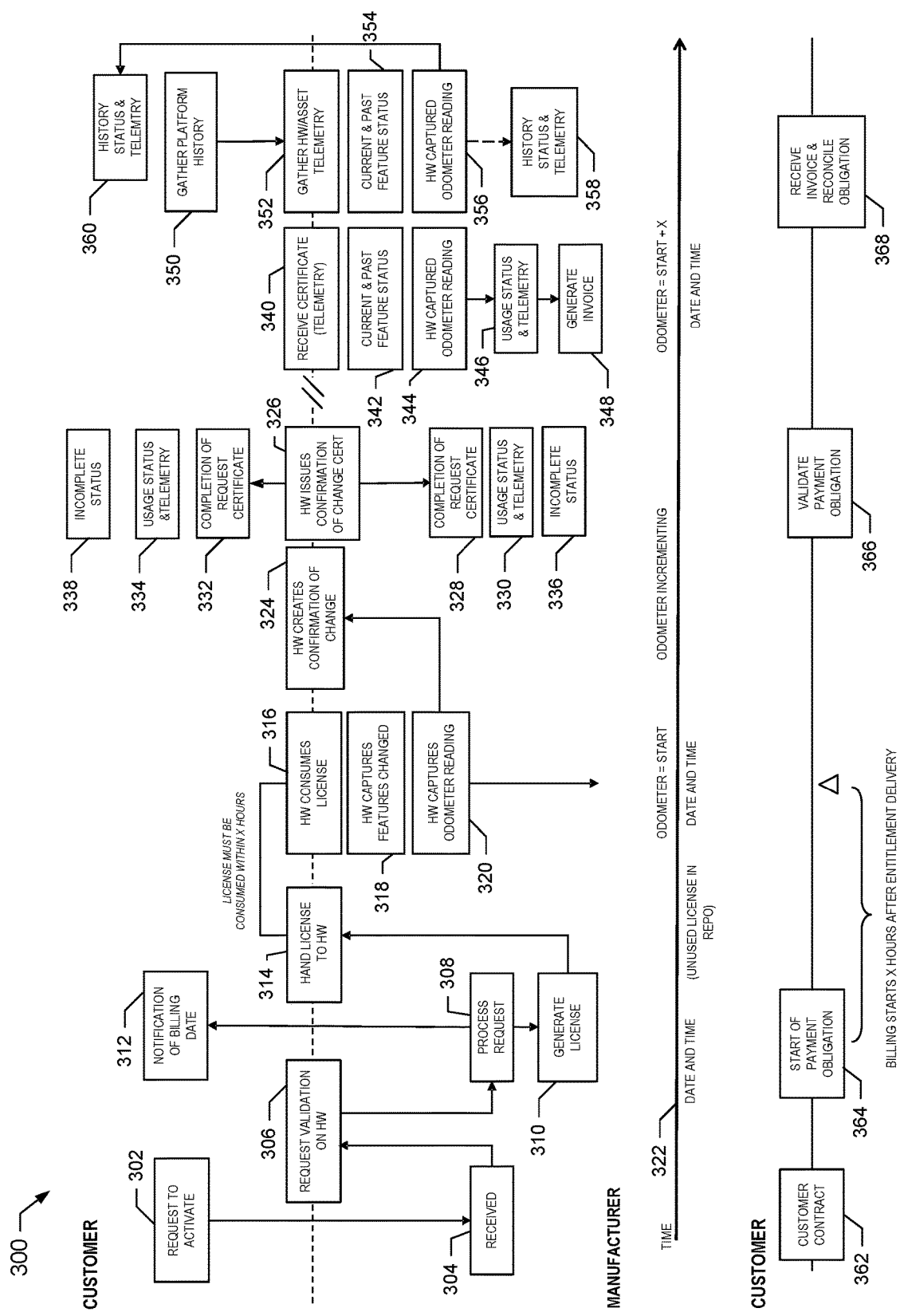
FIG. 3 illustrates an example software defined silicon management lifecycle implemented by the example systems of FIGS. 1 and/or 2.

An example SDSi management lifecycle 300 capable of being implemented by the example systems 100 and/or 200 of FIGS. 1-2 is illustrated in FIG. 3. The lifecycle 300 is described from the perspective of activating or deactivating an SDSI feature provided by the SDSi semiconductor device 105, but also can be applied to any type of configuration change of an SDSI feature provided by the SDSi semiconductor device 105. The lifecycle 300 begins at block 302 at which the SDSi client agent 272 of the customer enterprise system 115 sends a request to the SDSi portal 262 of the manufacturer enterprise system 110 to activate (or deactivate) an SDSI feature provided by the SDSi semiconductor device 105. Accordingly, the SDSi portal 262 is an example of means for receiving a request to activate or deactivate a feature provided by the semiconductor device 105. For example, the customer may access a customer management record for the SDSi semiconductor device 105 maintained by the platform inventory management service 274, and modify the customer management record to invoke the SDSi client agent 272 to send the request. Accordingly, the SDSi client agent 272 is an example of means for sending a request to activate or deactivate an SDSi feature provided by the semiconductor device 105. At block 304, the SDSi portal 262 of the manufacturer enterprise system 110 receives the request sent by the SDSi client agent 272 of the customer enterprise system 115 to activate (or deactivate) the SDSI feature provided by the SDSi semiconductor device 105. At block 306, the SDSi agent management interface 264 sends a query to the SDSi asset agent 140 to confirm that the SDSi semiconductor device 105 supports the SDSi feature to be activated (or deactivated). For example, the SDSi feature management service 256 may process the customer request received via the SDSi portal 262 and invoke the SDSi agent management interface 264 to send the query. The agent interface 202 of the SDSi asset agent 140 receives the query and invokes the license processor 214 to generate a response. The license processor 214 analyzes the configuration of the hardware circuitry 125, the firmware 130 and/or the BIOS 135 of the semiconductor device 105, generates feature support verification information indicating whether the queried feature is supported by the semiconductor device 105, and reports, via the agent interface 202, a response including the feature support verification information to the SDSi agent management interface 264. In some examples, rather than querying the SDSi asset agent 140 of the SDSi semiconductor device 105, the SDSi agent management interface 264 accesses one or more databases and/or other data structures (e.g., based on device identifier and/or SKU information included in the feature request) that store specification/configuration data for the SDSi semiconductor device 105 to confirm whether the SDSi semiconductor device 105 supports the requested feature.

At block 308 of the lifecycle 300, the SDSi agent management interface 264 receives the query response from the SDSi asset agent 140 (or from the queries database(s) and/or data structure(s)), which is processed by the SDSi feature management service 256. If the response indicates the SDSi feature of interest is supported by the SDSi semiconductor device 105, at block 310 the SDSi feature management service 256 generates a license to activate (or deactivate) the SDSi feature as requested. Accordingly, the SDSi feature management service 256 is an example of means for generating a license to be processed by the semiconductor device 105 to activate or deactivate an SDSi feature. Also, at block 312, the SDSi feature management service 256 causes the license to be sent via the SDSi portal 262 to the SDSi client agent 272 of the customer enterprise system 115. Accordingly, the SDSi client agent 272 is an example of means for receive a license from an enterprise management system to authorize activation or deactivation of an SDSi feature provided by the semiconductor device 105 In the illustrated example, the license generated at block 310 is associated with a license key and/or license data that specifies, for example, an identifier of the semiconductor device 105, the SDSi feature to be activated (or deactivated), terms of the activation (or deactivation), such as whether this is a one-time feature activation (deactivation) or renewable activation subject to a subscription, a valid start window (e.g., X hours, where X is a numerical value, or some other duration) for invoking the license to activate (or deactivate) the SDSI feature, etc. At this point in the lifecycle 300, the license generated at block 310 is treated as an unused license to activate (or deactivate) the SDSi feature, which is stored in a repository at the customer enterprise system 115 until the customer triggers use of the license to activate (or deactivate) the requested feature. For example, the SDSi feature management service 256 of the manufacturer enterprise system 110 can update a manufacturer management record maintained by the manufacturer for the semiconductor device 105 to include the license and/or license data generated at block 310, Likewise, the entitlement management service 278 of the customer enterprise system 115 can update the customer management record maintained by the customer for the semiconductor device 105 to indicate receipt of the license along with the license details. Accordingly, the entitlement management service 278 is an example of means for updating a management record associated with the semiconductor device 105 based on a license. In some such examples, the entitlement management service 278 can be invoked by the customer to update the customer management record to trigger operation of the license to activate (or deactivate) the SDSi feature, which cause the SDSi client agent 272 of the customer enterprise system 115 to transmit (e.g., download) the license via the network 155 to the SDSi asset agent 140 of the semiconductor device 105.

For example, upon receipt of a request at the SDSi client agent 272 to invoke the license, at block 314 the SDSi client agent 272 sends the license to the SDSi asset agent 140. Accordingly, the SDSi client agent 272 is an example of means for sending a license to the semiconductor device 105. The license is received by the agent interface 202, which at block 316 invokes the license processor 214. At block 316, the license processor 214 processes the license data to identify the feature to be activated (or deactivated), and activates (or deactivates) the feature in accordance with the license data. For example, if the feature is a configurable number of processor cores, and the semiconductor device 105 was initialized to have a first number of the processor cores active (e.g., 2 of 8 cores are active) with remaining ones of the processor cores dormant (e.g., 6 of 8 cores are dormant), the license data may specify that a second number of dormant processor cores (e.g., 4 of the 6 dormant cores) are to be activated (e.g., in response to a request from the customer enterprise system 115 to activate the second number of dormant cores). The license data may also identify which of the dormant cores are to be activated. In such an example, the license processor 214 invokes the agent library 218 to activate the dormant cores specified in the license data. As another example, the SDSi asset agent 140 may later receive a second license from the SDSi client agent 272 of the customer enterprise system 115 that specifies a third number of the active processor cores (e.g., 2 of the 6 active cores) that are to be deactivated (e.g., with the second license being generated by the manufacturer enterprise system 110 in response to a request from the customer enterprise system 115 to deactivate the third number of active cores). The second license data may also identify which of the active cores are to be deactivated. In such an example, the license processor 214 invokes the agent library 218 to deactivate the active cores specified in the license data. In some examples, the license processor 214 may limit the number of cores able to be deactivated to not be greater the second number of dormant cores that were activated based on prior received license data. As yet another example, if the feature is a configurable clock rate, and the semiconductor device was initialized to activate a first clock rate from a set of possible clock rates, the license generated by the manufacturer enterprise system 110 and downloaded via the SDSi client agent 272 of the customer enterprise system 115 may identify a second clock rate different from the first clock rate that is to be activated (e.g., in response to a request from the customer enterprise system 115 to activate the second clock rate). In such an example, the license processor 214 invokes the agent library 218 to activate the second clock rate identified in the license data.

In some examples, a single license can configure multiple features across different feature categories. For example, a single license may include first license data to activate one or more additional cores, and second license to modify and/or otherwise adjust a clock rate of one or more cores. In such an example, the adjusted clock rate may be applied to one or more previously activated cores and/or one(s) of the one or more additional cores to be activated in response to the license processor 214 processing the license. Additionally or alternatively, in some examples, a single license can activate one or more features, and also deactivate one or more other features.

At block 318 of the lifecycle 300, the analytics engine 206 of the SDSi asset agent 140 logs the SDSi feature activation (or deactivation) performed on the semiconductor device 105. At block 320, the analytics engine 206 captures an odometer reading representative of a present, local time maintained by the circuitry 125 (in combination with the firmware 135 and/or BIOS 140) of the semiconductor device 105. For example, the circuitry 125 may utilize a counter, timer or other mechanism to implement an odometer to track the passage of time locally at the semiconductor device 105 (which is represented by the directed line 322 in FIG. 3.). At block 320, the analytics engine 206 captures a value of the odometer to act as a timestamp of when the requested feature was activated (or deactivated). At block 324, the analytics engine 206 generates a certificate to confirm the successful activation (or deactivation) of the requested SDSi feature. In the illustrated example, the certificate includes telemetry data associated with operation of the semiconductor device 105 and generated by the analytics engine 206 in response to activation (or deactivation) of the requested SDSi feature. In some examples, the telemetry data includes an indication of whether the feature activation (or deactivation) was a success, a status of the SDSi feature affected by the activation (or deactivation) (e.g., such as the presently configured number of cores that are active, the presently active clock rate, etc.), a first odometer reading (e.g., first timestamp) indicating when the feature activation (or deactivation) occurred, a second odometer reading (e.g., a second timestamp) indicating whether the certificate was generated, etc.

At block 326 of the lifecycle 300, the analytics engine 206 reports, via the agent interface 202, the certificate with the telemetry data in response to the activation (or deactivation) of the SDSi feature based on the received license data. In the illustrated example, the analytics engine 206 reports the certificate with the telemetry data to both the manufacturer enterprise system 110 and the customer enterprise system 115. For example, at block 328, the example SDSi agent management interface 264 of the manufacturer enterprise system 110 receives the certificate, and at block 330 provides it to the SDSi feature management service 256 of the manufacturer enterprise system 110. Accordingly, the SDSi agent management interface 264 is an example of means for receiving a certificate from the semiconductor device 105 to confirm successful activation or deactivation of an SDSi feature. The SDSi feature management service 256 processes the certificate and included telemetry data to log the successful feature activation (or deactivation). Similarly, at block 332, the SDSi client agent 272 of the customer enterprise system 115 receives the certificate and at block 334 provides it to the entitlement management service 278 of the customer enterprise system 115. The entitlement management service 278 processes the certificate and included telemetry data to log the successful feature activation (or deactivation). In the illustrated example, at this point in the lifecycle 300, the status of the feature activation (or deactivation) may be considered incomplete until verified by a subsequent certificate from the SDSi asset agent 140 (see blocks 336 and 338).

At block 340 of the lifecycle 300, the SDSi agent management interface 264 of the manufacturer enterprise system 110 receives a subsequent certificate with updated telemetry data from the SDSi asset agent 140. At block 342, the subsequent certificate is provided to the SDSi feature management service 256 of the manufacturer enterprise system 110. The SDSi feature management service 256 processes the certificate to obtain the updated telemetry data, and also obtains the prior telemetry data included in the previous certificate. At block 344, the SDSi feature management service 256 accesses the odometer readings included in the telemetry data. At block 346, the SDSi feature management service 256 compares the telemetry data and odometer reading to confirm the successful activation (or deactivation) (or, more generally, the successful configuration change) of the SDSi feature of interest. Accordingly, the SDSi feature management service 256 is an example of means for validating the successful activation or deactivation of an SDSi feature based on telemetry data. At block 348, the customer management service 254 of the manufacturer enterprise system 110 generates an invoice for the successful activation (or deactivation) of the SDSi feature of interest, and sends it to the customer enterprise system 115 via the SDSi portal 262 for processing by the accounts management service 276. In some examples, assuming the semiconductor device 105 is associated with a present SKU (e.g., a first SKU), after the requested SDSi feature is activated (or deactivated), the product management service 252 of the manufacturer enterprise system 110 generates a new SKU (e.g., a second SKU) and updates the manufacturer management record maintained for the semiconductor device 105 to associate the new SKU (second SKU) with the semiconductor device 105. Accordingly, the product management service 252 is an example of means for updating a management record to associate a second SKU with the semiconductor device 105 after an SDSi feature is activated or deactivated. Additionally or alternatively, in some examples, assuming the semiconductor device 105 is associated with a present SKU (e.g., a first SKU), after the requested SDSi feature is activated (or deactivated), the platform inventory management service 274 of the customer enterprise system 115 generates a new SKU (e.g., a second SKU) and updates the customer management record maintained for the semiconductor device 105 to associate the new SKU (second SKU) with the semiconductor device 105. Accordingly, the platform inventory management service 274 is an example of means for updating a management record to associate a second SKU with the semiconductor device 105 after an SDSi feature is activated or deactivated.

At block 350 of the lifecycle 300, the entitlement management service 278 of the customer enterprise system 115 generates a request for status of the semiconductor device 105, and sends the request via the SDSi client agent 272 to the SDSi asset agent 140. Additionally or alternatively, the SDSi feature management service 256 of the manufacturer enterprise system 110 could generate the request for status of the semiconductor device 105, and send the request via the SDSi agent management interface 264 to the SDSi asset agent 140. In either case, at block 352, the agent interface 202 receives the request and invokes the analytics engine 206 to generate a certificate in response to the request. In the illustrated example, the certificate includes updated telemetry data associated with operation of the semiconductor device 105 generated by the analytics engine 206 in response to the request. The updated telemetry data is timestamped with a local time corresponding to an odometer reading captured in response to the request. At blocks 354 and 356, the SDSi agent management interface 264 receives the requested certificate with the updated telemetry data from the SDSi asset agent 140 and provides it to the SDSi feature management service 256 of the manufacturer enterprise system 110. The SDSi feature management service 256 obtains the updated telemetry data, and also obtains the prior telemetry data for the semiconductor device 105, and further accesses the odometer readings included in the telemetry data. At block 356, the example SDSi feature management service 256 updates a history of the operational status of the semiconductor device 105 and uses the telemetry data to determine whether the semiconductor device 105 is operating properly.

Similarly, at block 360 of the lifecycle 300, the SDSi client agent 272 receives the requested certificate with the updated telemetry data from the SDSi asset agent 140 and provides it to the entitlement management service 278 of the customer enterprise system 115. The entitlement management service 278 obtains the updated telemetry data, and also obtains any prior telemetry data for the semiconductor device 105, and further accesses the odometer readings included in the telemetry data. The entitlement management service 278 then updates a history of the operational status of the semiconductor device 105 and uses the telemetry data to determine whether the semiconductor device 105 is operating properly. In some examples, the accounts management service 276 of the customer enterprise system 115 updates, based on receipt of the certificate, the customer management record associated with the semiconductor device 105 to confirm establishment or conclusion of a payment obligation with the manufacturer of the semiconductor device 105, such as the payment obligation associated with the invoice received from the manufacturer enterprise system 110 at block 348. Accordingly, the accounts management service 276 is an example of means for updating a management record, based on a certificate, to confirm establishment or conclusion of a payment obligation with a manufacturer of the semiconductor device 105.

As illustrated in the example lifecycle 300 of FIG. 3, the request to activate (or deactivate) the SDSI feature sent by the customer enterprise system 115 at block 302 and received by the manufacturer enterprise system 110 at block 304 can initiate a contract between the customer and the manufacturer. Later, the sending of the license to the customer enterprise system 115 at block 312 can be a trigger to start a payment obligation (see block 364). In some examples, the start of the payment obligation can be delayed until the feature is activated (or deactivated) in the semiconductor device 105 based on the license at block 316. Later, the reporting at block 326 of the certificate in response to the activation (or deactivation) of the SDSi feature in the semiconductor device 105 can validate the payment obligation (see block 366). Later, the generation and receipt of the invoice at block 348 can trigger reconciliation of the payment obligation (see block 368).

The licenses generated by the manufacturer enterprise system 110 to activate (or deactivate) SDSi features in the semiconductor device 105 can support one-time activation, on-demand activation and/or recurring subscription models. For example, the license may include license data to instruct the license processor 214 of the SDSi asset agent 140 executing in the semiconductor device 105 to perform a one-time activation (or deactivation) of one or more features identified by the license data. In some examples, to support on-demand activation and/or recurring subscription models, the license generated by the manufacturer enterprise system 110 can include license data that instructs the license processor 214 to activate (or deactivate) the specified SDSi feature(s) in accordance with an express permit or an express deny control mechanism. For example, under an express permit control mechanism, the license processor 214 causes an SDSi feature that is activated based on the license to be deactivated upon expiration of a time period (e.g., tracked by a counter, clock, or other mechanism) unless an express permit control signal is received from the manufacturer enterprise system 110 (e.g., via the SDSi agent management interface 264) before the time period expires. Conversely, under an express deny control mechanism, the license processor 214 causes an SDSi feature that is activated based on the license to be remain active unless an express deny control signal is received from the manufacturer enterprise system 110 (e.g., via the SDSi agent management interface 264). In such an example, receipt of the express deny control signal causes the license processor 214 to deny access to the activated feature, such as, by deactivating the feature.

In some examples, the license processor 214 of the SDSi asset agent 140 executing in the semiconductor device 105 activates and deactivates SDSI features through the use of reprogrammable soft fuse(s), register(s), logic gate(s), etc. For example, such reprogrammable soft fuse(s), register(s), logic gate(s), etc., can be connected to control lines of the hardware blocks included in the hardware circuitry 125 of the semiconductor device 105 to implement the SDSi features, connected to control inputs read by the firmware 130 and/or BIOS 135 to enable/disable the SDSi features, etc. The license processor 214 can set and/or reset ones of the reprogrammable soft fuse(s), values of the register(s), input(s) of the logic gate(s), etc., to activate/deactivate different SDSi features of the semiconductor device 105.

In some examples, the license processor 214 writes received license(s) and/or the license data included therein to a protected license memory region of the semiconductor device 105. In some examples, the license data is encrypted and the license processor 214 decrypts the license data before writing it to the protected license memory region of the semiconductor device 105. In some such examples, SDSi feature activation/deactivation responsive to a received license does not occur until the semiconductor device 105 reboots (e.g., via a soft reset, a hard reset, etc.) and the license data in the protected license memory region is read upon start-up. In some examples, the license processor 214 sets one or more particular locations of the protected license memory region to activate one or more SDSi features, and erases or overwrites the license data contained in those location(s) of the protected license memory region to deactivate those SDSi feature(s). For example, to deactivate a given SDSi feature, the license processor 214 may write random or otherwise garbage data to the location(s) associated with that feature in the protected license memory region, and rely on an error checking capability of the semiconductor device 105 that causes the given SDSi feature to remain disabled in response to such random or otherwise garbage data.

In some examples, the location(s) of the protected license memory region for deactivated SDSi feature(s) is(are) not erased or overwritten. Rather, in some such examples, to deactivate an SDSi feature, a deactivation license is appended to the list of licenses already stored in the protected license memory region for that SDSi feature. The newly received deactivation license in such an example overrides the actions of previously received licenses for that SDSi feature. In that way, the history of SDSi configuration operations (activations and deactivations) performed on the SDSi feature are stored by the semiconductor device 105 in the order the SDSi licenses were applied. In some examples, this information could be read by the customer.

Figure 4:
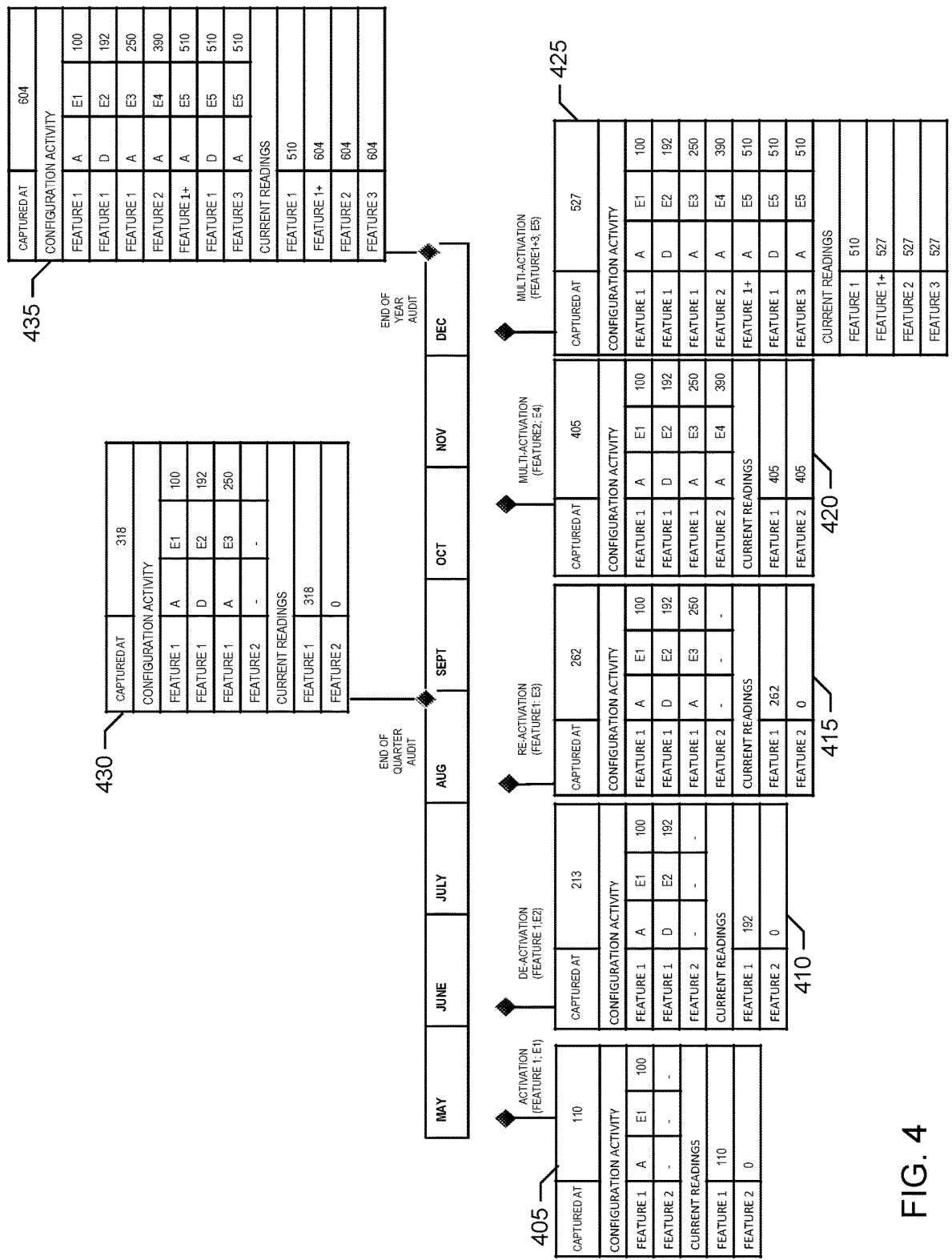
FIG. 4 illustrates example certificates utilized in the example systems of FIGS. 1 and/or 2 to implement the example lifecycle of FIG. 4.

Example certificates utilized in the example systems 100 and/or 200 of FIGS. 1-2 to implement the example lifecycle 300 of FIG. 3 are illustrated in FIG. 4. In the illustrated example of FIG. 4, the SDSi asset agent 140 associated with the semiconductor device 105 generates and reports a first example certificate 405 to the manufacturer enterprise system 110 and/or the customer enterprise system 115 in response to a first event (labeled "E1" in FIG. 4). The first event corresponds to activation of a first SDSi feature of the semiconductor device 105 (labeled "Feature 1" in FIG. 4). In the illustrated example, the first certificate 405 identifies the first SDSi feature ("Feature 1") and includes telemetry data. The telemetry data of the first certificate 405 indicates an activated status (labeled "A" in FIG. 4) for the first SDSi feature ("Feature 1"), and includes a first timestamp (e.g., first odometer reading) having a value of "100," which represents a local time at which the first SDSi feature ("Feature 1") was activated in the semiconductor device 105. The telemetry data of the first certificate 405 also indicates that another available SDSi feature (labeled "Feature 2" in FIG. 4) is dormant. The telemetry data of the first certificate 405 further includes a second timestamp (e.g., second odometer reading) having a value of "110," which represents a local time at which the first certificate 405 was generated.

In the illustrated example of FIG. 4, the SDSi asset agent 140 associated with the semiconductor device 105 generates and reports a second example certificate 410 to the manufacturer enterprise system 110 and/or the customer enterprise system 115 in response to a second event (labeled "E2" in FIG. 4). The second event corresponds to deactivation of the first SDSi feature of the semiconductor device 105 (labeled "Feature 1" in FIG. 4). In the illustrated example, the second certificate 410 identifies the first SDSi feature ("Feature 1") and includes updated telemetry data (in addition to the telemetry data included in the first certificate 405). The updated telemetry data of the second certificate 410 indicates a deactivated status (labeled "D" in FIG. 4) for the first SDSi feature ("Feature 1"), and includes a third timestamp (e.g., third odometer reading) having a value of "192," which represents a local time at which the first SDSi feature ("Feature 1") was deactivated in the semiconductor device 105. The updated telemetry data of the second certificate 410 also indicates that another available SDSi feature (labeled "Feature 2" in FIG. 4) is still dormant. The updated telemetry data of the second certificate 410 further includes a fourth timestamp (e.g., fourth odometer reading) having a value of "213," which represents a local time at which the second certificate 410 was generated.

In the illustrated example of FIG. 4, the SDSi asset agent 140 associated with the semiconductor device 105 generates and reports a third example certificate 415 to the manufacturer enterprise system 110 and/or the customer enterprise system 115 in response to a third event (labeled "E3" in FIG. 4). The third event corresponds to re-activation of the first SDSi feature of the semiconductor device 105 (labeled "Feature 1" in FIG. 4). In the illustrated example, the third certificate 415 identifies the first SDSi feature ("Feature 1") and includes updated telemetry data (in addition to the telemetry data included in the prior certificates 405 and 410). The updated telemetry data of the third certificate 415 indicates an activated status (labeled "A" in FIG. 4) for the first SDSi feature ("Feature 1"), and includes a fifth timestamp (e.g., fifth odometer reading) having a value of "250," which represents a local time at which the first SDSi feature ("Feature 1") was re-activated in the semiconductor device 105. The updated telemetry data of the third certificate 415 also indicates that another available SDSi feature (labeled "Feature 2" in FIG. 4) is still dormant. The updated telemetry data of the third certificate 415 further includes a sixth timestamp (e.g., sixth odometer reading) having a value of "262," which represents a local time at which the third certificate 415 was generated.

In the illustrated example of FIG. 4, the SDSi asset agent 140 associated with the semiconductor device 105 generates and reports a fourth example certificate 420 to the manufacturer enterprise system 110 and/or the customer enterprise system 115 in response to a fourth event (labeled "E4" in FIG. 4). The fourth event corresponds to activation of a second SDSi feature of the semiconductor device 105 (labeled "Feature 2" in FIG. 4). In the illustrated example, the fourth certificate 420 identifies the second SDSi feature ("Feature 2") and includes updated telemetry data (in addition to the telemetry data included in the prior certificates 405-415). The updated telemetry data of the fourth certificate 420 indicates an activated status (labeled "A" in FIG. 4) for the second SDSi feature ("Feature 2"), and includes a seventh timestamp (e.g., seventh odometer reading) having a value of "390," which represents a local time at which the second SDSi feature ("Feature 2") was activated in the semiconductor device 105. The updated telemetry data of the fourth certificate 420 further includes an eighth timestamp (e.g., eighth odometer reading) having a value of "405," which represents a local time at which the fourth certificate 420 was generated.

In the illustrated example of FIG. 4, the SDSi asset agent 140 associated with the semiconductor device 105 generates and reports a fifth example certificate 425 to the manufacturer enterprise system 110 and/or the customer enterprise system 115 in response to a fifth event (labeled "E5" in FIG. 4). The fifth event corresponds to modification of the first SDSi feature (labeled "Feature 1+" in FIG. 4), and activation of a third SDSi feature of the semiconductor device 105 (labeled "Feature 3" in FIG. 4). In the illustrated example, the fifth certificate 425 identifies the modified first SDSi feature ("Feature 1+") and the third SDSi feature ("Feature 3"), and includes updated telemetry data (in addition to the telemetry data included in the prior certificates 405-420). The updated telemetry data of the fifth certificate 425 indicates an activated status (labeled "A" in FIG. 4) for the modified first SDSi feature ("Feature 1+"), a de-activated status (labeled "D" in FIG. 4) for the prior version of the first SDSi feature ("Feature 1"), and an activated status (labeled "A" in FIG. 4) for the third SDSi feature ("Feature 3"). The updated telemetry data includes a ninth timestamp (e.g., ninth odometer reading) having a value of "510," which represents a local time at which the modified first SDSi feature ("Feature 1+") was activated, the prior version of the first SDSi feature ("Feature 1") was deactivated, and the third SDSi feature ("Feature 3") was activated in the semiconductor device 105. The updated telemetry data of the fifth certificate 425 further includes a tenth timestamp (e.g., tenth odometer reading) having a value of "527," which represents a local time at which the fifth certificate 425 was generated.

In the illustrated example of FIG. 4, the SDSi asset agent 140 associated with the semiconductor device 105 generates and reports a sixth example certificate 430 to the manufacturer enterprise system 110 and/or the customer enterprise system 115 in response to a first status request from the manufacturer enterprise system 110 and/or the customer enterprise system 115. In the illustrated example, the sixth certificate 430 identifies the status history of the SDSi features provided by the semiconductor device 105. For example, the sixth certificate 430 includes status and corresponding telemetry data to log the activation and de-activation events for the first SDSi feature ("Feature 1") that occurred up to the time of the status request. The telemetry data of the sixth certificate 430 further includes a timestamp (e.g., odometer reading) having a value of "318," which represents a local time at which the sixth certificate 430 was generated.

In the illustrated example of FIG. 4, the SDSi asset agent 140 associated with the semiconductor device 105 generates and reports a seventh example certificate 435 to the manufacturer enterprise system 110 and/or the customer enterprise system 115 in response to a second status request from the manufacturer enterprise system 110 and/or the customer enterprise system 115. In the illustrated example, the seventh certificate 435 identifies the status history of the SDSi features provided by the semiconductor device 105. For example, the seventh certificate 435 includes status and corresponding telemetry data to log the activation and de-activation events for the first SDSi feature ("Feature 1"), the modified first feature (Feature 1+"), the second feature (Feature 2") and the third feature (Feature 3") that occurred up to the time of the status request. The telemetry data of the seventh certificate 435 further includes a timestamp (e.g., odometer reading) having a value of "604," which represents a local time at which the seventh certificate 435 was generated.

Figure 5:
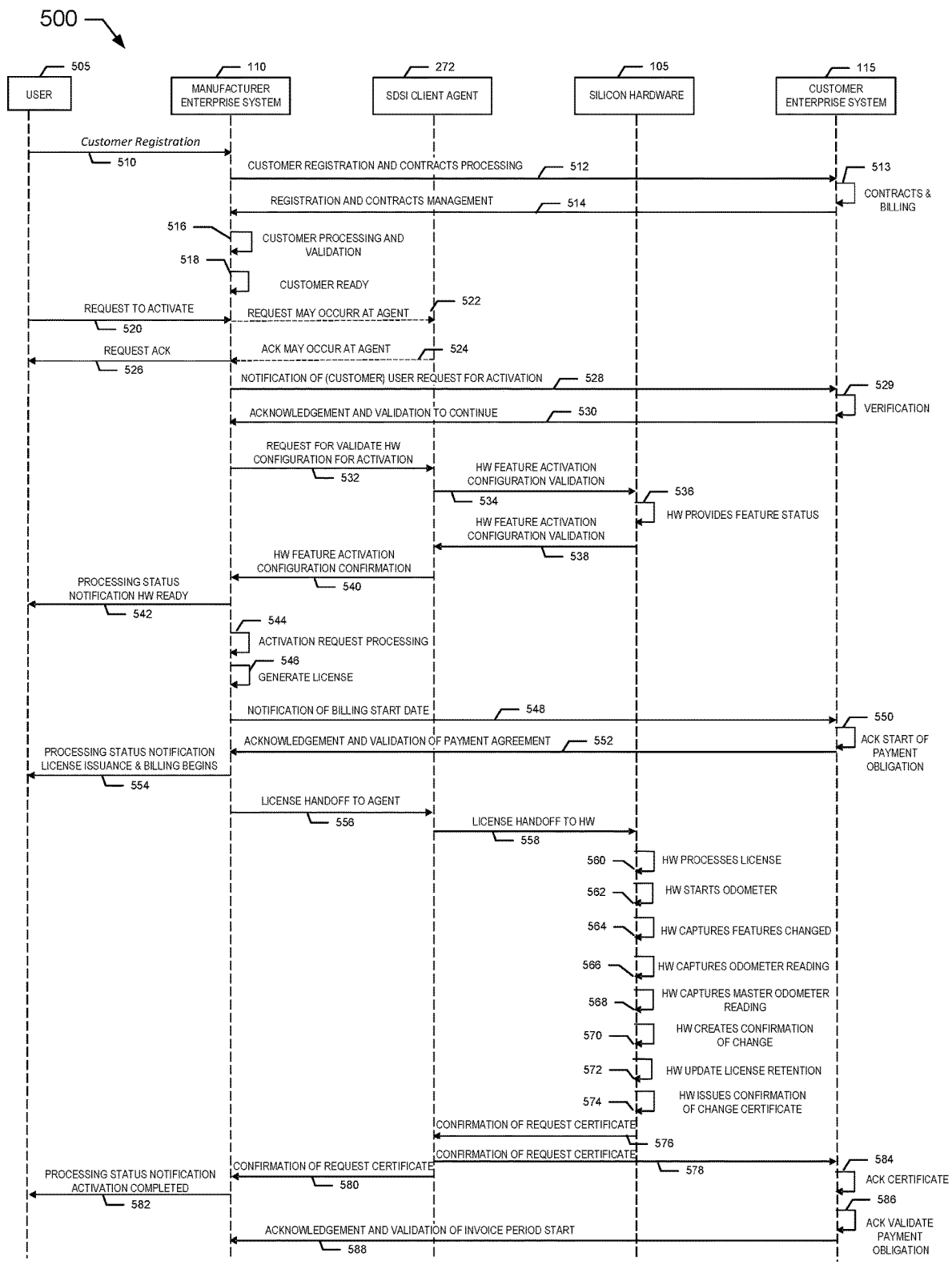
FIG. 5 illustrates an example process flow performed by the example systems of FIGS. 1 and/or 2 to enable initial feature activation in an example software defined silicon product.

An example process flow 500 performed by the example systems 100 and/or 200 of FIGS. 1-2 to enable initial feature activation in the SDSi product 105 is illustrated in FIG. 5. The process flow 500 of the illustrated example begins with an example user 505 associated with a customer requesting registration of the customer for access to SDSi capabilities offered by a manufacturer of the SDSi product 105 (line 510). The manufacturer enterprise system 110 then engages with the customer enterprise system 115 to on-board the customer (lines 512-518). The manufacturer enterprise system 110 then receives a request to activate an SDSi feature of the SDSi product 105 and acknowledges the request (lines 520-526). As shown in the illustrated example, the feature activation request can be received from a source (e.g., computer device) separate from the customer enterprise system 115 or from the SDSi client agent 272 of the customer enterprise system 115. In the illustrated example, the manufacturer enterprise system 110 further confirms with the customer enterprise system 115 that the SDSi feature activation request is valid (lines 528-530).

Assuming the SDSi feature activation request is valid, the manufacturer enterprise system 110 queries the SDSi product 105 to determine whether the requested SDSi feature to be activated is supported by the SDSi product 105 (lines 532-542). In the illustrated example, the manufacturer enterprise system 110 sends the query to the SDSi client agent 272 of the customer enterprise system 115, which queries the SDSi product 105 for the status of the requested SDSi feature and returns a response to the manufacturer enterprise system 110. However, in other examples, the manufacturer enterprise system 110 queries the SDSi product 105 without involving the SDSi client agent 272 or, more generally, the customer enterprise system 115. For example, the SDSi agent management interface 264 of the manufacturer enterprise system 110 may send a query to the SDSi product 105 for the status of the requested SDSi feature and receive a response from the SDSi product 105.

Assuming the requested SDSi feature is supported, the manufacturer enterprise system 110 generates a license to activate the requested SDSi feature in the SDSi product 105 (lines 544-546). The manufacturer enterprise system 110 also communicates with the customer enterprise system 115 to establish billing terms and other contractual obligations associated with activation of the requested SDSi feature (lines 548-554). The manufacturer enterprise system 110 then sends the generated license to the SDSi client agent 272 of the customer enterprise system 115 (line 556). Sometime later (e.g., when the customer is ready for the requested feature to be activated), the SDSi client agent 272 sends the license to the SDSi asset agent 140 of the SDSi product 105 (line 558). The SDSi asset agent 140 invokes the license processor 214 to process the received license to activate the requested SDSi feature (line 560). The license processor 214 invokes the analytics engine 206 to capture one or more odometer readings (lines 562-568), and then creates a confirmation certificate to confirm activation of the requested feature (lines 570-574).

The SDSi asset agent 140 of the SDSi product 105 then reports the confirmation certificate to the manufacturer enterprise system 110 and the customer enterprise system 115 (e.g., via the SDSi client agent 272 in the illustrated example) (lines 576-580. The manufacturer enterprise system 110 and the customer enterprise system 115 process the received confirmation certificate, and the customer enterprise system 115 validates the start of a payment obligation responsive to activation of the requested SDSi feature (lines 582-588).

Figure 6:
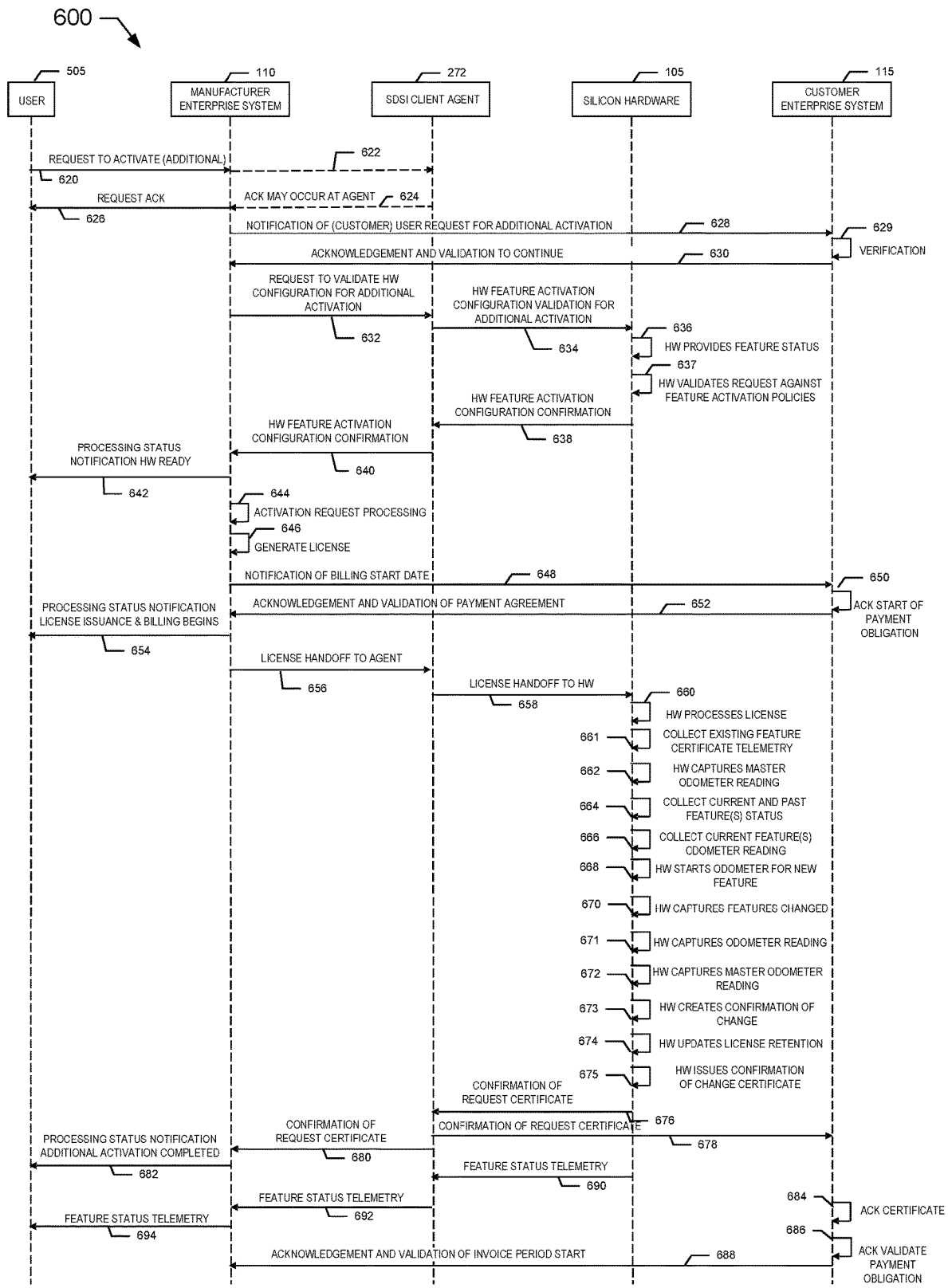
FIG. 6 illustrates an example process flow performed by the example systems of FIGS. 1 and/or 2 to enable additional feature activation in an example software defined silicon product.

An example process flow 600 performed by the example systems 100 and/or 200 of FIGS. 1-2 to enable additional feature activation in the SDSi product 105 is illustrated in FIG. 6. The process flow 600 of the illustrated example begins with the manufacturer enterprise system 110 receiving a request from the user 505 to activate an additional SDSi feature of the SDSi product 105 and acknowledging the request (lines 620-626). As shown in the illustrated example, the additional feature activation request can be received from a source (e.g., computer device) separate from the customer enterprise system 115 or from the SDSi client agent 272 of the customer enterprise system 115. In the illustrated example, the manufacturer enterprise system 110 further confirms with the customer enterprise system 115 that the additional SDSi feature activation request is valid (lines 628-630).

Assuming the additional SDSi feature activation request is valid, the manufacturer enterprise system 110 queries the SDSi product 105 to determine whether the additional requested SDSi feature to be activated is supported by the SDSi product 105 (lines 632-642). In the illustrated example, the manufacturer enterprise system 110 sends the query to the SDSi client agent 272 of the customer enterprise system 115, which queries the SDSi product 105 for the status of the requested SDSi feature and returns a response to the manufacturer enterprise system 110. However, in other examples, the manufacturer enterprise system 110 queries the SDSi product 105 without involving the SDSi client agent 272 or, more generally, the customer enterprise system 115. For example, the SDSi agent management interface 264 of the manufacturer enterprise system 110 may send a query to the SDSi product 105 for the status of the requested SDSi feature and receive a response from the SDSi product 105. In the illustrated example, in addition to checking whether the requested feature is supported, the SDSi product 105 also validates the activation request against other policies (line 637). For example, such policies may confirm that the additional SDSi feature to be activated will not conflict with an earlier SDSi feature that was activated.

Assuming the requested additional SDSi feature is supported, the manufacturer enterprise system 110 generates a license to activate the additional SDSi feature in the SDSi product 105 (lines 644-646). The manufacturer enterprise system 110 also communicates with the customer enterprise system 115 to establish billing terms and other contractual obligations associated with activation of the additional SDSi feature (lines 648-654). The manufacturer enterprise system 110 then sends the generated license to the SDSi client agent 272 of the customer enterprise system 115 (line 656). Sometime later (e.g., when the customer is ready for the additional feature to be activated), the SDSi client agent 272 sends the license to the SDSi asset agent 140 of the SDSi product 105 (line 658). The SDSi asset agent 140 invokes the license processor 214 to process the received license to activate the requested SDSi feature (line 660). The license processor 214 also invokes the analytics engine 206 to collect telemetry data for the SDSi features of the SDSi product 105 (line 661) and capture one or more odometer readings (lines 662-672), and then creates a confirmation certificate to confirm activation of the requested feature (lines 673-675).

The SDSi asset agent 140 of the SDSi product 105 then reports the confirmation certificate to the manufacturer enterprise system 110 and the customer enterprise system 115 (e.g., via the SDSi client agent 272 in the illustrated example) (lines 676-680. The manufacturer enterprise system 110 and the customer enterprise system 115 process the received confirmation certificate, and the customer enterprise system 115 validates the start of a payment obligation responsive to activation of the requested SDSi feature (lines 682-688). In the illustrated example, the SDSi asset agent 140 of the SDSi product 105 also reports SDSi feature status telemetry (e.g., included in subsequent certificates) to the manufacturer enterprise system 110 (e.g., via the SDSi client agent 272 in the illustrated example) (lines 690-694).

Figure 7:
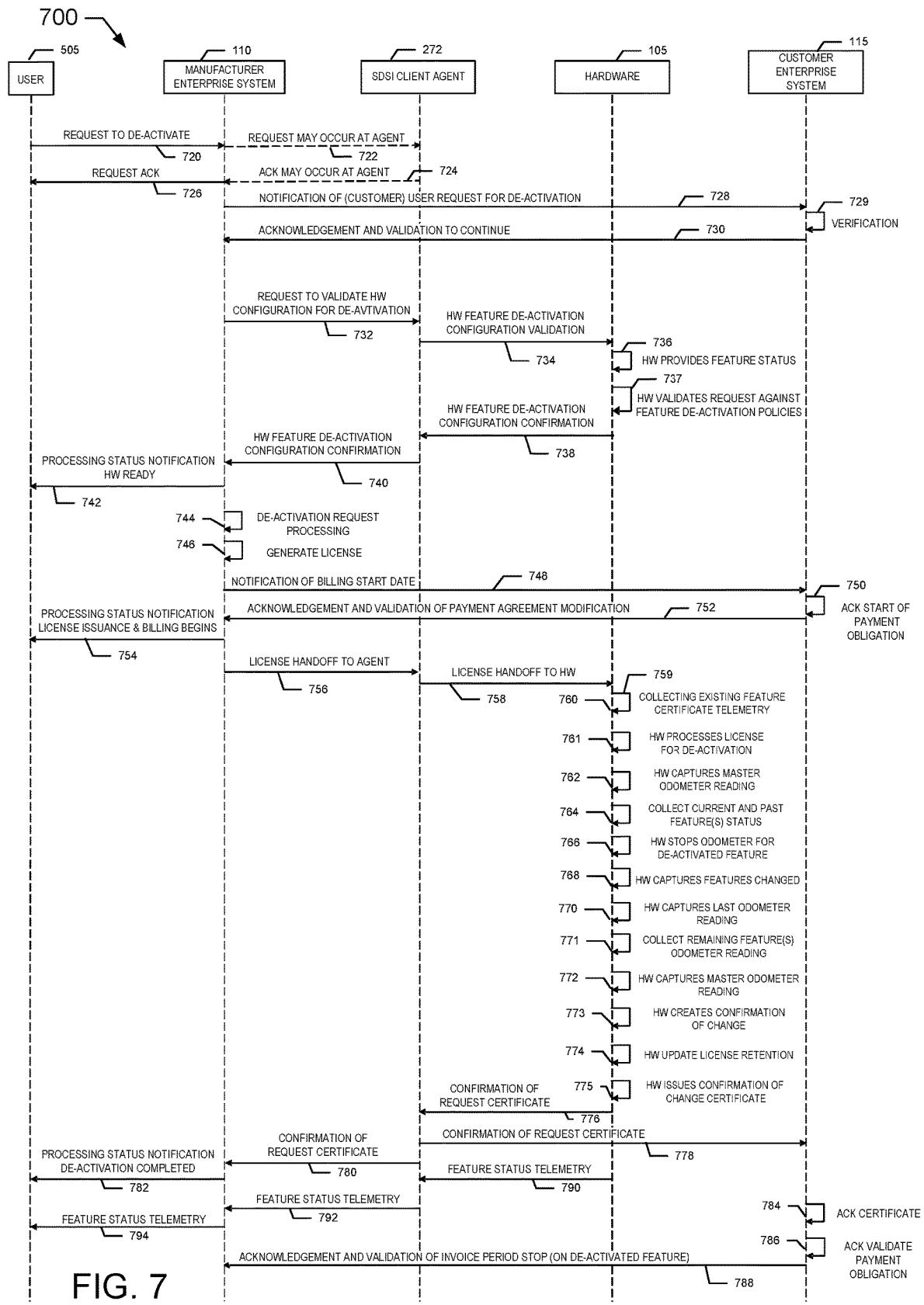
FIG. 7 illustrates an example process flow performed by the example systems of FIGS. 1 and/or 2 to enable feature deactivation in an example software defined silicon product.

An example process flow 700 performed by the example systems 100 and/or 200 of FIGS. 1-2 to enable feature deactivation in the SDSi product 105 is illustrated in FIG. 7. The process flow 700 of the illustrated example begins with the manufacturer enterprise system 110 receiving a request from the user 505 to deactivate an SDSi feature of the SDSi product 105 and acknowledging the request (lines 720-726). As shown in the illustrated example, the feature deactivation request can be received from a source (e.g., computer device) separate from the customer enterprise system 115 or from the SDSi client agent 272 of the customer enterprise system 115. In the illustrated example, the manufacturer enterprise system 110 further confirms with the customer enterprise system 115 that the SDSi feature deactivation request is valid (lines 728-730).

Assuming the SDSi feature deactivation request is valid, the manufacturer enterprise system 110 queries the SDSi product 105 to determine whether the requested SDSi feature to be deactivated is supported by the SDSi product 105 (lines 732-742). In the illustrated example, the manufacturer enterprise system 110 sends the query to the SDSi client agent 272 of the customer enterprise system 115, which queries the SDSi product 105 for the status of the requested SDSi feature and returns a response to the manufacturer enterprise system 110. However, in other examples, the manufacturer enterprise system 110 queries the SDSi product 105 without involving the SDSi client agent 272 or, more generally, the customer enterprise system 115. For example, the SDSi agent management interface 264 of the manufacturer enterprise system 110 may send a query to the SDSi product 105 for the status of the requested SDSi feature and receive a response from the SDSi product 105. In the illustrated example, in addition to checking whether the requested feature is supported, the SDSi product 105 also validates the deactivation request against other policies (line 737). For example, such policies may confirm that the SDSi feature to be deactivated will not cause a conflict with remaining active SDSi features, will not violate a specified base SDSi feature state for SDSi product 105, etc.

Assuming the SDSi feature to be deactivated is supported, the manufacturer enterprise system 110 generates a license to deactivate the SDSi feature in the SDSi product 105 (lines 744-746). The manufacturer enterprise system 110 also communicates with the customer enterprise system 115 to establish billing terms and other contractual obligations associated with deactivation of the SDSi feature (lines 748-754). The manufacturer enterprise system 110 then sends the generated license to the SDSi client agent 272 of the customer enterprise system 115 (line 756). Sometime later (e.g., when the customer is ready for the feature to be deactivated), the SDSi client agent 272 sends the license to the SDSi asset agent 140 of the SDSi product 105 (line 758). The SDSi asset agent 140 invokes the analytics engine 206 to collect telemetry data for the SDSi product 105 before feature deactivation (line 759), and then invokes the license processor 214 to process the received license to deactivate the requested SDSi feature (line 760). The analytics engine 206 also captures one or more odometer readings and collects telemetry data for the remaining active SDSi features of the SDSi product 105 (lines 762-774), which are used by the license processor 214 to create a confirmation certificate to confirm deactivation of the requested feature (lines 775).

The SDSi asset agent 140 of the SDSi product 105 then reports the confirmation certificate to the manufacturer enterprise system 110 and the customer enterprise system 115 (e.g., via the SDSi client agent 272 in the illustrated example) (lines 776-780. The manufacturer enterprise system 110 and the customer enterprise system 115 process the received confirmation certificate, and the customer enterprise system 115 validates the start of a payment obligation responsive to deactivation of the requested SDSi feature (lines 782-788). In the illustrated example, the SDSi asset agent 140 of the SDSi product 105 also reports SDSi feature status telemetry (e.g., included in subsequent certificates) to the manufacturer enterprise system 110 (e.g., via the SDSi client agent 272 in the illustrated example) (lines 790-794).

Figure 8:
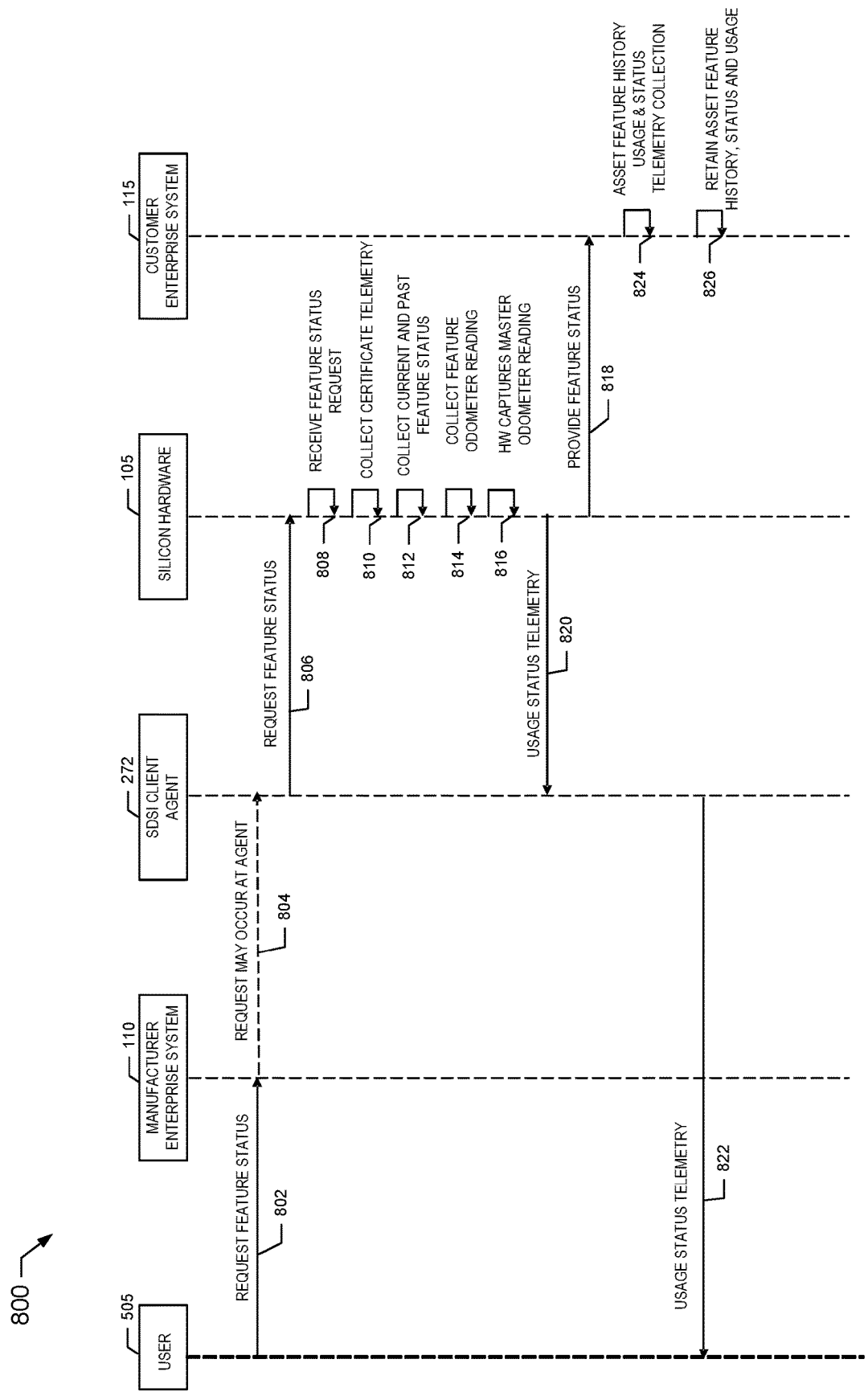
FIG. 8 illustrates an example process flow performed by the example systems of FIGS. 1 and/or 2 to provide customer-initiated feature usage status and billing reconciliation.

An example process flow 800 performed by the example systems 100 and/or 200 of FIGS. 1-2 to provide customer-initiated feature usage status and billing reconciliation is illustrated in FIG. 8. The process flow 800 of the illustrated example begins with the manufacturer enterprise system 110 receiving a request from the user 505 for SDSi feature status of the SDSi product 105 (lines 802-804). As shown in the illustrated example, the additional feature activation request can be received from a source (e.g., computer device) separate from the customer enterprise system 115, or can be received at the SDSi client agent 272 thereby bypassing the manufacturer enterprise system 110. In the illustrated example, the feature status request is received by the SDSi client agent 272, which sends the request to the SDSi asset agent 140 of the SDSi product 105 (line 806). In response to the feature status request, the SDSi asset agent 140 invokes the analytics engine 206 to collect telemetry data, current and past feature status, and odometer readings (lines 808-

816). The SDSi asset agent 140 the reports the SDSi feature status of the SDSi product 105 to the customer enterprise system 115 (line 818), and more detailed telemetry status to the manufacturer enterprise system 110 (lines 820-822). In the illustrated example, the customer enterprise system 115 collects the SDSi feature status data from the SDSi product 105 and retains the status to perform feature usage status and billing reconciliation (lines 824-826).

Figure 9:
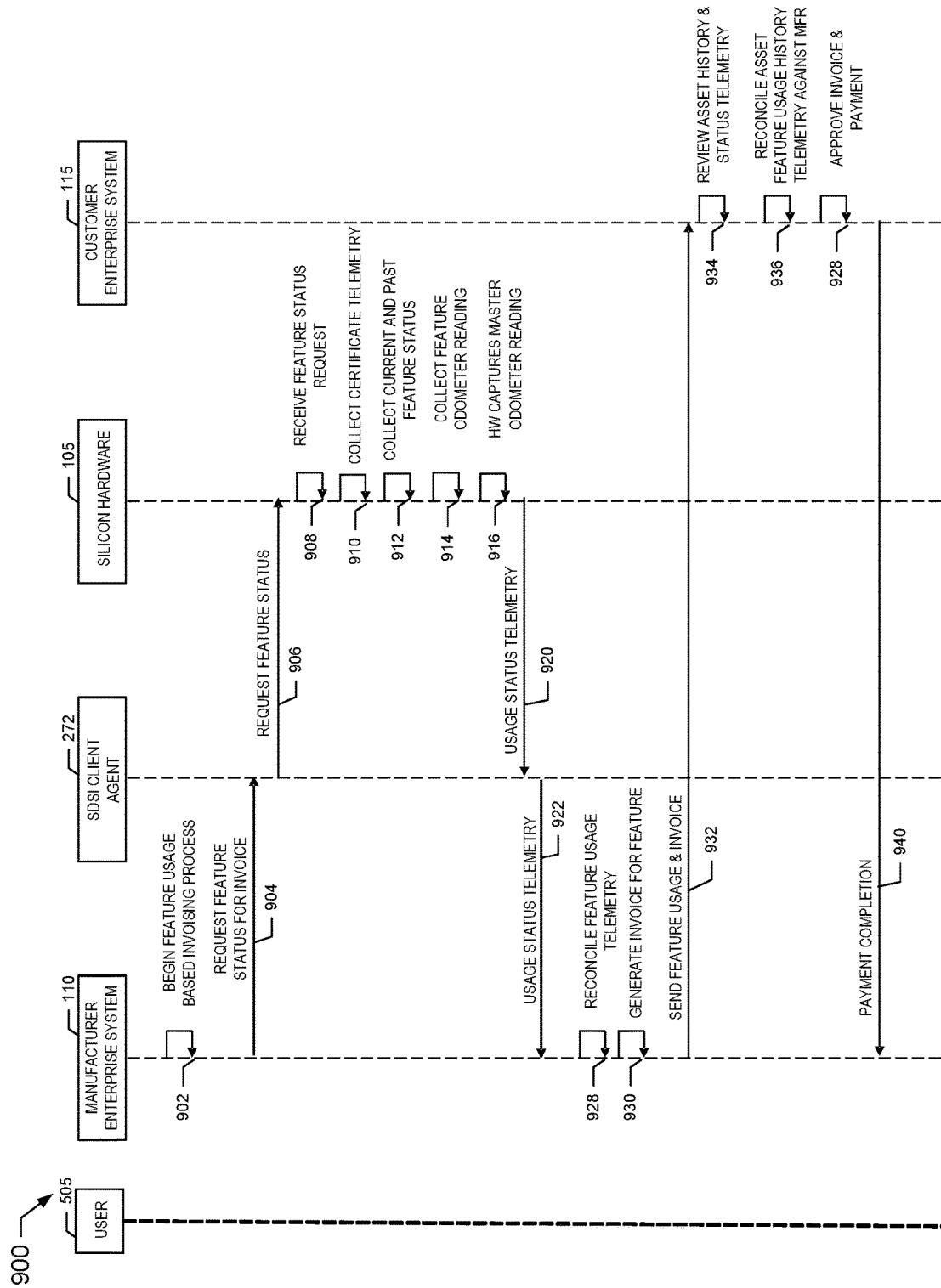
FIG. 9 illustrates an example process flow performed by the example systems of FIGS. 1 and/or 2 to provide manufacturer-initiated feature usage status and billing reconciliation.

An example process flow 900 performed by the example systems 100 and/or 200 of FIGS. 1-2 to provide manufacturer-initiated feature usage status and billing reconciliation is illustrated in FIG. 9. The process flow 900 of the illustrated example begins with the manufacturer enterprise system 110 beginning an invoicing process based on SDSi feature usage associated with the SDSi product 105 (line 902). The manufacturer enterprise system 110 then send a request for SDSi feature status of the SDSi product 105 (line 904). In the illustrated example, the feature status request is received by the SDSi client agent 272, which sends the request to the SDSi asset agent 140 of the SDSi product 105 (line 906). In response to the feature status request, the SDSi asset agent 140 invokes the analytics engine 206 to collect telemetry data, current and past feature status, and odometer readings (lines 908-916). The SDSi asset agent 140 the reports the SDSi feature status and telemetry to the manufacturer enterprise system 110 (lines 920-922). In the illustrated example, the manufacturer enterprise system 110 uses the SDSi feature status data and telemetry from the SDSi product 105 to perform feature usage status and billing, and sends an invoice to the customer enterprise system 115 (lines 928-932). The customer enterprise system 115 then reconciles the invoice against stored SDSI feature status and telemetry for the SDSi product 105, approves payment, and sends payment (or a payment completion record) to the manufacturer enterprise system 110 (lines 934-940).

Although the examples of FIGS. 1-9 are illustrated as including a single SDSi silicon product 105 (SDSi semiconductor device 105), a single manufacturer enterprise system 110 in associated with a single cloud platform 120, and a single customer enterprise system 115, SDSi frameworks and architectures as disclosed herein are not limited thereto. For example, any number(s) and/or type(s) of SDSi silicon products 105 (SDSi semiconductor devices 105) can be configured and managed in the example systems 100 and 200 described above. Additionally or alternatively, any number of manufacturer enterprise systems 110 and/or cloud platforms 120 can be included in the systems 100 and 200 described above to manage respective SDSi silicon products 105 (SDSi semiconductor devices 105) manufactured by different silicon manufacturers. Additionally or alternatively, any number of client enterprise systems 115 can be included in the systems 100 and 200 described above to manage SDSi silicon products 105 (SDSi semiconductor devices 105) purchased by different customers (e.g., OEMs). Also, in some examples, the client enterprise systems 115 can include multiple SDSi client agents 272. For example, the client enterprise systems 115 can configure different SDSi client agents 272 to manage different groups of one or more SDSi products 105.

Software Defined Silicon Security

Figure 10:
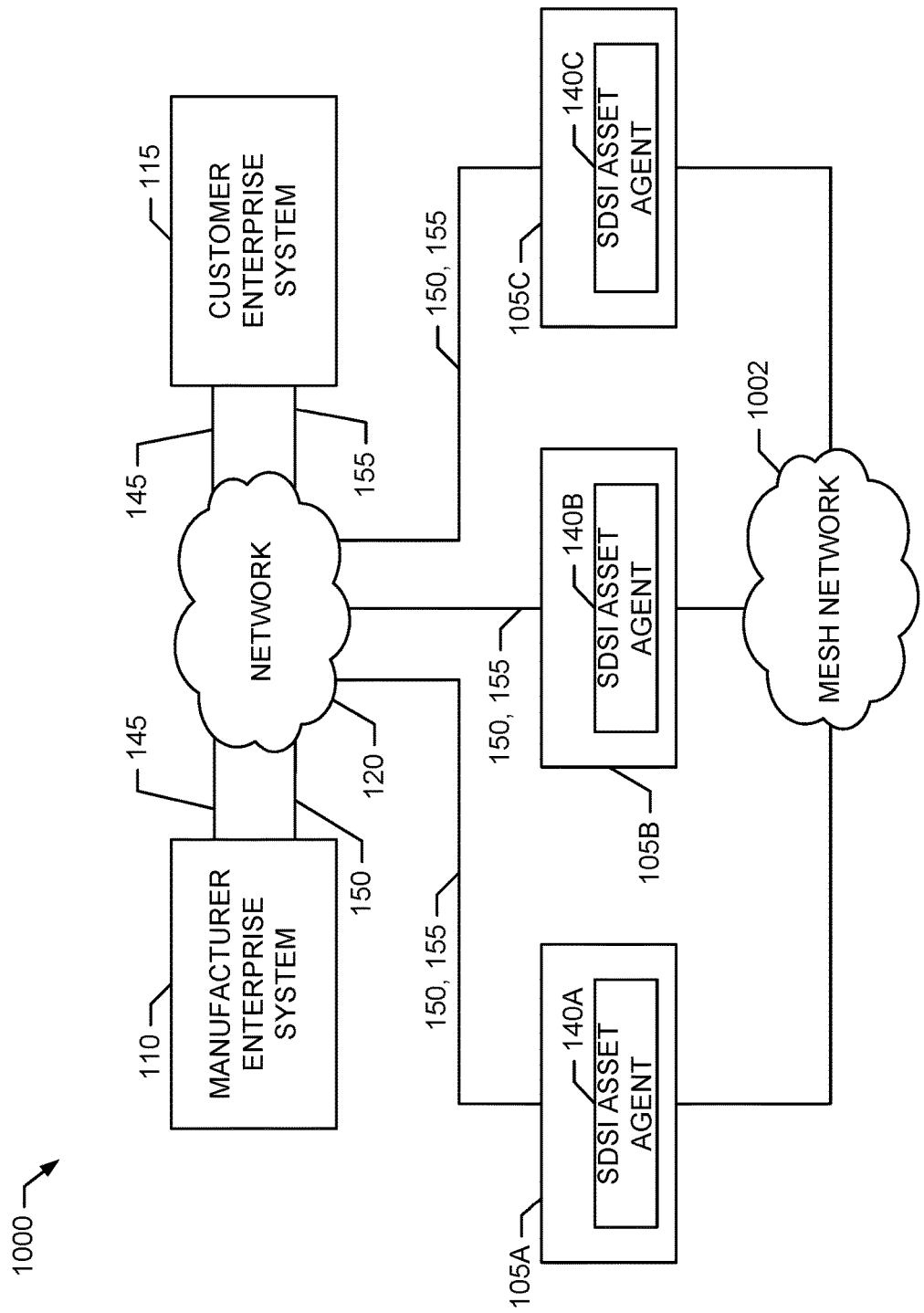
FIG. 10 is a block diagram of another example system to implement and manage software defined silicon products in accordance with teachings of this disclosure.

A block diagram of an example system 1000 to implement and manage SDSi products in accordance with teachings of this disclosure is illustrated in FIG. 10. The example SDSi system 1000 of FIG. 10 includes a plurality of the example silicon products 105 of FIG. 1 (e.g., a plurality of the SDSi semiconductor devices 105 of FIG. 1, a plurality of the semiconductor assets 105 of FIG. 1, etc.), such as a first example silicon product 105A (referred to herein as the "first semiconductor device 105A"), a second example silicon product 105B (referred to herein as the "second semiconductor device 105B"), and a third example silicon product 105C (referred to herein as the "third semiconductor device 105A"). The silicon products 105A-C include respective instantiations of the SDSi asset agent 140 of FIG. 1, such as a first example SDSi asset agent 140A, a second example SDSi asset agent 140B, and a third example SDSi asset agent 140C. The SDSi asset agents 140A-C of the example of FIG. 10, and/or, more generally, the semiconductor products 105A-C of FIG. 10, implement SDSi features as disclosed herein. The system 1000 also includes the example manufacturer enterprise system 110 of FIG. 1 and the example customer enterprise system 115 of FIG. 1W to manage the SDSi asset agents 140A-C of FIG. 10, and/or, more generally, the semiconductor products 105A-C of FIG. 10. In the illustrated example of FIG. 10, at least some aspects of the manufacturer enterprise system 110 and/or the customer enterprise system 115 are implemented as cloud services in the example cloud platform 120 of FIG. 1.

In the illustrated example of FIG. 10, the manufacturer enterprise system 110 is in communication with the customer enterprise system 115 via a cloud service implemented by the cloud platform 120 (represented by the line labeled 145 of FIG. 1). In the illustrated example of FIG. 10, the SDSi semiconductor devices 105A-C are in communication with the manufacturer enterprise system 110 via a cloud service implemented by the cloud platform 120 (represented by the line labeled 150 of FIG. 1). In the illustrated example of FIG. 10, the SDSi semiconductor devices 105A-C are in communication with the customer enterprise system 115 via a cloud service implemented by the cloud platform 120 (represented by the line labeled 155 of FIG. 1).

In the illustrated example of FIG. 10, the SDSi semiconductor devices 105A-C are in communication with each other via an example mesh network (e.g., a meshnet) 1002. For example, one or more of the SDSi semiconductor devices 105A-C are in communication with one or more of the SDSi semiconductor devices 105A-C using a mesh networking topology (e.g., a Hybrid Wireless Mesh Protocol (HWMP), Dynamic Source Routing, Associativity-Based Routing, Zone Routing Protocol, etc.) to deliver data in a wireless network (e.g., a wireless local area network (WLAN)). In such examples, one or more of the SDSi semiconductor devices 105A-C are in communication with one(s) of the SDSi semiconductor devices 105A-C in a direct, dynamic, and/or non-hierarchically architecture to route data between some or all of the semiconductor devices 105A-C.

In the illustrated example of FIG. 10, the mesh network 1002 may implement one or more peer-to-peer (P2P) security protocols where either side (e.g., an initiating one of the semiconductor devices 105A-C, a receiving one of the semiconductor devices 105A-C, etc.) can initiate authentication to the other side, or both sides can initiate authentication simultaneously. In some examples, when peers (e.g., peer SDSi asset agents 140A-C, peer semiconductor devices 105A-C, etc.) discover each other, they take part in an authentication process, such as a secure password-based authentication and/or key establishment protocol. In some examples, the authentication process may be implemented by a Simultaneous Authentication of Equals (SAE). In such examples, if SAE completes successfully, each peer knows the other peer possesses the authentication (e.g., the mesh password) and, as a by-product of the SAE exchange, the two peers establish a cryptographically strong key. In such examples, the cryptographic key is used to establish a secure peering session and derive a session key to protect mesh traffic, including routing traffic, during the secure peering session.

In some examples, peers can authenticate each other and/or otherwise be authenticated based on asymmetric encryption algorithms and/or symmetric encryption algorithms. For example, the SDSi asset agents 140A-C may decrypt/encrypt data in a data packet using the Advanced Encryption Standard (AES) that includes using a block cipher (e.g., the AES-128 block cipher, the AES-192 block cipher, the AES-256 block cipher, etc.) to decrypt/encrypt the data included in the data packet. In some examples, the SDSi asset agents 140A-C can decrypt/encrypt data using an AES cipher block chaining (AES-CBC) algorithm, a ciphertext feedback (AES-CFB) algorithm, an AES output feedback (AES-OFB) algorithm, a 2-byte CBC message authentication code (CBC-MAC) algorithm, a Galois MAC (GMAC) algorithm, or a keyed-Hashing MAC (HMAC) algorithm. Additionally or alternatively, the SDSi asset agents 140A-C may decrypt/encrypt data using any other symmetric algorithm. In some examples, the SDSi asset agents 140A-C can decrypt/encrypt data using an asymmetric encryption technique by using two independent keys, a first key to encrypt the data packet and a second key to decrypt the data packet. For example, the SDSi asset agents 140A-C may decrypt/encrypt a data packet of interest using a Diffie-Hellman key exchange, or a Rivest, Shamir and Adleman (RSA) algorithm. Additionally or alternatively, the SDSi asset agents 140A-C may decrypt/encrypt the data packet of interest using any other asymmetric encryption technique.

In some examples, the SDSi asset agents 140A-C authenticate and/or otherwise validate connections between the SDSi asset agents 140A-C. For example, the first SDSi asset agent 140A determines whether the second SDSi asset agent 140B has authorization to exchange data with the first SDSi asset agent 140A. In such examples, the first SDSi asset agent 140A can receive a first data packet from the second SDSi asset agent 140B corresponding to a request by the second semiconductor device 105B to communicate with the first semiconductor device 105A. In response to receiving the request, the first SDSi asset agent 140A can send a second data packet including a signature request to the second SDSi asset agent 140B. For example, the signature request corresponds to a signature associated with an Elliptic Curve Digital Signature Algorithm (ECDSA). In response to receiving the signature request, the second SDSi asset agent 140B can generate and transmit a third data packet including the signature to the first SDSi asset agent 140A via the mesh network 1002. The first SDSi asset agent 140A can authenticate the signature provided by the second SDSi asset agent 140B and validate subsequent data packet transfers between the first SDSi asset agent 140A and the second SDSi asset agent 140B. In some examples, the first SDSi asset agent 140A may authenticate the second SDSi asset agent 140B through any other Digital Signature Algorithm (DSA).

In some examples, the SDSi asset agents 140A-C communicate with each other via the mesh network 1002 to determine and/or otherwise obtain reputation information or score(s) (e.g., agent reputation score(s)). In some examples, a reputation score is indicative or representative of a level of trustworthiness associated with an agent (e.g., the SDSi asset agents 140A-C) of a semiconductor device (e.g., the semiconductor devices 105A-C). In some examples, an agent with the highest reputation score is chosen to facilitate a system function, such as issuing a license or reporting telemetry data (e.g., reporting telemetry data to the manufacturer enterprise system 110 and/or the customer enterprise system 115). Advantageously, to avoid locking into one of the SDSi asset agents 140A-C, which at some point may become compromised and turn rogue or otherwise malicious, the SDSi asset agents 140A-C may determine that a subsequent license be issued by a different one of the SDSi asset agents 140A-C.

In some examples, one or more of the activated features of one(s) of the semiconductor devices 105A-C may deactivate (e.g., periodically deactivate, asynchronously deactivate, etc.) to invoke a re-certification process of the deactivated one(s) of the semiconductor devices 105A-C. Advantageously, one(s) of the SDSi asset agents 140A-C can be located both in an intranet and on the Internet to effectuate high availability and performance maintaining a relatively high level of security.

In some examples, the SDSi asset agents 140A-C improve security of the system 1000 by deploying a TEE in which to execute secure application code and/or protect data of interest (e.g., silicon product manufacturer owned cryptographical data). For example, a TEE is a compute or computing execution context wherein resources, such as process data, memory, storage, input(s)/output(s) (I/O(s)), etc., are isolated and protected from untrusted and/or unauthorized access. In such examples, the TEE takes the form of an entire operating system or portion(s) thereof, such as application code running or executing in an isolated environment, such as that provided by Intel® Software Guard Extensions (SGX).

In some examples, the SDSi asset agents 140A-C deploy a TEE based on known TEEs deployable by one(s) of the semiconductor devices 105A-C. For example, the first SDSi asset agent 140A invokes the first semiconductor device 105A to deploy a first TEE included in the first semiconductor device 105A in response to determining that the first TEE is supported and/or otherwise deployable by the first semiconductor device 105A. In other examples, the first SDSi asset agent 140A invokes the second semiconductor device 105B to deploy the first TEE included in the second semiconductor device 105B in response to determining that the first TEE is not supported and/or otherwise deployable by the first semiconductor device 105A but is supported and/or otherwise deployable by the second semiconductor device 105B. In some such examples, the first TEE is a hardware or hardware-based TEE, a software or software-based TEE, or a combination thereof.

In some examples, the SDSi asset agents 140A-C assemble, compose, and/or otherwise generate a TEE based on one or more TEE components. For example, the TEE components correspond to compute capabilities that exist within the compute environment that represent a part, portion, or component of a TEE, such as trusted execution, trusted memory, trusted storage, etc. In such examples, the TEE components are either located on a platform local to an agent making a TEE deployment request (e.g., the first semiconductor device 105A when the first SDSi asset agent 140A makes the TEE deployment request) or available through a network connection (e.g., the mesh network 1002, the cloud platform 120, etc.). In some examples, the SDSi asset agents 140A-C generate a TEE based on one or more identified TEE components in response to determining that a known TEE or a previously generated or deployed TEE is not identified.

In some examples, the SDSi asset agents 140A-C deploy a TEE in response to translating an intent or intended outcome expected by a request. For example, the request is a change in a configuration, a requirement, etc., associated with availability (e.g., redundancy, a number failures-to-tolerate (FTT), etc.), machine learning, performance, reliability, security, etc., parameters of the system 1000. In such examples, a user (e.g., a customer, a computing device associated with the customer, a server, etc.) generates a request to adjust a configuration of the system 1000 based on one or more requirements. In some such examples, the SDSi asset agents 140A-C execute one or more artificial intelligence (AI)/machine learning (ML) models to translate and/or otherwise convert an intent or intended outcome from the one or more requirements of the request into one or more features of one(s) of the semiconductor devices 105A-C. For example, the SDSi asset agents 140A-C execute the one or more AI/ML models to translate a request to an intent to improve security of the system 1000, map the intent to one or more features (e.g., configurable features, security features, etc.) of one(s) of the semiconductor devices 105A-C, and deploy the one or more features based on the mapping. In such examples, the SDSi asset agents 140A-C maps the intent to one or more security features, such as a TEE supported by the first semiconductor device 105A, and invokes the first semiconductor device 105A to deploy the first TEE. Advantageously, the user may generate the request to adjust operation of the system 1000 without requiring the user to have in-depth knowledge of hardware and/or software configurations of the system 1000.

As used herein, availability refers to the level of redundancy required to provide continuous operation expected for workload(s) (e.g., computing workload(s), computational task(s), etc.) executed by the system 1000. As used herein, performance refers to the computer processing unit (CPU) operating speeds (e.g., CPU gigahertz (GHz)), memory (e.g., gigabytes (GB) of random access memory (RAM)), mass storage (e.g., GB hard drive disk (HDD), GB solid state drive (SSD)), and/or power capabilities to execute the workload(s). As used herein, security refers to hardware (e.g., a processor executing security decryption, encryption, monitoring services, etc., a firewall device, a hardware-based TEE, etc.), software (e.g., a software-based TEE, a virtual sandbox, etc.) and/or firmware (e.g., a firmware-based TEE) that can be deployed to protect the system 1000 or portion(s) thereof.

Figure 11:
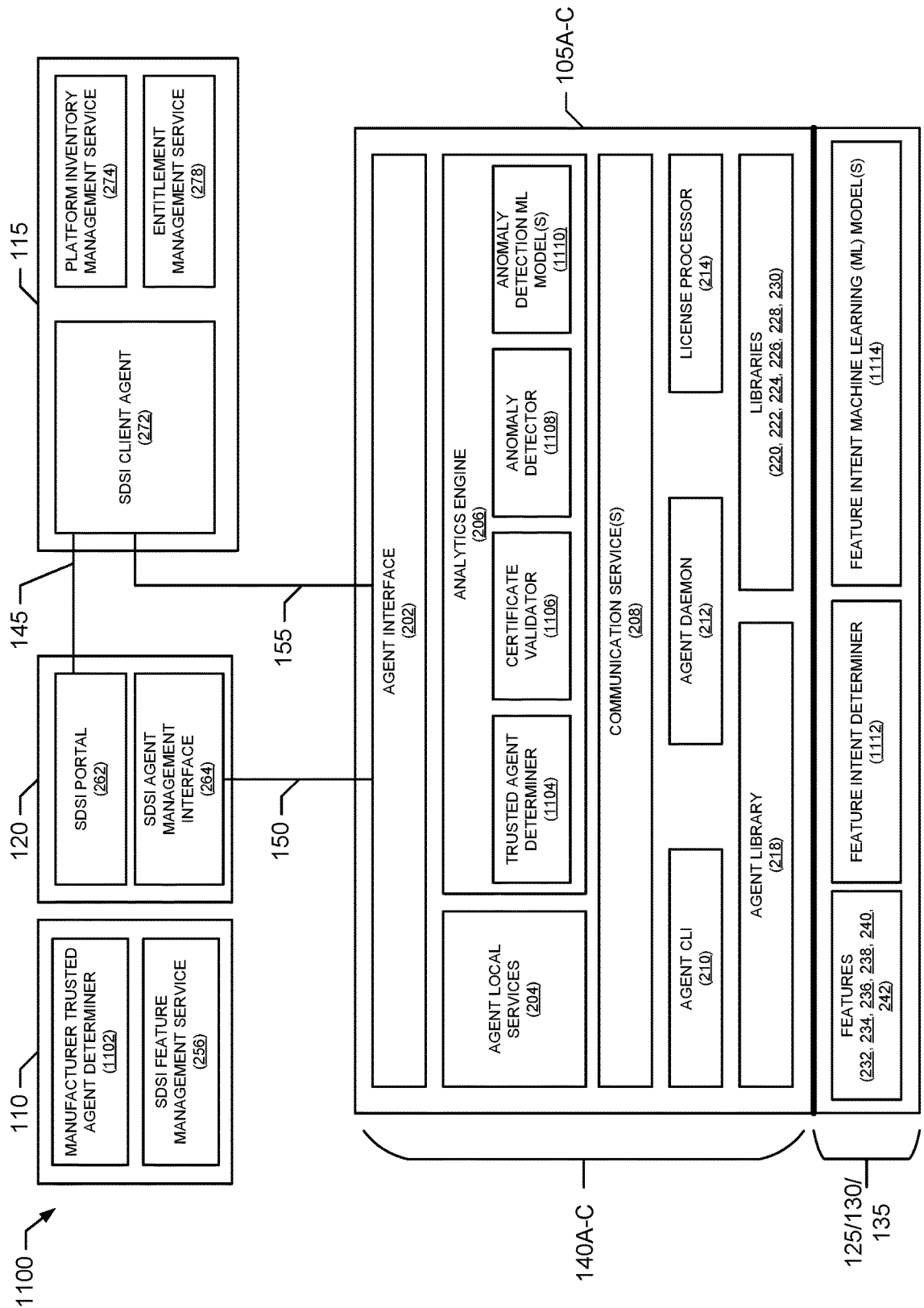
FIG. 11 is a block diagram illustrating example implementations of another example software defined silicon agent, another example manufacturer enterprise system, and another example customer enterprise system included in the example system of FIG. 10.

FIG. 11 depicts a block diagram of an example system 1100 that illustrates example implementations of the SDSi asset agent 140 and/or one(s) of the SDSi asset agents 140A-C, the manufacturer enterprise system 110, and the customer enterprise system 115 included in the example system 100 of FIG. 1 and/or the example system 1000 of FIG. 10. In the illustrated example of FIG. 11, the manufacturer enterprise system 110 includes the example SDSi feature management service 256 of FIG. 2 and an example manufacturer trusted agent determiner 1102. In the illustrated example of FIG. 11, the manufacturer enterprise system 110 includes the SDSi feature management service 256 to determine whether to renew license(s) associated with one(s) of the SDSi asset agents 140A-C to improve and/or otherwise effectuate security of the system 1000 of the example of FIG. 10.

In the illustrated example of FIG. 11, the manufacturer enterprise system 110 includes the manufacturer trusted agent determiner 1102 to determine a reputation score (e.g., an agent reputation score) for one(s) of the SDSi asset agents 140A-C of FIG. 11. For example, the SDSi feature management service 256 determines whether to renew license(s) associated with one(s) of the SDSi asset agents 140A-C. In such examples, the manufacturer trusted agent determiner 1102 determines a reputation score for respective one(s) of the SDSi asset agents 140A-C based on whether the license(s) are renewed. In some such examples, the manufacturer trusted agent determiner 1102 determines a first reputation score for the first SDSi asset agent 140A based on the determination to renew the license(s) associated with the first SDSi asset agent 140A. In some such examples, the manufacturer trusted agent determiner 1102 determines a second reputation score for the first SDSi asset agent 140A based on the determination not to renew the license(s) associated with the first SDSi asset agent 140A. In some examples, the second reputation score is less than the first reputation score because a determination not to renew the license(s) is indicative of the first SDSi asset agent 140A being compromised and/or otherwise acting not in accordance with accepted or typical behavior of an SDSi agent. Additionally or alternatively, the manufacturer enterprise system 110 of the example of FIG. 11 may include the example product management service 252 and/or the example customer management service 254 of the example of FIG. 2.

In the illustrated example of FIG. 11, the system 1100 includes the example SDSi portal 262 and the example SDSi agent management interface 264 of FIG. 2. In the example of FIG. 11, the example SDSi portal 262 and the example SDSi agent management interface 264 are implemented as cloud services in the cloud platform 120. In the illustrated example of FIG. 11, the example customer enterprise system 115 of FIG. 2 and/or FIG. 10 includes the example SDSi client agent 272, the example platform inventory management service 274, and the example entitlement management service 278 of FIG. 2. Additionally or alternatively, the example customer enterprise system 115 of FIG. 11 may include the example accounts management service 276 of the example of FIG. 2.

In the illustrated example of FIG. 11, the system 1100 includes an example implementation of the SDSi asset agent 140 of FIG. 1, and/or more generally, the semiconductor device 105 of FIG. 1, and/or an example implementation of the SDSi asset agents 140A-C of FIG. 10, and/or, more generally, the semiconductor devices 105A-C of FIG. 10. In the illustrated example of FIG. 11, the SDSi asset agents 140A-C include the example agent interface 202, the example agent local services 204, the example analytics engine 206, the example communication service(s) 208, the example agent CLI 210, the example agent daemon 212, the example license processor 214, the example agent library 218, and the example feature libraries 220-230 of FIG. 2 corresponding to the respective example feature sets 232-242 of FIG. 2 implemented by the example hardware circuitry 125, the example firmware 130, and/or the example BIOS 135 of FIG. 2.

In the illustrated example of FIG. 11, the analytics engine 206 includes an example trusted agent determiner 1104, an example certificate validator 1106, an example anomaly detector 1108, and example anomaly detection machine learning (ML) model(s) 1110.

In the illustrated example of FIG. 11, the analytics engine 206 includes the trusted agent determiner 1104 to determine and/or obtain reputation information (e.g., agent reputation information) associated with one(s) of the SDSi asset agents 140A-C. In some examples, the trusted agent determiner 1104 attests and/or otherwise executes attestation process(es) to determine a level of trustworthiness of the one(s) of the SDSi asset agents 140A-C. In such examples, the trusted agent determiner 1104 identifies one(s) of the SDSi asset agents 140A-C as trusted agent(s) (e.g., trusted SDSi agent(s)) based on the attestation. For example, in response to the first SDSi asset agent 140A being identified as a trusted agent, the first SDSi asset agent 140A can be an issuer (e.g., a trusted issuer) and/or a sender (e.g., a trusted sender) or transmitter (e.g., trusted transmitter). For example, an issuer is an agent that can obtain a license from the manufacturer enterprise system 110. In such examples, the issuer issues the license to a requesting one of the SDSi asset agents 140A-C. In some such examples, the issuer generates a certificate to confirm the successful activation or deactivation of the requested feature. In some examples, a sender is an agent that obtains a request to activate or deactivate a feature from one of the SDSi asset agents 140A-C and transmits the request to the manufacturer enterprise system 110.

In some examples, the trusted agent determiner 1104 determines whether a request has been received to activate and/or deactivate feature(s) of one(s) of the semiconductor devices 105A-C. In such examples, the trusted agent determiner 1104 identifies one(s) of the SDSi asset agents 140A-C as trusted agent(s). In some such examples, the trusted agent determiner 1104 selects a trusted agent from the identified trusted agent(s) to be a sender and/or an issuer to facilitate an issuance of corresponding license(s) based on the request.

In some examples, in response to a receipt of the request, the trusted agent determiner 1104 determines agent reputation score(s) of one(s) of the SDSi asset agents 140A-C to identify trusted agent(s). In some examples, the trusted agent determiner 1104 identifies one(s) of the SDSi asset agents 140A-C as trusted agent(s) based on the agent reputation scores. In some examples, the trusted agent determiner 1104 identifies the first SDSi asset agent 140A as a first trusted agent based on a first agent reputation score of the first SDSi asset agent 140A satisfying a threshold (e.g., a reputation score threshold, an agent reputation score threshold, a trusted reputation score threshold, a trusted agent reputation score threshold, etc.). For example, the trusted agent determiner 1104 determines that the first SDSi asset agent 140A has a first agent reputation score of 95 (e.g., a 95 out of a possible maximum agent reputation score of 100) and identifies the first SDSi asset agent 140A as the first trusted agent based on the first agent reputation score of 95 being greater than the threshold of 80 and, thus, satisfying the threshold. However, the first agent reputation score may be any other number, the first agent reputation score may be with respect to any other possible maximum agent reputation score, and/or the threshold may be any other number or representation of a threshold.

In some examples, the trusted agent determiner 1104 selects the first SDSi asset agent 140A as a trusted sender and/or a trusted issuer to execute the request for license(s) based on the first SDSi asset agent 140A having the highest agent reputation score of the SDSi asset agents 140A-C. In some examples, the trusted agent determiner 1104 selects the first SDSi asset agent 140 as a trusted sender and/or a trusted issuer based on a list of previously used trusted agents to ensure requests are distributed more evenly across all available and/or otherwise identified trusted agents. For example, the trusted agent determiner 1104 maintains a list (e.g., a trusted agent list) of N previously used trusted agents. In such examples, the trusted agent list includes the SDSi asset agents 140A-C. In some such examples, the trusted agent determiner 1104 queries and/or otherwise searches the list and determines based on the query that the first SDSi asset agent 140A has not been previously used to transmit an entitlement request. As used herein, entitlement requests refer to requests to activate, deactivate, etc., SDSi features of an asset, such as the semiconductor device 105. In some examples, an entitlement refers to an authorization to activate, deactivate, etc., one or more SDSi features of an asset, and a license refers to data and/or other things that cause activation, deactivation, etc., on the asset of the one or more SDSi features for which an entitlement has been granted. In some examples, the trusted agent determiner 1104 identifies the first SDSi asset agent 140A as the trusted agent in response to identifying the first SDSi asset agent 140 as not previously transmitting an entitlement request or, in some examples, in response to identifying the first SDSi asset agent 140A as not being used more recently than the second SDSi asset agent 140B and the third SDSi asset agent 140C.

In some examples, the trusted agent determiner 1104 determines agent reputation score(s) based on agent reputation score data. In such examples, the trusted agent determiner 1104 selects one of the SDSi asset agents 140A-C of interest to process. For example, the trusted agent determiner 1104 selects the first SDSi asset agent 140A to process. In such examples, the trusted agent determiner 1104 obtains certificate(s), renewed certificate(s), and/or agent information from the first SDSi asset agent 140A. In some such examples, the agent information includes an identifier of the first semiconductor device 105A, telemetry data reported by the first SDSi asset agent 140A, etc. In some such examples, the telemetry data includes an indication of whether a feature activation (or deactivation) was a success, a status of the SDSi feature affected by the activation (or deactivation) (e.g., such as the presently configured number of cores that are active, the presently active clock rate, etc.), a first odometer reading (e.g., first timestamp) indicating when the feature activation (or deactivation) occurred, a second odometer reading (e.g., a second timestamp) indicating whether the certificate was generated, etc.

In some examples, an initial agent reputation score is assigned by the manufacturer trusted agent determiner 1102 of the manufacturer enterprise system 110 to one(s) of the SDSi asset agents 140A-C based on an attestation protocol and/or an agent registration process. For example, the manufacturer trusted agent determiner 1102 issues an initial agent reputation score of 100 to the SDSi asset agents 140A-C because the level of trustworthiness is at a maximum after being commissioned from the silicon manufacturer. In some examples, the manufacturer trusted agent determiner 1102 invokes the SDSi agent management interface 264 to distribute the initial agent reputation scores to the SDSi asset agents 140A-C so that respective ones of the SDSi asset agents 140A-C maintain their own lists of agent reputation scores. In some examples, the trusted agent determiner 1104 of the SDSi asset agents 140A-C monitor and/or otherwise observe different ones of the SDSi asset agents 140A-C to identify anomalies, outliers, etc., associated with a number of licenses issued, a frequency of status broadcasts by the SDSi asset agents 140A-C, substantial changes in value(s) of feature(s) in license(s) issued by the SDSi asset agents 140A-C, etc. For example, the trusted agent determiner 1104 of the second SDSi asset agent 140B and the third SDSi asset agent 140C of the mesh network 1002 of FIG. 10 detect that the first SDSi asset agent 140A of the mesh network 1002 is abnormally behaving based on at least the criteria described above. In such examples, the trusted agent determiner 1102 of the second SDSi asset agent 140B lowers an agent reputation score of the first SDSi asset agent 140A by a first amount in a first list maintained by the second SDSi asset agent 140B and the trusted agent determiner 1104 of the third SDSi asset agent 140C lowers the agent reputation score of the first SDSi asset agent 140A by a second amount in a second list maintained by the third SDSi asset agent 140C. In some examples, the first amount is the same as the second amount while in other examples the first amount is different from the second amount.

In some examples, the trusted agent determiner 1104 of the second SDSi asset agent 140B and the third SDSi asset agent 140C of the mesh network 1002 of FIG. 10 detect that the first SDSi asset agent 140A of the mesh network 1002 is behaving as expected based on at least the criteria described above. For example, in response to the first SDSi asset agent 140A issuing a license to the first semiconductor device 105A that is consistent with typical behavior of an SDSi agent and/or is consistent with typical behavior of the first SDSi asset agent 140A, the trusted agent determiner 1104 of the second SDSi asset agent 140B and the third SDSi asset agent 140C determine an agent reputation score of the first SDSi asset agent 140A, an adjustment to the agent reputation score, etc., and/or a combination thereof. In some examples, the trusted agent determiner 1104 of the second SDSi asset agent 140B increases an agent reputation score of the first SDSi asset agent 140A by a first amount in a first list maintained by the second SDSi asset agent 140B and the trusted agent determiner 1104 of the third SDSi asset agent 140C increases the agent reputation score of the first SDSi asset agent 140A by a second amount in a second list maintained by the third SDSi asset agent 140C. For example, the trusted agent determiner of the second SDSi asset agent 140B and the third SDSi asset agent 140C determine the first amount and the second amount based on an issued certificate broadcasted from the first SDSi asset agent 140A to the mesh network 1002. In some examples, the first amount is the same as the second amount while in other examples the first amount is different from the second amount.

In some examples, the trusted agent determiner 1104 determine an agent reputation score based on whether one of the SDSi asset agents 140A-C reported a certificate to the manufacturer enterprise system 110. For example, the first SDSi asset agent 140A broadcasts a certificate to the mesh network 1002. In such examples, the second SDSi asset agent 140B and/or the third SDSi asset agent 140C report the broadcasted certificate to the manufacturer enterprise system 110. In some such examples, the manufacturer trusted agent 1102 invokes the SDSi agent management interface 264 to generate an alert, inform, notify, etc., the second SDSi asset agent 140B and/or the third SDSi asset agent 140C that the first SDSi asset agent 140A reported the certificate to the manufacturer enterprise system 110. In some such examples, the trusted agent determiner 1104 of the second SDSi asset agent 140B and/or the third SDSi asset agent 140C increase an agent reputation score of the first SDSi asset agent 140A in the list(s) of the second SDSi asset agent 140B and/or the third SDSi asset agent 140C. In other examples, the manufacturer trusted agent 1102 invokes the SDSi agent management interface 264 to generate an alert, inform, notify, etc., the second SDSi asset agent 140B and/or the third SDSi asset agent 140C that the first SDSi asset agent 140A did not report the certificate to the manufacturer enterprise system 110. In some such examples, the trusted agent determiner 1104 of the second SDSi asset agent 140B and/or the third SDSi asset agent 140C decrease an agent reputation score of the first SDSi asset agent 140A in the list(s) of the second SDSi asset agent 140B and/or the third SDSi asset agent 140C because the first SDSi asset agent 140A is abnormally behaving and/or otherwise not operating in a trustworthy manner.

In some examples, the trusted agent determiner 1104 blocks one(s) of the SDSi asset agents 140A-C based on an agent reputation score (e.g., by adding them to a blocked list). For example, the first SDSi asset agent 140A and the second SDSi asset agent 140B blocks the third SDSi asset agent 140C in response to an agent reputation score of the third SDSi asset agent 140C satisfying a blocked threshold. In such examples, the trusted agent determiner 1104 of the first SDSi asset agent 140A determines that the agent reputation score satisfies the blocked threshold based on the agent reputation score being lower than the blocked threshold. In some such examples, in response to the blocked threshold being satisfied, the first SDSi asset agent 140A adds the third SDSi asset agent 140C to a blocked list maintained by the first SDSi asset agent 140A. In some such examples, the trusted agent determiner 1104 of the first SDSi asset agent 140A determines that the agent reputation score of 60 satisfies the blocked threshold of 80 based on the agent reputation score of 60 being lower than the blocked threshold of 80.

In some examples, the trusted agent determiner 1104 allows access to one(s) of the SDSi asset agents 140A-C based on an agent reputation score (e.g., by adding them to an allowed list). For example, the first SDSi asset agent 140A and the second SDSi asset agent 140B allow access to the third SDSi asset agent 140C in response to an agent reputation score of the third SDSi asset agent 140C satisfying an allowed threshold. In such examples, the trusted agent determiner 1104 of the first SDSi asset agent 140A determines that the agent reputation score of the third SDSi asset agent 140C satisfies the allowed threshold based on the agent reputation score being higher than the whitest threshold (or a blocked threshold). In some such examples, in response to the allowed threshold being satisfied, the first SDSi asset agent 140A adds the third SDSi asset agent 140C to an allowed list maintained by the first SDSi asset agent 140A. In some such examples, the trusted agent determiner 1104 of the first SDSi asset agent 140A determines that the agent reputation score of 90 satisfies the allowed threshold of 80 based on the agent reputation score of 90 being higher than the allowed threshold of 80.

In some examples, the trusted agent determiner 1104 evaluates whether an agent reputation score associated with an SDSi asset agent satisfies the allowed threshold in response to obtaining a license from the SDSi asset agent. For example, the first SDSi asset agent 140A may receive a license from the second SDSi asset agent 140B. In such examples, the first SDSi asset agent 140A may compare the agent reputation score of the second SDSi asset agent 140B to the allowed threshold prior to invoking the license to ensure that the license has not been compromised by a malicious actor. In some such examples, the first SDSi asset agent 140A invokes the license in response to determining that the agent reputation score satisfies the allowed threshold. In some such examples, the first SDSi asset agent 140A discards the license in response to determining that the agent reputation score does not satisfy the allowed threshold.

Advantageously, in some examples, the trusted agent determiner 1104 communicates with different one(s) of the SDSi asset agents 140A-C for improved security. For example, to prevent the first semiconductor device 105A from communicating with only the second SDSi agent 140B, which may be compromised and/or otherwise controlled by a malicious actor or attacker, the first SDSi agent 140A may cycle through one(s) of the SDSi agents 140A-C. For example, the first SDSi agent 140A may cycle through one(s) of the SDSi agents 140A-C in a random pattern, a round robin pattern, etc., or any other type of pattern. In some examples, the first SDSi agent 140A may communicate with the second SDSi agent 140B during a first interaction, the third SDSi agent 140C during a second interaction, etc. In some such examples, after communicating with the second SDSi agent 140B during the first interaction, the first SDSi agent 140A may initiate a counter, a timer, etc., to determine a time period during which the second SDSi agent 140B is not to be communicated with. In response to the counter, the timer, etc., triggering the end of the time period, the first SDSi agent 140A may communicate again with the second SDSi agent 140B.

In some examples, the trusted agent determiner 1104 determines an agent reputation score based on a fingerprint (e.g., an agent fingerprint) determined by a runtime measurement. For example, the SDSi asset agents 140A-C request (e.g., periodically request, asynchronously request, etc.) runtime measurements from different ones of the SDSi asset agents 140A-C. Example runtime measurements include a hashed and/or otherwise cryptographically generated measurement of an application (e.g., application code, machine readable instructions, etc.) in memory, a counter value (e.g., a hardware counter value, a CPU counter value, etc.), etc. In some examples, the runtime measurements are indicative of, representative of, and/or otherwise correspond to a fingerprint of an agent, and/or, more generally, a semiconductor device.

In some examples, the trusted agent determiner 1104 determines an agent reputation score based on a comparison of a fingerprint obtained from a first agent to a stored fingerprint in a second agent. For example, the trusted agent determiner 1104 of the first SDSi asset agent 140A queries the second SDSi asset agent 140B for a runtime measurement. In such examples, the trusted agent determiner 1104 of the second SDSi asset agent 140B obtains a runtime measurement associated with hardware of the second semiconductor device 105B, such as a CPU counter value, and cryptographically signs the runtime measurement to generate a digital signature (e.g., an electronic signature). For example, the trusted agent determiner 1104 of the second SDSi asset agent 140B generates the digital signature by executing an algorithm (e.g., a cryptographic algorithm, an encryption algorithm, etc.) to transform first data (e.g., a runtime measurement) into second data (e.g., cryptographical data, cipher text, unreadable cipher text, etc.) that is unreadable to an unauthorized device or user. In some examples, the second SDSi asset agent 140B transmits the digital signature, the signed runtime measurement (e.g., the cryptographically signed runtime measurement), etc., to the first SDSi asset agent 140A. In such examples, the trusted agent determiner 1104 of the first SDSi asset agent 140A decrypts the digital signature by executing an algorithm (e.g., a cryptographic algorithm, a decryption algorithm, etc.) to make the underlying runtime measurement readable to the trusted agent determiner 1104. In some such examples, the trusted agent determiner 1104 uses a key (e.g., an asymmetric key, a symmetric key, etc.) to make the cryptographically protected runtime measurement readable.

In some examples, the trusted agent determiner 1104 of the first SDSi asset agent 140A compares the decrypted runtime measurement to a stored runtime measurement that is associated with the second SDSi asset agent 140B. For example, the stored runtime measurement is included in and/or otherwise stored in a file (e.g., a signed known good measurement file) that is stored in the mesh of the SDSi asset agents 140A-C, and/or, more generally, the mesh network 1002. In such examples, the file is returned to the one of the SDSi asset agents 140A-C that is acting and/or otherwise operating as a certification or validation authority on call of the one of the SDSi asset agents 140A-C being attested. In some such examples, different versions of the file are stored in different ones of the SDSi asset agents 140A-C due to untimely synchronization. The respective files have a security version number (SVN). In some examples, the file having the highest SVN, which is indicative of the most recent or most up-to-date file, is returned to the certification authority for the purposes of runtime measurement attestation.

In some examples, in response to determining that the measurements match based on the comparison, the trusted agent determiner 1104 of the first SDSi asset agent 140B increases an agent reputation score of the second SDSi asset agent 140B. In other examples, in response to determining that the measurements do not match based on the comparison, the trusted agent determiner 1104 of the first SDSi asset agent 140A decreases the agent reputation score of the second SDSi asset agent 140B. In some such examples, the mismatch of the runtime measurements is indicative that the second SDSi asset agent 140B has been compromised, manipulated (e.g., maliciously manipulated), etc., and/or is otherwise a rogue or malicious agent or actor.

In some examples, the trusted agent determiner 1104 implements means for determining a trusted agent. For example, the means for determining determines respective reputation scores associated with a plurality of agents in a mesh network, the plurality of agents associated with a plurality of semiconductor devices, respective ones of the semiconductor devices including circuitry configurable to provide one or more features. In such examples, the means for determining selects, based on the respective reputation scores, a first agent from the plurality of the agents to transmit a request to activate or deactivate at least one of the one or more features. In some examples, the request is a first request transmitted at a first time, and the means for determining determines whether the first agent transmitted a second request at a second time prior to the first time, and in response to determining that the first agent did not transmit the second request, selects the first agent to transmit the first request. In some examples, the means for determining queries the first agent for a cryptographically signed runtime measurement associated with a resource of the semiconductor device, compares the cryptographically signed runtime measurement to a validated cryptographically signed runtime measurement, broadcasts a validation result based on the comparison to the mesh network to cause the plurality of the agents to store the validation result, and in response to the validation result indicating a match, adds the first agent to an allowed list. In some examples, the means for determining blocks the first agent in response to the validation result not indicating a match, and drops future broadcasts from the first agent. In this example, the means for determining is implemented by any processor structured to perform the corresponding operation by executing software or firmware, or hardware circuit (e.g., discrete and/or integrated analog and/or digital circuitry, an FPGA, a PLD, a FPLD, an ASIC, a comparator, an operational-amplifier (op-amp), a logic circuit, etc.) structured to perform the corresponding operation without executing software or firmware, but other structures are likewise appropriate.

In some examples, the agent interface 202 implements means for interfacing with an agent. For example, the means for interfacing broadcasts an activation or deactivation of one or more features to a mesh network to cause the means for determining to update the reputation score of the first agent in response to the request. In this example, the means for interfacing is implemented by any processor structured to perform the corresponding operation by executing software or firmware, or hardware circuit (e.g., discrete and/or integrated analog and/or digital circuitry, an FPGA, a PLD, a FPLD, an ASIC, a comparator, an operational-amplifier (op-amp), a logic circuit, etc.) structured to perform the corresponding operation without executing software or firmware, but other structures are likewise appropriate.

In the illustrated example of FIG. 11, the analytics engine 206 includes the certificate validator 1106 to renew certificate(s) associated with trusted agent(s) of the mesh network 1002. In some examples, to effectuate security of the system 1100 of FIG. 11, trusted agent(s) are requested (e.g., periodically requested, asynchronously requested, etc.) to renew certificates by invalidating feature activation. For example, the certificate validator 1106 of the first SDSi asset agent 140A identifies the second semiconductor device 105B to validate by renewing certificate(s) associated with the second semiconductor device 105B. In such examples, the certificate validator 1106 determines certification information, such as a current asset status, activated feature(s), and/or license issuer(s) associated with certificate(s) of the second semiconductor device 105B.

In some examples, the certificate validator 1106 implements means for validating a certificate. For example, the means for determining determines a first reputation score of a first agent based on a renewal of a license issued to a first semiconductor device of a plurality of semiconductor devices associated with the first agent, and the means for validating determines an asset status of the first semiconductor device, determines a feature activated on the first semiconductor device, determine an issuer of the license that invoked an activation of the feature, cryptographically signs renew request data including data associated with at least one of the asset status, the feature, or the issuer, and transmits the cryptographically signed renew request data to cause a server to determine whether to facilitate the renewal of the license. In some examples, the means for validating, in response to obtaining a renewed license from the server, provisions the renewed license to the first semiconductor device and generates a renewal certificate. In such examples, the means for interfacing broadcasts the renewal certificate to the mesh network, and the means for determining updates the reputation score of the first agent based on the renewal certificate. In this example, the means for validating is implemented by any processor structured to perform the corresponding operation by executing software or firmware, or hardware circuit (e.g., discrete and/or integrated analog and/or digital circuitry, an FPGA, a PLD, a FPLD, an ASIC, a comparator, an operational-amplifier (op-amp), a logic circuit, etc.) structured to perform the corresponding operation without executing software or firmware, but other structures are likewise appropriate.

In some examples, the certificate validator 1106 de-activates the activated feature(s) based on the certificate information. In such examples, the certificate validator 1106 of the second SDSi asset agent 140B transmits a renew request (e.g., a renew certificate request) to the manufacturer enterprise system 110. In some such examples, the certificate validator 1106 of the second SDSi asset agent 140B cryptographically signs the renew request which, in some examples, includes the certificate information or portion(s) thereof. In response to obtaining the renew request, the SDSi feature management service 256 determines whether to renew the certificate(s) previously issued to the second semiconductor device 105B. For example, the SDSi feature management service 256 determines to renew the request based on an agent reputation score of the second SDSi asset agent 140B satisfying a threshold, determining that the certificate(s) were previously reported to the mesh network 1002 and/or the manufacturer enterprise system 110, etc., and/or a combination thereof. In some examples, the SDSi feature management service 256 determines not to renew the request based on the agent reputation score of the second SDSi asset agent 140B not satisfying the threshold, determining that the certificate(s) were not previously reported to the mesh network 1002 and/or the manufacturer enterprise system 110, etc., and/or a combination thereof, which is/are indicative of the second SDSi asset agent 140B being a rogue and/or otherwise compromised agent.

In some examples, in response to the SDSi feature management service 256 determining not to renew the request, the SDSi management service 256 invokes the SDSi agent management interface 264 to generate an alert, inform, notify, etc., one(s) of the SDSi asset agents 140A-C that the second SDSi asset agent 140B is not having the certificate(s) renewed. In such examples, the first SDSi asset agent 140A, the third SDSi agent 140C, etc., decrease an agent reputation score of the second SDSi asset agent 140B based on the alert, the informing, the notification, etc.

In some examples, in response to determining to renew the request, the SDSi feature management service 256 invokes the SDSi agent management interface 264 to generate an alert, inform, notify, etc., one(s) of the SDSi asset agents 140A-C that the second SDSi asset agent 140B is having the certificate(s) renewed. In such examples, the first SDSi asset agent 140A, the third SDSi agent 140C, etc., increase an agent reputation score of the second SDSi asset agent 140B based on the alert, the informing, the notification, etc.

In some examples, in response to the SDSi feature management service 256 determining to renew the request, the license processor 214 of the second SDSi asset agent 140B facilitates provisioning of the license to the second SDSi asset agent 140B by re-activating the de-activated feature(s). In such examples, in response to a successful reactivation, the agent analytics engine 206 generates a certificate. In some such examples, the agent analytics engine 206 invokes the agent interface 202 to broadcast the renewed certificate(s) to the mesh network 1002. In some examples, in response to receiving the broadcast, the trusted agent determiner 1104 of the first SDSi asset agent 140A and the third SDSi asset agent 140C increase the agent reputation score of the second SDSi asset agent 140B based on the renewed certificate(s), which is indicative of the second SDSi asset agent 140B being trustworthy and/or otherwise unlikely to be a rogue or compromised agent.

In the illustrated example of FIG. 11, the analytics engine 206 includes the anomaly detector 1108 to use artificial intelligence to analyze broadcasts from ones of the SDSi asset agents 140A-C to detect and/or otherwise identify one or more anomalies. In some examples, the anomaly detector 1108 analyzes the broadcasts from not blocked one(s) of the SDSi asset agents 140A-C and/or otherwise from one(s) of the SDSi asset agents 140A-C having relatively high agent reputation scores. In such examples, the anomaly detector 1108 may not analyze anomalies in broadcasts from blocked one(s) of the SDSi asset agents 140A-C because the trusted agent determiner 1104, and/or, more generally, a corresponding one of the SDSi asset agents 140A-C ignores the broadcasts from the blocked one(s) of the SDSi asset agents 140A-C.

In some examples, the anomaly detector 1108 executes one or more AI models, such as the anomaly detection machine learning (ML) model(s) 1110 of the example of FIG. 11. In such examples, the anomaly detector 1108 executes the anomaly detection ML model(s) 1110 to analyze trend(s) in a number of issued licenses, a number of activated (or deactivated) features, a value of respective one(s) of the activated (or deactivated) features, etc., and/or a combination thereof. In some such examples, the anomaly detection ML model(s) 1110 output and/or otherwise determine whether differences (e.g., significant differences, substantial differences, etc.) or deviations (e.g., significant deviations, substantial deviations, etc.) are detected based on the AI analysis. In some such examples, the anomaly detector 1108 invokes the trusted agent determiner 1104 to reduce and/or otherwise lower a score for the one of the SDSi asset agents 140A-C associated with the detected anomalies.

In some examples, the analytics engine 206 includes the anomaly detector 1108 to use AI, including ML, deep learning (DL), and/or other artificial machine-driven logic, to enable the analytics engine 206, and/or, more generally, the SDSi asset agent 140A-C to use a model, such as the anomaly detection ML model(s) 1110, to process input data (e.g., certificate data, license data, information included in a broadcast to the mesh network 1002, etc.) to generate an output (e.g., a detection or identification of one or more anomalies or deviations) based on patterns, trends, and/or associations previously learned by the model via a training process. For instance, the anomaly detector 1108 trains the anomaly detection ML model(s) 1110 with data to recognize patterns, trends, and/or associations and follow such patterns, trends, and/or associations when processing input data such that other input(s) result in output(s) consistent with the recognized patterns, trends, and/or associations.

In some examples, the anomaly detector 1108 implements means for detecting an anomaly. For example, the means for detecting executes a machine learning model to detect an anomaly associated with a license, and, in response to a detection of the anomaly, updates a reputation score associated with a second agent of the plurality of the agents based on the anomaly. In this example, the means for detecting is implemented by any processor structured to perform the corresponding operation by executing software or firmware, or hardware circuit (e.g., discrete and/or integrated analog and/or digital circuitry, an FPGA, a PLD, a FPLD, an ASIC, a comparator, an operational-amplifier (op-amp), a logic circuit, etc.) structured to perform the corresponding operation without executing software or firmware, but other structures are likewise appropriate.

Many different types of machine learning models and/or machine learning architectures exist. In some examples, a neural network model is used to implement the anomaly detection ML model(s) 1110. Using a neural network model enables the example anomaly detector 1108 to analyze patterns in certificates, licenses, etc., broadcasted to the mesh network 1002 and identify any anomalies or deviations based on the patterns. In general, ML models/architectures that are suitable to use in the example approaches disclosed herein include recurrent neural networks. However, other types of machine learning models could additionally or alternatively be used such as supervised learning artificial neural network models. Example supervised learning artificial neural network models include two-layer (2-layer) radial basis neural networks (RBN), learning vector quantization (LVQ) classification neural networks, etc.

The example anomaly detector 1108 and/or the example anomaly detection ML model(s) 1110 implement(s) an AI/ML system using two phases, a learning/training phase and an inference phase. In the learning/training phase, the anomaly detector 1108 executes a training algorithm to train the anomaly detection ML model(s) 1110 to operate in accordance with patterns, trends, and/or associations based on, for example, training data. In general, the anomaly detection ML model(s) 1110 includes internal parameters that guide how input data is transformed into output data, such as through a series of nodes and connections within the model to transform input data into output data. Additionally, hyperparameters are used as part of the training process to control how the learning is performed (e.g., a learning rate, a number of layers to be used in the machine learning model, etc.). Hyperparameters are defined to be model hyperparameters that are determined prior to initiating the training process.

The example anomaly detector 1108 may deploy different types of training based on the type of AI/ML model of the anomaly detection ML model(s) 1110 and/or the expected output. In some examples, the anomaly detector 1108 deploys supervised training to use inputs and corresponding expected (e.g., labeled) outputs to select parameters (e.g., by iterating over combinations of select parameters) for the anomaly detection ML model(s) 1110 to reduce model error. As used herein, labelling refers to an expected output of the anomaly detection ML model(s) 1110 (e.g., a classification, an expected output value, etc.). In some examples, the anomaly detector 1108 deploys unsupervised training (e.g., used in deep learning, a subset of machine learning, etc.) to use inferring patterns from inputs to select parameters for the anomaly detection ML model(s) 1110 (e.g., without the benefit of expected (e.g., labeled) outputs).

In some examples, the anomaly detector 1108 trains the anomaly detection ML model(s) 1110 using unsupervised learning. In some examples, the anomaly detector 1108 trains the anomaly detection ML model(s) 1110 using stochastic gradient descent. However, any other training algorithm may additionally or alternatively be used. In some examples, the anomaly detector 1108 can perform training of the anomaly detection ML model(s) 1110 until the level of error is no longer reducing. In some examples, the anomaly detector 1108 executes the training by performing the training locally on the semiconductor device 105A-C. In some examples, the training is performed remotely at an external computing system (e.g., the manufacturer enterprise system 110, the customer enterprise system 115, etc.) communicatively coupled to the semiconductor device 105A-C.

In some examples, the anomaly detector 1108 performs the training of the anomaly detection ML model(s) 1110 using hyperparameters that control how the learning is performed (e.g., a learning rate, a number of layers to be used in the anomaly detection ML model(s) 1110, etc.). In some examples, hyperparameters that control model performance and training speed are the learning rate and regularization parameter(s). Such hyperparameters are selected by, for example, trial and error, a customer associated with the customer enterprise system 115 based on one or more requirements or specifications, etc., to reach an optimal model performance. In some examples, the anomaly detector 1108 utilizes Bayesian hyperparameter optimization to determine an optimal and/or otherwise improved or more efficient network architecture to avoid model overfitting and improve model's overall applicability. In some examples, the anomaly detector 1108 determines that re-training of the anomaly detection ML model(s) 1110 is to be performed. In such examples, the anomaly detector 1108 determines to execute such re-training in response to a predetermined time period elapsing, a quantity of certificate data, license data, etc., obtained from the mesh network 1002, a receipt of a re-training request by a user or external computing system, etc., and/or a combination thereof.

Training is performed using training data. In some examples, the training data originates from locally generated data, such as telemetry data from the SDSi asset agents 140A-C. In some examples where supervised training is used, the training data is labeled. Labeling is applied to the training data by a user manually or by an automated data pre-processing system. In some examples, the training data is pre-processed using, for example, an interface (e.g., the agent interface 202), or other portion of the SDSi asset agent 140A-C, such as the trusted agent determiner 1104, the certificate validator 1106, the anomaly detector 1108, etc., to determine training data. In some examples, the anomaly detector 1108 sub-divides the training data into two or more portions, such as a first portion of data for training the model and a second portion of data for validating the model.

Once training is complete, the example anomaly detector 1108 deploys the anomaly detection ML model(s) 1110 for use as an executable construct that processes an input and provides an output based on the network of nodes and connections defined in the anomaly detection ML model(s) 1110. The anomaly detection ML model(s) 1110 is stored in memory of the SDSi asset agent 140A-C, the semiconductor device 105A-C, etc., or in a database of a remote computing system, such as one or more servers associated with at least one of the manufacturer enterprise system 110 or the customer enterprise system 115. The example anomaly detector 1108 may then execute the example anomaly detection ML model(s) 1110 to detect anomalies associated with broadcast(s) from one(s) of the example SDSi asset agents 140A-C.

Once trained, the example deployed anomaly detection ML model(s) 1110 may be operated in an inference phase to process data. In the inference phase, data to be analyzed (e.g., live data) is input to the example anomaly detection ML model(s) 1110, and the anomaly detection ML model(s) 1110 execute(s) to create an output. By way of example, this inference phase can be thought of as the AI "thinking" to generate the output based on what it learned from the training (e.g., by executing the model to apply the learned patterns and/or associations to the live data). In some examples, input data undergoes pre-processing before being used as an input to the anomaly detection ML model(s) 1110. Moreover, in some examples, the output data may undergo post-processing after it is generated by the anomaly detection ML model(s) 1110 to transform the output into a useful result (e.g., a display of data, an instruction to be executed by a machine, etc.).

In some examples, output(s) of the deployed anomaly detection ML model(s) 1110 may be captured and provided as feedback. By analyzing the feedback, an accuracy of the deployed model can be determined. If the feedback indicates that the accuracy of the deployed model is less than a threshold or other criterion, the example anomaly detector 1108 triggers training of an updated model using the feedback and an updated training data set, hyperparameters, etc., to generate an updated, deployed one(s) of the example anomaly detection ML model(s) 1110.

In the illustrated example of FIG. 11, the hardware circuitry 125, the firmware 130, and/or the BIOS 135 implement an example feature intent determiner 1112 and example feature intent machine learning (ML) model(s) 1112. In some examples, the feature intent determiner 1112 determine an intent or expected outcome of a request to change a hardware asset, such as the semiconductor devices 105A-C, post manufacture. Typically, tools provided by silicon product manufacturers require an operator, a user, etc., to know details about features that need to activated or deactivated. Such a request to change the hardware asset may be in response to a customer order for manufacturing a server platform, an increased workload caused by a peak in computing and/or network traffic experienced by a customer associated with the customer enterprise system 115, etc. Such examples of bases for the request may require deep knowledge of the workload and understanding of the available hardware, software, and/or firmware features of the semiconductor devices 105A-C. In some such examples, the capability of changing a configuration of an asset by a customer may not be fully leveraged, which may lead to suboptimal asset utilization and/or increased costs. In some examples, a specific combination of features may result in better performance while another combination of other features may significantly decrease performance of execution. In such examples, the complexity of such dependencies increases with subsequent generations of semiconductor devices because of new features being introduced or existing features being modified.

Advantageously, the example feature intent determiner 1112 reduces the complexity of understanding features of the semiconductor device 105A-C when requesting a configuration change to improve performance of execution of computing workloads. For example, a configuration change of the semiconductor device 105A-C may include an activation of one or more first features, an activation of one or more second features, a deactivation of one or more third features, and/or a deactivation of one or more fourth features. In some examples, the feature intent determiner 1112 obtains a request for a configuration change of one(s) of the semiconductor devices 105A-C. In such examples, the request is based on and/or otherwise formatted according to a high-level meta-language to enable a requester (e.g., a user, a computing device, etc.) to define an expected outcome of the configuration change.

In some examples, the feature intent determiner 1112 deploys a language parser (e.g., a language parsing engine) to translate the request for the configuration change into one or more requirements associated with availability, machine learning, performance, reliability, security, etc., and translate the one or more requirements into one or more features of the semiconductor device 105A-C that, when activated, deliver the configuration change in accordance with the expected outcome. In such examples, the feature intent determiner 1112 invokes execution of the feature intent ML model(s) 1114 to determine whether to adjust and/or otherwise modify the one or more features identified by the feature intent determiner 1112. In some examples, in response to an identification of the one or more features, the modified one(s) of the one or more features, etc., the feature intent determiner 1112 invokes the license processor 214 to obtain (e.g., automatically obtain) the corresponding license(s) for the identified feature(s).

In some examples, the feature intent ML model(s) 1114 obtain(s) data (e.g., training data) from the mesh network 1002, the manufacturer enterprise network 110, and/or the customer enterprise network 115. Such example data includes system diagnostics and/or information associated with workloads previously executed, currently being executed, and/or in a queue to be processed by one(s) of the semiconductor devices 105A-C. Advantageously, the example feature intent determiner 1112 and/or the example feature intent ML model(s) 1114 implement a self-learning AI/ML system to adaptively handle and/or otherwise execute dynamically changing workloads with optimum and/or otherwise improved performance.

In some examples, the hardware circuitry 125, the firmware 130, and/or the BIOS 135 include the feature intent determiner 1112 to use AI, including ML, DL, and/or other artificial machine-driven logic, to use a model, such as the feature intent ML model(s) 1114, to process input data (e.g., system diagnostics, workload data, requested features, requirements, etc.) to generate an output (e.g., one or more features to be activated (or deactivated) based on patterns, trends, and/or associations previously learned by the feature intent ML model(s) 1114 via a training process. For instance, the feature intent determiner 1112 trains the feature intent ML model(s) 1114 with data to recognize patterns, trends, and/or associations and follow such patterns, trends, and/or associations when processing input data such that other input(s) result in output(s) consistent with the recognized patterns, trends, and/or associations.

In some examples, a neural network model is used to implement the feature intent ML model(s) 1114. Using a neural network model enables the example feature intent determiner 1112 to analyze patterns in system diagnostics, workloads, requested features, etc., broadcasted to the mesh network 1002 and/or stored by at least one of the manufacturer enterprise system 110 or the customer enterprise system 115. In some examples, other types of machine learning models could additionally or alternatively be used to implement the feature intent ML model(s) 1114, such as supervised learning artificial neural network models.

The example feature intent determiner 1112 and/or the example feature intent ML model(s) 1114 implement(s) an AI/ML system using two phases, a learning/training phase and an inference phase. In the learning/training phase, the example feature intent determiner 1112 executes a training algorithm to train the example feature intent ML model(s) 1114 to operate in accordance with patterns, trends, and/or associations based on, for example, training data. In general, the feature intent ML model(s) 1114 include(s) internal parameters that guide how input data is transformed into output data, such as through a series of nodes and connections within the model to transform input data into output data. Additionally, hyperparameters are used as part of the training process to control how the learning is performed (e.g., a learning rate, a number of layers to be used in the machine learning model, etc.). Hyperparameters are defined to be model hyperparameters that are determined prior to initiating the training process.

The example feature intent determiner 1112 may deploy different types of training based on the type of AI/ML model of the feature intent ML model(s) 1114 and/or the expected output. In some examples, the feature intent determiner 1112 deploys supervised training to use inputs and corresponding expected (e.g., labeled) outputs to select parameters (e.g., by iterating over combinations of select parameters) for the feature intent ML model(s) 1114 to reduce model error. As used herein, labelling refers to an expected output of the feature intent ML model(s) 1114 (e.g., a classification, an expected output value, etc.). In some examples, the feature intent determiner 1112 deploys unsupervised training (e.g., used in deep learning, a subset of machine learning, etc.) to use inferring patterns from inputs to select parameters for the feature intent ML model(s) 1114 (e.g., without the benefit of expected (e.g., labeled) outputs).

In some examples, the feature intent determiner 1112 trains the feature intent ML model(s) 1114 using unsupervised learning. In some examples, the feature intent determiner 1112 trains the feature intent ML model(s) 1114 using stochastic gradient descent. However, any other training algorithm may additionally or alternatively be used. In some examples, the feature intent determiner 1112 can perform training of the feature intent ML model(s) 1114 until the level of error is no longer reducing. In some examples, the feature intent determiner 1112 executes the training by performing the training locally on the semiconductor device 105A-C. In some examples, the training is performed remotely at an external computing system (e.g., the manufacturer enterprise system 110, the customer enterprise system 115, etc.) communicatively coupled to the semiconductor device 105A-C.

In some examples, the feature intent determiner 1112 performs the training of the feature intent ML model(s) 1114 using hyperparameters that control how the learning is performed (e.g., a learning rate, a number of layers to be used in the feature intent ML model(s) 1114, etc.). In some examples, hyperparameters that control model performance and training speed are the learning rate and regularization parameter(s). Such hyperparameters are selected by, for example, trial and error, a customer associated with the customer enterprise system 115 based on one or more requirements or specifications, etc., to reach an optimal model performance. In some examples, the feature intent determiner 1112 utilizes Bayesian hyperparameter optimization to determine an optimal and/or otherwise improved or more efficient network architecture to avoid model overfitting and improve model's overall applicability. In some examples, the feature intent determiner 1112 determines that re-training of the feature intent ML model(s) 1114 is to be performed. In such examples, the feature intent determiner 1112 determines to execute such re-training in response to a predetermined time period elapsing, a quantity of system diagnostics, workload data, etc., obtained from the mesh network 1002, a receipt of a re-training request by a user or external computing system, etc., and/or a combination thereof.

Training is performed using training data. In some examples, the training data originates from locally generated data, such as telemetry data from the SDSi asset agents 140A-C, the system diagnostics, the workload data, etc. In some examples where supervised training is used, the training data is labeled. Labeling is applied to the training data by a user manually or by an automated data pre-processing system. In some examples, the training data is pre-processed using, for example, an interface (e.g., the agent interface 202) or other portion of the SDSi asset agent 140A-C to determine training data. In some examples, the feature intent determiner 1112 sub-divides the training data into two or more portions, such as a first portion of data for training the model and a second portion of data for validating the model.

Once training is complete, the example feature intent determiner 1112 deploys the feature intent ML model(s) 1114 for use as an executable construct that processes an input and provides an output based on the network of nodes and connections defined in the feature intent ML model(s) 1114. The example feature intent ML model(s) 1114 is stored in memory of the semiconductor device 105A-C, etc., or in a database of a remote computing system, such as one or more servers associated with at least one of the example manufacturer enterprise system 110 or the example customer enterprise system 115. The example feature intent determiner 1112 may then execute the example feature intent ML model(s) 1114 to determine one or more features to activate based on an intent or expected outcome from a request to change a configuration of one(s) of the example semiconductor devices 105A-C.

Once trained, the deployed feature intent ML model(s) 1114 may be operated in an inference phase to process data. In the inference phase, data to be analyzed (e.g., live data) is input to the example feature intent ML model(s) 1114, and the feature intent model(s) 1114 execute(s) to create an output. In some examples, input data undergoes pre-processing before being used as an input to the feature intent ML model(s) 1114. Moreover, in some examples, the output data may undergo post-processing after it is generated by the feature intent ML model(s) 1114 to transform the output into a useful result (e.g., a display of data, an instruction to be executed by a machine, etc.).

In some examples, output(s) of the deployed feature intent ML model(s) 1114 may be captured and provided as feedback. By analyzing the feedback, an accuracy of the deployed model can be determined. If the feedback indicates that the accuracy of the deployed model is less than a threshold or other criterion, the example feature intent determiner 1112 triggers training of an updated model using the feedback and an updated training data set, hyperparameters, etc., to generate an updated, deployed one(s) of the example feature intent ML model(s) 1114.

Figure 12:
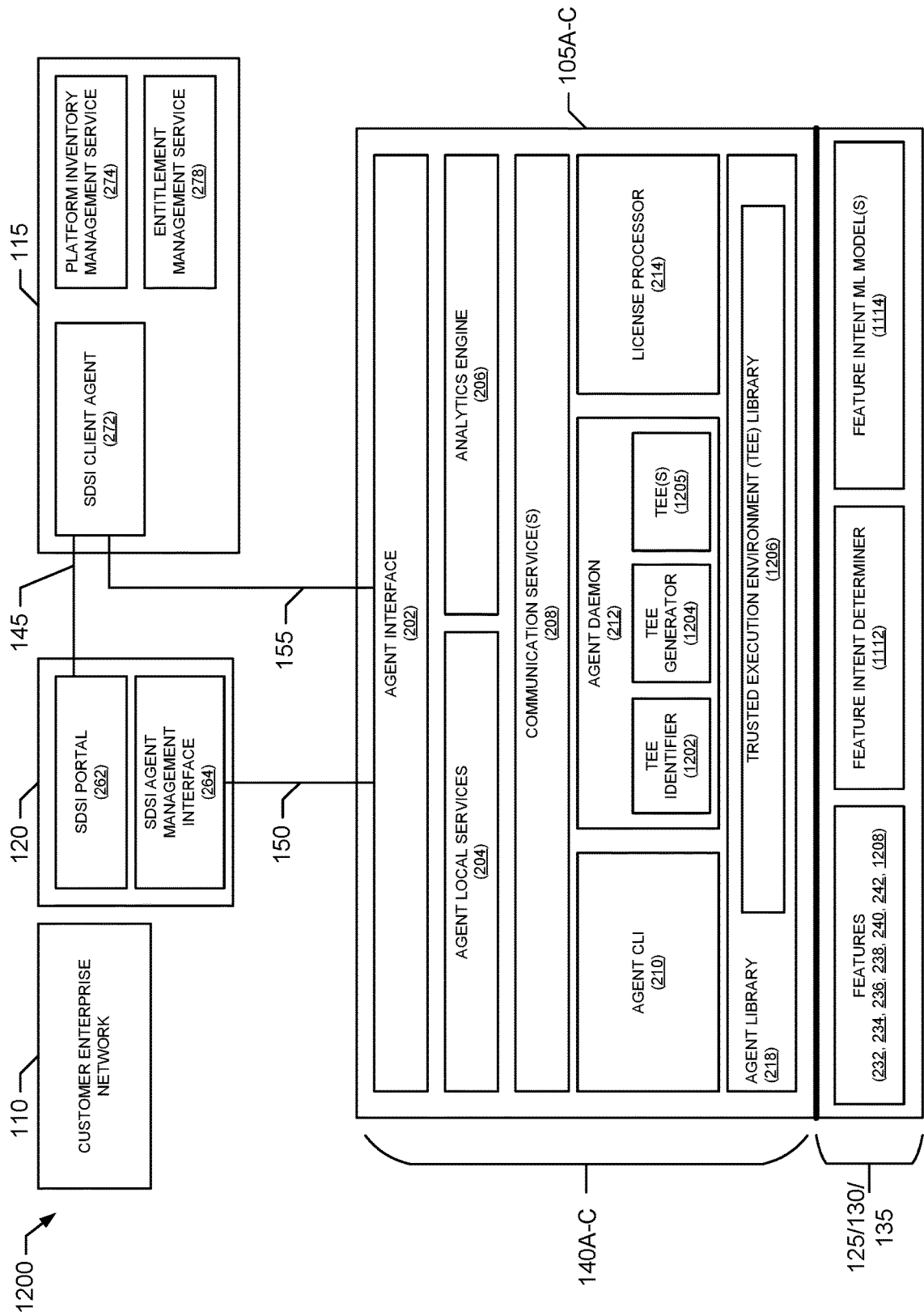
FIG. 12 is a block diagram illustrating example implementations of another example software defined silicon agent, another example manufacturer enterprise system, and another example customer enterprise system included in the example system of FIG. 10.

FIG. 12 depicts a block diagram of an example system 1200 that illustrates example implementations of the SDSi asset agent 140 and/or one(s) of the SDSi asset agents 140A-C, the manufacturer enterprise system 110, and the customer enterprise system 115 included in the example system 100 of FIG. 1, the example system 1000 of FIG. 10, and/or the example system 1100 of FIG. 11. In the illustrated example of FIG. 12, the system 1200 includes the example SDSi portal 262 and the example SDSi agent management interface 264 of FIG. 2. In the example of FIG. 12, the example SDSi portal 262 and the example SDSi agent management interface 264 are implemented as cloud services in the cloud platform 120. In the illustrated example of FIG. 12, the example customer enterprise system 115 of FIG. 2, FIG. 10, and/or FIG. 11 includes the example SDSi client agent 272, the example platform inventory management service 274, and the example entitlement management service 278 of FIG. 2. Additionally or alternatively, the example customer enterprise system 115 of FIG. 12 may include the example accounts management service 276 of the example of FIG. 2.

In the illustrated example of FIG. 12, the system 1200 includes an example implementation of the SDSi asset agent 140 of FIG. 1, and/or more generally, the semiconductor device 105 of FIG. 1, and/or an example implementation of the SDSi asset agents 140A-C of FIG. 10, and/or, more generally, the semiconductor devices 105A-C of FIG. 10. In the illustrated example of FIG. 12, the SDSi asset agents 140A-C include the example agent interface 202, the example agent local services 204, the example analytics engine 206, the example communication service(s) 208, the example agent CLI 210, the example agent daemon 212, the example license processor 214, the example agent library 218, and the example feature libraries 220-230 of FIG. 2 corresponding to the respective example feature sets 232-242 of FIG. 2 implemented by the example hardware circuitry 125, the example firmware 130, and/or the example BIOS 135 of FIG. 2.

In the illustrated example of FIG. 12, the agent daemon 212 includes an example trusted execution environment (TEE) identifier 1202, an example TEE generator 1204, and example TEE(s) 1205. In the illustrated example of FIG. 12, the agent library 218 includes an example TEE library 1206. In the illustrated example of FIG. 12, the hardware circuitry 125, the firmware 130, and/or the BIOS 135 include example TEE component(s) 1208, the feature intent determiner 1112 of FIG. 11, and the feature intent ML model(s) 1114 of FIG. 11.

The example agent daemon 212 securely executes the elements of the SDSi asset agent 140A-C. For example, the agent daemon 212 executes one or more of the agent interface 202, the agent local services 204, the analytics engine 206, the communication services 208, the agent CLI 210, and/or the license processor 214 in a protected environment, such as one(s) of the trusted execution environment(s) (TEE(s)) 1205, implemented by the semiconductor device 105A-C. The SDSi asset agent 140A-C of the illustrated example includes the agent library 218 to provide, among other things, hardware-agnostic application programming interfaces (APIs), such as TEE APIs included in the TEE library 1206.

In some examples, the agent daemon 212 invokes the TEE generator 1204 to generate an execution environment, such as one(s) of the TEE(s) 1205, that allows an application to run in a resource envelope that has the necessary TEE component(s) 1208, such as trusted execution, trusted memory, trusted storage, etc., to protect application specific secrets or other data in compliance with the highest certifications. Prior security technologies must be purpose built to leverage a TEE and must therefore be deployed into an end user environment as a combination of hardware and software that greatly increases the cost and complexity of the overall security solution. Advantageously, the example agent daemon 212 enables an application (e.g., software) to operate at two or more levels of intelligence and allow an application architecture that is not coupled (e.g., tightly coupled, integrated, etc.) to a particular TEE technology from a hardware perspective. In some examples, the agent daemon 212, at a first level of intelligence, can allow an instance of the application to leverage and/or otherwise take advantage of an available TEE identified by the TEE identifier 1202 to which the application has access, either local or remote to the semiconductor device 105A-C. In some examples, the agent daemon 214, at a second level of intelligence, can invoke the TEE generator 1204 to compose, assemble, compile, and/or otherwise generate the TEE(s) 1205 from one or more of the TEE component(s) 1208 to meet desired security requirements. In such examples, the agent daemon 214 invokes the TEE generator 1204 to generate the TEE(s) 1205 in response to a determination that a standard or known TEE is not available or leverage a software-based TEE definable by the TEE library 1206.

In the illustrated example of FIG. 12, the agent daemon 212 includes the TEE identifier 1202 to explore an environment (e.g., an execution environment) of a semiconductor device, such as the semiconductor devices 105A-C, for known TEE(s) based on security requirements. For example, the TEE(s) 1205 include one or more known or conventional TEEs. In some examples, the TEE identifier 1202 obtains a request to deploy a TEE, such as one(s) of the TEE(s) 1205, on the first semiconductor device 105A based on security requirements including a request for trusted execution, trusted memory, trusted storage, trusted key derivation and management, etc. In such examples, the TEE identifier 1202 identifies whether the first semiconductor device 105A supports one or more known TEEs that comply with the security requirements. In some such examples, the TEE identifier

1202 maps the security requirements to the TEE(s) 1205, the TEE library 1206, one or more hardware-based TEEs deployable by one(s) of the features 232, 234, 236, 238, 240, 242, 1208, etc. For example, the TEE identifier 1202 identifies that the first semiconductor device 105A has one or more known TEEs based on mapping the security requirements to the one or more known TEEs that comply with the security requirements.

Advantageously, the example TEE identifier 1202 senses an environment of the SDSi asset agent 140A-C, and/or, more generally, the semiconductor device 105A-C, for a presence of one or more TEEs, such as one(s) of the TEE(s) 1205, and selects from amongst the detected one or more TEEs that is/are best suited to protect the application, data associated with the application, and/or portion(s) thereof. Advantageously, in some examples, the TEE identifier 1202 selects one or more APIs from the TEE library 1206 that correspond to the selected TEE and configures the one or more selected APIs to generate an abstraction layer for the selected TEE. In such examples, the one or more configured APIs enable the application to interface with the selected TEE without concerning itself with the API specifics of the selected TEE.

In some examples, the TEE identifier 1202 implements means for identifying whether a semiconductor device supports a first TEE based on security requirements. In such examples, the semiconductor device includes circuitry configurable to provide one or more features. In this example, the means for identifying is implemented by any processor structured to perform the corresponding operation by executing software or firmware, or hardware circuit (e.g., discrete and/or integrated analog and/or digital circuitry, an FPGA, a PLD, a FPLD, an ASIC, a comparator, an operational-amplifier (op-amp), a logic circuit, etc.) structured to perform the corresponding operation without executing software or firmware, but other structures are likewise appropriate.

In some examples, in response to identifying the one or more known TEEs, the TEE generator 1204 selects one of the one or more known TEEs to deploy. For example, in response to identifying one of the TEE(s) 1205 as a known TEE, the TEE generator 1204 deploys the known TEE to protect application data, cryptographic data, etc., of interest. In such examples, the TEE generator 1204 invokes an application to execute in the deployed TEE to protect the secrets or other data associated with the application. In some examples, in response to not identifying a known TEE that complies with requested security requirements, the TEE generator 1204 generates a TEE based on a software-based TEE definable by the TEE library 1206 and/or the TEE component(s) 1208 either local or remote to the semiconductor device 105A-C.

In the illustrated example of FIG. 12, the agent daemon 212 includes the TEE generator 1204 to explore an environment of the SDSi asset agent 140A-C, and/or, more generally, the semiconductor device 105A-C, for a presence of one or more of the TEE components 1208. In some examples, the TEE generator 1204 determines whether a TEE (e.g., a hardware-based TEE) is composable based on identified one(s) of the TEE component(s) 1208 and/or security requirements included in a TEE deployment request. In some such examples, based on the determination that the TEE is composable, the TEE generator 1204 deploys the TEE, such as one(s) of the TEE(s) 1205 which, in some examples, is/are hardware-based TEE(s), based on at least one of the trusted execution, the trusted memory, or the trusted storage included in the TEE component(s) 1208. In some such examples, based on the determination that the TEE is not composable, the TEE generator 1204 deploys a different type of TEE, such as a software-based TEE included in the TEE library 1206, based on the security requirements.

In some examples, the TEE generator 1204 generates a handler (e.g., a TEE handler). For example, the TEE generator 1204 generates a handler to implement routine(s) (e.g., firmware and/or software routine(s)), function(s) (e.g., software and/or firmware function(s)), method(s) (e.g., firmware and/or software method(s)), etc., and/or a combination thereof, to expose a set of capabilities to the SDSi asset agent 140A-C to effectuate TEE protection for the data, the processes, etc., of an application that the SDSi asset agent 140A-C is tasked to protect. In such examples, in response to deploying a TEE, the TEE generator 1204 returns the handler or an abstracted instance of the deployed TEE that is configured to receive calls from the SDSi asset agent 140A-C to protect the data, the processes, etc., of an application of interest.

In some examples, the TEE generator 1204 implements means for generating a second TEE based on one or more features in response to a determination to generate the second TEE based on an identification whether a semiconductor device supports a first TEE based on security requirements. In some examples, the means for generating generates the second TEE in response to the determination indicating that the first TEE is not supported by the semiconductor device. In some examples, the means for generating determines whether the second TEE is deployable as a hardware TEE based on the one or more features, and deploys the second TEE as the hardware TEE based on the determination. In some examples, the means for generating deploys the second TEE as a software TEE in response to the determination indicating that the second TEE is not deployable as the hardware TEE. In this example, the means for generating is implemented by any processor structured to perform the corresponding operation by executing software or firmware, or hardware circuit (e.g., discrete and/or integrated analog and/or digital circuitry, an FPGA, a PLD, a FPLD, an ASIC, a comparator, an operational-amplifier (op-amp), a logic circuit, etc.) structured to perform the corresponding operation without executing software or firmware, but other structures are likewise appropriate.

In some examples, one or more of the TEE identifier 1202, the TEE generator 1204, the TEE(s), 1205, and/or the TEE library 1206 are deployed to the SDSi asset agent 140A-C. For example, in response to one or more licenses being issued to the first SDSi asset agent 140A, at least one of the TEE identifier 1202, the TEE generator 1204, the TEE(s) 1205, or the TEE library 1206 is/are deployed to the SDSi asset agent 140A-C.

In the illustrated example of FIG. 12, the agent daemon 212 includes the TEE(s) 1205 to securely execute the elements of the SDSi asset agent 140A-C. In some examples, the TEE(s) 1205 include one or more TEEs. For example, the TEE(s) 1205 include one or more known or conventional TEEs obtained from an external computing system, such as the manufacturer enterprise system 110 and/or the customer enterprise system 115. In some examples, the TEE(s) 1205 include one or more different types of TEEs. For example, the TEE(s) 1205 include one or more firmware-based TEEs, one or more software-based TEEs, and/or one or more hardware-based TEEs. For example, the TEE(s) 1205 include one or more firmware and/or software-based TEEs that can be exposed to an element of the SDSi asset agent 140A-C, the manufacturer enterprise system 110, and/or the customer enterprise system 115 via hardware-agnostic application programming interfaces (APIs), such as TEE APIs included in the TEE library 1206. In other examples, the TEE(s) 1205 include one or more hardware-based TEEs generated from one(s) of the features 232, 234, 236, 238, 240, 242, 1208. In such examples, the one or more hardware-based TEEs can be exposed to an element of the SDSi asset agent 140A-C, the manufacturer enterprise system 110, and/or the customer enterprise system 115 via hardware-agnostic application programming interfaces (APIs), such as TEE APIs included in the TEE library 1206. Although the TEE(s) 1205 are depicted as being included in the agent daemon 212, additionally or alternatively, the TEE(s) 1205 may be included in one or more different elements of the SDSi asset agent 140A-C, the hardware circuitry 125, the firmware 130, and/or the BIOS 135 of the semiconductor device 105A-C. For example, one or more of the TEEs 1205 are included in at least one of the agent daemon 212, the hardware circuitry 125, the firmware 130, or the BIOS 135 of the semiconductor device 105A-C.

In the illustrated example of FIG. 12, the agent library 218 includes the TEE library 1206 to store a suite of data and/or machine readable instructions (e.g., API(s), programming code, software handler(s), etc.). In some examples, the data and/or the machine readable instructions are configured to expose an API used to scan an environment (e.g., a compute environment) for the presence of TEEs, the initialization of the TEEs, and/or the use or execution of the TEEs. In some examples, the TEE library 1206 includes one or more known TEEs (e.g., one or more known software or software-based TEEs, one or more known hardware or hardware-based TEEs that can be composed from the TEE component(s) 1208, etc., and/or a combination thereof), one or more TEE APIs (e.g., one or more known TEE APIs that correspond to the one or more known TEEs), etc., and/or a combination thereof.

In the illustrated example of FIG. 12, the features include the TEE component(s) 1208 to be used to assemble, compose, and/or otherwise generate a TEE, such as one(s) of the TEE(s) 1205 (e.g., one or more hardware-based TEEs, one or more firmware-based TEEs, one or more software-based TEEs, etc., and/or a combination thereof). In some examples, the TEE components 308 include one or more hardware TEE components, such as secure or trusted compute resources (e.g., one or more cores of a multi-core CPU), memory, storage, bus(es), peripheral(s), etc. In some examples, the TEE components 308 include one or more firmware and/or BIOS TEE components, such as a secure or trusted bootloader, kernel, filesystem, trusted application, interrupt, etc. For example, the TEE generator 1204 assembles one(s) of the TEE component(s) 1208 and deploys the assembly, compilation, etc., as the TEE(s) 1205 in the agent daemon 212, as the TEE(s) 1205 in the hardware circuitry 125, as the TEE(s) 1205 in the firmware 130, and/or as the TEE(s) 1205 in the BIOS 135 of the semiconductor device 105A-C.

The SDSi asset agent 140A-C of the illustrated example includes the feature intent determiner 1112 and the feature intent ML model(s) 1114 to translate an intent or expected outcome from a request to deploy the TEE(s) 1205. In some examples, in response to a request to improve security of the system 1200, the feature intent determiner 1112 translates the request using a high-level meta-language (e.g., C, C++, Java, C#, Perl, Python, HyperText Markup Language (HTML), Structured Query Language (SQL), Swift, etc.) into one or more security requirements, one or more TEE requirements, etc. In such examples, the feature intent determiner 1112 invokes the TEE identifier 1202 to identify one or more known TEEs supported by the semiconductor device 105A-C, one or more TEE component(s) 1208 of the semiconductor device 105A-C, etc. In some such examples, the feature intent determiner 1112 invokes the one or more feature intent ML models 1114 to output a TEE configuration to meet and/or otherwise satisfy the intent of the request. For example, the one or more feature intent ML models 1114 determine whether one or more known TEEs supported by the semiconductor device 105A-C meet and/or otherwise satisfy the intended outcome of the request to improve security of the system 1200. In other examples, the one or more feature intent ML models 1114 determine whether one or more TEEs are composable based on the TEE library 1206, the TEE component(s) 1208, etc., to meet and/or otherwise satisfy the intended outcome of the request to improve security of the system 1200. Advantageously, the example TEE generator 1204 composes a TEE, such as the TEE(s) 1205, based on the output(s) from the feature intent ML model(s) 1114 to optimize and/or otherwise improve security of the system 1200.

In some examples, the feature intent determiner 1112 implements means for determining a feature intent. For example, the means for determining obtains a request to deploy a TEE, translates an intent of the request to the security requirements, executes a machine learning model to determine the one or more features, and generates the second TEE based on the one or more features. In such examples, the one or more features are a first set of features, and the means for determining determines to adjust the first set of features into a second set of one or more features, and re-trains the machine learning model based on the second set of the one or more features. In this example, the means for determining is implemented by any processor structured to perform the corresponding operation by executing software or firmware, or hardware circuit (e.g., discrete and/or integrated analog and/or digital circuitry, an FPGA, a PLD, a FPLD, an ASIC, a comparator, an operational-amplifier (op-amp), a logic circuit, etc.) structured to perform the corresponding operation without executing software or firmware, but other structures are likewise appropriate.

In some examples, the agent interface 202 implements means for interfacing with an agent. For example, the means for interfacing determines whether the one or more features of the semiconductor device includes a first feature representative of translating the intent, and in response to determining that the one or more features do not include the first feature, activates the first feature. In this example, the means for interfacing is implemented by any processor structured to perform the corresponding operation by executing software or firmware, or hardware circuit (e.g., discrete and/or integrated analog and/or digital circuitry, an FPGA, a PLD, a FPLD, an ASIC, a comparator, an operational-amplifier (op-amp), a logic circuit, etc.) structured to perform the corresponding operation without executing software or firmware, but other structures are likewise appropriate.

While example manners of implementing the systems 100, 200, 1000, 1100, and/or 1200 are illustrated in FIGS. 1-9 and 10-12, one or more of the elements, processes and/or devices illustrated in FIGS. 1-9 and 10-12 may be combined, divided, re-arranged, omitted, eliminated and/or implemented in any other way. Further, the example silicon product 105 (e.g., the example semiconductor device 105), the example manufacturer enterprise system 110, the example customer enterprise system 115, the example cloud platform 120, the example SDSi asset agent 140, the example agent interface 202, the example agent local services 204, the example analytics engine 206, the example communication services 208, the example agent CLI 210, the example agent daemon 212, the example license processor 214, the example agent library 218, the example feature libraries 220-230, the example product management service 252, the example customer management service 254, the example SDSi feature management service 256, the example SDSi portal 262, the example SDSi agent management interface 264, the example manufacturer trusted agent determiner 1102, the example SDSi client agent 272, the example platform inventory management service 274, the example accounts management service 276, the example entitlement management service 278, the example trusted agent determiner 1104, the example certificate validator 1106, the example anomaly detector 1108, the example anomaly detection ML model(s) 1110, the example feature intent determiner 1112, the example feature intent ML model(s) 1114, the example TEE identifier 1202, the example TEE generator 1204, the example TEE(s) 1205, the example TEE library 1206, the example TEE component(s) 1208, and/or, more generally, the systems 100, 200, 1000, 1100, and/or 1200 of FIGS. 1-9 and 10-12 may be implemented by hardware, software, firmware and/or any combination of hardware, software and/or firmware. Thus, for example, any of the example silicon product 105 (e.g., the example semiconductor device 105), the example manufacturer enterprise system 110, the example customer enterprise system 115, the example cloud platform 120, the example SDSi asset agent 140, the example agent interface 202, the example agent local services 204, the example analytics engine 206, the example communication services 208, the example agent CLI 210, the example agent daemon 212, the example license processor 214, the example agent library 218, the example feature libraries 220-230, the example product management service 252, the example customer management service 254, the example SDSi feature management service 256, the example SDSi portal 262, the example SDSi agent management interface 264, the example manufacturer trusted agent determiner 1102, the example SDSi client agent 272, the example platform inventory management service 274, the example accounts management service 276, the example entitlement management service 278, the example trusted agent determiner 1104, the example certificate validator 1106, the example anomaly detector 1108, the example anomaly detection ML model(s) 1110, the example feature intent determiner 1112, the example feature intent ML model(s) 1114, the example TEE identifier 1202, the example TEE generator 1204, the example TEE(s) 1205, the example TEE library 1206, the example TEE component(s) 1208, and/or, more generally, the systems 100, 200, 1000, 1100, and/or 1200 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)), field programmable gate arrays (FPGAs) and/or field programmable logic device(s) (FPLD(s)). When reading any of the apparatus or system claims of this patent to cover a purely software and/or firmware implementation, at least one of the example systems 100, 200, 1000, 1100, 1200, the example silicon product 105 (e.g., the example semiconductor device 105), the example manufacturer enterprise system 110, the example customer enterprise system 115, the example cloud platform 120, the example SDSi asset agent 140, the example agent interface 202, the example agent local services 204, the example analytics engine 206, the example communication services 208, the example agent CLI 210, the example agent daemon 212, the example license processor 214, the example agent library 218, the example feature libraries 220-230, the example product management service 252, the example customer management service 254, the example SDSi feature management service 256, the example SDSi portal 262, the example SDSi agent management interface 264, the example manufacturer trusted agent determiner 1102, the example SDSi client agent 272, the example platform inventory management service 274, the example accounts management service 276, the example entitlement management service 278, the example trusted agent determiner 1104, the example certificate validator 1106, the example anomaly detector 1108, the example anomaly detection ML model(s) 1110, the example feature intent determiner 1112, the example feature intent ML model(s) 1114, the example TEE identifier 1202, the example TEE generator 1204, the example TEE(s) 1205, the example TEE library 1206, and/or the example TEE component(s) 1208 is/are hereby expressly defined to include a non-transitory computer readable storage device or storage disk such as a memory, a digital versatile disk (DVD), a compact disk (CD), a Blu-ray disk, etc. including the software and/or firmware. Further still, the example systems 100, 200, 1000, 1100, and/or 1200 may include one or more elements, processes and/or devices in addition to, or instead of, those illustrated in FIGS. 1-9 and 10-12, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Device Enhancements

Figure 13:
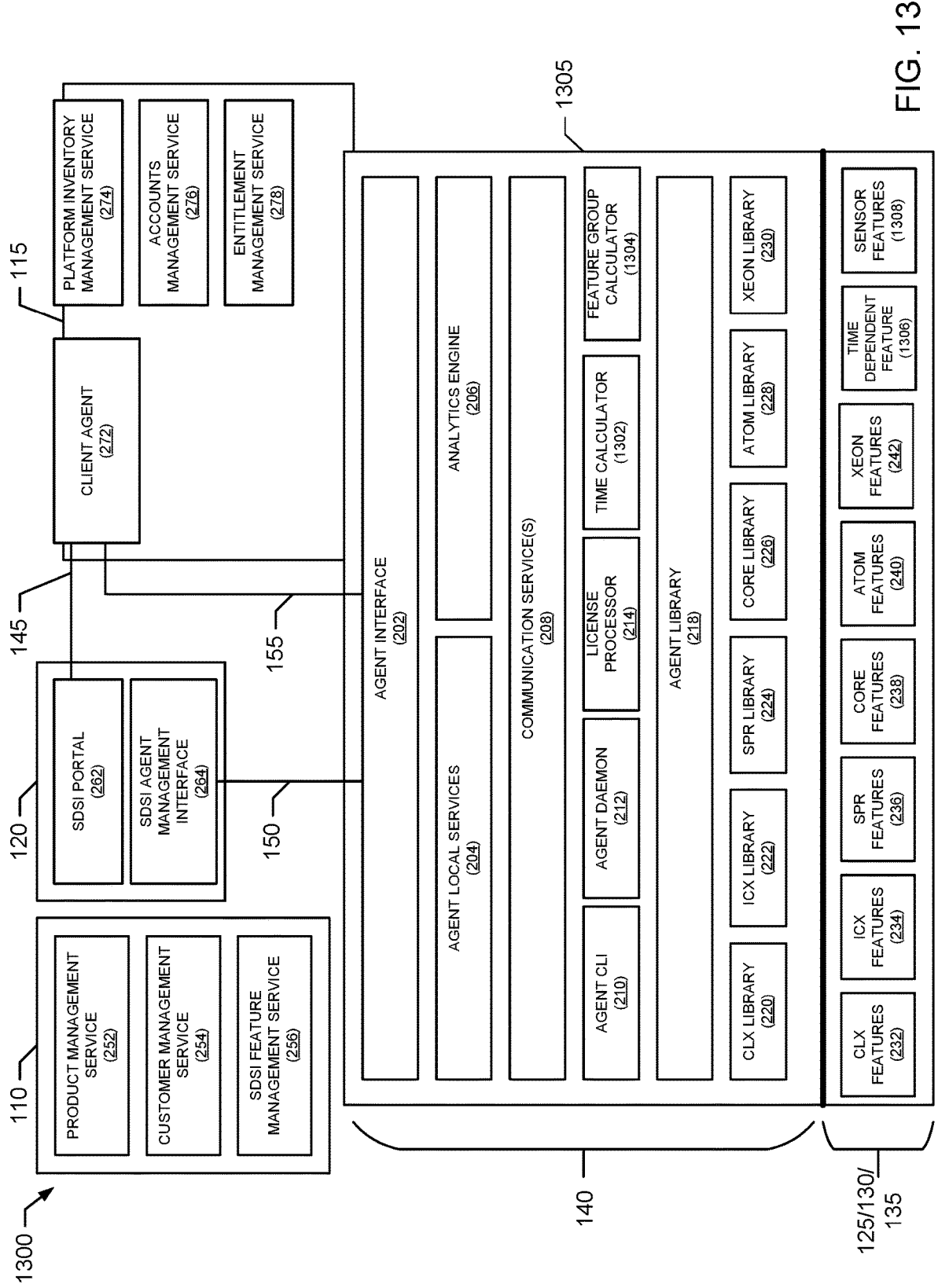
FIG. 13 is a block diagram of another example system to implement and manage software defined silicon products in accordance with the teachings of this disclosure.

A block diagram of another example system 1300 to implement and manage SDSi products in accordance with the teachings of this disclosure is illustrated in FIG. 13. FIG. 13 is a block diagram of another example system 1300 to implement and manage an example software defined silicon product 1305 in accordance with the teachings of this disclosure. The example SDSi system 1300 and the example silicon product 1305 of FIG. 13 includes some of the features and/or elements of the example silicon product 105 of FIG. 1. Particularly, the example SDSi system 1300 includes the example SDSi agent 140, the example agent interface 202, the example agent local services 204, the example analytics engine 206, the example communication services 208, the example agent command line interface (CLI) 210, the example agent daemon 212, the example license processor 214, and the example agent library 218, the example feature libraries 220-230, and the respective example feature sets 232-242. Unless stated otherwise, the features of FIG. 2 included in FIG. 13 have the same function, form and relationships as described in connection with these features above.

The example SDSi system 1300 of FIG. 13 additionally includes an example time calculator 1302 and an example feature group calculator 1304. In the illustrated example of FIG. 13, the example SDSI system 1300 further includes example time-dependent features 1306 and sensor features 1308, which may be implemented by the hardware circuitry 125, firmware 130, and/or BIOS 135 of the silicon product 1305.

The example time calculator 1302 determines the absolute time and/or relative time when queried. In the illustrated example of FIG. 13, the time calculator 1302 determines the absolute time and/or relative time based on the electrical properties of the time-dependent feature 1306. For example, the time calculator 1302 can determine the relative time based on a difference in the electrical properties of the time-dependent feature 1306 at a time of manufacture of the silicon product 1305 and the current electrical properties. The example time calculator 1302 can determine the absolute time based on the determined relative time and the recorded time of manufacture, which can also be stored and/or determined when the silicon product 1305 is manufactured. In such examples, the time calculator 1302 can determine and/or store the electric properties of the time-dependent feature 1306 when the silicon product is manufactured. An example implementation of the time calculator 1302 is described in greater detail below in conjunction with FIG. 14.

The example feature group calculator 1304 determines if configurations associated with the silicon product are permissible (e.g., do not exceed the operational capacity of the silicon product, etc.). For example, the feature group calculator 1304, in response to receiving a new feature combination, can perform a calculation to determine if the configuration associated with this feature combination of the CPU is permissible. In some examples, the feature group calculator 1304 determines the features associated with a license, determines values (e.g., scores, weights, etc.) associated with each of those features and then calculates a group score based on the values. In some examples, the feature group calculator 1304 compares the determined group score to one of more thresholds. For example, the feature group calculator 1304 can compare the calculated group score to a warranty threshold and/or a disable threshold. In some examples, if the feature group calculator 1304 determines the calculate group score exceeds the warranty threshold, the feature group calculator 1304 can void the warranty of the silicon product. In some examples, if the feature group calculator 1304 determines the calculated group score exceeds the disable threshold, the feature group calculator 1304 can prevent the license associated with the new feature combination from being activated. In some examples, the feature group calculator 1304 can include environmental factors (e.g., as detected/determined by the sensor features 1308, etc.) in the group score calculation(s). An example implementation of the feature group calculator 1304 is described below in conjunction with FIG. 15.

The example time-dependent feature 1306 is a mechanical (e.g., physical, etc.) feature embedded, installed and/or otherwise coupled to the silicon product 1305. In the illustrated example of FIG. 13, the time-dependent feature 1306 has one or more electrical propertie(s) (e.g., resistance, capacitance, inductance, etc.) that change over time in a predictable manner. Particularly, the time-dependent feature 1306 has one or more electrical parameters and/or properties that are primarily a function of time. As such, if the electrical property of the time-dependent feature 1306 is checked at a first time (e.g., a time of manufacture, etc.), the time calculator 1302 can determine a relative time difference between the first time and a second time, based on the difference in the measured electric property at the first time and the second time. As such, the time-dependent feature 1306 enables an interested party (e.g., the manufacturer enterprise system 110, the customer enterprise system 105, etc.) to determine absolute and relative time references without relying on the silicon product 1305 being powered.

In some examples, the time-dependent feature 1306 can be implemented by a radioisotope with a relative long half-life (e.g., 57 Cobalt, etc.). In other examples, the time-dependent feature 1306 can be implemented by a physical unclonable function (PUF) with properties that vary over time. In other examples, the time-dependent feature 1306 can be implemented by any other suitable material and/or device.

The example sensor features 1308 are features of the silicon product that detect and/or otherwise determine the environmental conditions of the SDSi system 1300. For example, the sensor features 1308 can include a temperature sensor (e.g., a thermometer, etc.), a radiation sensor, a humidity sensor, moisture sensor, and/or any other suitable sensors that can detect and/or otherwise determine the environmental conditions of the SDSi system 1300. Additionally or alternatively, the sensor features 1308 can include features that enable the silicon product 1305 to interface and/or communicate with the machine that silicon product 1305 is installed. In such examples, the sensor features 1308 enable the time calculator 1302 to receive environmental condition information from sensors associated with the machine.

Figure 14:
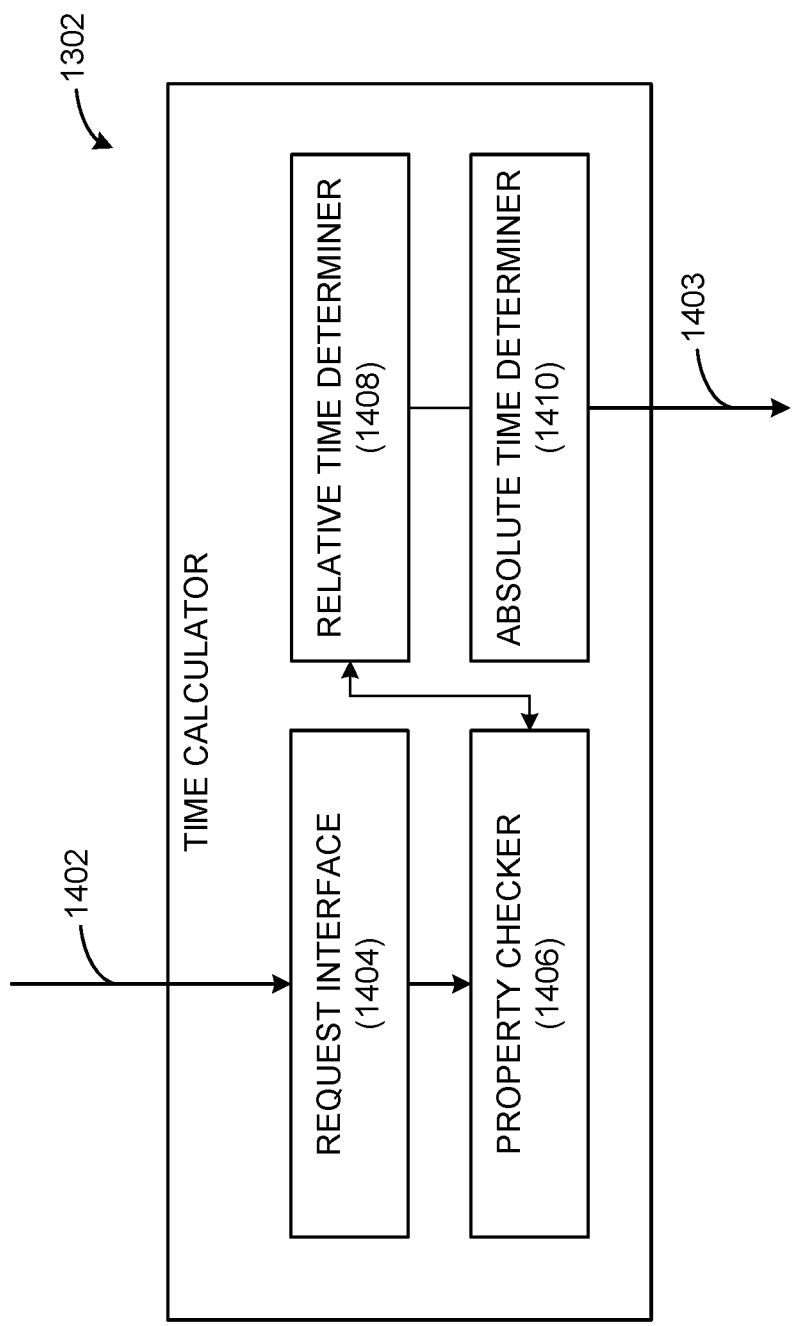
FIG. 14 is a block diagram of the example time calculator of FIG. 13.

FIG. 14 is a block diagram of the example time calculator 1302 of FIG. 13. In the illustrated example of FIG. 13, the time calculator 1302 receives an example request 1402 and outputs an example time output 1403. In the illustrated example of FIG. 14, the example time calculator 1302 includes an example request interface 1404, an example property checker 1406, an example relative time determiner 1408, and an example absolute time determiner 1410. While the example time calculator 1302 is depicted as being part of the example silicon product 1305, some or all of the example time calculator 1302 can be implemented at another location (e.g., at the manufacturer enterprise system 110, at the customer enterprise system 115, etc.).

The example request interface 1404 receives the example request 1402 and determines if it is a request for an absolute time and/or a relative time. In some examples, the request interface 1404 can receive the request 1402. The example request 1402 is a request for the absolute time and/or the relative time. For example, the example request 1402 can include a request for a timestamp corresponding to the current absolute time (e.g., the time/date, etc.) and/or a timestamp corresponding to the relative time (e.g., the time between the request and an event in the past, etc.). The example request 1402 can be generated by the analytics engine 206 when logging SDSi feature activation and/or deactivation. In such examples, the analytic engine 206 can query the time calculator 1302 to generate an odometer reading (e.g., a timestamp, a time reference, etc.). In some examples, the license processor 214 can query the time calculator 1302 to determine if a license has expired and, thusly, the feature associated with the license should be deactivated and/or disabled.

The example property checker 1406 interfaces with the example time-dependent feature 1306 to determine the current electrical properties of the time-dependent feature 1306. For example, the property checker 1406 can determine the electrical property of the time-dependent feature 1306 by causing a current to run through time-dependent feature 1306 so the property checker 1406 can check the electrical property of the time-dependent feature 1306. In other examples, the property checker 1406 can retrieve a log of the electrical properties from a database associated with the silicon product 1305. In such examples, the property checker 1406 can determine the electrical properties based on recent operations of the silicon product 1305.

The example relative time determiner 1408 correlates the determined property with a relative time. For example, the relative time determiner 1408 can determine the relative time between a current request and a previous event based on (i) the time-dependent function of the time-dependent feature 1306, and (ii) a previously determined property of the time-dependent feature 1306 corresponding to when the previous event occurred. In some examples, the relative time determiner 1408 can determine the relative time between the request 1401 and a time of manufacturer of the silicon product 1305. In some examples, the relative time determiner 1408 can determine the relative time between the current event and any previous event in which the electrical property of the time-dependent feature 1306 was determined (e.g., the activation of a feature of the silicon product 1305, etc.).

The example absolute time determiner 1410 determines the absolute time. For example, the absolute time determiner 1410 determines the absolute time based on the relative time determined by the relative time determiner 1408. For example, after determining the relative time between the request and the time of manufacture, the absolute time determiner 1410 can add the relative time to the absolute time at the time of manufacture. In such examples, the absolute time determiner 1410 can retrieve the absolute time at the time of manufacture from storage.

Figure 15:
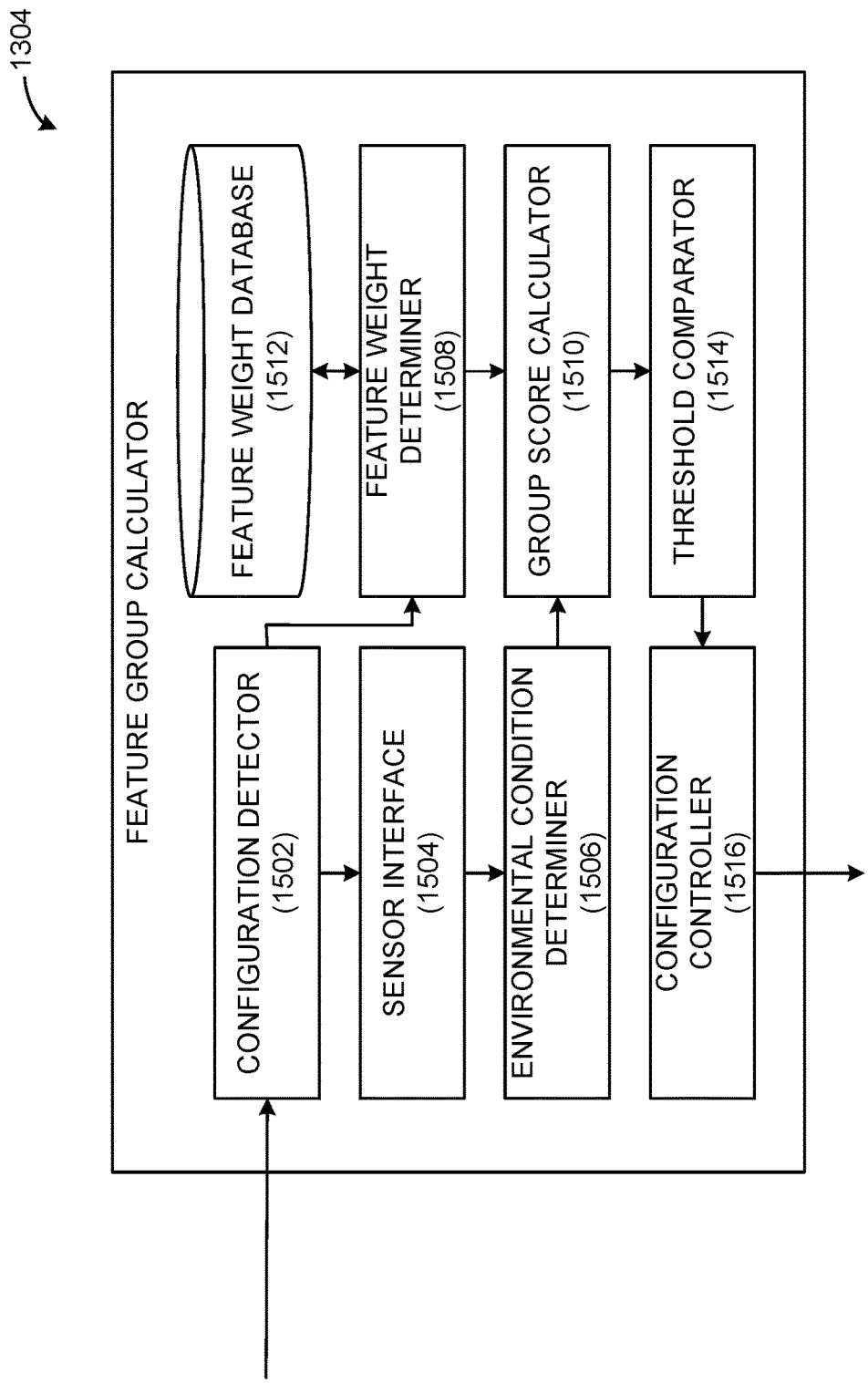
FIG. 15 is a block diagram of the example feature group calculator of FIG. 13.

While an example manner of implementing the time calculator 1302 of FIG. 13 is illustrated in FIG. 15, one or more of the elements, processes and/or devices illustrated in FIG. 4 may be combined, divided, re-arranged, omitted, eliminated and/or implemented in any other way. Further, the example request interface 204, the example property checker 1406, the example relative time determiner 1408, the example absolute time determiner 1410 and/or, more generally, the example time calculator 1302 of FIG. 14 may be implemented by hardware, software, firmware and/or any combination of hardware, software and/or firmware. Thus, for example, any of the example request interface 204, the example property checker 1406, the example relative time determiner 1408, the example absolute time determiner 1410 and/or, more generally, the example time calculator 1302 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example, request interface 204, the example property checker 1406, the example relative time determiner 1408, the example absolute time determiner 1410 is/are hereby expressly defined to include a non-transitory computer readable storage device or storage disk such as a memory, a digital versatile disk (DVD), a compact disk (CD), a Blu-ray disk, etc. including the software and/or firmware. Further still, the example time calculator 1302 of FIG. 13 may include one or more elements, processes and/or devices in addition to, or instead of, those illustrated in FIG. 14, and/or may include more than one of any or all of the illustrated elements, processes and devices.

FIG. 15 is a block diagram of the example feature group calculator 1304 of FIG. 13. The example feature group calculator 1304 includes an example configuration detector 1502, an example sensor interface 1504, an example environmental condition determiner 1506, an example feature weight determiner 1508, an example group score calculator 1510, an feature weight database 1512, an example threshold comparator 1514, and configuration controller 1516.

The example configuration detector 1502 detects when the silicon product 1305 is configured and/or about to be configured into a new configuration. For example, the configuration detector 1502 can monitor the features of the processor to determine if a feature has been activated, deactivated, and/or modified. For example, the configuration detector 1502 can detect if a core of the processor has been activated and/or deactivated and/or the frequency of a core has been changed. In some examples, the configuration detector 1502 can detect if a new license has been received by the silicon product 1305. In such examples, the configuration detector 1502 can detect the received license and determine the feature(s) associated therewith. In some examples, the configuration detector 1502 can receive a request from the license processor 214 to determine if the features associated with a license can be enabled.

The sensor interface 1504, included in or otherwise implemented by the feature group calculator 1304, receives and distributes data detected and/or collected by the sensor features 1308. In some examples, the sensor interface 1504 can distribute collected sensor data to the environmental condition determiner 1506, the group score calculator 1510, and/or the feature weight database 1512. In some examples, the sensor interface 1504 can transform the collected sensor data into a format readable by the other components of the feature group calculator 1304. In some examples, the sensor interface 1504 can receive data associated with the ambient temperature, the humidity, ambient radiation, ambient moisture etc.

The environmental condition determiner 1506 determines the environmental conditions and associated environmental weight factors based on the sensor data received by the sensor interface 1504. For example, the environmental condition determiner 1506 can determine the weight factor associated with each environmental condition. In some examples, the environmental condition determiner 1506 can assign a weight factor to the ambient temperature if the ambient temperature exceeds a boundary condition (e.g., the environmental condition determiner 1506 can determine a weight of 10 if the ambient temperature exceeds 20 degrees Celsius (C), the environmental condition determiner can determine a weight of 30 if the ambient humidity exceeds 80%, etc.). In some examples, the environmental condition determiner 1506 can scale (e.g., linearly, exponentially, etc.) the determined weight as the environmental conditions become worse for processor performance (e.g., the environmental condition determiner 1506 can scale the temperature weight by 5 for each degree above 20 degrees Celsius (C), etc.). In some examples, the environmental condition determiner 1508 can determine a negative weight value if the environmental conditions are favorable (e.g., determining a temperature weight of −5 if the temperature is below 10 degrees Celsius (C), etc.). In some examples, the environmental condition determiner 1506 determines the environmental weight(s) based on previously determined empirical measurements. Additionally or alternatively, the environmental condition determiner 1506 can determine the weight values based on a machine learning model. In some examples, the environmental condition determiner 1506 can determine a total environmental score based on the sum of the determined environmental weights. In some examples, the environmental condition determiner 1506 can determine multiple environmental scores corresponding to each feature group affected by the configuration. In such examples, the determined weights can vary based on the associated feature group.

The feature weight determiner 1508 determines the weight of each feature associated with the detected/received configuration. For example, the feature weight determiner 1508 can interface with the feature weight database 1512 to determine the weight value of each feature associated with the detected/received configuration. For example, the feature weight determiner 1508 can determine a score for each feature associated with the configuration. For example, if the configuration includes 8 cores operating at 4.0 gigahertz (GHz), the feature weight determiner 1508 can determine that each operating core has a weight of 10 and that the operating frequency has a weight of 50. In such examples, the feature weight determiner 1508 can determine the feature score of 130. In such examples, the feature score is associated with the operating conditions (e.g., TDP, etc.) of the processor, without regard for the environmental conditions of the processor.

The group score calculator 1510 determines the group score based on the environmental score, as determined by the environmental condition determiner 1506, and the feature score, as determined by the feature weight determiner 1508. For example, the group score calculator 1510 can determine the group score based on the sum of environmental score and the feature score. In other examples, the group score calculator 1510 can determine the group score based on any other suitable manner (e.g., weighting the feature scores or the environmental score before summing them, multiplying the feature score and the environmental score, etc.). In some examples, the algorithm used by the group score calculator 1510 can be implemented by a machine learning algorithm. In such examples, the machine learning algorithm can be trained by the model trainer 1518. In some examples, if the configuration affects features from multiple groups, the group score calculator 1510 can determine multiple group scores for each group.

The threshold comparator 1514 compares the group score to one or more threshold(s). For example, the threshold comparator 1514 can determine if the group score exceeds a warranty threshold, an enablement threshold, etc. In some examples, the threshold comparator 1514 can have a dynamic threshold (e.g., determined via machine learning, etc.). In some examples, the threshold comparator 1514 can compare the calculated group score depending on the feature group being examined. For example, a first feature-group (e.g., core activation and speed, etc.) and a second feature-group (e.g., memory architecture, speed select, etc.) can have different thresholds associated therewith.

The configuration controller 1516 determines an appropriate action to take based on the output of the threshold comparator 1516. For example, if the group-score exceeds the enablement threshold, the configuration controller 1516 could prevent the configuration from being implemented. In other examples, if the group-score exceeds the warranty threshold but not the enablement threshold, the configuration controller could void the warranty of the processor. In other examples, the configuration controller 1516 can trigger any other suitable action based on the determined group score and/or output of the threshold comparator.

While an example manner of implementing the time calculator 1302 of FIG. 13 is illustrated in FIG. 15, one or more of the elements, processes and/or devices illustrated in FIG. 4 may be combined, divided, re-arranged, omitted, eliminated and/or implemented in any other way. Further, the example configuration detector 1502, sensor interface 1504, environmental condition determiner, feature weight determiner 1508, group score calculator 1510, threshold comparator 1514, configuration controller 1516, and/or, more generally, the example feature group calculator 1304 of FIG. 15 may be implemented by hardware, software, firmware and/or any combination of hardware, software and/or firmware. Thus, for example, any of the configuration detector 1502, sensor interface 1504, environmental condition determiner, feature weight determiner 1508, group score calculator 1510, threshold comparator 1514, configuration controller 1516 and/or, more generally, the example feature group calculator 1304 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example configuration detector 1502, sensor interface 1504, environmental condition determiner, feature weight determiner 1508, group score calculator 1510, threshold comparator 1514, configuration controller 1516 is/are hereby expressly defined to include a non-transitory computer readable storage device or storage disk such as a memory, a digital versatile disk (DVD), a compact disk (CD), a Blu-ray disk, etc. including the software and/or firmware. Further still, the example feature group calculator 1304 of FIG. 13 may include one or more elements, processes and/or devices in addition to, or instead of, those illustrated in FIG. 15, and/or may include more than one of any or all of the illustrated elements, processes and devices.

Flowchart Introduction

Flowcharts representative of example hardware logic, machine readable instructions, hardware implemented state machines, and/or any combination thereof for implementing the example systems 100, 200, 1000, 1100, 1200, the example silicon product 105 (e.g., the example semiconductor device 105), the example manufacturer enterprise system 110, the example customer enterprise system 115, the example cloud platform 120, the example SDSi asset agent 140, the example agent interface 202, the example agent local services 204, the example analytics engine 206, the example communication services 208, the example agent CLI 210, the example agent daemon 212, the example license processor 214, the example agent library 218, the example feature libraries 220-230, the example product management service 252, the example customer management service 254, the example SDSi feature management service 256, the example SDSi portal 262, the example SDSi agent management interface 264, the example manufacturer trusted agent determiner 1102, the example SDSi client agent 272, the example platform inventory management service 274, the example accounts management service 276, the example entitlement management service 278, the example trusted agent determiner 1104, the example certificate validator 1106, the example anomaly detector 1108, the example anomaly detection ML model(s) 1110, the example feature intent determiner 1112, the example feature intent ML model(s) 1114, the example TEE identifier 1202, the example TEE generator 1204, the example TEE(s) 1205, the example TEE library 1206, and/or the example TEE component(s) 1208 are shown in FIGS. 16-18 and 19-25. In these examples, the machine readable instructions may be one or more executable programs or portion(s) of an executable program for execution by a computer processor, such as the processors 2812, 2912, 3012, 3112, and/or 3212 shown in the example processor platforms 2800, 2900, 3000, 3100, 3200 discussed below in connection with FIGS. 28-30 and 31-32. The one or more programs, or portion(s) thereof, may be embodied in software stored on a non-transitory computer readable storage medium such as a CD-ROM, a floppy disk, a hard drive, a DVD, a Blu-ray Disk™, or a memory associated with the processors 2812, 2912, 3012, 3112, and/or 3212, but the entire program or programs and/or parts thereof could alternatively be executed by a device other than the processor 2812, 2912, 3012, 3112, and/or 3212 and/or embodied in firmware or dedicated hardware. Further, although the example program(s) is(are) described with reference to the flowcharts illustrated in FIGS. 16-18 and 19-10, many other methods of implementing the example systems 100, 200, 1000, 1100, and/or 1200, the example silicon product 105 (e.g., the example semiconductor device 105), the example manufacturer enterprise system 110, the example customer enterprise system 115, the example cloud platform 120, the example SDSi asset agent 140, the example agent interface 202, the example agent local services 204, the example analytics engine 206, the example communication services 208, the example agent CLI 210, the example agent daemon 212, the example license processor 214, the example agent library 218, the example feature libraries 220-230, the example product management service 252, the example customer management service 254, the example SDSi feature management service 256, the example SDSi portal 262, the example SDSi agent management interface 264, the example manufacturer trusted agent determiner 1102, the example SDSi client agent 272, the example platform inventory management service 274, the example accounts management service 276, the example entitlement management service 278, the example trusted agent determiner 1104, the example certificate validator 1106, the example anomaly detector 1108, the example anomaly detection ML model(s) 1110, the example feature intent determiner 1112, the example feature intent ML model(s) 1114, the example TEE identifier 1202, the example TEE generator 1204, the example TEE(s) 1205, the example TEE library 1206, and/or the example TEE component(s) 1208 may alternatively be used. For example, with reference to the flowcharts illustrated in FIGS. 16-18 and 19-25, the order of execution of the blocks may be changed, and/or some of the blocks described may be changed, eliminated, combined and/or subdivided into multiple blocks. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

Figure 26:
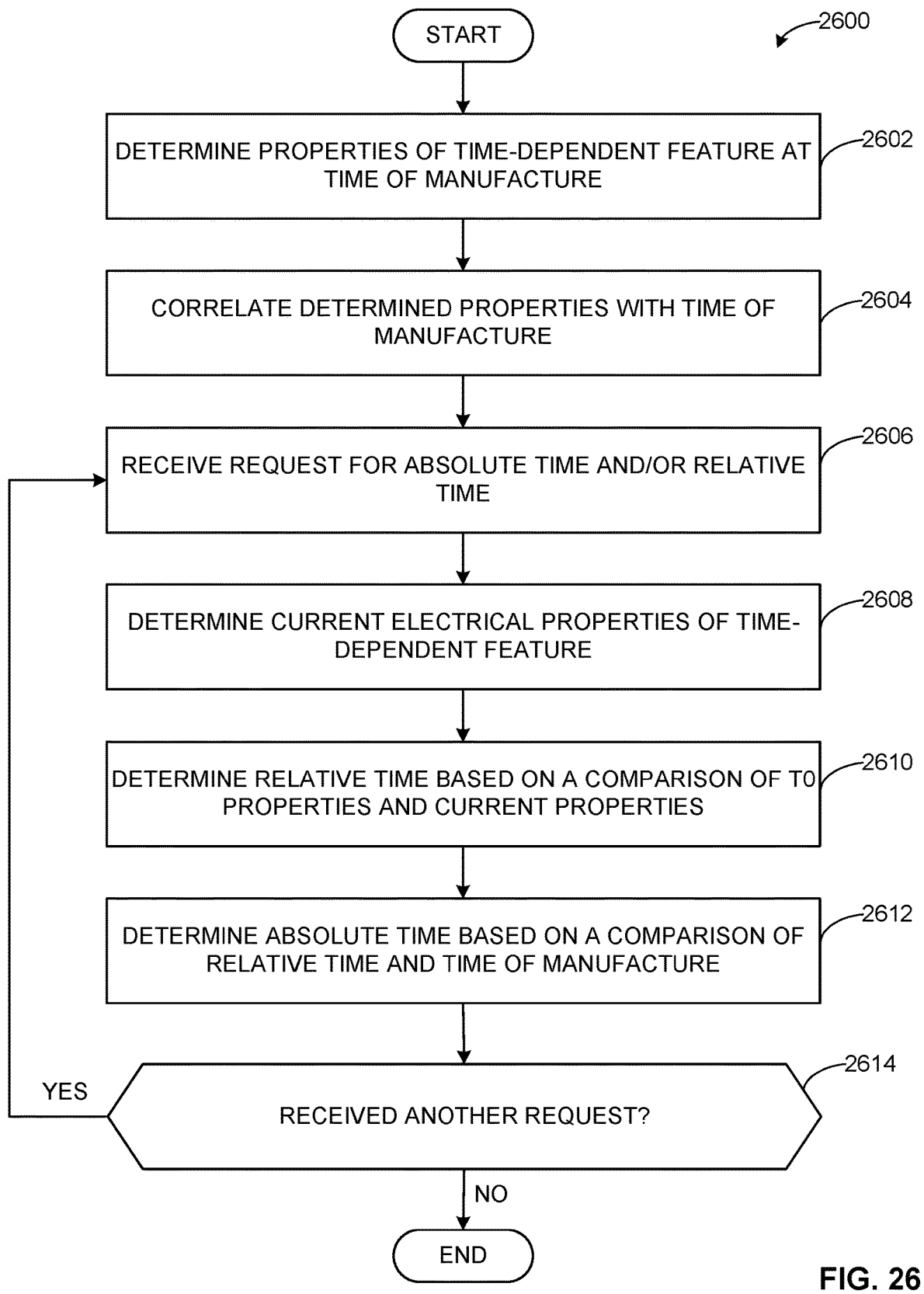
FIG. 26 is a flowchart representative of example computer readable instructions that may be executed to implement the example time calculator of FIG. 14.

A flowchart representative of example hardware logic, machine readable instructions, hardware implemented state machines, and/or any combination thereof for implementing the time calculator 1302 of FIGS. 13 and 14 is shown in FIG. 26. The machine readable instructions may be one or more executable programs or portion(s) of an executable program for execution by a computer processor and/or processor circuitry, such as the processor 3312 shown in the example processor platform 3300 discussed below in connection with FIG. 33. The program may be embodied in software stored on a non-transitory computer readable storage medium such as a CD-ROM, a floppy disk, a hard drive, a DVD, a Blu-ray disk, or a memory associated with the processor 3312, but the entire program and/or parts thereof could alternatively be executed by a device other than the processor 3312 and/or embodied in firmware or dedicated hardware. Further, although the example program is described with reference to the flowchart illustrated in FIG. 26, many other methods of implementing the example time calculator 1302 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more devices (e.g., a multi-core processor in a single machine, multiple processors distributed across a server rack, etc.).

Figure 27:
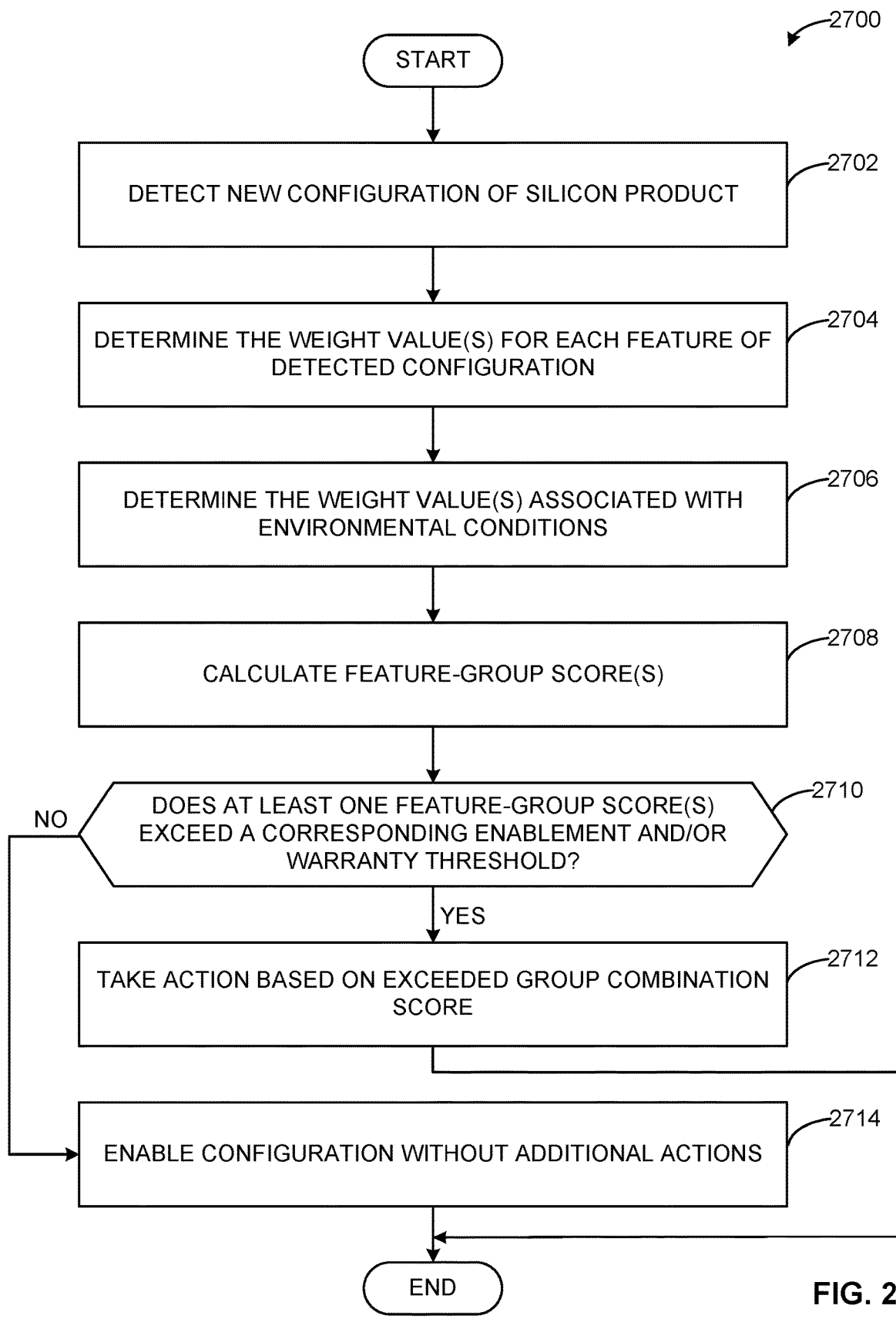
FIG. 27 is a flowchart representative of example computer readable instructions that may be executed to implement the example feature group calculator of FIG. 15.

A flowchart representative of example hardware logic, machine readable instructions, hardware implemented state machines, and/or any combination thereof for implementing the feature group calculator 1304 of FIGS. 13 and 15 is shown in FIG. 27. The machine readable instructions may be one or more executable programs or portion(s) of an executable program for execution by a computer processor and/or processor circuitry, such as the processor 3312 shown in the example processor platform 3300 discussed below in connection with FIG. 33. The program may be embodied in software stored on a non-transitory computer readable storage medium such as a CD-ROM, a floppy disk, a hard drive, a DVD, a Blu-ray disk, or a memory associated with the processor 3312, but the entire program and/or parts thereof could alternatively be executed by a device other than the processor 3312 and/or embodied in firmware or dedicated hardware. Further, although the example program is described with reference to the flowchart illustrated in FIG. 27, many other methods of implementing the example feature group calculator 1304 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more devices (e.g., a multi-core processor in a single machine, multiple processors distributed across a server rack, etc.).

The machine readable instructions described herein may be stored in one or more of a compressed format, an encrypted format, a fragmented format, a compiled format, an executable format, a packaged format, etc. Machine readable instructions as described herein may be stored as data (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers). The machine readable instructions may require one or more of installation, modification, adaptation, updating, combining, supplementing, configuring, decryption, decompression, unpacking, distribution, reassignment, compilation, etc. in order to make them directly readable, interpretable, and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement a program such as that described herein.

In another example, the machine readable instructions may be stored in a state in which they may be read by a computer, but require addition of a library (e.g., a dynamic link library (DLL)), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, the disclosed machine readable instructions and/or corresponding program(s) are intended to encompass such machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example processes of FIGS. 16-18, 19-25 and/or 26 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. Also, as used herein, the terms "computer readable" and "machine readable" are considered equivalent unless indicated otherwise.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

Software Defined Silicon Architecture

Figure 16:
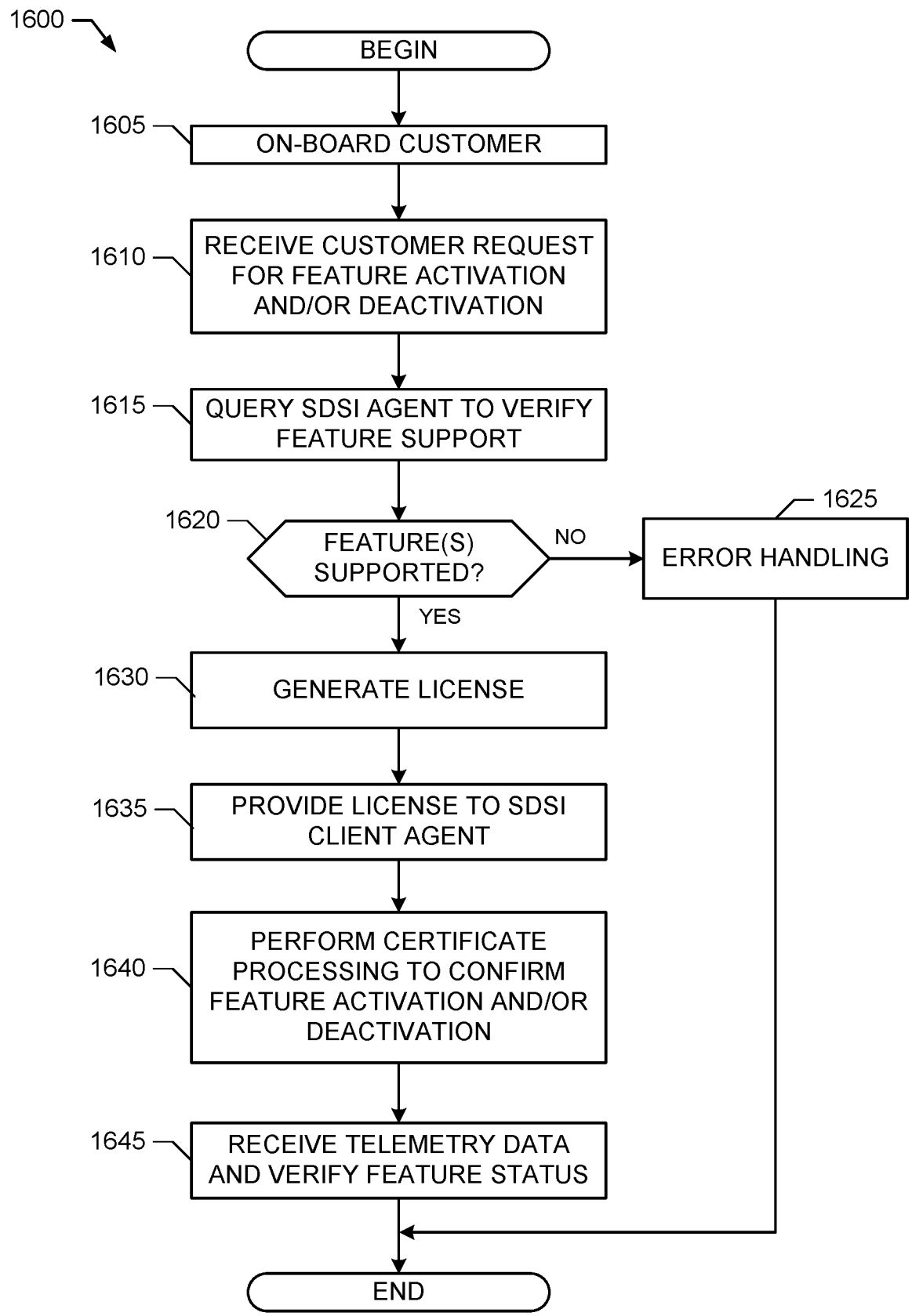
FIG. 16 is a flowchart representative of example computer readable instructions that may be executed to implement the example manufacturer enterprise system of FIGS. 1 and/or 2.

An example program 1600 that may be executed to implement the example manufacturer enterprise system 110 of the example systems 100 and/or 200 of FIGS. 1-2 is illustrated in FIG. 16. The example program 1600 may be executed at predetermined intervals, based on an occurrence of a predetermined event, etc., or any combination thereof. With reference to the preceding figures and associated written descriptions, the example program 1600 of FIG. 16 begins execution at block 1605 at which the customer management service 254 of the manufacturer enterprise system 110 on-boards a customer for access to SDSi capabilities offered by the manufacturer of the SDSi product 105, as described above. For example, the customer management service 254 can exchange information with the customer enterprise system 115 of the customer to on-board the customer prior to or after the customer's purchase of the SDSi product 105.

At block 1610, the SDSi portal 262 of the manufacturer enterprise system 110 receives a request to activate (or deactivate) an SDSi feature of the SDSi product 105, as described above. In the illustrated example, the request is forwarded to the SDSi feature management service 256, which identifies the SDSi product 105 associated with the request and determines whether the request is valid. Assuming the request is valid, at block 1615, the SDSi feature management service 256 initiates a query to determine whether the SDSi feature to be activated (or deactivated) is supported by the SDSi product 105. In some examples, the SDSi feature management service 256 invokes the SDSi agent management interface 264 of the manufacturer enterprise system 110 to send the query directly to the SDSi product 105, as described above, thereby directly querying the SDSi product 105. In some examples, the SDSi feature management service 256 sends the query to the SDSi client agent 272 of the client enterprise system 115, which then sends the query to the SDSi product 105, as described above, thereby indirectly querying the SDSi product 105. In some examples, the SDSi agent management interface 264 queries one or more database and/or other data structure(s) maintained by the manufacturer enterprise system 110 to determine whether the SDSi product 105 supports the SDSi feature to be activated (or deactivated), as described above.

If the requested SDSi feature is not supported by the SDSi product 105 (block 1620), at block 1625 the manufacturer enterprise system 110 performs error handling and denies the request, such as by sending an appropriate communication via the SDSi portal 262 to the customer enterprise system 115. However, if the requested SDSi feature is supported by the SDSi product 105 (block 1620), at block 1630 the SDSi feature management service 256 of the manufacturer enterprise system 110 generates a license to activate (or deactivate) the SDSi feature in response to the customer's request, as described above. At block 1635, the SDSi feature management service 256 causes the license to be sent via the SDSi portal 262 to the SDSi client agent 272 of the customer enterprise system 115, as described above.

Sometime later, at block 1640, the manufacturer enterprise system 110 receives, as described above, a certificate reported by the SDSi product 105 to confirm activation (or deactivation) of the requested SDSi feature, which is processed by the SDSi feature management service 256. In some examples, the certificate is received directly from the SDSi product 105 by the SDSi agent management interface 264 of the manufacturer enterprise system 110. In some examples, the certificate is received indirectly, such as from the SDSi client agent 272 of the client enterprise system 115, which received the certificate form the SDSi product 105. At block 1640, the SDSi feature management service 256 of the manufacturer enterprise system 110 processes the received certificate, as described above, to confirm successful activation (or deactivation) of the requested SDSi feature, and invokes the customer management service 254 to reconcile billing, generate an invoice, etc., which contacts the customer enterprise system 115 accordingly. Thereafter, at block 1645, the SDSi feature management service 256 of the manufacturer enterprise system 110 receives telemetry data reported by the SDSi product 105 (e.g., in one or more certificates), as described above, which is processed at the manufacturer enterprise system 110 to confirm proper operation of the SDSi product 105, reconcile billing, generate further invoice(s), etc.

Figure 17:
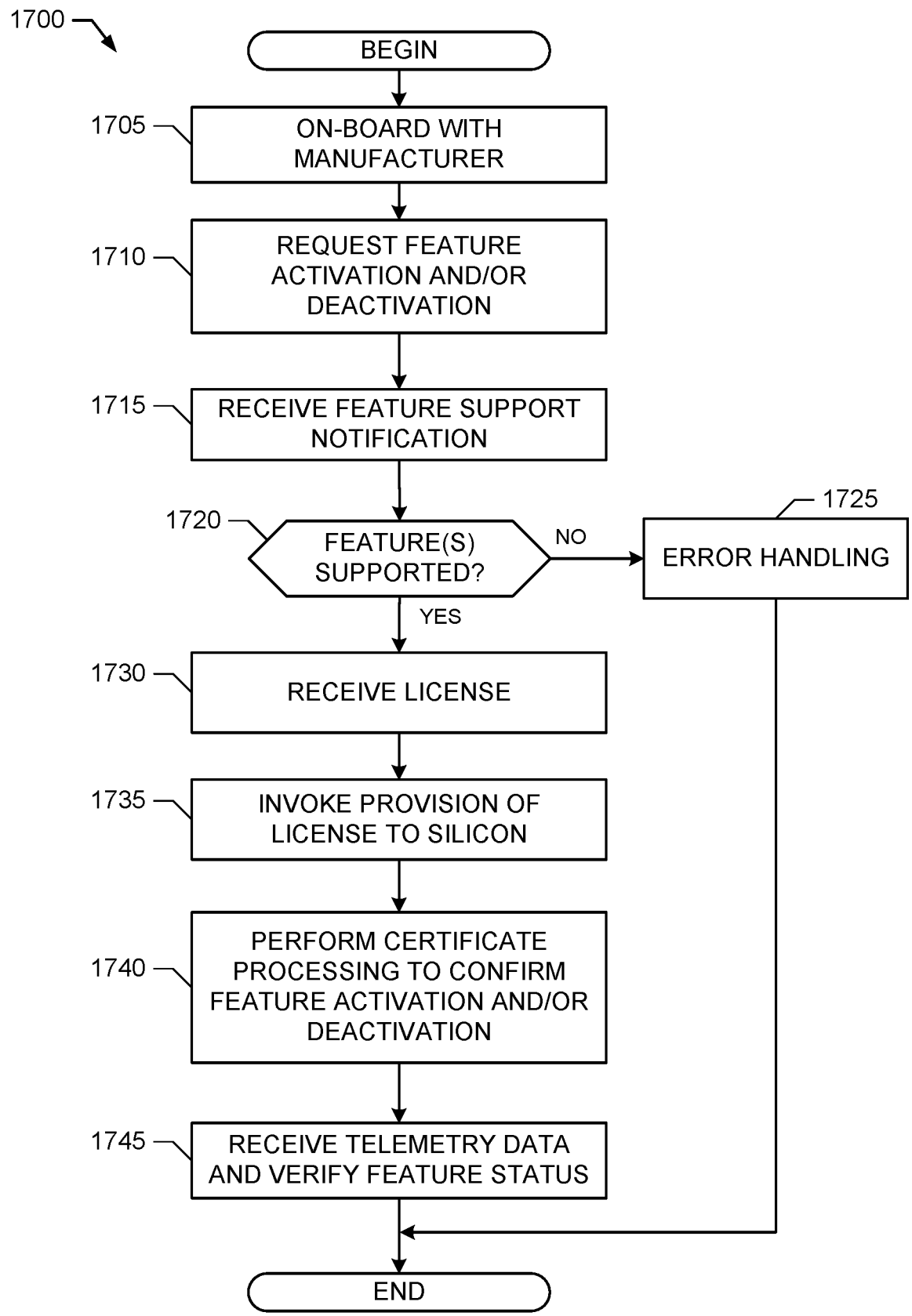
FIG. 17 is a flowchart representative of example computer readable instructions that may be executed to implement the example customer enterprise system of FIGS. 1 and/or 2.

An example program 1700 that may be executed to implement the example customer enterprise system 115 of the example systems 100 and/or 200 of FIGS. 1-2 is illustrated in FIG. 17. The example program 1700 may be executed at predetermined intervals, based on an occurrence of a predetermined event, etc., or any combination thereof. With reference to the preceding figures and associated written descriptions, the example program 1700 of FIG. 17 begins execution at block 1705 at which the accounts management service 276 of the customer enterprise system 115 on-boards its customer for access to SDSi capabilities offered by a manufacturer of the SDSi product 105, as described above. For example, the accounts management service 276 can exchange information with the manufacturer enterprise system 110 to on-board with the manufacturer prior to or after the customer's purchase of the SDSi product 105.

At block 1710, the SDSi client agent 272 of the client enterprise system 115 sends a request to activate (or deactivate) an SDSi feature of the SDSi product 105, as described above. In the illustrated example, the request is generated by the platform inventory management service 274 or the SDSi client agent 272 of the client enterprise system 115, and is sent by the SDSi client agent 272 to the SDSi portal 262 of the manufacturer enterprise system 110. At block 1715, the SDSi client agent 272 receives a notification from the SDSi portal 262 that indicates whether the requested SDSi feature to be activated (or deactivated) is supported by the SDSi product 105. If the requested SDSi feature is not supported by the SDSi product 105 (block 1720), at block 1725 the customer enterprise system 115 performs error handling and, for example, updates the platform inventory management service 274 to note that the requested SDSi feature is not supported by the SDSi product 105. However, if the requested SDSi feature is supported by the SDSi product 105 (block 1720), at block 1730 the SDSi client agent 272 receives, from the SDSi portal 262, a license to activate (or deactivate) the SDSi feature in response to the customer's request, as described above. In the illustrated example, the license is maintained by the entitlement management service 278 of the customer enterprise system 115 until the customer is ready to invoke the license, as described above.

Sometime later, at block 1735, the entitlement management service 278 determines (e.g., based on customer input) that the license received at block 1730 to activate (or deactivate) the SDSi feature is to be invoked. Thus, the entitlement management service 278 provides the license to the SDSi client agent 272, which sends (e.g., downloads) the license to the SDSi product 105, as described above. Sometime later, at block 1740, the customer enterprise system 115 receives, as described above, a certificate reported by the SDSi product 105 to confirm activation (or deactivation) of the requested SDSi feature. In the illustrated example, the certificate is received directly from the SDSi product 105 by the SDSi client agent 272 of the customer enterprise system 115. At block 1740, the entitlement management service 278 of the customer enterprise system 115 processes the received certificate, as described above, to confirm successful activation (or deactivation) of the requested SDSi feature, and invokes the accounts management service 276 to reconcile billing, authorize payment, etc., which contacts the manufacturer enterprise system 110 accordingly. Thereafter, at block 1745, the SDSi client agent 272 of the customer enterprise system 115 receives feature status data reported by the SDSi product 105 (e.g., in one or more certificates), as described above, which is processed at the entitlement management service 278 and accounts management service 276 to confirm proper operation of the SDSi product 105, reconcile billing, authorize further payment(s), etc.

Figure 18:
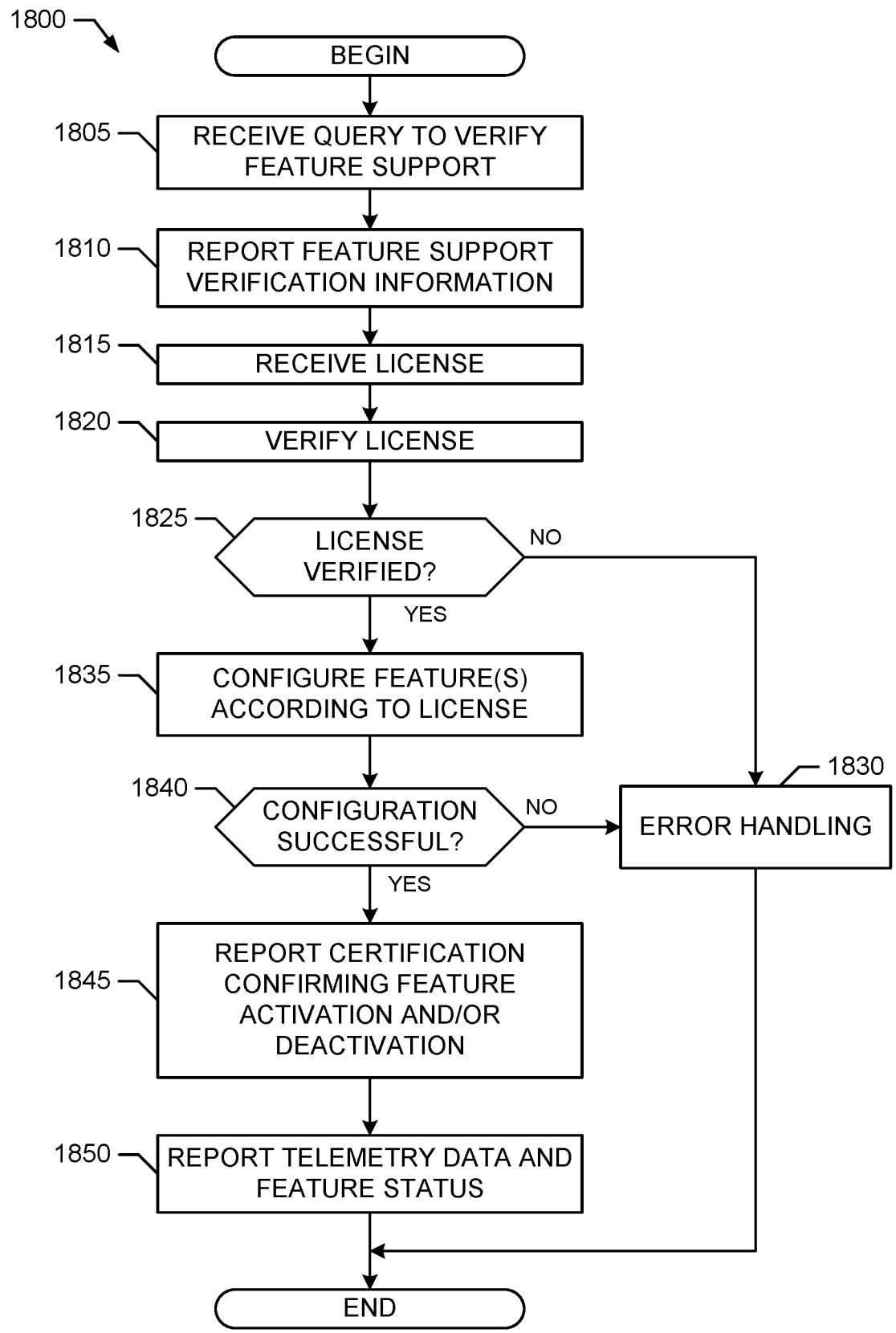
FIG. 18 is a flowchart representative of example computer readable instructions that may be executed to implement the example software defined silicon agent of FIGS. 1 and/or 2.

An example program 1800 that may be executed to implement the example SDSi asset agent 140 of the example systems 100 and/or 200 of FIGS. 1-2 is illustrated in FIG. 18. The example program 1800 may be executed at predetermined intervals, based on an occurrence of a predetermined event, etc., or any combination thereof. With reference to the preceding figures and associated written descriptions, the example program 1800 of FIG. 18 begins execution at block 1805 at which the SDSi asset agent 140 receives a query to confirm whether a particular SDSi feature is supported by the SDSi product 105. For example, the query may be from the SDSi agent management interface 264 of the manufacturer enterprise system 110, the SDSi client agent 272 of the customer enterprise system 115, etc. At block 1810, the SDSi asset agent 140 invokes its license processor 214 to generate a response to the query, as describes above. For example, the license processor 214 analyzes the configuration of the hardware circuitry 125, the firmware 130 and/or the BIOS 135 of the SDSi product 105, and generates feature support verification information indicating whether the queried feature is supported by the SDSi product 105, which is reported by the SDSi asset agent 140 back to the source of the query.

At block 1815, the SDSi asset agent 140 receives a license from the SDSi client agent 272 of the customer enterprise system 115 to activate (or deactivate) an SDSi feature of the SDSi product 105, as described above. At block 1820, the license processor 214 of the SDSi asset agent 140 verifies the license. For example, the license processor 214 may determine the license is verified when the license correctly identifies the SDSi product 105 and/or the feature to be activated (or deactivated), when the license is authentic (e.g., based on a manufacturer signature included with the license, a license sequence number included in the license, etc.), when activation (or deactivation) of the requested SDSi feature will not result in an unsupported or otherwise invalid configuration of the SDSi product 105, etc., or any combination thereof. In some examples, the license processor 214 determines the license is verified if some or all such verification criteria are satisfied, and determines the license is unverified if one or more of such verification criteria are not satisfied.

If the license is determined to be unverified (block 1825), at block 1830 the SDSi asset agent 140 performs error handling to, for example, discard the license and report a certificate to the SDSi client agent 272 that indicates the license could not be invoked. However, if the license is determined to be valid (block 1825), at block 1835 the license processor 214 configures the SDSi product 105 to activate (or deactivate) the SDSi feature in accordance with the license, as described above. If configuration is not successful (block 1840), at block 1830 the SDSi asset agent 140 performs error handling to, for example, discard the license and report a certificate to the SDSi client agent 272 that indicates the configuration of the SDSi product 105 to activate (or deactivate) the requested SDSi feature was unsuccessful.

However, if configuration is successful (block 1840), at block 1845 the license processor 214, in combination with the analytics engine 205, generates a certificate to confirm the successful activation (or deactivation) of the requested SDSi feature, which is reported by the SDSi asset agent 140 to the SDSi client agent 272, as described above. Sometime later (e.g., in response to a request, based on an event, etc.), at block 1850, the SDSi asset agent 140 reports telemetry data and feature status data (e.g., in one or more certificates) to the SDSi client agent 272 of the customer enterprise system 115 and/or to the SDSi agent management interface 264 of the manufacturer enterprise system 110, as described above.

Software Defined Silicon Security

Figure 19:
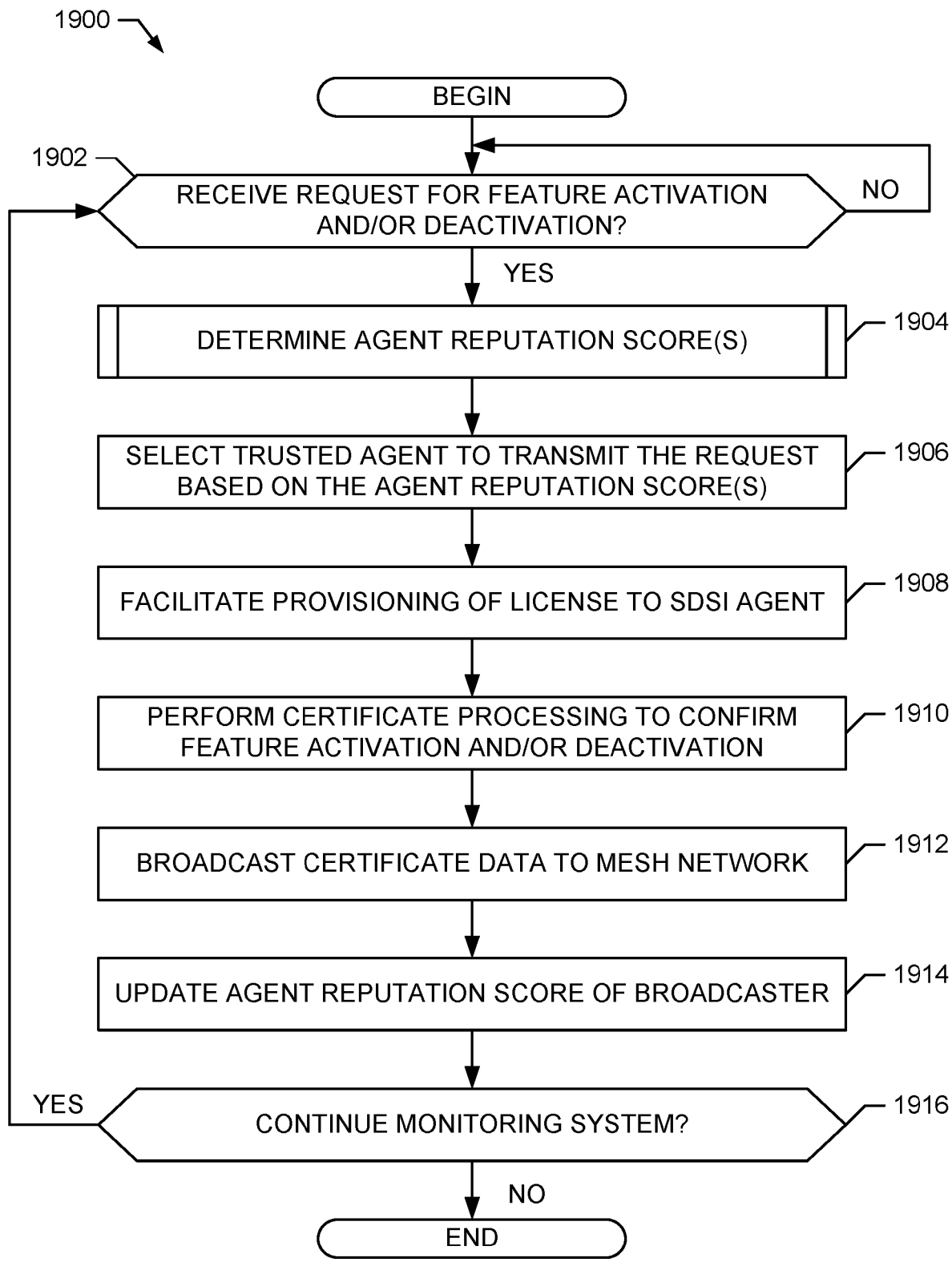
FIG. 19 is a flowchart representative of example computer readable instructions that may be executed to implement the example software defined silicon agent of FIGS. 10 and/or 11.

An example program 1900 that may be executed to implement the example SDSi asset agent 140 of the example systems 100 and/or 200 of FIGS. 1-2 and/or the example SDSi asset agents 140A-C of the example systems 1000, 1100, and/or 1200 of FIGS. 10-12 is illustrated in FIG. 19. The example program 1900 may be executed at predetermined intervals, based on an occurrence of a predetermined event, etc., or any combination thereof. With reference to the preceding figures and associated written descriptions, the example program 1900 of FIG. 19 begins execution at block 1902 at which the SDSi asset agent 140 and/or SDSi asset agent 140A-C determine whether a request for a feature activation and/or deactivation has been received. For example, the license processor 214 (FIG. 2) determines that a request to activate one of the features 232, 234, 236, 238, 240, 242 has been received.

At block 1904, the SDSi asset agent 140 and/or SDSi asset agent 140A-C determine agent reputation score(s). For example, the trusted agent determiner 1104 (FIG. 11) executes an attestation process of one(s) of the SDSi agents 140A-C of the mesh network 1002 of FIG. 10. An example process that may be executed to implement block 1904 is described below in connection with FIG. 20.

At block 1906, the SDSi asset agent 140 and/or SDSi asset agent 140A-C select a trusted agent to transmit the request based on the agent reputation score(s). For example, the trusted agent determiner 1104 selects the first SDSi asset agent 140A as a sender (e.g., a trusted sender) and/or an issuer (e.g., a trusted issuer) to transmit the request to the manufacturer enterprise system 110 based on the first SDSi asset agent 140A having the highest agent reputation score of the SDSi asset agents 140A-C.

At block 1908, the SDSi asset agent 140 and/or SDSi asset agent 140A-C facilitate provisioning of a license to an SDSi agent. For example, the license processor 214 to process a license issued by the manufacturer enterprise system 110 to configure (e.g., activate) an SDSi feature included in the feature sets 232-242 implemented by the hardware circuitry 125, firmware 130, and/or BIOS 135 of the SDSi semiconductor device 105.

At block 1910, the SDSi asset agent 140 and/or SDSi asset agent 140A-C perform certificate processing to confirm feature activation and/or deactivation. For example, the certificate validator 1106 (FIG. 11) generates a certificate to confirm the successful activation of the SDSi feature.

At block 1912, the SDSi asset agent 140 and/or SDSi asset agent 140A-C broadcast certificate data to the mesh network 1002. For example, the certificate validator 1106 of the first SDSi asset agent 140A broadcasts certificate data including the issued certificate, a current asset status, a value of the activated feature, etc., to the second SDSi asset agent 140B and the third SDSi asset agent 140C of the mesh network 1002.

At block 1914, the SDSi asset agent 140 and/or SDSi asset agent 140A-C update an agent reputation score of the broadcaster. For example, the trusted agent determiner 1104 of the second SDSi asset agent 140B and the trusted agent determiner 1106 of the third SDSi asset agent 140C update an agent reputation score of the first SDSi asset agent 140A included in a list of respective ones of the second SDSi asset agent 140B and the third SDSi asset agent 140C. In such examples, the trusted agent determiner 1104 of the second SDSi asset agent 140B and the trusted agent determiner 1106 of the third SDSi asset agent 140C update the agent reputation score of the first SDSi asset agent 140A by increasing the agent reputation score because the successful activation of the license from the manufacturer enterprise system 110 indicates an increased level of trustworthiness of the first SDSi asset agent 140A.

At block 1916, the SDSi asset agent 140 and/or SDSi asset agent 140A-C determine whether to continue monitoring the system. For example, the license processor 214 determines to continue monitoring the system 1000 and/or 1100 for another request to activate and/or deactivate a feature of one of the semiconductor devices 105A-C has been received.

If, at block 1916, the SDSi asset agent 140 and/or SDSi asset agent 140A-C determine to continue monitoring the system, control returns to block 1902 to determine whether another request for feature activation and/or deactivation has been received. If, at block 1916, the SDSi asset agent 140 and/or SDSi asset agent 140A-C determine not to continue monitoring the system, the example program 1900 of the example of FIG. 19 concludes.

Figure 20:
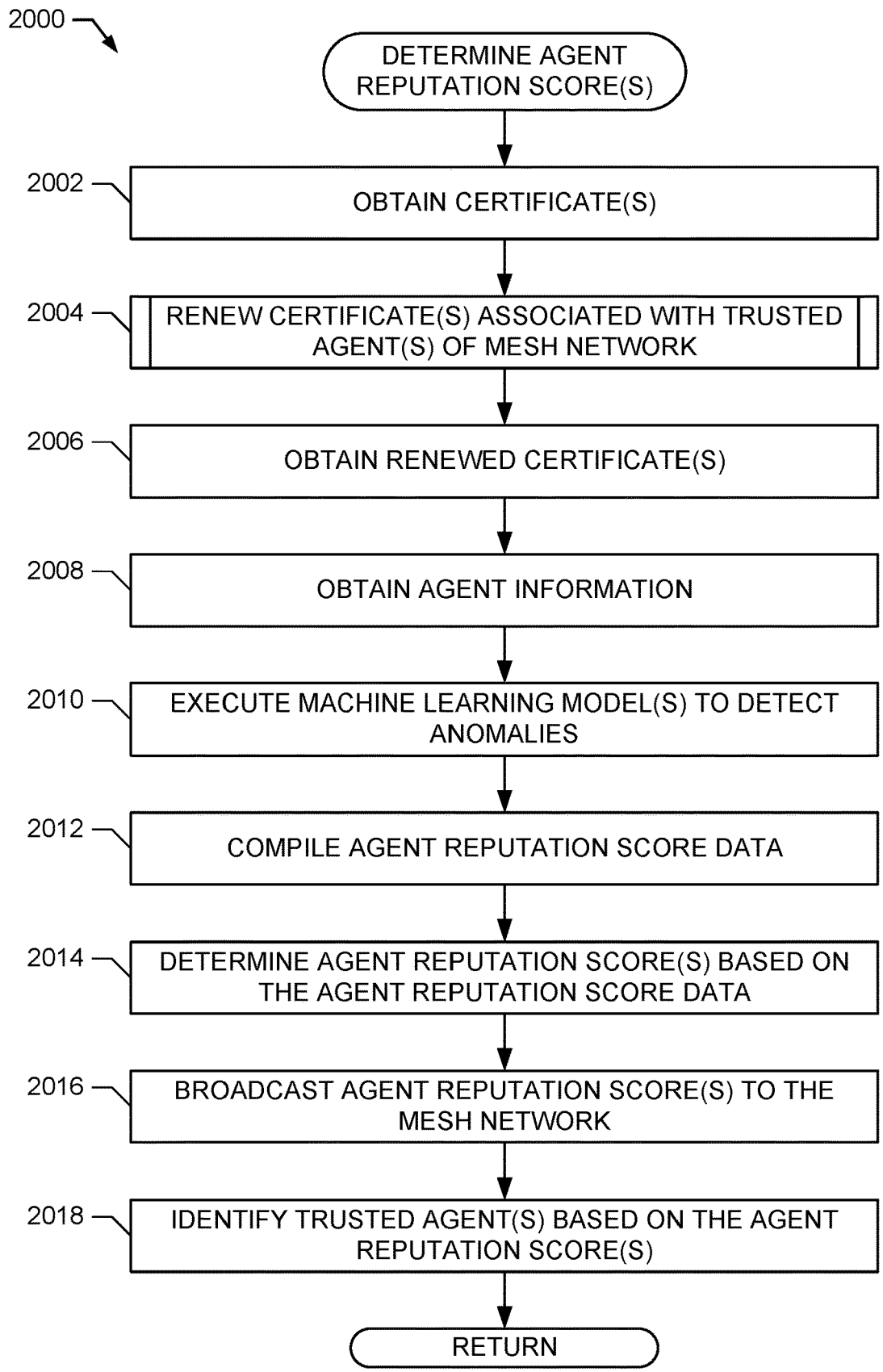
FIG. 20 is a flowchart representative of example computer readable instructions that may be executed to implement the example software defined silicon agent of FIGS. 10 and/or 11.

An example program 2000 that may be executed to implement the example SDSi asset agent 140 of the example systems 100 and/or 200 of FIGS. 1-2 and/or the example SDSi asset agents 140A-C of the example systems 1000, 1100, and/or 1200 of FIGS. 10-12 is illustrated in FIG. 20. The example program 2000 may be executed at predetermined intervals, based on an occurrence of a predetermined event, etc., or any combination thereof. The example program 2000 of FIG. 20 may be executed to implement block 1904 of the example of FIG. 19 to determine agent reputation score(s). With reference to the preceding figures and associated written descriptions, the example program 2000 of FIG. 20 begins execution at block 2002 at which the SDSi asset agent 140 and/or SDSi asset agent 140A-C obtains certificate(s). For example, the trusted agent determiner 1104 (FIG. 11) of the first SDSi asset agent 140A obtain one or more certificates from an SDSi agent, such as the second SDSi asset agent 140B of FIG. 10.

At block 2004, the SDSi asset agent 140 and/or SDSi asset agent 140A-C renew certificate(s) associated with trusted agent(s) of a mesh network. For example, the certificate validator 1106 (FIG. 11) of the first SDSi asset agent 140A deactivates one or more activated features of the second SDSi asset agent 140B to cause the second SDSi asset agent 140B to renew certificate(s) associated with the one or more deactivated features. An example process that may be executed to implement block 2004 is described below in connection with FIG. 21.

At block 2006, the SDSi asset agent 140 and/or SDSi asset agent 140A-C obtain renewed certificate(s). For example, the trusted agent determiner 1104 of the first SDSi asset agent 140A obtains zero, one, or more renewed certificates from the second SDSi asset agent 140B.

At block 2008, the SDSi asset agent 140 and/or SDSi asset agent 140A-C obtain agent information. For example, the trusted agent determiner 1104 of the first SDSi asset agent 140A obtains agent information, such as an identifier of the second semiconductor device 105B, telemetry data reported by the second SDSi asset agent 140B, etc., from the second SDSi asset agent 140B.

At block 2010, the SDSi asset agent 140 and/or SDSi asset agent 140A-C execute machine learning model(s) to detect anomalies. For example, the anomaly detector 1108 (FIG. 11) executes the anomaly detection model(s) 1110 to determine whether an anomaly is detected in connection with the certificate(s), the renewed certificate(s), the agent information, etc., associated with the second SDSi asset agent 140B.

At block 2012, the SDSi asset agent 140 and/or SDSi asset agent 140A-C compiles agent reputation score data. For example, the trusted agent determiner 1104 of the first SDSi asset agent 140A compiles agent reputation score data including the certificate(s), the renewed certificate(s), the agent information, etc., associated with the second SDSi asset agent 140B.

At block 2014, the SDSi asset agent 140 and/or SDSi asset agent 140A-C determine agent reputation score(s) based on the agent reputation score data. For example, the trusted agent determiner 1104 of the first SDSi asset agent 140A determines an agent reputation score of the second SDSi asset agent 140B based on the agent reputation score data. In other examples, the trusted agent determiner 1104 of the first SDSi asset agent 140A is identified as a trusted sender to transmit the agent reputation score data to the manufacturer trusted agent determiner 1102 (FIG. 11). In such examples, the manufacturer trusted agent determiner 1102 determines the agent reputation score of the second SDSi asset agent 140B based on the agent reputation score data.

At block 2016, the SDSi asset agent 140 and/or SDSi asset agent 140A-C broadcast agent reputation score(s) to the mesh network 1002. For example, the first SDSi asset agent 140A broadcasts the agent reputation score of the second SDSi asset agent 140B to the mesh network 1002. In some examples, the manufacturer trusted agent determiner 1102 140A broadcasts the agent reputation score of the second SDSi asset agent 140B to the mesh network 1002.

At block 2018, the SDSi asset agent 140 and/or SDSi asset agent 140A-C identify trusted agent(s) based on the agent reputation score(s). For example, the trusted agent determiner 1104 of the first SDSi asset agent 140A and/or the third SDSi asset agent 140C identifies the second SDSi asset agent 140B as a trusted agent in response to the agent reputation score of the second SDSi asset agent 140B satisfying and/or otherwise meeting a threshold. In response to identifying the trusted agent(s) based on the agent reputation score(s) at block 2018, the example program 2000 of the example of FIG. 20 concludes. For example, the program 2000 returns to block 1906 of the example of FIG. 19 to select a trusted agent to transmit the request based on the agent reputation score(s).

Figure 21:
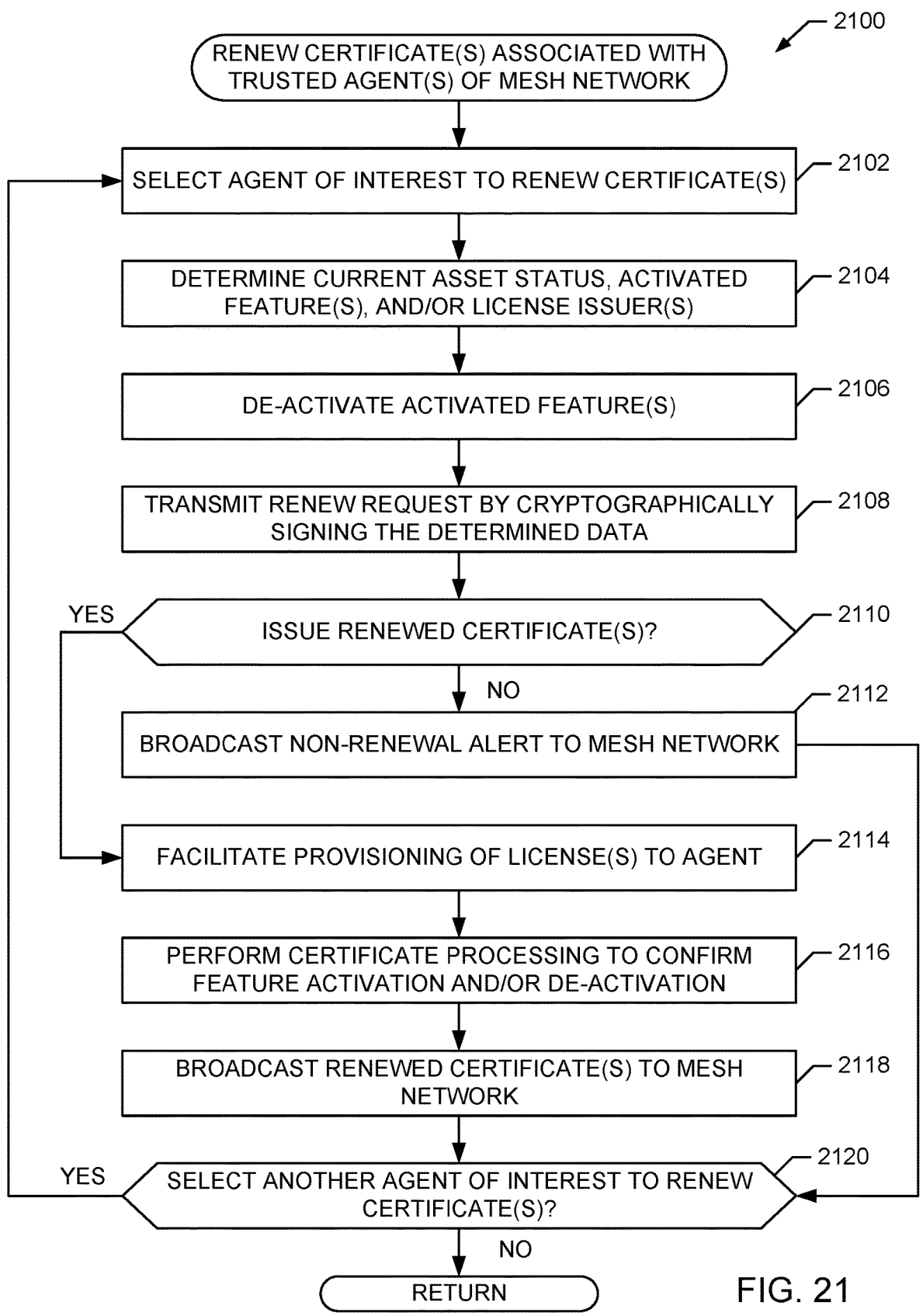
FIG. 21 is a flowchart representative of example computer readable instructions that may be executed to implement the example software defined silicon agent of FIGS. 10 and/or 11.

An example program 2100 that may be executed to implement the example SDSi asset agent 140 of the example systems 100 and/or 200 of FIGS. 1-2 and/or the example SDSi asset agents 140A-C of the example systems 1000, 1100, and/or 1200 of FIGS. 10-12 is illustrated in FIG. 21. The example program 2100 may be executed at predetermined intervals, based on an occurrence of a predetermined event, etc., or any combination thereof. With reference to the preceding figures and associated written descriptions, the example program 2100 of FIG. 21 begins execution at block 2102 at which the SDSi asset agent 140 and/or SDSi asset agent 140A-C select an agent of interest to renew certificate(s). For example, the certificate validator 1106 (FIG. 11) of the first SDSi asset agent 140A select the second SDSi asset agent 140B to renew certificate(s).

At block 2104, the SDSi asset agent 140 and/or SDSi asset agent 140A-C determine a current asset status, activated feature(s), and/or license issuer(s). For example, the certificate validator 1106 of the second SDSi asset agent 140B obtains a current asset status, activated feature(s), and/or license issuer(s) associated with the second semiconductor device 105B. In such examples, the second SDSi asset agent 140B transmits the current asset status, the activated feature(s), and/or the license issuer(s) information to the certificate validator 1106 of the first SDSi asset agent 140A.

At block 2106, the SDSi asset agent 140 and/or SDSi asset agent 140A-C de-activate activated feature(s). For example, the certificate validator 1106 of the first SDSi asset agent 140A transmits a de-activation command, instruction, signal, etc., to the certificate validator 1106 of the second SDSi asset agent 140B to de-activate one or more features of the second semiconductor device 105B.

At block 2108, the SDSi asset agent 140 and/or SDSi asset agent 140A-C transmit a renew request by cryptographically signing the determined data. For example, the certificate validator 1106 of the second SDSi asset agent 140B cryptographically and/or otherwise electronically signs data including at least one of a current asset status, activated feature(s), and/or license issuer(s) associated with the second semiconductor device 105B.

At block 2110, the SDSi asset agent 140, the SDSi asset agent 140A-C, and/or the manufacturer enterprise system 110 (FIG. 1) determine whether to issue renewed certificate(s). For example, the SDSi feature management service 256 (FIG. 2) determines whether to issue renewed certificate(s) to re-activate the de-activated feature(s) of the second semiconductor device 105B based on the cryptographically signed data. In such examples, the SDSi feature management service 256 determines whether to issue the renewed certificate(s) based on an agent reputation score of the second SDSi asset agent 140B, a level of trustworthiness of the second SDSi asset agent 140B, etc.

If, at block 2110, the SDSi asset agent 140, the SDSi asset agent 140A-C, and/or the manufacturer enterprise system 110 determine not to issue renewed certificate(s), then, at block 2112, the SDSi asset agent 140, the SDSi asset agent 140A-C, and/or the manufacturer enterprise system 110 broadcast a non-renewal alert to the mesh network 1002. For example, the SDSi feature management service 256 invokes the SDSi agent management interface 264 (FIG. 2) to broadcast to an alert, an indication, etc., to the mesh network 1002 that the certificate(s) for the second semiconductor device 105B have not been renewed. In response to broadcasting the non-renewal alert to the mesh network at block 2112, control proceeds to block 2120 to determine whether to select another agent of interest to renew certificate(s).

If, at block 2110, the SDSi asset agent 140, the SDSi asset agent 140A-C, and/or the manufacturer enterprise system 110 determine to issue renewed certificate(s) control proceeds to block 2114 to facilitate provisioning of license(s) to the agent. For example, the SDSi feature management service 256 invokes the SDSi agent management interface 264 to distribute one or more license(s) that correspond to the certificate(s) in the renew request to the second SDSi asset agent 140B to cause the second SDSi asset agent 140B to re-activate the de-activated feature(s).

At block 2116, the SDSi asset agent 140 and/or SDSi asset agent 140A-C perform certificate processing to confirm feature activation and/or de-activation. For example, the license processor 214 of the second SDSi asset agent 140B re-activates the previously de-activated feature(s). In such examples, the certificate validator 1106 of the second SDSi asset agent 140B generates a certificate (e.g., a renewal certificate) to confirm the activation (e.g., successful activation, successful re-activation, etc.).

At block 2118, the SDSi asset agent 140 and/or SDSi asset agent 140A-C broadcast renewed certificate(s) to the mesh network 1002. For example, the certificate validator 1106 of the second SDSi asset agent 140B invokes the agent interface 202 of the second SDSi asset agent 140B to broadcast the renewed certificate(s) to the mesh network 1002. In such examples, the broadcast of the renewed certificate(s) cause the trusted agent determiner 1104 of the first SDSi asset agent 140A and the third SDSi asset agent 140C to update an agent reputation score of the second SDSi asset agent 140B based on the renewed certificate(s).

At block 2120, the SDSi asset agent 140 and/or SDSi asset agent 140A-C determine whether to select another agent of interest to renew certificate(s). For example, the certificate validator 1106 determines to select the third SDSi asset agent 140C to renew certificate(s). If, at block 2120, the SDSi asset agent 140 and/or SDSi asset agent 140A-C determine to select another agent of interest to renew certificate(s), control returns to block 2102 to select another agent of interest to renew certificate(s). If, at block 2120, the SDSi asset agent 140 and/or SDSi asset agent 140A-C determine not to select another agent of interest to renew certificate(s), the example program 2100 concludes. For example, the program 2100 returns to block 2006 of the example of FIG. 20 to obtain renewed certificate(s).

Figure 22:
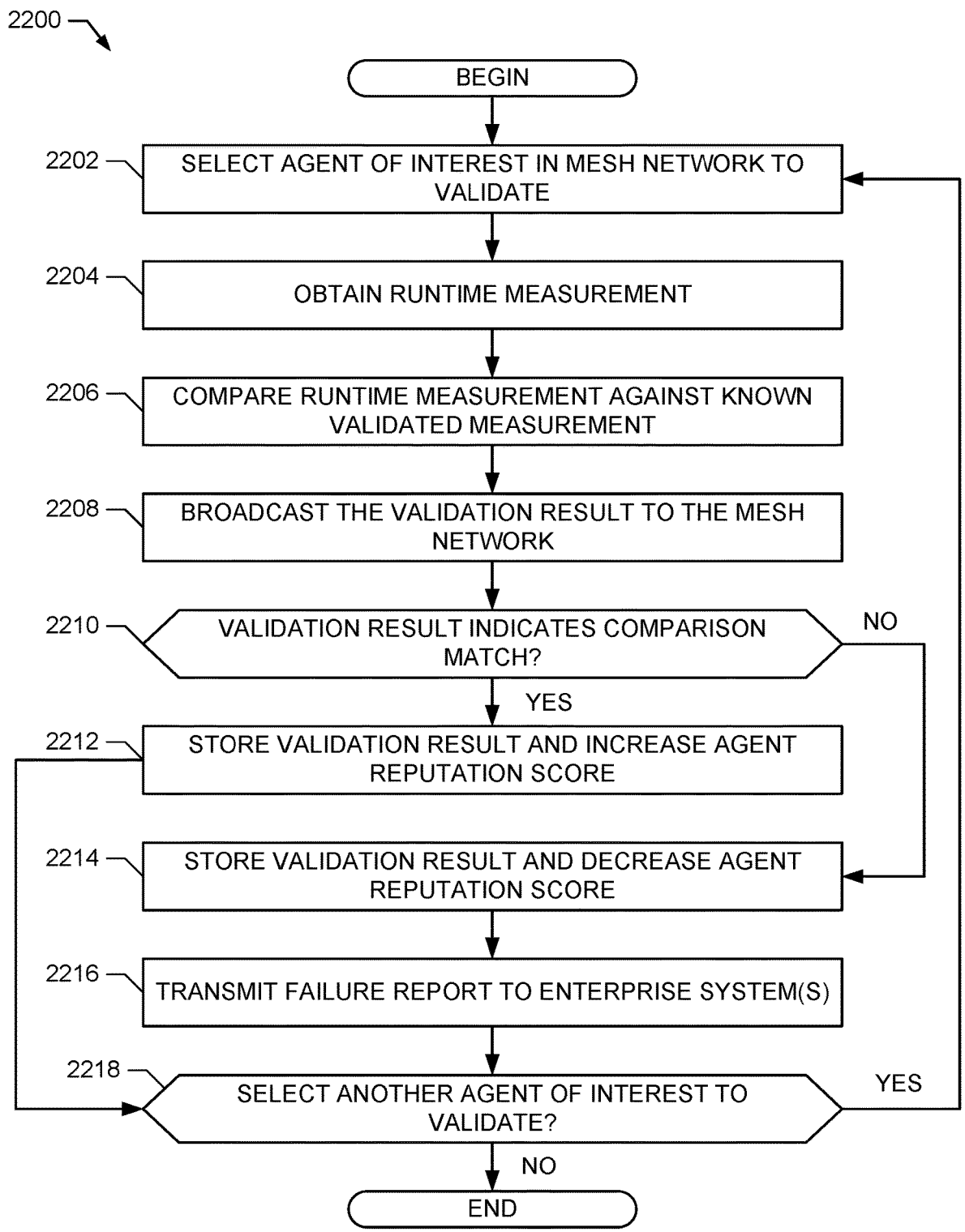
FIG. 22 is a flowchart representative of example computer readable instructions that may be executed to implement the example software defined silicon agent of FIGS. 10 and/or 11.

An example program 2200 that may be executed to implement the example SDSi asset agent 140 of the example systems 100 and/or 200 of FIGS. 1-2 and/or the example SDSi asset agents 140A-C of the example systems 1000, 1100, and/or 1200 of FIGS. 10-12 is illustrated in FIG. 22. The example program 2200 may be executed at predetermined intervals, based on an occurrence of a predetermined event, etc., or any combination thereof. With reference to the preceding figures and associated written descriptions, the example program 2200 of FIG. 22 begins execution at block 2202 at which the SDSi asset agent 140 and/or SDSi asset agent 140A-C select an agent of interest in a mesh network to validate. For example, the trusted agent determiner 1104 (FIG. 11) of the first SDSi asset agent 140A selects the second SDSi asset agent 140B of the mesh network 1002 to validate.

At block 2204, the SDSi asset agent 140 and/or SDSi asset agent 140A-C obtain a runtime measurement. For example, the trusted agent determiner 1104 of the second SDSi asset agent 140B generates a runtime measurement (e.g., a hash of application code, a value of a CPU counter, etc.). In such examples, the trusted agent determiner 1104 of the second SDSi asset agent 140B signs the runtime measurement and transmits the signed runtime measurement to the trusted agent determiner 1104 of the first SDSi asset agent 140A.

At block 2206, the SDSi asset agent 140 and/or SDSi asset agent 140A-C compare the runtime measurement against a known validated measurement. For example, the trusted agent determiner 1104 of the first SDSi asset agent 140A compares the signed runtime measurement to a known validated measurement stored in the first SDSi asset agent 140A, the manufacturer enterprise system 110, and/or the customer enterprise system 115.

At block 2208, the SDSi asset agent 140 and/or SDSi asset agent 140A-C broadcast the validation result to the mesh network. For example, the trusted agent determiner 1104 of the first SDSi asset agent 140A transmits the result of the comparison (e.g., the comparison yielded a match, a mismatch, etc.) to the second SDSi asset agent 140B, the third SDSi asset agent 140C, etc., of the mesh network 1002.

At block 2210, the SDSi asset agent 140 and/or SDSi asset agent 140A-C determine whether the validation result indicates a comparison match. For example, the third SDSi asset agent 140C obtains the validation result and determines that the comparison of the runtime measurement to the known validated measurement is a match, a mismatch, etc. If, at block 2210, the SDSi asset agent 140 and/or SDSi asset agent 140A-C determine the validation result indicates a comparison match, then, at block 2212, the SDSi asset agent 140 and/or SDSi asset agent 140A-C store the validation result and increase an agent reputation score. For example, the trusted agent determiner 1104 of the third SDSi asset agent 140C increases an agent reputation score of the second SDSi asset agent 140B because the comparison match indicates an increased level of trustworthiness of the second SDSi asset agent 140B. In such examples, the trusted agent determiner 1104 of the third SDSi asset agent 140C stores the validation result to use in a subsequent or future attestation process in connection with runtime measurements. In response to storing the validation result and increasing the agent reputation score at block 2214, control proceeds to block 2218 to determine whether to select another agent of interest to validate.

If, at block 2210, the SDSi asset agent 140 and/or SDSi asset agent 140A-C determine the validation result does not indicate a comparison match, control proceeds to block 2214 to store the validation result and decrease an agent reputation score. For example, the trusted agent determiner 1104 of the third SDSi asset agent 140C decreases an agent reputation score of the second SDSi asset agent 140B because the comparison mismatch indicates a decreased level of trustworthiness of the second SDSi asset agent 140B.

At block 2216, the SDSi asset agent 140 and/or SDSi asset agent 140A-C transmit a failure report to enterprise system(s). For example, the trusted agent determiner 1104 of the first SDSi asset agent 140A and/or the third SDSi asset agent 140C transmit(s) a failure report including an instance receipt detailing the runtime measurement, the known validated measurement, the result of the comparison, a timestamp, an identifier of the SDSi agent executing the comparison, an identifier of the SDSi agent generating the report, etc., to the manufacturer enterprise system 110 and/or the customer enterprise system 115.

At block 2218, the SDSi asset agent 140 and/or SDSi asset agent 140A-C determine whether to select another agent of interest to validate. For example, the first SDSi asset agent 140A determines to select the third SDSi asset agent 140C to validate. If, at block 2218, the SDSi asset agent 140 and/or SDSi asset agent 140A-C determine to select another agent of interest to validate, control returns to block 2202 to select another agent of interest in the mesh network 1002 to validate. If, at block 2218, the SDSi asset agent 140 and/or SDSi asset agent 140A-C determine not to select another agent of interest to validate, the example program 2200 concludes.

Figure 23:
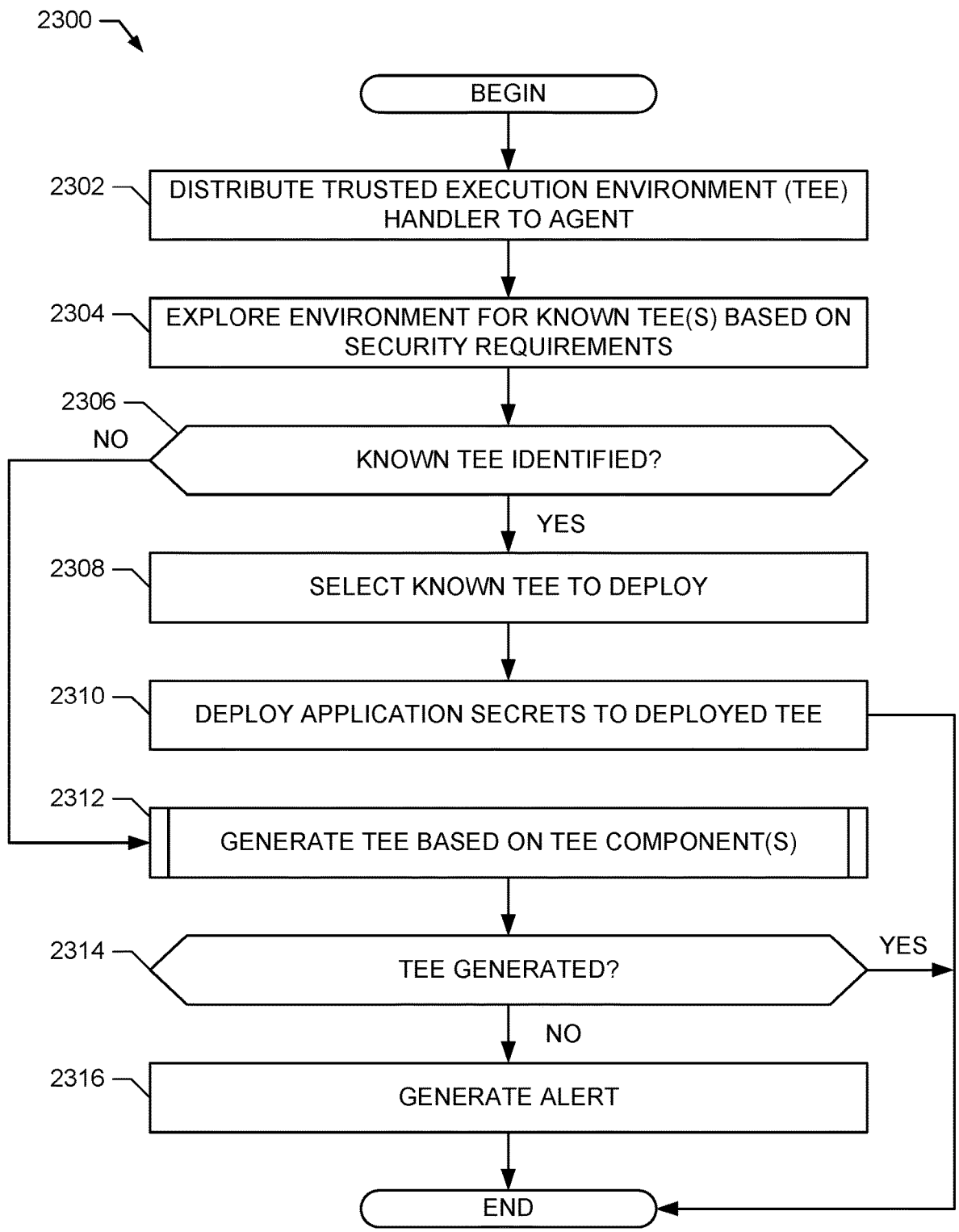
FIG. 23 is a flowchart representative of example computer readable instructions that may be executed to implement the example software defined silicon agent of FIGS. 10 and/or 12.

An example program 2300 that may be executed to implement the example SDSi asset agent 140 of the example systems 100 and/or 200 of FIGS. 1-2 and/or the example SDSi asset agents 140A-C of the example systems 1000, 1100, and/or 1200 of FIGS. 10-12 is illustrated in FIG. 23. The example program 2300 may be executed at predetermined intervals, based on an occurrence of a predetermined event, etc., or any combination thereof. With reference to the preceding figures and associated written descriptions, the example program 2300 of FIG. 23 begins execution at block 2302 at which the SDSi asset agent 140 and/or SDSi asset agent 140A-C distributes a trusted execution environment (TEE) handler to an agent. For example, the manufacturer enterprise network 110 and/or the customer enterprise network 115 distribute the TEE generator 1204 to one(s) of the SDSi asset agents 140A-C, such as the first SDSi asset agent 140A. In such examples, the TEE generator 1204 implements a TEE handler that generates a TEE, deploys the TEE, and/or returns an abstracted instance of the TEE to which an element of the first SDSi asset agent 140A or external computing system can interact and/or otherwise control via one or more hardware-agnostic TEE APIs.

At block 2304, the SDSi asset agent 140 and/or SDSi asset agent 140A-C explore an environment for known TEE(s) based on security requirements. For example, the TEE identifier 1202 explores, searches, queries, etc., at least one of the TEE(s) 1205, the TEE library 1206, or the TEE component(s) 1208 for a known, pre-packaged, and/or pre-configured TEE that meets and/or otherwise satisfies the security requirements.

At block 2306, the SDSi asset agent 140 and/or SDSi asset agent 140A-C determine whether a known TEE has been identified. For example, the TEE identifier 1202 identifies a known TEE of the TEE(s) 1205 that satisfies the security requirements. In other examples, the TEE identifier 1202 does not identify a known TEE of the TEE(s) 1205 that satisfies the security requirements.

If, at block 2306, the SDSi asset agent 140 and/or SDSi asset agent 140A-C determine that a known TEE has not been identified, control proceeds to block 2312 to generate a TEE based on TEE component(s). If, at block 2306, the SDSi asset agent 140 and/or SDSi asset agent 140A-C determine that a known TEE has been identified, then, at block 2308, the TEE identifier 1202 identifies the known TEE to deploy. For example, the TEE identifier 1202 invokes the TEE generator 1204 to return one or more TEE APIs from the TEE library 1206 to interface with the identified known TEE.

At block 2310, the SDSi asset agent 140 and/or SDSi asset agent 140A-C deploy application secrets to a deployed TEE. For example, the TEE(s) 1205 obtains application code to execute in the TEE(s) 1205, cryptographically protected data to store in trusted memory and/or storage of the TEE(s) 1205, etc. In response to deploying the application secrets to the deployed TEE, the example program 2300 concludes.

At block 2312, the SDSi asset agent 140 and/or SDSi asset agent 140A-C generates a TEE based on TEE component(s). For example, the TEE generator 1204 compiles a TEE from one(s) of the TEE component(s) 1208, or from TEE component(s) on a remote computing system (e.g., the customer enterprise system 115, a different one of the SDSi asset agents 140A-C, etc.). In such examples, the TEE generator 1204 deploys the compiled TEE as one of the TEE(s) 1205, or as a TEE on the remote computing system. An example process that may be executed to implement block 2312 is described below in connection with FIG. 24.

At block 2314, the SDSi asset agent 140 and/or SDSi asset agent 140A-C determine whether a TEE has been generated. For example, the TEE generator 1204 determines that a TEE has not been generated because the TEE component(s) 1208 cannot compose a TEE that satisfies the security requirements. In other examples, the TEE generator 1204 determines that a TEE has been generated based on the TEE being deployed to protect data of interest.

If, at block 2314, the SDSi asset agent 140 and/or SDSi asset agent 140A-C determine that a TEE has been generated, the example program 2300 concludes. If, at block 2314, the SDSi asset agent 140 and/or SDSi asset agent 140A-C determine that a TEE has not been generated, then, at block 2316, the SDSi asset agent 140 and/or SDSi asset agent 140A-C generate an alert. For example, the TEE generator 1204 generates an alert indicative of a TEE not being generated because necessary one(s) of the TEE component(s) 1208 are not activated, present, etc., the security requirements are too stringent, etc. In response to generating the alert at block 2316, the example program 2300 concludes.

Figure 24:
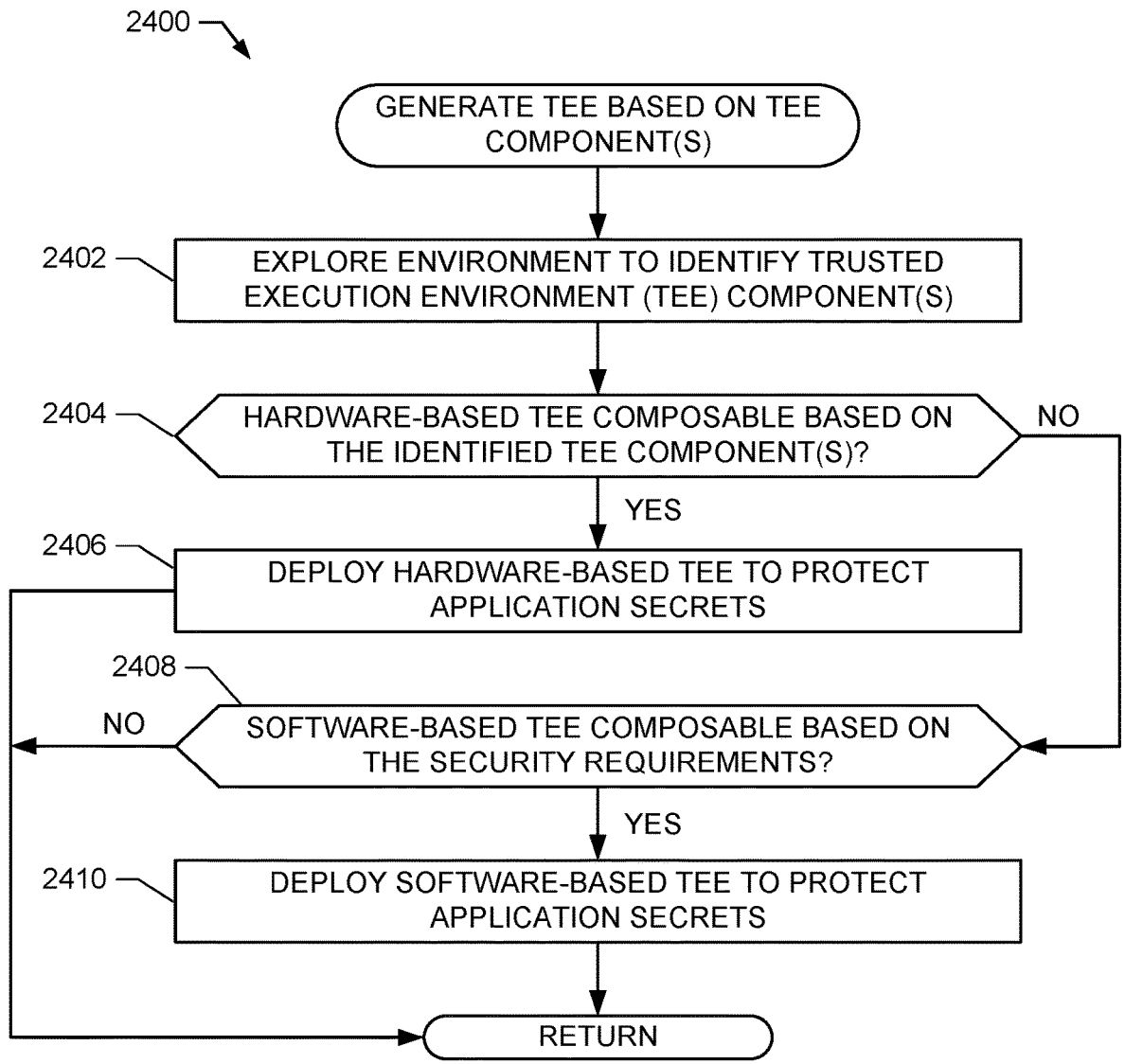
FIG. 24 is a flowchart representative of example computer readable instructions that may be executed to implement the example software defined silicon agent of FIGS. 10 and/or 12.

An example program 2400 that may be executed to implement the example SDSi asset agent 140 of the example systems 100 and/or 200 of FIGS. 1-2 and/or the example SDSi asset agents 140A-C of the example systems 1000, 1100, and/or 1200 of FIGS. 10-12 is illustrated in FIG. 24. The example program 2400 may be executed to implement block 2312 of the example of FIG. 23 to generate a TEE based on TEE component(s). The example program 2400 may be executed at predetermined intervals, based on an occurrence of a predetermined event, etc., or any combination thereof. With reference to the preceding figures and associated written descriptions, the example program 2400 of FIG. 24 begins execution at block 2402 at which the SDSi asset agent 140 and/or SDSi asset agent 140A-C explore an environment to identify TEE component(s). For example, the TEE identifier 1202 (FIG. 12) explores, searches, queries, etc., at least one of the TEE(s) 1205, the TEE library 1206, or the TEE component(s) 1208 for a for hardware, software, and/or firmware TEE related component(s) that meet and/or otherwise satisfy requested security requirements. In such examples, the TEE identifier 302 identifies trusted execution, trusted memory, and trusted storage included in the TEE component(s) 1208 that satisfy the requested security requirements.

At block 2404, the SDSi asset agent 140 and/or SDSi asset agent 140A-C determine whether a hardware-based TEE is composable based on the identified TEE component(s). For example, the TEE identifier 1202 determines that the security requirements include trusted execution, trusted memory, and trusted storage. In such examples, the TEE identifier 1202 determines that the TEE component(s) 1208 include the trusted execution, trusted memory, and trusted storage. In some such examples, the TEE identifier 1202 determines that a hardware-based TEE can be composed, generated, etc., based on the trusted execution, trusted memory, and trusted storage.

If, at block 2404, the SDSi asset agent 140 and/or SDSi asset agent 140A-C determine that a hardware-based TEE is composable based on the identified TEE component(s), then, at block 2406, the SDSi asset agent 140 and/or SDSi asset agent 140A-C deploy a hardware-based TEE to protect application secrets. For example, the TEE generator 1204 deploys a hardware-based TEE as one of the TEE(s) 2405 based on the TEE component(s) 1208. In response to deploying the hardware-based TEE to protect the application secrets at block 2406, the example program 2400 concludes. For example, the program 2400 returns to block 2314 of the example of FIG. 23 to determine whether a TEE has been generated.

If, at block 2404, the SDSi asset agent 140 and/or SDSi asset agent 140A-C determine that a hardware-based TEE is not composable based on the identified TEE component(s), control proceeds to block 2408 to determine whether a software-based TEE is composable based on the security requirements. For example, the TEE identifier 1202 determines that a software-based TEE is composable based on the security requirements.

If, at block 2408, the SDSi asset agent 140 and/or SDSi asset agent 140A-C determine that a software-based TEE is not composable based on the security requirements, the example program 2400 concludes. For example, the program 2400 returns to block 2314 of the example of FIG. 23 to determine whether a TEE has been generated.

If, at block 2408, the SDSi asset agent 140 and/or SDSi asset agent 140A-C determine that a software-based TEE is composable based on the security requirements, then, at block 2410, the SDSi asset agent 140 and/or SDSi asset agent 140A-C deploy a software-based TEE to protect application secrets. For example, the TEE generator 1204 deploys a software-based TEE as one of the TEE(s) 2405 based on the TEE library 1206, the TEE component(s) 1208, etc., and/or a combination thereof. In response to deploying the software-based TEE to protect the application secrets at block 2410, the example program 2400 concludes. For example, the program 2400 returns to block 2314 of the example of FIG. 23 to determine whether a TEE has been generated.

Figure 25:
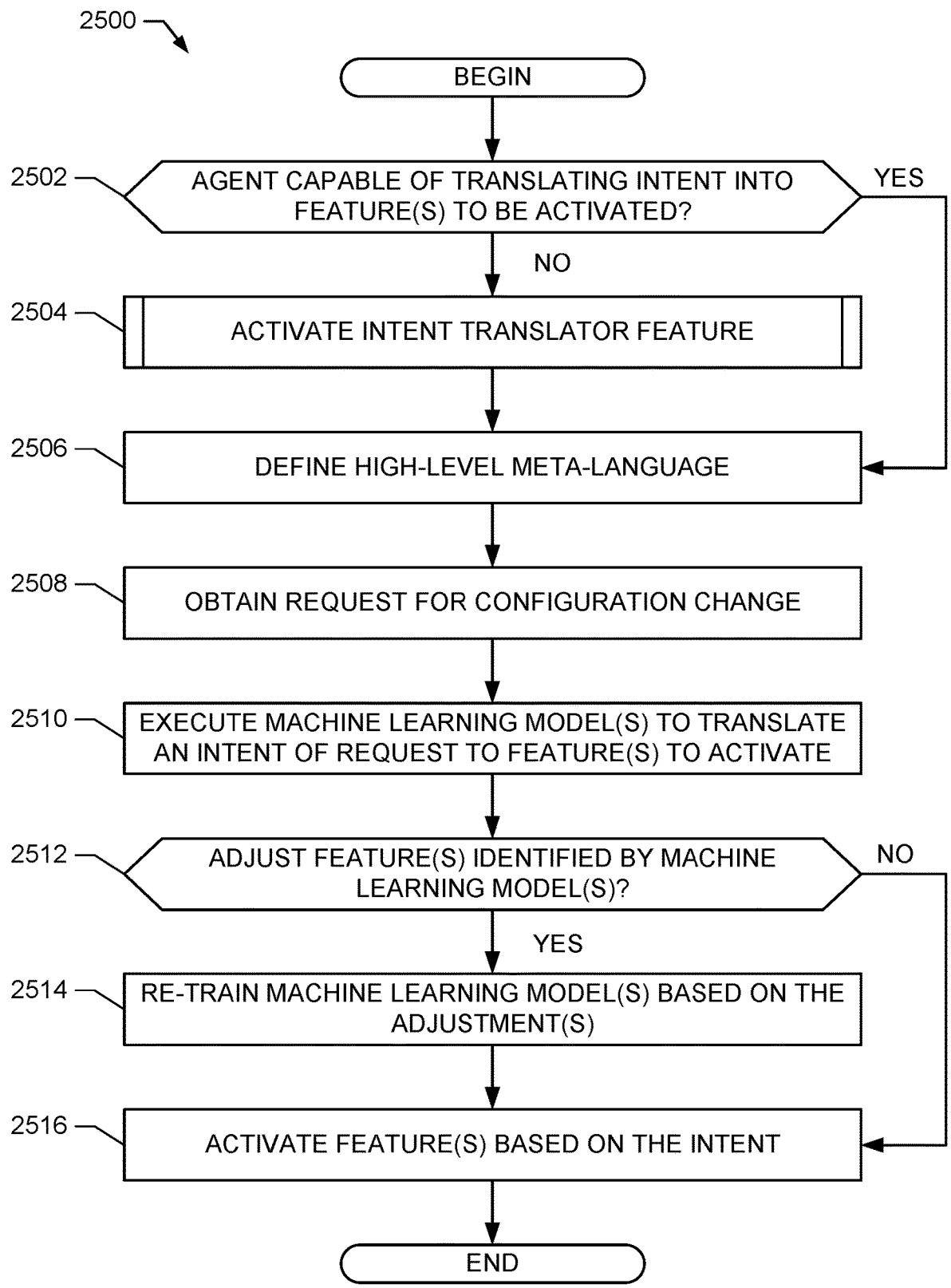
FIG. 25 is a flowchart representative of example computer readable instructions that may be executed to implement the example software defined silicon agent of FIGS. 10, 11, and/or 12.

An example program 2500 that may be executed to implement the example SDSi asset agent 140 of the example systems 100 and/or 200 of FIGS. 1-2 and/or the example SDSi asset agents 140A-C of the example systems 1000, 1100, and/or 1200 of FIGS. 10-12 is illustrated in FIG. 25. The example program 2500 may be executed at predetermined intervals, based on an occurrence of a predetermined event, etc., or any combination thereof. With reference to the preceding figures and associated written descriptions, the example program 2500 of FIG. 25 begins execution at block 2502 at which the SDSi asset agent 140 and/or SDSi asset agent 140A-C determine whether an agent is capable of translating intent into feature(s) to be activated. For example, the first SDSi asset agent 140A determines that the SDSi asset agent 140A is capable of translating an intent or intended outcome from a request for a configuration change of the SDSi asset agent 140A, and/or, more generally, the system 1000, 1100, and/or 1200 of FIGS. 10-12 based on whether the SDSi asset agent 140A includes and/or otherwise has activated the feature intent determiner 1112 and/or the feature intent ML model(s) 1114.

If, at block 2502, the SDSi asset agent 140 and/or SDSi asset agent 140A-C determine that the agent is capable of translating intent into feature(s) to be activated, control proceeds to block 2506 to define a high-level meta-language. If, at block 2502, the SDSi asset agent 140 and/or SDSi asset agent 140A-C determine that the agent is not capable of translating intent into feature(s) to be activated, then, at block 2504, the SDSi asset agent 140 and/or SDSi asset agent 140A-C activates an intent translator feature. An example process that may be executed to implement block 2504 is described in connection with FIGS. 16, 17, and/or 18. For example, the first SDSi asset agent 140A requests the manufacturer enterprise system 110 for an license to activate the feature intent determiner 1112 and/or the feature intent ML model(s) 1114.

At block 2506, the SDSi asset agent 140 and/or SDSi asset agent 140A-C defines a high-level meta-language. For example, the feature intent determiner 1112 defines a high-level meta-language to process configuration change requests.

At block 2508, the SDSi asset agent 140 and/or SDSi asset agent 140A-C obtains a request for a configuration change. For example, the first SDSi asset agent 140A obtains a request to change the first SDSi asset agent 140A and/or, more generally, the first semiconductor device 105A, by adjusting requirement(s) associated with at least one of availability, machine learning, performance, reliability, or security.

At block 2510, the SDSi asset agent 140 and/or SDSi asset agent 140A-C executes machine learning model(s) to translate an intent of the request to feature(s) to activate. For example, the feature intent determiner 1112 invokes the feature intent ML model(s) 1114 to translate a change in performance requirements to an intent or intended outcome of improving performance of the first SDSi asset agent 140A and/or, more generally, the first semiconductor device 105A. In such examples, the feature intent ML model(s) 1114 translate the intent or intended outcome to one or more features of the first semiconductor device 105A to improve performance, such as activating one or more cores of a CPU.

At block 2512, the SDSi asset agent 140 and/or SDSi asset agent 140A-C determine whether to adjust feature(s) identified by the machine learning model(s). For example, a user, an external computing system, etc., determines to adjust and/or otherwise override the feature(s) identified by the feature intent ML model(s) 1114.

If, at block 2512, the SDSi asset agent 140 and/or SDSi asset agent 140A-C determine not to adjust feature(s) identified by the machine learning model(s), control proceeds to block 2516 to activate the feature(s) based on the intent. If, at block 2512, the SDSi asset agent 140 and/or SDSi asset agent 140A-C determine to adjust feature(s) identified by the machine learning model(s), then, at block 2514, the SDSi asset agent 140 and/or SDSi asset agent 140A-C re-trains the machine learning model(s) based on the adjustment(s). For example, the feature intent determiner 1112 provides feedback, new data (e.g., new training data), etc., representative of the adjustment(s) to the feature intent ML model(s) 1114 to retrain and deploy retrained one(s) of the feature intent ML model(s) 1114.

At block 2516, the SDSi asset agent 140 and/or SDSi asset agent 140A-C activates feature(s) based on the intent. For example, the feature intent determiner 1112 invokes the license processor 214 to facilitate activation of the identified feature(s). In response to activating the feature(s) based on the intent at block 2516, the example program 2500 of the example of FIG. 25 concludes.

Device Enhancements

FIG. 26 is a flowchart representative of example computer readable instructions that may be executed to implement the example time calculator of FIG. 14. The process 2600 of FIG. 26 begins and block 2602. At block 2602, the property checker 1406 determines properties of the time-dependent feature 1306 at the time of manufacture. For example, the property checker 1406 can cause a current to run through the time-dependent feature 1306 and record the electrical properties of the time-dependent feature 1306 at the time of manufacture of the silicon product 1305.

At block 2604, the absolute time determiner 1410 correlates the determined property with the time of manufacture. For example, the absolute time determiner 1410 can store the determined property with the time of manufacture in a storage associated with the silicon product 1305. The absolute time determiner 1410 can then determine the time of manufacture by communicating with a clock associated with silicon product 1305 and/or by a manual/automatic input by the manufacturer. In such examples, the absolute time determiner 1410 can record the absolute time of the time of manufacture with the determined electrical properties of the time-dependent feature 1306.

At block 2606, the request interface 1404 receives the request 1402 for absolute time and/or relative time. For example, the request interface 1404 can receive the request 1402 from the analytics engine 206, license processor 214, etc. In some examples, the request interface 1404 can determine what time is requested by the request 1402 (e.g., the absolute time, the relative time, or both.).

At block 2608, the property checker 1406 determines the electrical properties of time-dependent feature 1306 at the time of the request 1402. For example, the property checker 1406 can cause a current to run through the time-dependent feature 1306 such that the electrical properties of the device can be determined. In some examples, the property checker 1406 can determine the current electrical properties by any other suitable means (e.g., reading a log of operations of the silicon product 1305, etc.).

At block 2610, the relative time determiner 1408 determines the relative time based on a comparison of the properties of the time-dependent feature 1306 at the time of manufacturer properties and the properties of the time-dependent feature 1306 at the current time (e.g., the time of the request 1402). For example, based on the known time-variance of the electrical properties of the time-dependent feature 1306, the relative time determiner 1408 can determine the relative time between the time of manufacture and the current time. In some examples, the relative time determiner 1408 can determine the relative time based on any other suitable means.

At block 2612, the absolute time determiner 1410 determines the absolute time based on a comparison of relative time and time of manufacture. For example, the absolute time determiner 1410 can add the relative time to the stored time of manufacture as recorded during the execution of block 2604. In some examples, the absolute time determiner 1410 can determine the absolute time by any other suitable means. After determining the absolute time, the absolute time determiner 1410 transmits the determined absolute and/or relative time to the requesting party/entity.

At block 2614, the request interface 1404 determines if another request 1402 has been received. If another request has been received, the process 2600 returns to block 2606. If another request has not been received, the process 2600 ends.

FIG. 27 is a flowchart representative of example computer-readable instructions that may be executed to implement the example feature group calculator 1304 of FIG. 15. The process 2700 of FIG. 27 begins at block 2702. At block 2702, the configuration detector 1502 detects a new configuration of silicon product 1305. For example, the configuration detector 1502 could detect features of the silicon product 1305 have been and/or are to be activated, deactivated, modified, etc. In some examples, the configuration detector 1502 can receive a notification (e.g., sent from the license processor 214, etc.) indicating a new configuration is/will be activated for the silicon product 1305. In some examples, the configuration detector 1502 can determine which feature-groups are affected by the configuration.

At block 2704, the feature weight determiner 1508 determines the weight value(s) for each feature of the detected configuration. For example, the feature weight determiner 1508 can determine the weight of each feature associated with the detected configuration. For example, the feature weight determiner 1508 can determine a score for each feature associated with the configuration. For example, if the configuration includes 8 cores operating at 4.0 gigahertz (GHz), the feature weight determiner 1508 can determine that each operating core has a weight of 10 and that the operating frequency has a weight of 50. In such examples, the feature weight determiner 1508 can determine the feature score of 130.

At block 2706, the environmental condition determiner 1506 determines the weight value(s) associated with environmental conditions. For example, the environmental condition determiner 1506, via the sensor interface 1504, can determine the environmental conditions under which the silicon product 1305 is operating. For example, the environmental condition determiner 1506 can determine the weight factor associated with each environmental condition. In some examples, the environmental condition determiner 1506 can assign a weight factor to the ambient temperature if the ambient temperature exceeds a boundary condition (e.g., the environmental condition determiner 1506 can determine a weight of 10 if the ambient temperature exceeds 20 degrees Celsius (C), the environmental condition determiner can determine a weight of 30 if the ambient humidity exceeds 80%, etc.). In some examples, the environmental condition determiner 1506 can scale (e.g., linearly, exponentially, etc.) the determined weight as the environmental conditions become worse for processor performance (e.g., the environmental condition determiner 1506 can scale the temperature weight by 5 for each degree above 20 degrees Celsius (C), etc.).

At block 2708, the group score calculator 1510 calculate feature-group score(s). For example, the group score calculator 1510 can determine the group score for each feature group detected by the new configuration detector during the execution of block 2702. In some examples, the group score calculator 1510 can determine the group score by summing the feature weight score and the environmental weight score. In some examples, the group score calculator 1510 can determine the group score(s) by any other suitable means.

At block 2710, the threshold comparator 1514 determines if at least one feature-group score(s) exceeds a corresponding enablement and/or warranty threshold. For example, the threshold comparator 1514 can compare the calculated group score(s) to at least one threshold and determine if the group score exceeds the at least one threshold. If at least one group score exceeds a threshold, the process 2700 advances to block 2712. If no group score exceeds a threshold, the process 2700 advances to block 2714.

At block 2712, the configuration controller 1516 takes action based on an exceeded group combination score. For example, if the configuration controller 1516 can void the warranty of the silicon product 1305 if a group score exceeds the warranty threshold. In some examples, the configuration controller 1516 can prevent the configuration from being enabled. At block 2714, the configuration controller 1516 enables configuration without additional actions. The process 2700 ends.

Processor and Distribution Platforms

Figure 28:
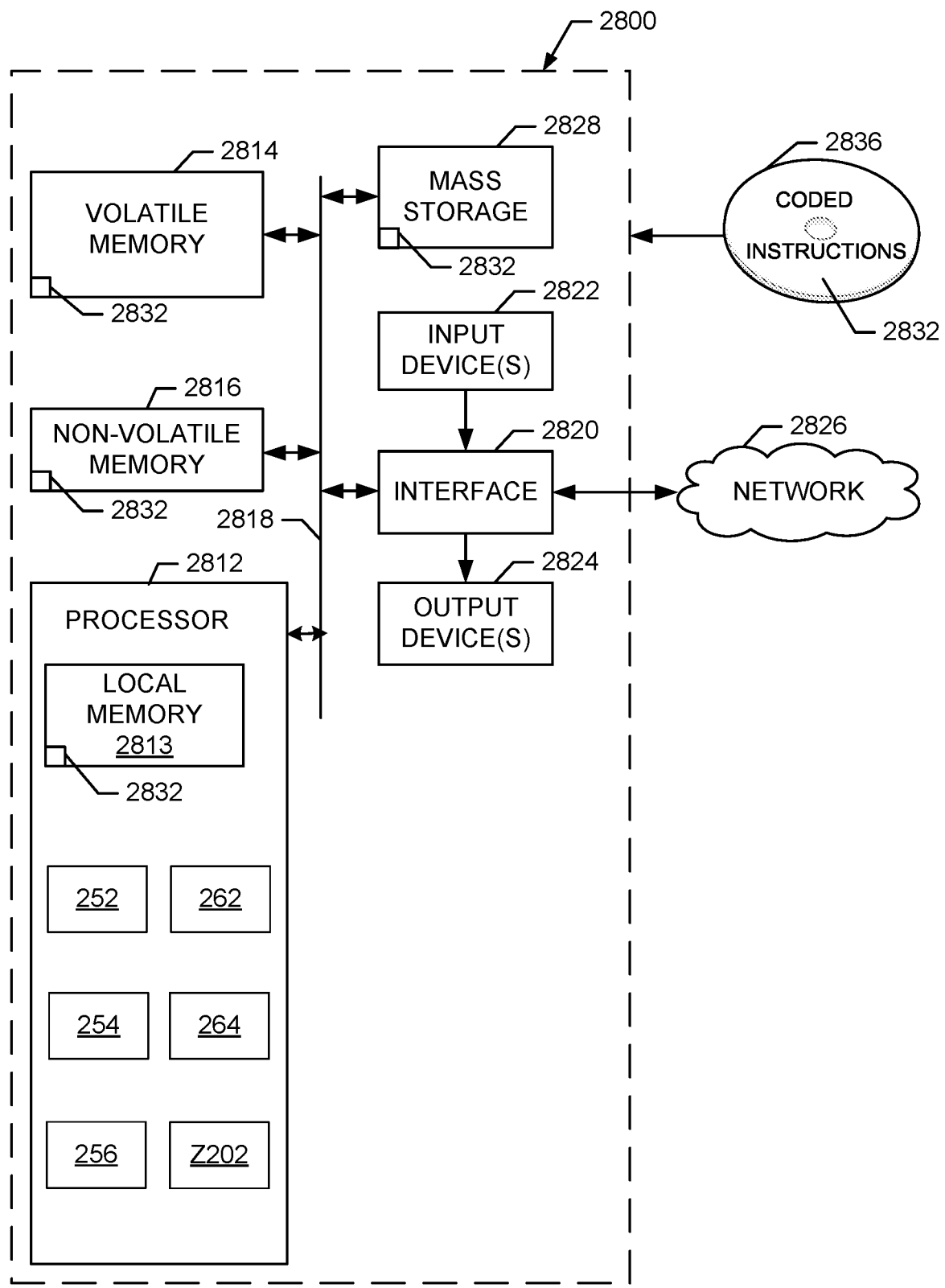
FIG. 28 is a block diagram of an example processor platform structured to execute the example computer readable instructions of FIG. 16 to implement the example manufacturer enterprise system of FIGS. 1 and/or 2.

FIG. 28 is a block diagram of an example processor platform 2800 structured to execute the instructions of FIGS. 16 and/or 19-25 to implement the manufacture enterprise system 110 of FIGS. 1-9 and/or 10-12. The processor platform 2800 can be, for example, a server, a personal computer, a workstation, a self-learning machine (e.g., a neural network), a mobile device (e.g., a cell phone, a smart phone, a tablet such as an iPad™), or any other type of computing device.

The processor platform 2800 of the illustrated example includes a processor 2812. The processor 2812 of the illustrated example is hardware. For example, the processor 2812 can be implemented by one or more integrated circuits, logic circuits, microprocessors, GPUs, DSPs, or controllers from any desired family or manufacturer. The hardware processor 2812 may be a semiconductor based (e.g., silicon based) device. In this example, the processor 2812 implements one or more of the example product management service 252, the example customer management service 254, the example SDSi feature management service 256, the example SDSi portal 262, the example SDSi agent management interface 264, and/or the manufacturer trusted agent determiner 1102.

The processor 2812 of the illustrated example includes a local memory 2813 (e.g., a cache). The processor 2812 of the illustrated example is in communication with a main memory including a volatile memory 2814 and a non-volatile memory 2816 via a link 2818. The link 2818 may be implemented by a bus, one or more point-to-point connections, etc., or a combination thereof. The volatile memory 2814 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 2816 may be implemented by flash memory and/or any other desired type of memory device. Access to the main memory 2814, 2816 is controlled by a memory controller.

The processor platform 2800 of the illustrated example also includes an interface circuit 2820. The interface circuit 2820 may be implemented by any type of interface standard, such as an Ethernet interface, a universal serial bus (USB), a Bluetooth® interface, a near field communication (NFC) interface, and/or a PCI express interface.

In the illustrated example, one or more input devices 2822 are connected to the interface circuit 2820. The input device(s) 2822 permit(s) a user to enter data and/or commands into the processor 2812. The input device(s) can be implemented by, for example, an audio sensor, a microphone, a camera (still or video), a keyboard, a button, a mouse, a touchscreen, a track-pad, a trackball, a trackbar (such as an isopoint), a voice recognition system and/or any other human-machine interface. Also, many systems, such as the processor platform 2800, can allow the user to control the computer system and provide data to the computer using physical gestures, such as, but not limited to, hand or body movements, facial expressions, and face recognition.

One or more output devices 2824 are also connected to the interface circuit 2820 of the illustrated example. The output devices 2824 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speakers(s). The interface circuit 2820 of the illustrated example, thus, typically includes a graphics driver card, a graphics driver chip and/or a graphics driver processor.

The interface circuit 2820 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 2826. The communication can be via, for example, an Ethernet connection, a digital subscriber line (DSL) connection, a telephone line connection, a coaxial cable system, a satellite system, a line-of-site wireless system, a cellular telephone system, etc.

The processor platform 2800 of the illustrated example also includes one or more mass storage devices 2828 for storing software and/or data. Examples of such mass storage devices 2828 include floppy disk drives, hard drive disks, compact disk drives, Blu-ray disk drives, redundant array of independent disks (RAID) systems, and digital versatile disk (DVD) drives.

The machine executable instructions 2832 corresponding to the instructions of FIG. 16 and/or FIGS. 19-25 may be stored in the mass storage device 2828, in the volatile memory 2814, in the non-volatile memory 2816, in the local memory 2813 and/or on a removable non-transitory computer readable storage medium, such as a CD or DVD 2836.

Figure 29:
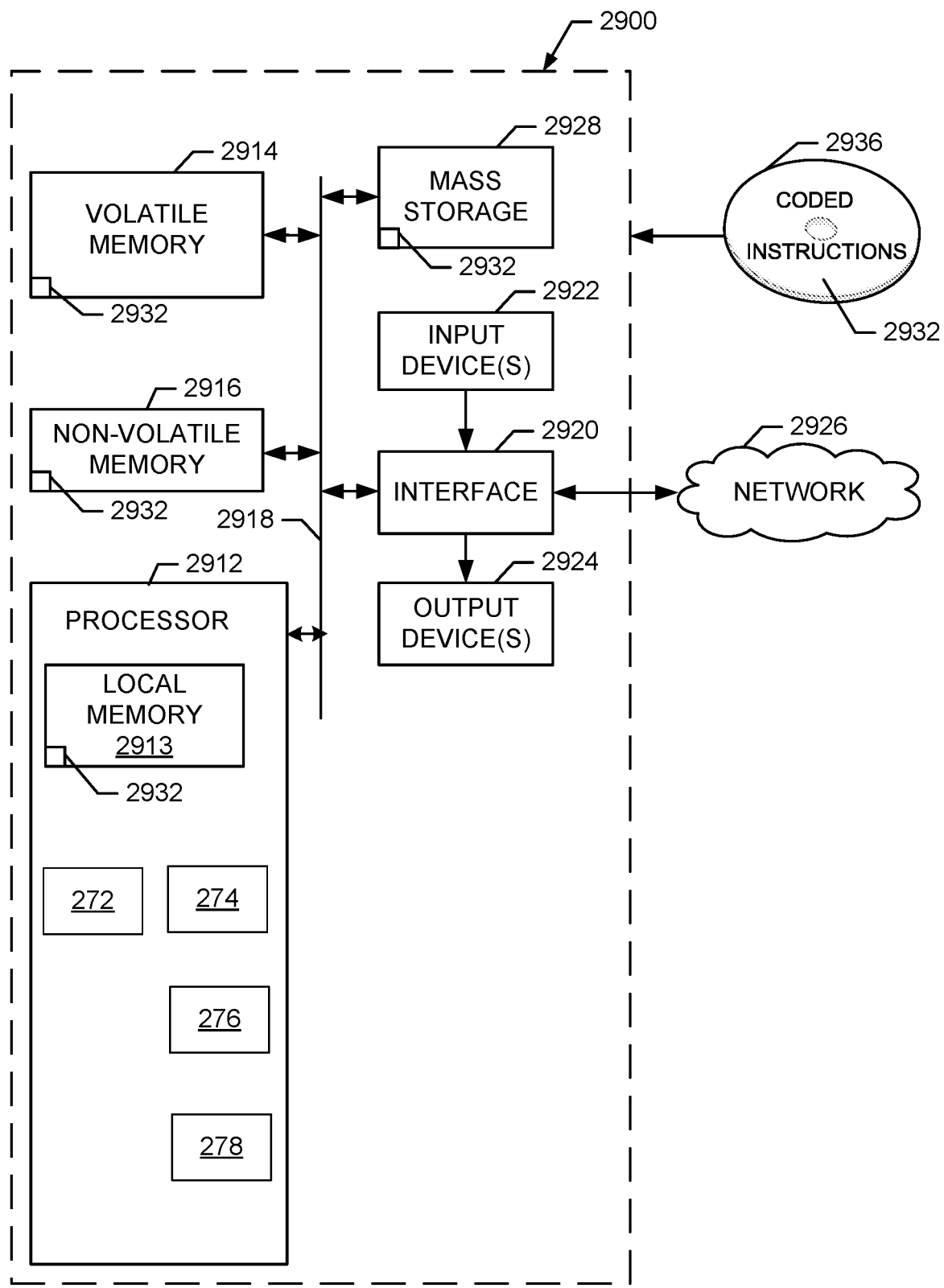
FIG. 29 is a block diagram of an example processor platform structured to execute the example computer readable instructions of FIG. 17 to implement the example customer enterprise system of FIGS. 1 and/or 2.

FIG. 29 is a block diagram of an example processor platform 2900 structured to execute the instructions of FIG. 17 to implement the customer enterprise system 115 of FIGS. 1-9. The processor platform 2900 can be, for example, a server, a personal computer, a workstation, a self-learning machine (e.g., a neural network), a mobile device (e.g., a cell phone, a smart phone, a tablet such as an iPad™) or any other type of computing device.

The processor platform 2900 of the illustrated example includes a processor 2912. The processor 2912 of the illustrated example is hardware. For example, the processor 2912 can be implemented by one or more integrated circuits, logic circuits, microprocessors, GPUs, DSPs, or controllers from any desired family or manufacturer. The hardware processor 2912 may be a semiconductor based (e.g., silicon based) device. In this example, the processor 2912 implements one or more of the example SDSi client agent 272, the example platform inventory management service 274, the example accounts management service 276 and/or the example entitlement management service 278.

The processor 2912 of the illustrated example includes a local memory 2913 (e.g., a cache). The processor 2912 of the illustrated example is in communication with a main memory including a volatile memory 2914 and a non-volatile memory 2916 via a link 2918. The link 2918 may be implemented by a bus, one or more point-to-point connections, etc., or a combination thereof. The volatile memory 2914 may be implemented by SDRAM, DRAM, RDRAM® and/or any other type of random access memory device. The non-volatile memory 2916 may be implemented by flash memory and/or any other desired type of memory device. Access to the main memory 2914, 2916 is controlled by a memory controller.

The processor platform 2900 of the illustrated example also includes an interface circuit 2920. The interface circuit 2920 may be implemented by any type of interface standard, such as an Ethernet interface, a USB, a Bluetooth® interface, an NFC interface, and/or a PCI express interface.

In the illustrated example, one or more input devices 2922 are connected to the interface circuit 2920. The input device(s) 2922 permit(s) a user to enter data and/or commands into the processor 2912. The input device(s) can be implemented by, for example, an audio sensor, a microphone, a camera (still or video), a keyboard, a button, a mouse, a touchscreen, a track-pad, a trackball, a trackbar (such as an isopoint), a voice recognition system and/or any other human-machine interface. Also, many systems, such as the processor platform 2900, can allow the user to control the computer system and provide data to the computer using physical gestures, such as, but not limited to, hand or body movements, facial expressions, and face recognition.

One or more output devices 2924 are also connected to the interface circuit 2920 of the illustrated example. The output devices 2924 can be implemented, for example, by display devices (e.g., an LED, an OLED, an LCD, a CRT display, an IPS display, a touchscreen, etc.), a tactile output device, a printer and/or speakers(s). The interface circuit 2920 of the illustrated example, thus, typically includes a graphics driver card, a graphics driver chip and/or a graphics driver processor.

The interface circuit 2920 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 2926. The communication can be via, for example, an Ethernet connection, a DSL connection, a telephone line connection, a coaxial cable system, a satellite system, a line-of-site wireless system, a cellular telephone system, etc.

The processor platform 2900 of the illustrated example also includes one or more mass storage devices 2928 for storing software and/or data. Examples of such mass storage devices 2928 include floppy disk drives, hard drive disks, compact disk drives, Blu-ray disk drives, RAID systems, and DVD drives.

The machine executable instructions 2932 corresponding to the instructions of FIG. 17 may be stored in the mass storage device 2928, in the volatile memory 2914, in the non-volatile memory 2916, in the local memory 2913 and/or on a removable non-transitory computer readable storage medium, such as a CD or DVD 2936.

Figure 30:
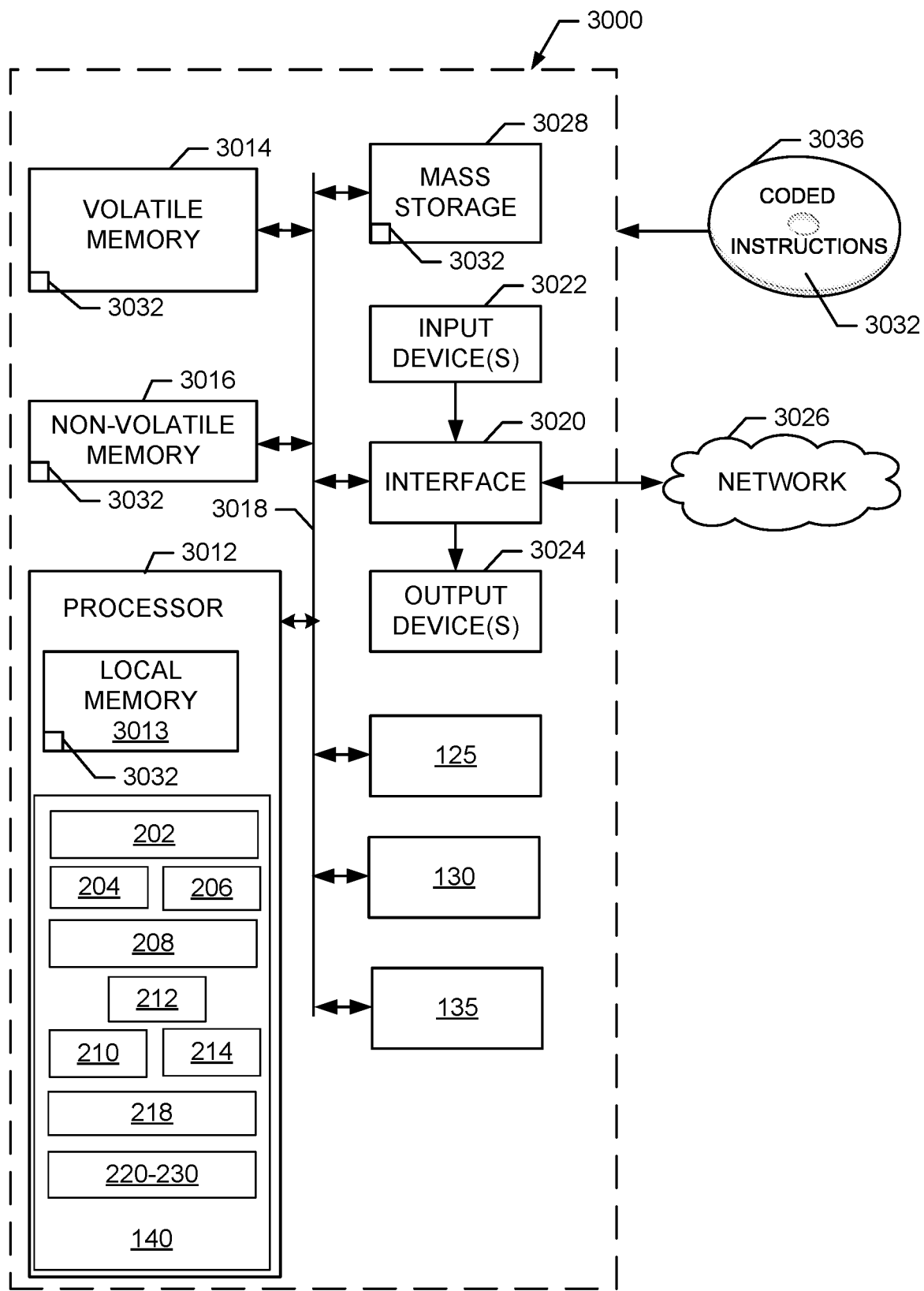
FIG. 30 is a block diagram of an example processor platform structured to execute the example computer readable instructions of FIG. 18 to implement the example software defined silicon agent of FIGS. 1 and/or 2.

FIG. 30 is a block diagram of an example processor platform 3000 structured to execute the instructions of FIG. 28 to implement the SDSi asset agent 140 of FIGS. 1-9. The processor platform 3000 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box a digital camera, a headset or other wearable device, or any other type of computing device.

The processor platform 3000 of the illustrated example includes a processor 3012. The processor 3012 of the illustrated example is hardware. For example, the processor 3012 can be implemented by one or more integrated circuits, logic circuits, microprocessors, GPUs, DSPs, or controllers from any desired family or manufacturer. The hardware processor 3012 may be a semiconductor based (e.g., silicon based) device. In this example, the processor 3012 implements one or more of the example agent interface 202, the example agent local services 204, the example analytics engine 206, the example communication services 208, the example agent CLI 210, the example agent daemon 212, the example license processor 214, the example agent library 218 and/or the example feature libraries 220-230.

The processor 3012 of the illustrated example includes a local memory 3013 (e.g., a cache). The processor 3012 of the illustrated example is in communication with a main memory including a volatile memory 3014 and a non-volatile memory 3016 via a link 3018. The link 3018 may be implemented by a bus, one or more point-to-point connections, etc., or a combination thereof. The volatile memory 3014 may be implemented by SDRAM, DRAM, RDRAM® and/or any other type of random access memory device. The non-volatile memory 3016 may be implemented by flash memory and/or any other desired type of memory device. Access to the main memory 3014, 3016 is controlled by a memory controller.

The processor platform 3000 of the illustrated example also includes an interface circuit 3020. The interface circuit 3020 may be implemented by any type of interface standard, such as an Ethernet interface, a USB, a Bluetooth® interface, an NFC interface, and/or a PCI express interface.

In the illustrated example, one or more input devices 3022 are connected to the interface circuit 3020. The input device(s) 3022 permit(s) a user to enter data and/or commands into the processor 3012. The input device(s) can be implemented by, for example, an audio sensor, a microphone, a camera (still or video), a keyboard, a button, a mouse, a touchscreen, a track-pad, a trackball, a trackbar (such as an isopoint), a voice recognition system and/or any other human-machine interface. Also, many systems, such as the processor platform 3000, can allow the user to control the computer system and provide data to the computer using physical gestures, such as, but not limited to, hand or body movements, facial expressions, and face recognition.

One or more output devices 3024 are also connected to the interface circuit 3020 of the illustrated example. The output devices 3024 can be implemented, for example, by display devices (e.g., an LED, an OLED, an LCD, a CRT display, an IPS display, a touchscreen, etc.), a tactile output device, a printer and/or speakers(s). The interface circuit 3020 of the illustrated example, thus, typically includes a graphics driver card, a graphics driver chip and/or a graphics driver processor.

The interface circuit 3020 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 3026. The communication can be via, for example, an Ethernet connection, a DSL connection, a telephone line connection, a coaxial cable system, a satellite system, a line-of-site wireless system, a cellular telephone system, etc.

The processor platform 3000 of the illustrated example also includes one or more mass storage devices 3028 for storing software and/or data. Examples of such mass storage devices 3028 include floppy disk drives, hard drive disks, compact disk drives, Blu-ray disk drives, RAID systems, and DVD drives.

The machine executable instructions 3032 corresponding to the instructions of FIG. 18 may be stored in the mass storage device 3028, in the volatile memory 3014, in the non-volatile memory 3016, in the local memory 3013 and/or on a removable non-transitory computer readable storage medium, such as a CD or DVD 3036.

Figure 31:
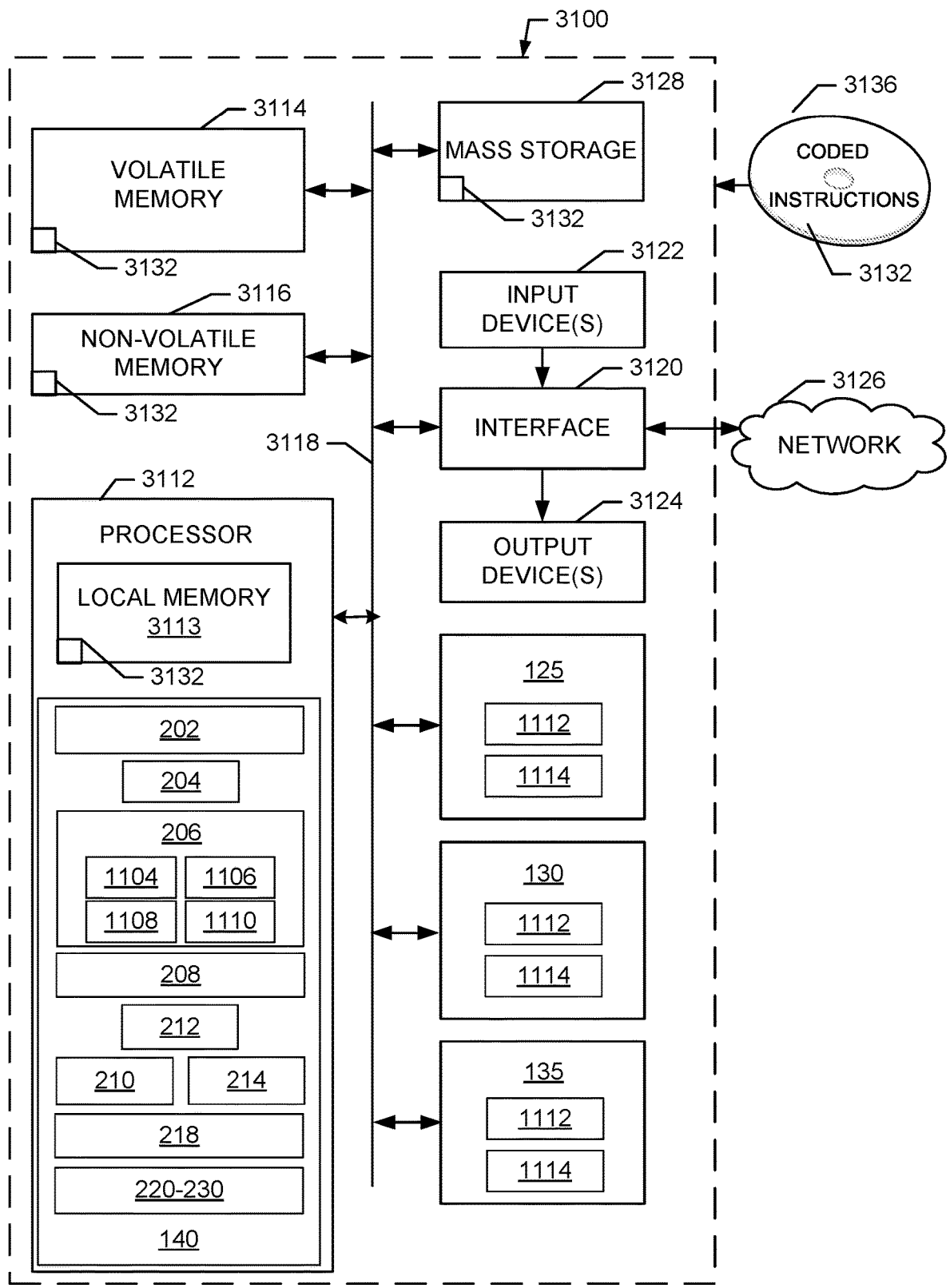
FIG. 31 is a block diagram of an example processor platform structured to execute the example computer readable instructions of FIGS. 19, 20, 21, 22, and/or 25 to implement the example software defined silicon agent of FIGS. 10, 11, and/or 12.

FIG. 31 is a block diagram of an example processor platform 3100 structured to execute the instructions of FIGS. 19-22 and/or 25 to implement the SDSi asset agent 140 of FIGS. 1-9 and/or the SDSi asset agent 140A-C of FIGS. 10-12. The processor platform 3100 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box a digital camera, a headset or other wearable device, or any other type of computing device.

The processor platform 3100 of the illustrated example includes a processor 3112. The processor 3112 of the illustrated example is hardware. For example, the processor 3112 can be implemented by one or more integrated circuits, logic circuits, microprocessors, GPUs, DSPs, or controllers from any desired family or manufacturer. The hardware processor 3112 may be a semiconductor based (e.g., silicon based) device. In this example, the processor 3112 implements one or more of the example agent interface 202, the example agent local services 204, the example analytics engine 206, the example communication services 208, the example agent CLI 210, the example agent daemon 212, the example license processor 214, the example agent library 218, the example feature libraries 220-230, the example trusted agent determiner 1104, the example certificate validator 1106, the example anomaly detector 1108, the example anomaly detection ML model(s) 1110, the example feature intent determiner 1112, and/or the example feature intent ML model(s) 1114.

The processor 3112 of the illustrated example includes a local memory 3113 (e.g., a cache). The processor 3112 of the illustrated example is in communication with a main memory including a volatile memory 3114 and a non-volatile memory 3116 via a link 3118. The link 3118 may be implemented by a bus, one or more point-to-point connections, etc., or a combination thereof. The volatile memory 3114 may be implemented by SDRAM, DRAM, RDRAM® and/or any other type of random access memory device. The non-volatile memory 3116 may be implemented by flash memory and/or any other desired type of memory device. Access to the main memory 3114, 3116 is controlled by a memory controller.

The processor platform 3100 of the illustrated example also includes an interface circuit 3120. The interface circuit 3120 may be implemented by any type of interface standard, such as an Ethernet interface, a USB, a Bluetooth® interface, an NFC interface, and/or a PCI express interface.

In the illustrated example, one or more input devices 3122 are connected to the interface circuit 3120. The input device(s) 3122 permit(s) a user to enter data and/or commands into the processor 3112. The input device(s) can be implemented by, for example, an audio sensor, a microphone, a camera (still or video), a keyboard, a button, a mouse, a touchscreen, a track-pad, a trackball, a trackbar (such as an isopoint), a voice recognition system and/or any other human-machine interface. Also, many systems, such as the processor platform 3100, can allow the user to control the computer system and provide data to the computer using physical gestures, such as, but not limited to, hand or body movements, facial expressions, and face recognition.

One or more output devices 3124 are also connected to the interface circuit 3120 of the illustrated example. The output devices 3124 can be implemented, for example, by display devices (e.g., an LED, an OLED, an LCD, a CRT display, an IPS display, a touchscreen, etc.), a tactile output device, a printer and/or speakers(s). The interface circuit 3120 of the illustrated example, thus, typically includes a graphics driver card, a graphics driver chip and/or a graphics driver processor.

The interface circuit 3120 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 3126. The communication can be via, for example, an Ethernet connection, a DSL connection, a telephone line connection, a coaxial cable system, a satellite system, a line-of-site wireless system, a cellular telephone system, etc.

The processor platform 3100 of the illustrated example also includes one or more mass storage devices 3128 for storing software and/or data. Examples of such mass storage devices 3128 include floppy disk drives, hard drive disks, compact disk drives, Blu-ray disk drives, RAID systems, and DVD drives.

The machine executable instructions 3132 corresponding to the instructions of FIG. 19-22 and/or 25 may be stored in the mass storage device 3128, in the volatile memory 3114, in the non-volatile memory 3116, in the local memory 3113 and/or on a removable non-transitory computer readable storage medium, such as a CD or DVD 3136.

Figure 32:
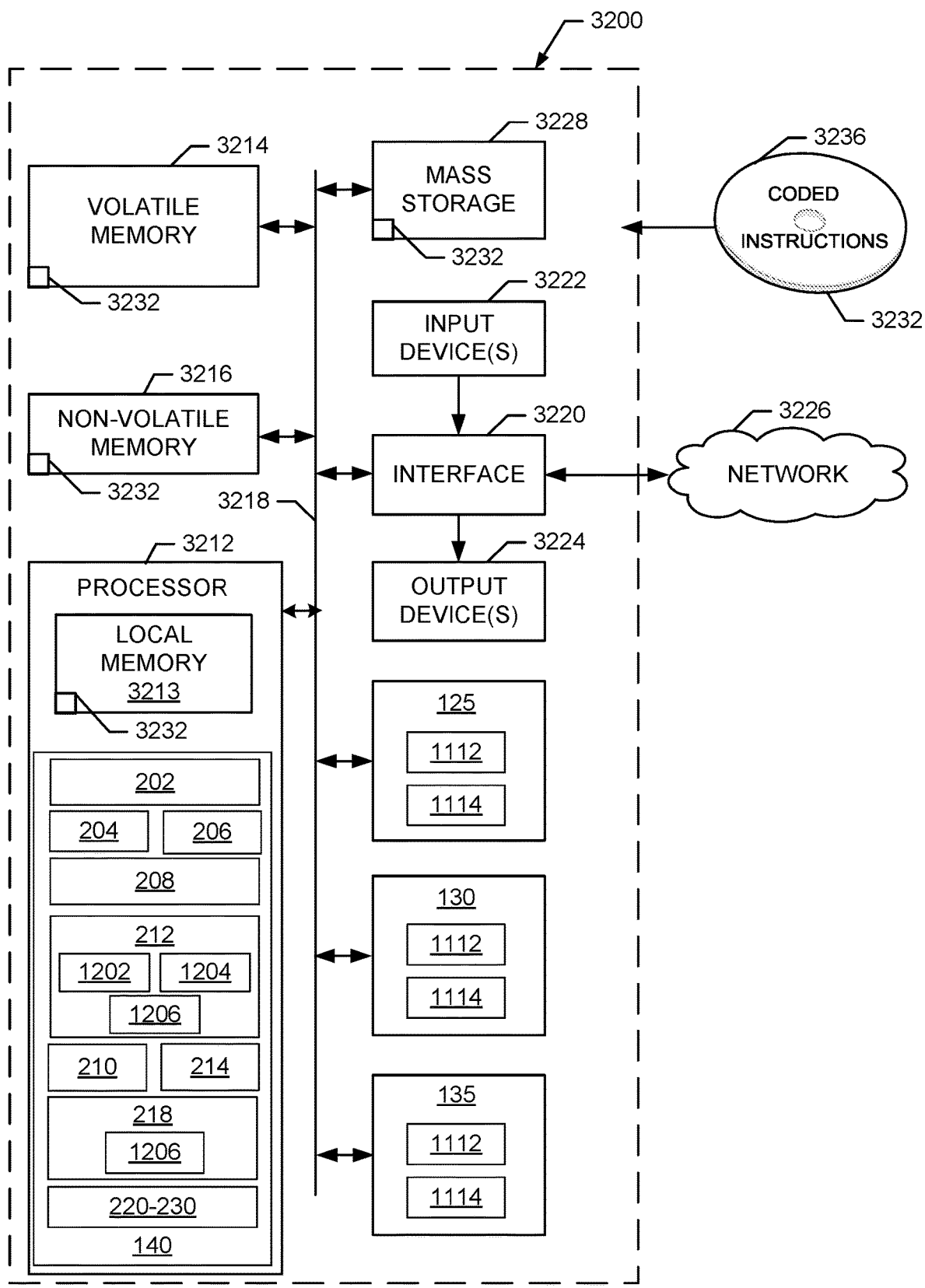
FIG. 32 is a block diagram of an example processor platform structured to execute the example computer readable instructions of FIGS. 23, 24, and/or 25 to implement the example software defined silicon agent of FIGS. 10, 11, and/or 12.

FIG. 32 is a block diagram of an example processor platform 3200 structured to execute the instructions of FIGS. 23, 24, and/or 25 to implement the SDSi asset agent 140 of FIGS. 1-9 and/or the SDSi asset agent 140A-C of FIGS. 10-12. The processor platform 3200 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box a digital camera, a headset or other wearable device, or any other type of computing device.

The processor platform 3200 of the illustrated example includes a processor 3212. The processor 3212 of the illustrated example is hardware. For example, the processor 3212 can be implemented by one or more integrated circuits, logic circuits, microprocessors, GPUs, DSPs, or controllers from any desired family or manufacturer. The hardware processor 3212 may be a semiconductor based (e.g., silicon based) device. In this example, the processor 3212 implements one or more of the example agent interface 202, the example agent local services 204, the example analytics engine 206, the example communication services 208, the example agent CLI 210, the example agent daemon 212, the example license processor 214, the example agent library 218, the example feature libraries 220-230, the example TEE identifier 1202, the example TEE generator 1204, the example TEE(s) 1205, the example TEE library 1206, the example feature intent determiner 1112, and/or the example feature intent ML model(s) 1114.

The processor 3212 of the illustrated example includes a local memory 3213 (e.g., a cache). The processor 3212 of the illustrated example is in communication with a main memory including a volatile memory 3214 and a non-volatile memory 3216 via a link 3218. The link 3218 may be implemented by a bus, one or more point-to-point connections, etc., or a combination thereof. The volatile memory 3214 may be implemented by SDRAM, DRAM, RDRAM® and/or any other type of random access memory device. The non-volatile memory 3216 may be implemented by flash memory and/or any other desired type of memory device. Access to the main memory 3214, 3216 is controlled by a memory controller. In this example, respective ones of the hardware circuitry 125, the firmware 130, and the BIOS 135 include the example TEE component(s) 1208.

The processor platform 3200 of the illustrated example also includes an interface circuit 3220. The interface circuit 3220 may be implemented by any type of interface standard, such as an Ethernet interface, a USB, a Bluetooth® interface, an NFC interface, and/or a PCI express interface.

In the illustrated example, one or more input devices 3222 are connected to the interface circuit 3220. The input device(s) 3222 permit(s) a user to enter data and/or commands into the processor 3212. The input device(s) can be implemented by, for example, an audio sensor, a microphone, a camera (still or video), a keyboard, a button, a mouse, a touchscreen, a track-pad, a trackball, a trackbar (such as an isopoint), a voice recognition system and/or any other human-machine interface. Also, many systems, such as the processor platform 3200, can allow the user to control the computer system and provide data to the computer using physical gestures, such as, but not limited to, hand or body movements, facial expressions, and face recognition.

One or more output devices 3224 are also connected to the interface circuit 3220 of the illustrated example. The output devices 3224 can be implemented, for example, by display devices (e.g., an LED, an OLED, an LCD, a CRT display, an IPS display, a touchscreen, etc.), a tactile output device, a printer and/or speakers(s). The interface circuit 3220 of the illustrated example, thus, typically includes a graphics driver card, a graphics driver chip and/or a graphics driver processor.

The interface circuit 3220 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 3226. The communication can be via, for example, an Ethernet connection, a DSL connection, a telephone line connection, a coaxial cable system, a satellite system, a line-of-site wireless system, a cellular telephone system, etc.

The processor platform 3200 of the illustrated example also includes one or more mass storage devices 3228 for storing software and/or data. Examples of such mass storage devices 3228 include floppy disk drives, hard drive disks, compact disk drives, Blu-ray disk drives, RAID systems, and DVD drives.

The machine executable instructions 3232 corresponding to the instructions of FIG. 19-22 and/or 25 may be stored in the mass storage device 3228, in the volatile memory 3214, in the non-volatile memory 3216, in the local memory 3213 and/or on a removable non-transitory computer readable storage medium, such as a CD or DVD 3236.

Figure 33:
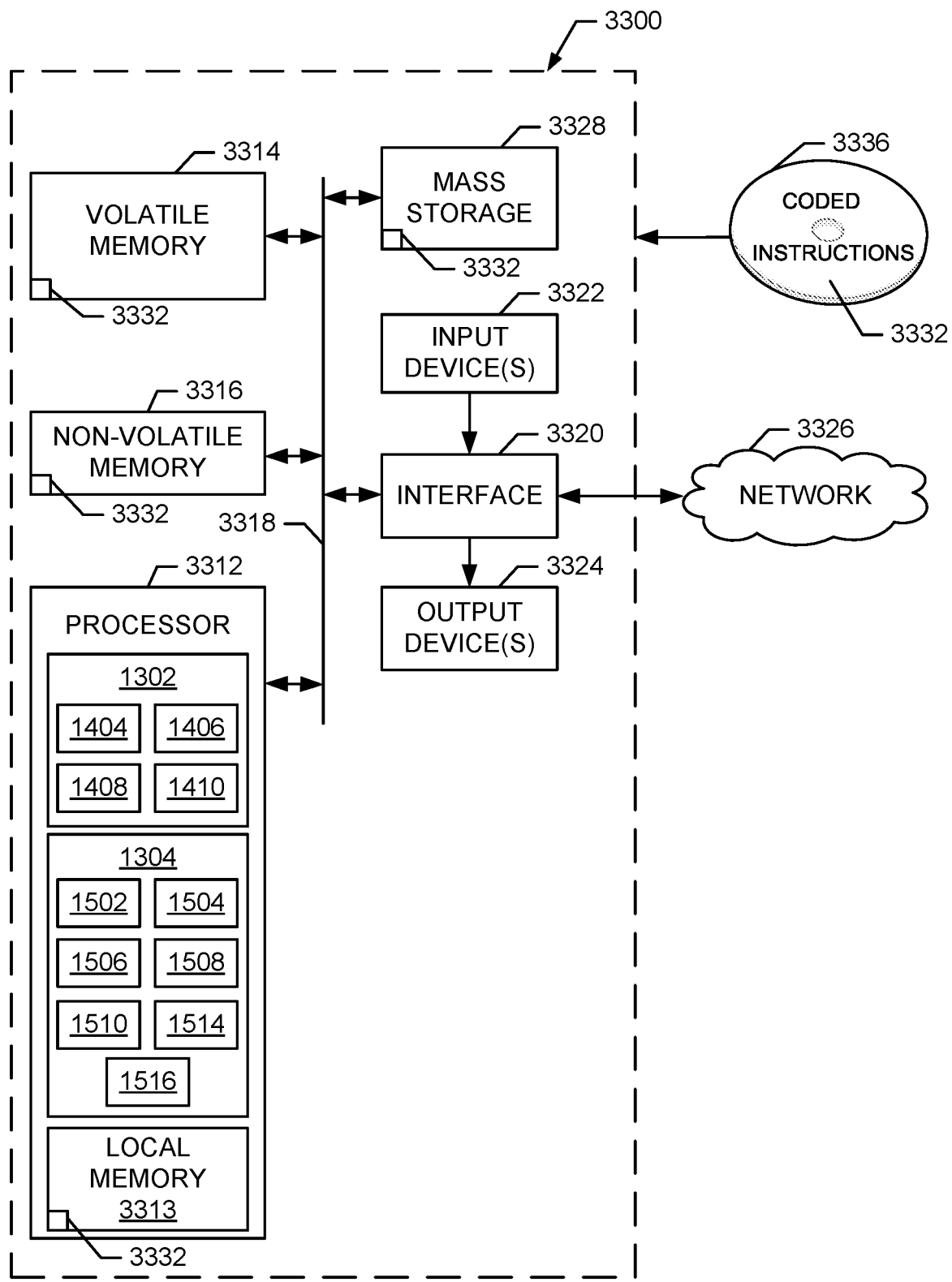
FIG. 33 is a block diagram of an example processor platform structured to execute the example computer readable instructions of FIGS. 26 and/or 27 to implement the example system of FIGS. 13, 14, and/or 15.

FIG. 33 is a block diagram of an example processor platform 3300 structured to execute the instructions of FIGS. 26-27 to implement the time calculator 1302 and feature group calculator 1304 of FIGS. 13-15. The processor platform 3300 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a Blu-ray player, a gaming console, a personal video recorder, a headset or other wearable device, or any other type of computing device.

The processor platform 3300 of the illustrated example includes a processor 3312. The processor 3312 of the illustrated example is hardware. For example, the processor 3312 can be implemented by one or more integrated circuits, logic circuits, microprocessors, GPUs, DSPs, or controllers from any desired family or manufacturer. The hardware processor may be a semiconductor based (e.g., silicon based) device. In this example, the processor 3312 implements the example time calculator 1302, the example feature group calculator 1304, the example request interface 1404, the example property checker 1406, the relative time determiner 1408, the absolute determiner 1410, the example configuration detector 1502, the example sensor interface 1504, the example environmental condition determiner 1506, the example feature weight determiner 1508, the example group score calculator 1510, the example threshold comparator 1514, and/or the example configuration controller 1516.

The processor 3312 of the illustrated example includes a local memory 3313 (e.g., a cache). The processor 3312 of the illustrated example is in communication with a main memory including a volatile memory 3314 and a non-volatile memory 3316 via a bus 3318. The volatile memory 3314 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 3316 may be implemented by flash memory and/or any other desired type of memory device. Access to the main memory 3314, 3316 is controlled by a memory controller.

The processor platform 3300 of the illustrated example also includes an interface circuit 3320. The interface circuit 3320 may be implemented by any type of interface standard, such as an Ethernet interface, a universal serial bus (USB), a Bluetooth® interface, a near field communication (NFC) interface, and/or a PCI express interface.

In the illustrated example, one or more input devices 3322 are connected to the interface circuit 3320. The input device(s) 3322 permit(s) a user to enter data and/or commands into the processor 3312. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 3324 are also connected to the interface circuit 3320 of the illustrated example. The output devices 3324 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 3320 of the illustrated example, thus, typically includes a graphics driver card, a graphics driver chip and/or a graphics driver processor.

The interface circuit 3320 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 3326. The communication can be via, for example, an Ethernet connection, a digital subscriber line (DSL) connection, a telephone line connection, a coaxial cable system, a satellite system, a line-of-site wireless system, a cellular telephone system, etc.

The processor platform 3300 of the illustrated example also includes one or more mass storage devices 3328 for storing software and/or data. Examples of such mass storage devices 3328 include floppy disk drives, hard drive disks, compact disk drives, Blu-ray disk drives, redundant array of independent disks (RAID) systems, and digital versatile disk (DVD) drives.

The machine executable instructions 3332 of FIGS. 26 and 27 may be stored in the mass storage device 3328, in the volatile memory 3314, in the non-volatile memory 3316, and/or on a removable non-transitory computer readable storage medium such as a CD or DVD.

Figure 34:
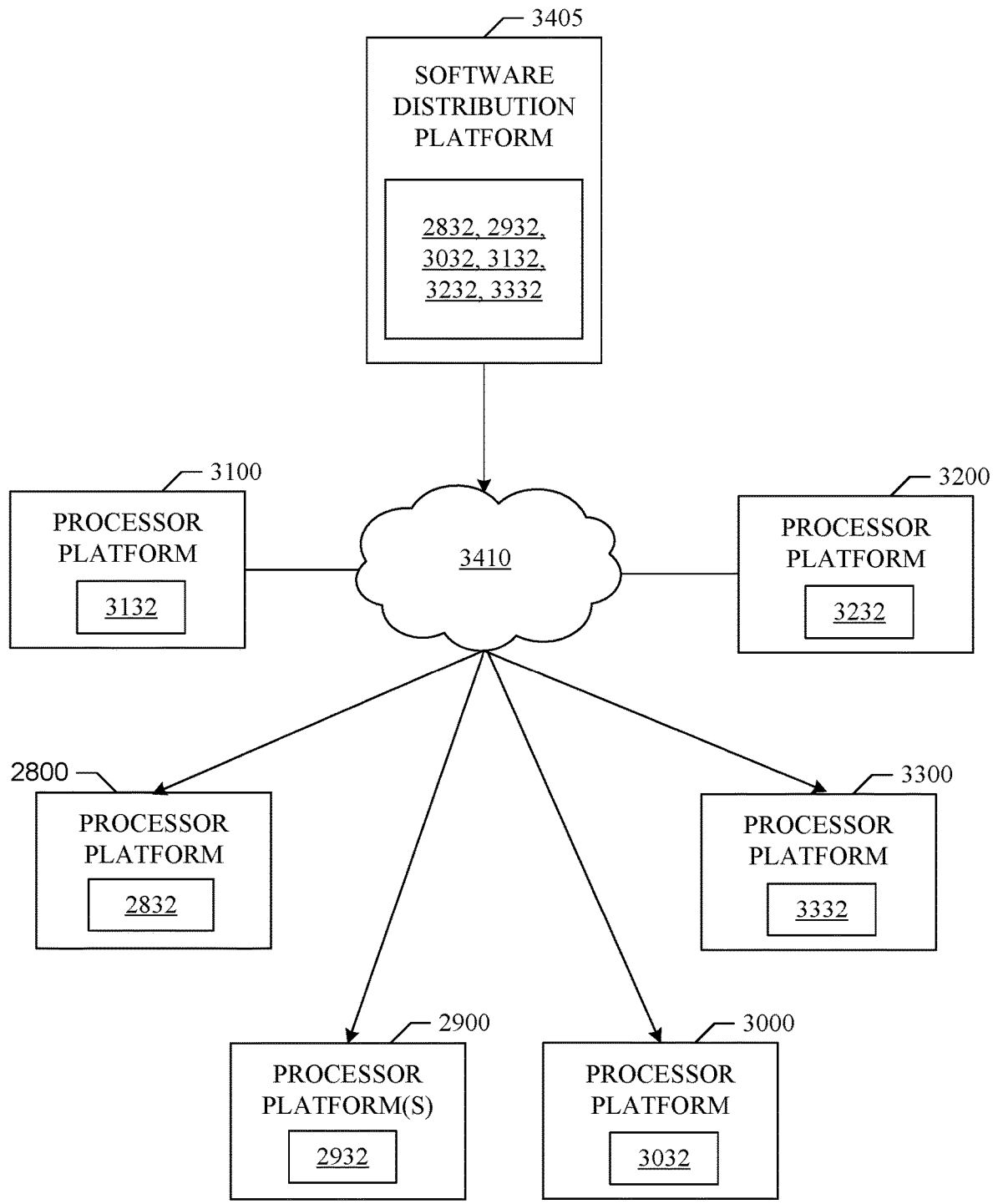
FIG. 34 is a block diagram of an example software distribution platform to distribute software (e.g., software corresponding to the example computer readable instructions of FIGS. 16, 17, 18, 19, 20, 21, 22, 23, 24, 25, 26 and/or 27) to client devices such as consumers (e.g., for license, sale and/or use), retailers (e.g., for sale, re-sale, license, and/or sub-license), and/or original equipment manufacturers (OEMs) (e.g., for inclusion in products to be distributed to, for example, retailers and/or to direct buy customers).

A block diagram illustrating an example software distribution platform 3405 to distribute software such as the example computer readable instructions 2832, 2932, 3032, 3132, 3232 and/or 3332 of FIGS. 28-30, FIGS. 31-32 and FIG. 33 to third parties is illustrated in FIG. 34. The example software distribution platform 3405 may be implemented by any computer server, data facility, cloud service, etc., capable of storing and transmitting software to other computing devices. The third parties may be customers of the entity owning and/or operating the software distribution platform. For example, the entity that owns and/or operates the software distribution platform may be a developer, a seller, and/or a licensor of software such as the example computer readable instructions 2832, 2932, 3032, 3132, 3232 and/or 3332 of FIGS. 28-30, FIGS. 31-32 and FIG. 33. The third parties may be consumers, users, retailers, OEMs, etc., who purchase and/or license the software for use and/or re-sale and/or sub-licensing. In the illustrated example, the software distribution platform 3405 includes one or more servers and one or more storage devices. The storage devices store the computer readable instructions 2832, 2932, 3032, 3132, 3232 and/or 3332, which may correspond to the example computer readable instructions 1600, 1700, 1800, 1900, 2000, 2100, 2200, 2300, 2400, 2500, 2600 and/or 2700 of FIGS. 16-18, FIGS. 19-25 and FIGS. 26-27, as described above. The one or more servers of the example software distribution platform 3405 are in communication with a network 3410, which may correspond to any one or more of the Internet and/or any of the example networks described above. In some examples, the one or more servers are responsive to requests to transmit the software to a requesting party as part of a commercial transaction. Payment for the delivery, sale and/or license of the software may be handled by the one or more servers of the software distribution platform and/or via a third party payment entity. The servers enable purchasers and/or licensors to download the computer readable instructions 2832, 2932, 3032, 3132, 3232 and/or 3332 from the software distribution platform 3405. For example, the software, which may correspond to the example computer readable instructions 1600, 1700, 1800, 1900, 2000, 2100, 2200, 2300, 2400, 2500, 2600 and/or 2700 of FIGS. 16-18, FIGS. 19-25 and FIGS. 26-27, may be downloaded to the example processor platforms 2800, 2900, 3000, 3100, 3200 and/or 3300, which execute the computer readable instructions 2832, 2932, 3032, 3132, 3232 and/or 3332 to implement the manufacture enterprise system 110, the customer enterprise system 115, the SDSi asset agent 140, the SDSi asset agent 140A-C, the time calculator 1302 and/or feature group calculator 1304. In some example, one or more servers of the software distribution platform 3405 periodically offer, transmit, and/or force updates to the software (e.g., the example computer readable instructions 2832, 2932, 3032, 3132, 3232 and/or 3332 of FIGS. 28-30, 31-32 and 33) to ensure improvements, patches, updates, etc. are distributed and applied to the software at the end user devices.

Edge Computing

Figure 35:
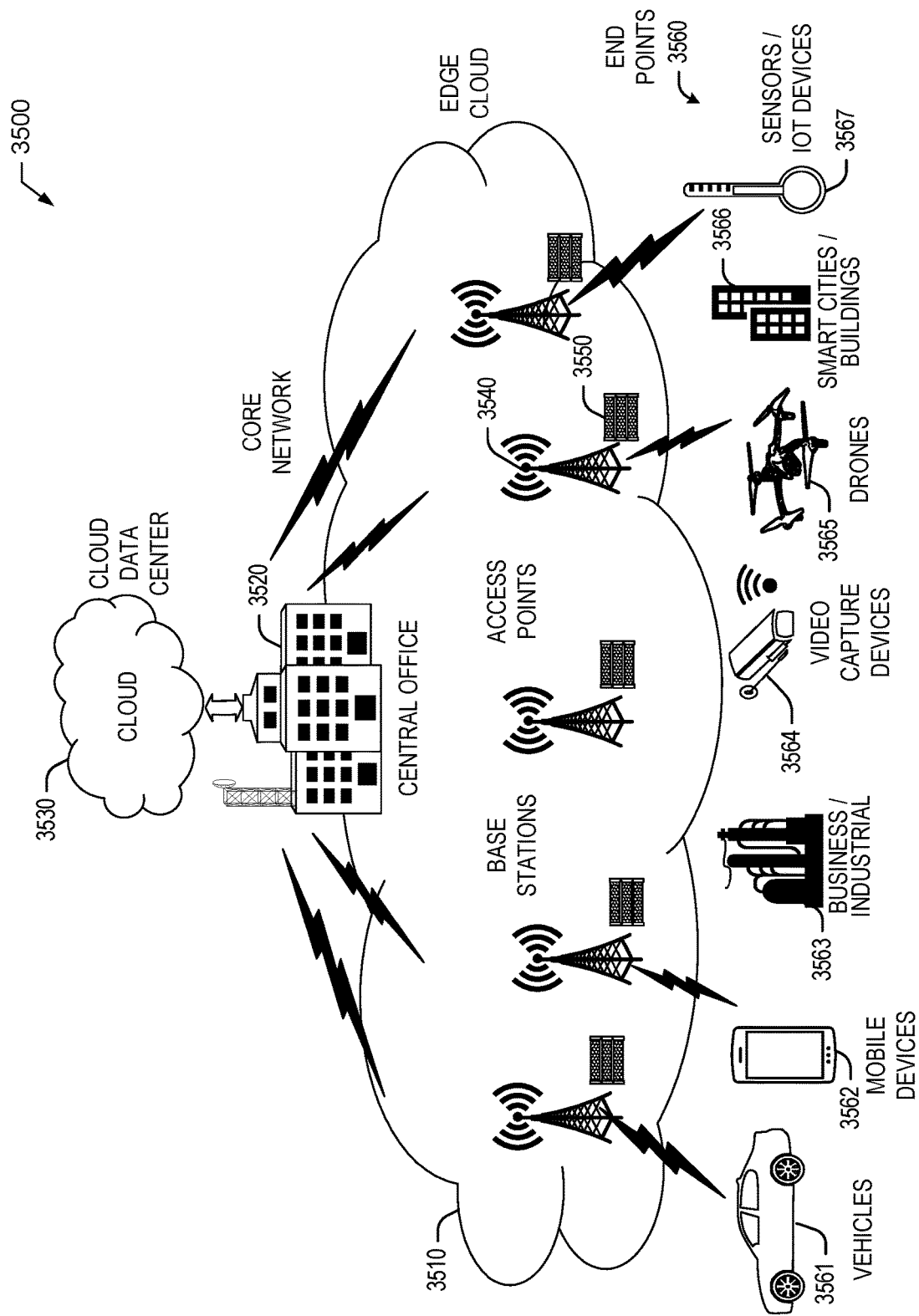
FIG. 35 illustrates an overview of an edge cloud configuration for edge computing.

FIG. 35 is a block diagram 3500 showing an overview of a configuration for edge computing, which includes a layer of processing referred to in many of the following examples as an "edge cloud". As shown, the edge cloud 3510 is co-located at an edge location, such as an access point or base station 3540, a local processing hub 3550, or a central office 3520, and thus may include multiple entities, devices, and equipment instances. The edge cloud 3510 is located much closer to the endpoint (consumer and producer) data sources 3560 (e.g., autonomous vehicles 3561, user equipment 3562, business and industrial equipment 3563, video capture devices 3564, drones 3565, smart cities and building devices 3566, sensors and IoT devices 3567, etc.) than the cloud data center 3530. Compute, memory, and storage resources which are offered at the edges in the edge cloud 3510 are critical to providing ultra-low latency response times for services and functions used by the endpoint data sources 3560 as well as reduce network backhaul traffic from the edge cloud 3510 toward cloud data center 3530 thus improving energy consumption and overall network usages among other benefits.

Compute, memory, and storage are scarce resources, and generally decrease depending on the edge location (e.g., fewer processing resources being available at consumer endpoint devices, than at a base station, than at a central office). However, the closer that the edge location is to the endpoint (e.g., user equipment (UE)), the more that space and power is often constrained. Thus, edge computing attempts to reduce the amount of resources needed for network services, through the distribution of more resources which are located closer both geographically and in network access time. In this manner, edge computing attempts to bring the compute resources to the workload data where appropriate, or, bring the workload data to the compute resources.

The following describes aspects of an edge cloud architecture that covers multiple potential deployments and addresses restrictions that some network operators or service providers may have in their own infrastructures. These include, variation of configurations based on the edge location (because edges at a base station level, for instance, may have more constrained performance and capabilities in a multi-tenant scenario); configurations based on the type of compute, memory, storage, fabric, acceleration, or like resources available to edge locations, tiers of locations, or groups of locations; the service, security, and management and orchestration capabilities; and related objectives to achieve usability and performance of end services. These deployments may accomplish processing in network layers that may be considered as "near edge", "close edge", "local edge", "middle edge", or "far edge" layers, depending on latency, distance, and timing characteristics.

Edge computing is a developing paradigm where computing is performed at or closer to the "edge" of a network, typically through the use of a compute platform (e.g., x86 or ARM compute hardware architecture) implemented at base stations, gateways, network routers, or other devices which are much closer to endpoint devices producing and consuming the data. For example, edge gateway servers may be equipped with pools of memory and storage resources to perform computation in real-time for low latency use-cases (e.g., autonomous driving or video surveillance) for connected client devices. Or as an example, base stations may be augmented with compute and acceleration resources to directly process service workloads for connected user equipment, without further communicating data via backhaul networks. Or as another example, central office network management hardware may be replaced with standardized compute hardware that performs virtualized network functions and offers compute resources for the execution of services and consumer functions for connected devices. Within edge computing networks, there may be scenarios in services which the compute resource will be "moved" to the data, as well as scenarios in which the data will be "moved" to the compute resource. Or as an example, base station compute, acceleration and network resources can provide services in order to scale to workload demands on an as needed basis by activating dormant capacity (subscription, capacity on demand) in order to manage corner cases, emergencies or to provide longevity for deployed resources over a significantly longer implemented lifecycle.

Figure 36:
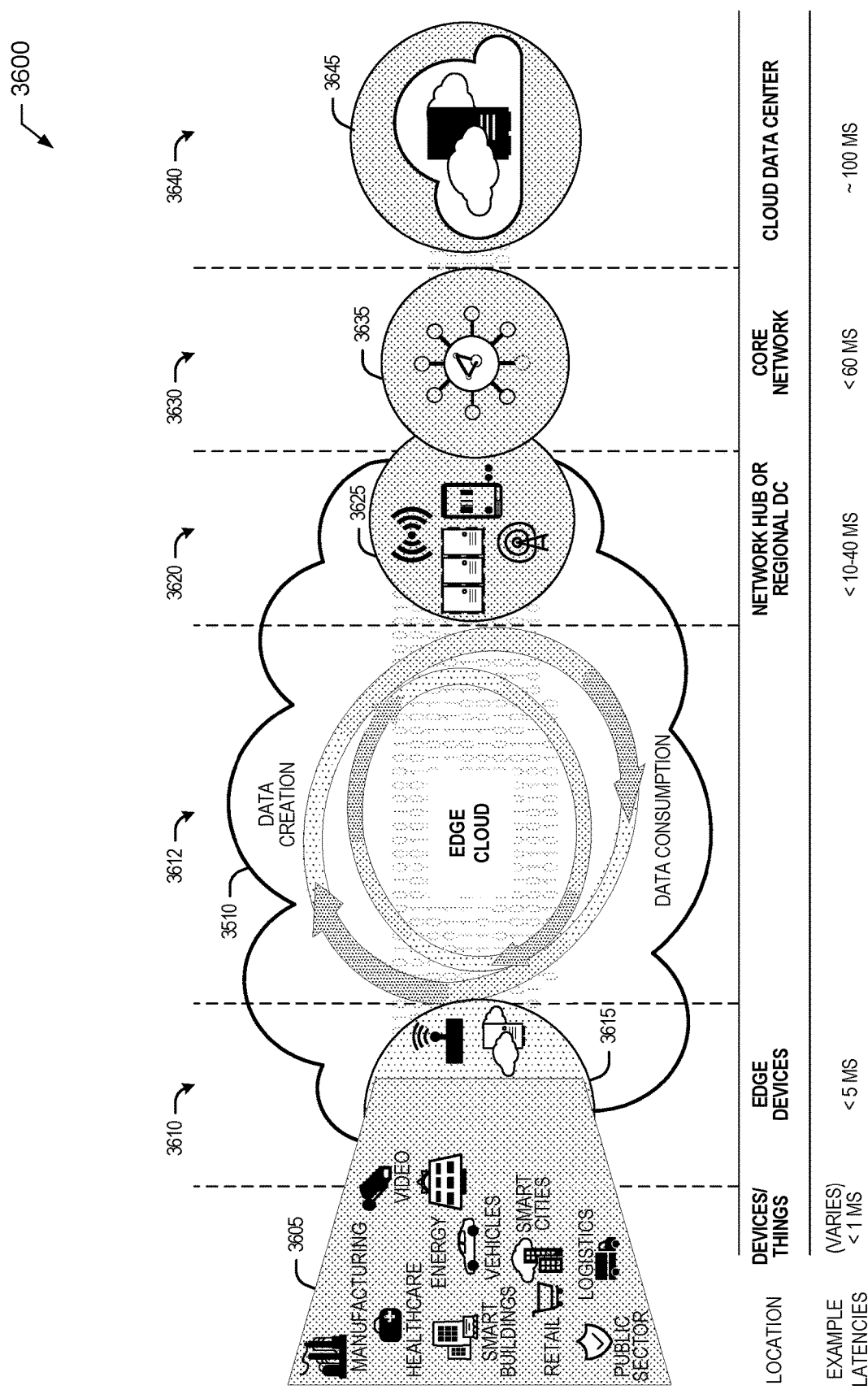
FIG. 36 illustrates operational layers among endpoints, an edge cloud, and cloud computing environments.

FIG. 36 illustrates operational layers among endpoints, an edge cloud, and cloud computing environments. Specifically, FIG. 36 depicts examples of computational use cases 3605, utilizing the edge cloud 3510 among multiple illustrative layers of network computing. The layers begin at an endpoint (devices and things) layer 3600, which accesses the edge cloud 3510 to conduct data creation, analysis, and data consumption activities. The edge cloud 3510 may span multiple network layers, such as an edge devices layer 3610 having gateways, on-premise servers, or network equipment (nodes 3615) located in physically proximate edge systems; a network access layer 3620, encompassing base stations, radio processing units, network hubs, regional data centers (DC), or local network equipment (equipment 3625); and any equipment, devices, or nodes located therebetween (in layer 3612, not illustrated in detail). The network communications within the edge cloud 3510 and among the various layers may occur via any number of wired or wireless mediums, including via connectivity architectures and technologies not depicted.

Examples of latency, resulting from network communication distance and processing time constraints, may range from less than a millisecond (ms) when among the endpoint layer 3600, under 5 ms at the edge devices layer 3610, to even between 10 to 40 ms when communicating with nodes at the network access layer 3620. Beyond the edge cloud 3510 are core network 3630 and cloud data center 3640 layers, each with increasing latency (e.g., between 50-60 ms at the core network layer 3630, to 100 or more ms at the cloud data center layer). As a result, operations at a core network data center 3635 or a cloud data center 3645, with latencies of at least 50 to 100 ms or more, will not be able to accomplish many time-critical functions of the use cases 3605. Each of these latency values are provided for purposes of illustration and contrast; it will be understood that the use of other access network mediums and technologies may further reduce the latencies. In some examples, respective portions of the network may be categorized as "close edge", "local edge", "near edge", "middle edge", or "far edge" layers, relative to a network source and destination. For instance, from the perspective of the core network data center 3635 or a cloud data center 3645, a central office or content data network may be considered as being located within a "near edge" layer ("near" to the cloud, having high latency values when communicating with the devices and endpoints of the use cases 3605), whereas an access point, base station, on-premise server, or network gateway may be considered as located within a "far edge" layer ("far" from the cloud, having low latency values when communicating with the devices and endpoints of the use cases 3605). It will be understood that other categorizations of a particular network layer as constituting a "close", "local", "near", "middle", or "far" edge may be based on latency, distance, number of network hops, or other measurable characteristics, as measured from a source in any of the network layers 3600-3640.

The various use cases 3605 may access resources under usage pressure from incoming streams, due to multiple services utilizing the edge cloud. To achieve results with low latency, the services executed within the edge cloud 3510 balance varying requirements in terms of: (a) Priority (throughput or latency) and Quality of Service (QoS) (e.g., traffic for an autonomous car may have higher priority than a temperature sensor in terms of response time requirement; or, a performance sensitivity/bottleneck may exist at a compute/accelerator, memory, storage, or network resource, depending on the application); (b) Reliability and Resiliency (e.g., some input streams need to be acted upon and the traffic routed with mission-critical reliability, where as some other input streams may be tolerate an occasional failure, depending on the application); and (c) Physical constraints (e.g., power, cooling and form-factor).

The end-to-end service view for these use cases involves the concept of a service-flow and is associated with a transaction. The transaction details the overall service requirement for the entity consuming the service, as well as the associated services for the resources, workloads, workflows, and business functional and business level requirements. The services executed with the "terms" described may be managed at each layer in a way to assure real time, and runtime contractual compliance for the transaction during the lifecycle of the service. When a component in the transaction is missing its agreed to SLA, the system as a whole (components in the transaction) may provide the ability to (1) understand the impact of the SLA violation, and (2) augment other components in the system to resume overall transaction SLA, and (3) implement steps to remediate.

Thus, with these variations and service features in mind, edge computing within the edge cloud 3510 may provide the ability to serve and respond to multiple applications of the use cases 3605 (e.g., object tracking, video surveillance, connected cars, etc.) in real-time or near real-time, and meet ultra-low latency requirements for these multiple applications. These advantages enable a whole new class of applications (Virtual Network Functions (VNFs), Function as a Service (FaaS), Edge as a Service (EaaS), standard processes, etc.), which cannot leverage conventional cloud computing due to latency or other limitations.

However, with the advantages of edge computing comes the following caveats. The devices located at the edge are often resource constrained and therefore there is pressure on usage of edge resources. Typically, this is addressed through the pooling of memory and storage resources for use by multiple users (tenants) and devices. The edge may be power and cooling constrained and therefore the power usage needs to be accounted for by the applications that are consuming the most power. There may be inherent power-performance tradeoffs in these pooled memory resources, as many of them are likely to use emerging memory technologies, where more power requires greater memory bandwidth. Likewise, improved security of hardware and root of trust trusted functions are also required, because edge locations may be unmanned and may even need permissioned access (e.g., when housed in a third-party location). Such issues are magnified in the edge cloud 3510 in a multi-tenant, multi-owner, or multi-access setting, where services and applications are requested by many users, especially as network usage dynamically fluctuates and the composition of the multiple stakeholders, use cases, and services changes.

At a more generic level, an edge computing system may be described to encompass any number of deployments at the previously discussed layers operating in the edge cloud 3510 (network layers 3600-4740), which provide coordination from client and distributed computing devices. One or more edge gateway nodes, one or more edge aggregation nodes, and one or more core data centers may be distributed across layers of the network to provide an implementation of the edge computing system by or on behalf of a telecommunication service provider ("telco", or "TSP"), internet-of-things service provider, cloud service provider (CSP), enterprise entity, or any other number of entities. Various implementations and configurations of the edge computing system may be provided dynamically, such as when orchestrated to meet service objectives.

Consistent with the examples provided herein, a client compute node may be embodied as any type of endpoint component, device, appliance, or other thing capable of communicating as a producer or consumer of data. Further, the label "node" or "device" as used in the edge computing system does not necessarily mean that such node or device operates in a client or agent/minion/follower role; rather, any of the nodes or devices in the edge computing system refer to individual entities, nodes, or subsystems which include discrete or connected hardware or software configurations to facilitate or use the edge cloud 3510.

As such, the edge cloud 3510 is formed from network components and functional features operated by and within edge gateway nodes, edge aggregation nodes, or other edge compute nodes among network layers 3610-4730. The edge cloud 3510 thus may be embodied as any type of network that provides edge computing and/or storage resources which are proximately located to radio access network (RAN) capable endpoint devices (e.g., mobile computing devices, IoT devices, smart devices, etc.), which are discussed herein. In other words, the edge cloud 3510 may be envisioned as an "edge" which connects the endpoint devices and traditional network access points that serve as an ingress point into service provider core networks, including mobile carrier networks (e.g., Global System for Mobile Communications (GSM) networks, Long-Term Evolution (LTE) networks, 5G/6G networks, etc.), while also providing storage and/or compute capabilities. Other types and forms of network access (e.g., Wi-Fi, long-range wireless, wired networks including optical networks) may also be utilized in place of or in combination with such 3GPP carrier networks.

The network components of the edge cloud 3510 may be servers, multi-tenant servers, appliance computing devices, and/or any other type of computing devices. For example, the edge cloud 3510 may include an appliance computing device that is a self-contained electronic device including a housing, a chassis, a case or a shell. In some circumstances, the housing may be dimensioned for portability such that it can be carried by a human and/or shipped. Example housings may include materials that form one or more exterior surfaces that partially or fully protect contents of the appliance, in which protection may include weather protection, hazardous environment protection (e.g., EMI, vibration, extreme temperatures), and/or enable submergibility. Example housings may include power circuitry to provide power for stationary and/or portable implementations, such as AC power inputs, DC power inputs, AC/DC or DC/AC converter(s), power regulators, transformers, charging circuitry, batteries, wired inputs and/or wireless power inputs. Example housings and/or surfaces thereof may include or connect to mounting hardware to enable attachment to structures such as buildings, telecommunication structures (e.g., poles, antenna structures, etc.) and/or racks (e.g., server racks, blade mounts, etc.). Example housings and/or surfaces thereof may support one or more sensors (e.g., temperature sensors, vibration sensors, light sensors, acoustic sensors, capacitive sensors, proximity sensors, etc.). One or more such sensors may be contained in, carried by, or otherwise embedded in the surface and/or mounted to the surface of the appliance. Example housings and/or surfaces thereof may support mechanical connectivity, such as propulsion hardware (e.g., wheels, propellers, etc.) and/or articulating hardware (e.g., robot arms, pivotable appendages, etc.). In some circumstances, the sensors may include any type of input devices such as user interface hardware (e.g., buttons, switches, dials, sliders, etc.). In some circumstances, example housings include output devices contained in, carried by, embedded therein and/or attached thereto. Output devices may include displays, touchscreens, lights, LEDs, speakers, I/O ports (e.g., USB), etc. In some circumstances, edge devices are devices presented in the network for a specific purpose (e.g., a traffic light), but may have processing and/or other capacities that may be utilized for other purposes. Such edge devices may be independent from other networked devices and may be provided with a housing having a form factor suitable for its primary purpose; yet be available for other compute tasks that do not interfere with its primary task. Edge devices include Internet of Things devices. The appliance computing device may include hardware and software components to manage local issues such as device temperature, vibration, resource utilization, updates, power issues, physical and network security, etc. The example processor systems of FIGS. 28 to 33 illustrate example hardware for implementing an appliance computing device. The edge cloud 3510 may also include one or more servers and/or one or more multi-tenant servers. Such a server may include an operating system and a virtual computing environment. A virtual computing environment may include a hypervisor managing (spawning, deploying, destroying, etc.) one or more virtual machines, one or more containers, etc. Such virtual computing environments provide an execution environment in which one or more applications and/or other software, code or scripts may execute while being isolated from one or more other applications, software, code or scripts.

Figure 37:
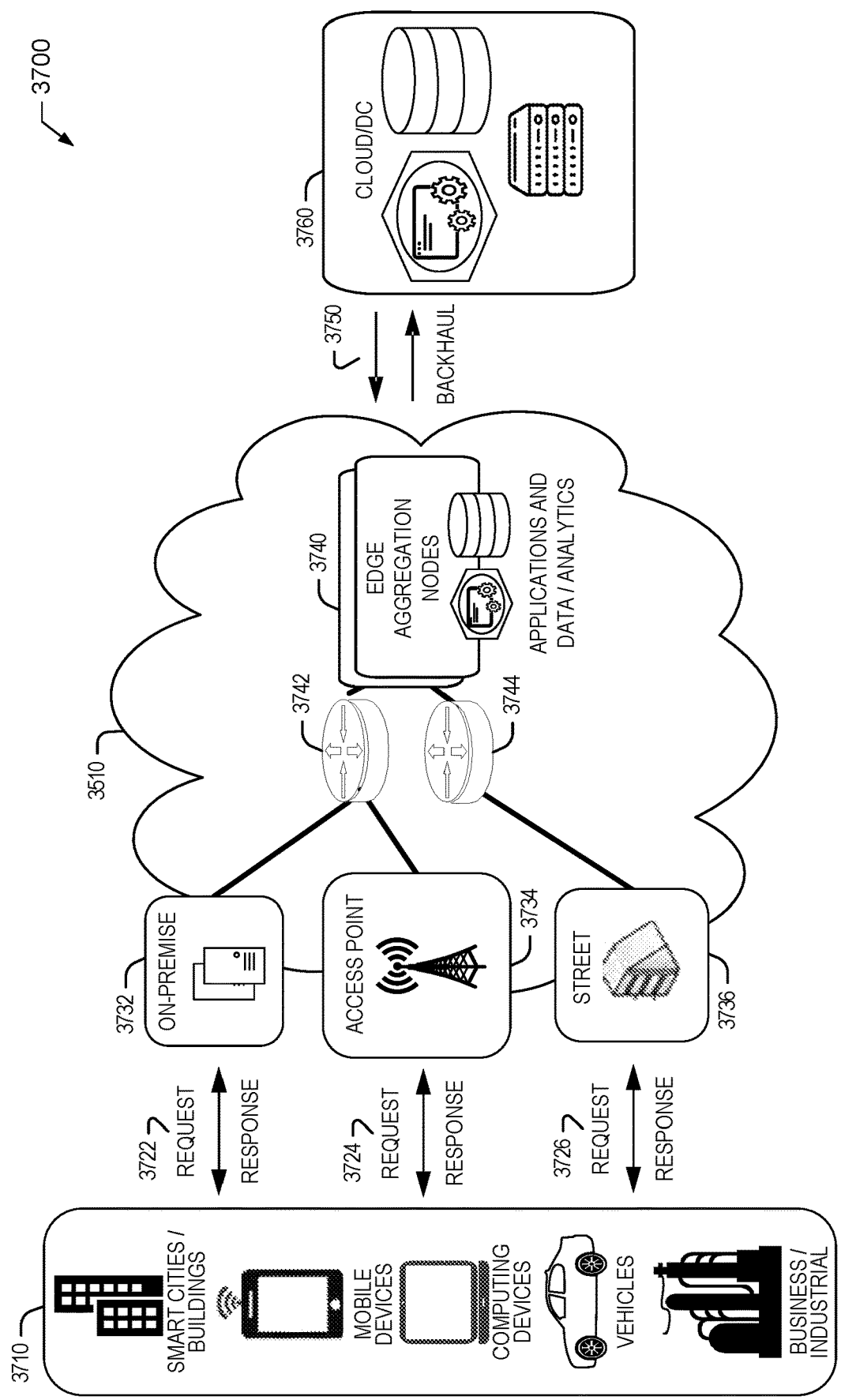
FIG. 37 illustrates an example approach for networking and services in an edge computing system.

In FIG. 37, various client endpoints 3710 (in the form of mobile devices, computers, autonomous vehicles, business computing equipment, industrial processing equipment) exchange requests and responses that are specific to the type of endpoint network aggregation. For instance, client endpoints 3710 may obtain network access via a wired broadband network, by exchanging requests and responses 3722 through an on-premise network system 3732. Some client endpoints 3710, such as mobile computing devices, may obtain network access via a wireless broadband network, by exchanging requests and responses 3724 through an access point (e.g., cellular network tower) 3734. Some client endpoints 3710, such as autonomous vehicles may obtain network access for requests and responses 3726 via a wireless vehicular network through a street-located network system 3736. However, regardless of the type of network access, the TSP may deploy aggregation points 3742, 3744 within the edge cloud 3510 to aggregate traffic and requests. Thus, within the edge cloud 3510, the TSP may deploy various compute and storage resources, such as at edge aggregation nodes 3740, to provide requested content. The edge aggregation nodes 3740 and other systems of the edge cloud 3510 are connected to a cloud or data center 3760, which uses a backhaul network 3750 to fulfill higher-latency requests from a cloud/data center for websites, applications, database servers, etc. Additional or consolidated instances of the edge aggregation nodes 3740 and the aggregation points 3742, 3744, including those deployed on a single server framework, may also be present within the edge cloud 3510 or other areas of the TSP infrastructure.

CONCLUSION

From the foregoing, it will be appreciated that example methods, apparatus and articles of manufacture have been disclosed that enables activation, deactivation and management of silicon product features after the silicon product has left the manufacturer's facility and control. The disclosed methods, apparatus and articles of manufacture improve the efficiency of using a computing device by providing mechanisms to activate dormant features of the silicon product, deactivate active features of the silicon product, perform failure recovery, etc. The disclosed methods, apparatus and articles of manufacture are accordingly directed to one or more improvement(s) in the functioning of a computer.

From the foregoing, it will also be appreciated that example methods, apparatus, and articles of manufacture have been disclosed that effectuate security of silicon product features after the silicon product has left the manufacturer's facility and control. The disclosed methods, apparatus, and articles of manufacture improve the efficiency of using a computing device by providing mechanisms to activate dormant features of the silicon product, deactivate active features of the silicon product, perform failure recovery, etc., corresponding to mesh attestation processes, deployment of TEE(s), and translation of intent(s) or intended outcome(s) associated with configuration change requests into dormant features of which to activate. The disclosed methods, apparatus and articles of manufacture are accordingly directed to one or more improvement(s) in the functioning of a computer.

From the foregoing, it will also be appreciated that example methods, apparatus, and articles of manufacture disclosed herein improve the efficiency of using a computing device by providing mechanisms to activate dormant features of the silicon product, deactivate active features of the silicon product, perform failure recovery, etc., corresponding to an unfalsifiable and reliable method of determining time references and determining feature load on a processor. The disclosed methods, apparatus and articles of manufacture are accordingly directed to one or more improvement(s) in the functioning of a computer.

Example methods, apparatus, systems, and articles of manufacture to provide device enhancements for software defined silicon implementations are disclosed herein. Further examples and combinations thereof include the following:

Example 1 includes an apparatus comprising a request interface to receive a request for a timestamp, a property checker to determine a first value of an electrical property of a feature embedded in a silicon product, the feature having electrical properties that change over time, and a relative time determiner to calculate a relative time between the request and a previous event based on the first value of the electrical property and a second value of the electrical property, the second value of the electrical property associated with the previous event.

Example 2 optionally includes the apparatus of example 1, wherein the feature includes a radioisotope.

Example 3 optionally includes the apparatus of example 1, wherein the feature includes a physical unclonable function.

Example 4 optionally includes the apparatus of any of examples 1-3, wherein the previous event is a time of manufacture of the silicon product.

Example 5 optionally includes the apparatus of any of examples 1-4, further including an absolute time determiner to calculate an absolute time based on the relative time and a recorded time of the previous event.

Example 6 optionally includes the apparatus of any of examples 1-5, wherein the electrical property is at least one of a resistance of the feature or a capacitance of the feature.

Example 7 optionally includes the apparatus of any of examples 1-6, wherein the request is issued by a client enterprise system, the request issued in association with a determination of whether to disable a license.

Example 8 includes a method comprising receiving a request for a timestamp, determining a first value of an electrical property of a feature embedded in a silicon product, the feature having electrical properties that change over time, and calculating a relative time between the request and a previous event based on the first value of the electrical property and a second value of the electrical property, the second value of the electrical property associated with the previous event.

Example 9 optionally includes the method of example 8, wherein the feature includes a radioisotope.

Example 10 optionally includes the method of example 8, wherein the feature includes a physical unclonable function.

Example 11 optionally includes the method of any of examples 8-10, wherein the previous event is a time of manufacture of the silicon product.

Example 12 optionally includes the method of any of examples 8-11, further including calculating an absolute time based on the relative time and a recorded time of the previous event.

Example 13 optionally includes the method of any of examples 8-12, wherein the electrical property is at least one of a resistance of the feature or a capacitance of the feature.

Example 14 optionally includes the method of any of examples 8-13, wherein the request is issued by a client enterprise system, the request issued in association with a determination of whether to disable a license.

Example 15 includes a non-transitory computer readable medium, comprising instructions, which when executed, cause a machine to receive a request for a timestamp, determine a first value of an electrical property of a feature embedded in a silicon product, the feature having electrical properties that change over time, and calculate a relative time between the request and a previous event based on the first value of the electrical property and a second value of the electrical property, the second value of the electrical property associated with the previous event.

Example 16 optionally includes the non-transitory computer readable medium of example 15, wherein the feature includes a radioisotope.

Example 17 optionally includes the non-transitory computer readable medium of example 15, wherein the feature includes a physical unclonable function.

Example 18 optionally includes the non-transitory computer readable medium of any of examples 15-17, wherein the previous event is a time of manufacture of the silicon product.

Example 19 optionally includes the non-transitory computer readable medium of any of examples 15-18, wherein the instructions further cause the machine to calculate an absolute time based on the relative time and a recorded time of the previous event.

Example 20 optionally includes the non-transitory computer readable medium of any of examples 15-19, wherein the electrical property is at least one of a resistance of the feature or a capacitance of the feature.

Example 21 optionally includes the non-transitory computer readable medium of any of examples 15-20, wherein the request is issued by a client enterprise system, the request issued in association with a determination of whether to disable a license.

Example 22 includes an apparatus comprising a configuration detector to detect a configuration change of a silicon product, the configuration change including a first feature and a second feature, a feature weight determiner to determine a first weight associated with the first feature and a second weight associated the second feature, a group score calculator to calculate a first group score based on the first weight and the second weight, and a configuration controller to disable the configuration change if the first group score does not satisfy a first threshold.

Example 23 optionally includes the apparatus of example 22, further including an environmental condition determiner the first group score to determine an environmental score based on an environmental condition of the silicon product, further based on the environmental score.

Example 24 optionally includes the apparatus of examples 23, wherein the environmental score is based on at least one of an ambient temperature, an ambient humidity, or a radiation.

Example 25 optionally includes the apparatus of any of examples 23-24, wherein the environmental score scales linearly relative to the ambient temperature.

Example 26 optionally includes the apparatus of any of examples 22-25, wherein a first feature group includes the first feature and the second feature and a second feature group includes a third feature and a fourth feature, and further including the feature weight determiner to determine a third weight associated with the third feature and a fourth weight associated the fourth feature, the group score calculator to calculate a second group score based on the third weight and the fourth weight, and the configuration controller to disable the configuration change if the second group score does not satisfy a second threshold, the second threshold associated with the second feature group, the first threshold associated with the second feature group.

Example 27 optionally includes the apparatus of any of examples 22-26, wherein the first feature is a number of active processor cores and the second feature is an operational frequency of the active processor cores.

Example 28 optionally includes the apparatus of any of examples 22-27, wherein the configuration controller is further to void a warranty of the silicon product if the first group score exceeds a second threshold.

Example 29 includes a non-transitory computer readable medium comprising instructions, which when executed, cause a machine to at least detect a configuration change of a silicon product, the configuration change including a first feature and a second feature, determine a first weight associated with the first feature and a second weight associated the second feature, calculate a first group score based on the first weight and the second weight, and disable the configuration change if the first group score does not satisfy a first threshold.

Example 30 optionally includes the non-transitory computer readable medium of example 29, wherein the instructions further cause the machine to determine an environmental score based on an environmental condition of the silicon product, the first group score further based on the environmental score.

Example 31 optionally includes the non-transitory computer readable medium of example 30, wherein the environmental score is based on at least one of an ambient temperature, an ambient humidity, or a radiation.

Example 32 optionally includes the non-transitory computer readable medium of any of examples 30-31, wherein the environmental score scales linearly relative to the ambient temperature.

Example 33 optionally includes the non-transitory computer readable medium of any of examples 29-32, wherein a first feature group includes the first feature and the second feature and a second feature group includes a third feature and a fourth feature, and the instructions further cause the machine to determine a third weight associated with the third feature and a fourth weight associated the fourth feature, calculate a second group score based on the third weight and the fourth weight, and disable the configuration change if the second group score does not satisfy a second threshold, the second threshold associated with the second feature group, the first threshold associated with the second feature group.

Example 34 optionally includes the non-transitory computer readable medium of any of examples 29-33, wherein the first feature is a number of active processor cores and the second feature is an operational frequency of the active processor cores.

Example 35 optionally includes the non-transitory computer readable medium of any of examples 29-34, wherein the instructions further cause the machine to void a warranty of the silicon product if the first group score exceeds a second threshold.

Example 36 includes a method comprising detecting a configuration change of a silicon product, the configuration change including a first feature and a second feature, determining a first weight associated with the first feature and a second weight associated the second feature, calculating a first group score based on the first weight and the second weight, and disabling the configuration change if the first group score does not satisfy a first threshold.

Example 37 optionally includes the method of example 36, further including determining an environmental score based on an environmental condition of the silicon product, the first group score further based on the environmental score.

Example 38 optionally includes the method of example 37, wherein the environmental score is based on at least one of an ambient temperature, an ambient humidity, or a radiation.

Example 39 optionally includes the method of any of examples 37-38, wherein the environmental score scales linearly relative to the ambient temperature.

Example 40 optionally includes the method of any of examples 36-39, wherein a first feature group includes the first feature and the second feature and a second feature group includes a third feature and a fourth feature, and further including determining a third weight associated with the third feature and a fourth weight associated the fourth feature, calculating a second group score based on the third weight and the fourth weight, and disabling the configuration change if the second group score does not satisfy a second threshold, the second threshold associated with the second feature group, the first threshold associated with the second feature group.

Example 41 optionally includes the method of any of examples 36-40, wherein the first feature is a number of active processor cores and the second feature is an operational frequency of the active processor cores.

Example 42 optionally includes the method of any of examples 36-41, further including voiding a warranty of the silicon product if the first group score exceeds a second threshold.

Example 43 includes an apparatus comprising means for receiving a request for a timestamp, means for determining a first value of an electrical property of a feature embedded in a silicon product, the feature having electrical properties that change over time, and means calculating a relative time between the request and a previous event based on the first value of the electrical property and a second value of the electrical property, the second value of the electrical property associated with the previous event.

Example 44 optionally includes the apparatus of example 43, wherein the feature includes a radioisotope.

Example 45 optionally includes the apparatus of example 43, wherein the feature includes a physical unclonable function.

Example 46 optionally includes the apparatus of any of examples 43-45, wherein the previous event is a time of manufacture of the silicon product.

Example 47 optionally includes the apparatus of any of examples 43-46, further including calculating an absolute time based on the relative time and a recorded time of the previous event.

Example 48 optionally includes the apparatus of any of examples 43-47, wherein the electrical property is at least one of a resistance of the feature or a capacitance of the feature.

Example 49 optionally includes the apparatus of any of examples 43-48, wherein the request is issued by a client enterprise system, the request issued in association with a determination of whether to disable a license.

Example 50 includes an apparatus comprising means for detecting a configuration change of a silicon product, the configuration change including a first feature and a second feature, means for first determining a first weight associated with the first feature and a second weight associated the second feature, means for calculating a first group score based on the first weight and the second weight, and means for disabling the configuration change if the first group score does not satisfy a first threshold.

Example 51 optionally includes the apparatus of example 50, further including second means for determining an environmental score based on an environmental condition of the silicon product, the first group score further based on the environmental score.

Example 52 optionally includes the apparatus of example 51, wherein the environmental score is based on at least one of an ambient temperature, an ambient humidity, or a radiation.

Example 53 optionally includes the apparatus of any of examples 51-52, wherein the environmental score scales linearly relative to the ambient temperature.

Example 54 optionally includes the apparatus of any of examples 50-53, wherein a first feature group includes the first feature and the second feature and a second feature group includes a third feature and a fourth feature, and further including the first means for determining to determine a third weight associated with the third feature and a fourth weight associated the fourth feature, the means for calculating to calculate a second group score based on the third weight and the fourth weight, and the means for disabling to disable the configuration change if the second group score does not satisfy a second threshold, the second threshold associated with the second feature group, the first threshold associated with the second feature group.

Example 55 optionally includes the apparatus of any of examples 50-54, wherein the first feature is a number of active processor cores and the second feature is an operational frequency of the active processor cores.

Example 56 optionally includes the apparatus of any of examples 50-55, wherein the means for disabling is to void a warranty of the silicon product if the first group score exceeds a second threshold.

Example 57 is an apparatus, comprising processing circuitry to perform any of Examples 8-14.

Example 58 is a computer-readable medium comprising instructions to perform any of Examples 8-14.

Example 59 is an apparatus, comprising processing circuitry to perform any of Examples 36-42.

Example 60 is a computer-readable medium comprising instructions to perform any of Examples 36-42.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

The following claims are hereby incorporated into this Detailed Description by this reference, with each claim standing on its own as a separate embodiment of the present disclosure.

What is claimed is:

1. At least one non-transitory computer readable medium comprising instructions to cause one or more processors to at least:
    associate a first stock keeping unit with a semiconductor device including a plurality of processor cores, respective ones of the processor cores configurable to be active or dormant, the first stock keeping unit associated with a first number of processor cores of the semiconductor device configured to be active, remaining ones of the processor cores to be dormant processor cores;

command the semiconductor device to activate one or more of the dormant processor cores to cause the semiconductor device to provide a second number of processor cores configured to be active; and generate a second stock keeping unit for the semiconductor device, the second stock keeping unit associated with the semiconductor device having the second number of processor cores configured to be active.

2. The at least one non-transitory computer readable medium of claim 1, wherein the semiconductor device includes a dormant processing capacity or a dormant feature to be made accessible after activation.

3. The at least one non-transitory computer readable medium of claim 2, wherein the instructions are to cause the one or processors to manage the dormant feature after activation on the semiconductor device.

4. The at least one non-transitory computer readable medium of claim 1, wherein the instructions are to cause the one or more processors to command the semiconductor device via a wireless network.

5. The at least one non-transitory computer readable medium of claim 1, wherein the instructions are to cause the one or more processors to report telemetry data associated with the semiconductor device to a manufacturer management record server.

6. The at least one non-transitory computer readable medium of claim 1, wherein the second stock keeping unit is an identifier, the identifier associated with a manufacturer management record maintained for the semiconductor device.

7. The at least one non-transitory computer readable medium of claim 2, wherein the instructions are to cause the one or processors to update the dormant feature in response to feature activation.

8. A method, comprising:

associating a first stock keeping unit with a semiconductor device including a plurality of processor cores, respective ones of the processor cores configurable to be active or dormant, the first stock keeping unit associated with a first number of processor cores of the semiconductor device configured to be dormant, remaining ones of the processor cores to be active processor cores;

commanding the semiconductor device to deactivate one or more of the active processor cores to cause the semiconductor device to provide a second number of processor cores configured to be dormant; and generating a second stock keeping unit for the semiconductor device, the second stock keeping unit associated with the semiconductor device having the second number of processor cores configured to be dormant.

9. The method of claim 8, wherein the semiconductor device includes an active processing capacity or an active feature to be made inaccessible after deactivation.

10. The method of claim 9, further including managing the active feature after deactivation on the semiconductor device.

11. The method of claim 8, further including commanding the semiconductor device via a wireless network.

12. The method of claim 8, further including reporting telemetry data associated with the semiconductor device to a manufacturer management record server.

13. The method of claim 8, wherein the second stock keeping unit is an identifier, the identifier associated with a manufacturer management record maintained for the semiconductor device.

14. The method of claim 9, further including updating the active feature in response to feature deactivation.

15. A system comprising:

at least one memory;

machine readable instructions; and processor circuitry to at least one of instantiate or execute the machine readable instructions to:

associate a first stock keeping unit with a processor platform including a plurality of processor cores, respective ones of the processor cores configurable to be active or dormant, the first stock keeping unit associated with a first number of processor cores of the processor platform configured to be active, remaining ones of the processor cores to be dormant processor cores;

command the processor platform to activate one or more of the dormant processor cores to cause the processor platform to provide a second number of processor cores configured to be active; and generate a second stock keeping unit for the processor platform, the second stock keeping unit associated with the processor platform having the second number of processor cores configured to be active.

16. The system of claim 15, wherein the processor platform includes a dormant processing capacity or a dormant feature to be made accessible after activation.

17. The system of claim 16, wherein the processor circuitry is to manage the dormant feature after activation on the processor platform.

18. The system of claim 15, wherein the processor circuitry is to report telemetry data associated with the processor platform to a manufacturer management record server.

19. The system of claim 15, wherein the second stock keeping unit is an identifier, the identifier associated with a manufacturer management record maintained for the processor platform.

20. At least one non-transitory computer readable medium comprising instructions to cause one or more processors to at least:

associate a first stock keeping unit with a semiconductor device including a plurality of processor cores, respective ones of the processor cores configurable to be active or dormant, the first stock keeping unit associated with a first number of processor cores of the semiconductor device configured to be dormant, remaining ones of the processor cores to be active processor cores;

command the semiconductor device to deactivate one or more of the active processor cores to cause the semiconductor device to provide a second number of processor cores configured to be dormant; and generate a second stock keeping unit for the semiconductor device, the second stock keeping unit associated with the semiconductor device having the second number of processor cores configured to be dormant.

21. The at least one non-transitory computer readable medium of claim 20, wherein the semiconductor device includes an active processing capacity or an active feature to be made inaccessible after deactivation.

22. The at least one non-transitory computer readable medium of claim 21, wherein the instructions are to cause the one or processors to manage the active feature after deactivation on the semiconductor device.

23. The at least one non-transitory computer readable medium of claim 20, wherein the instructions are to cause the one or more processors to command the semiconductor device via a wireless network.

24. The at least one non-transitory computer readable medium of claim 20, wherein the instructions are to cause the one or more processors to report telemetry data associated with the semiconductor device to a manufacturer management record server.

25. The at least one non-transitory computer readable medium of claim 20, wherein the second stock keeping unit is an identifier, the identifier associated with a manufacturer management record maintained for the semiconductor device.

* * * * *